US011385429B2

(12) United States Patent
Bolster et al.

(10) Patent No.: US 11,385,429 B2
(45) Date of Patent: Jul. 12, 2022

(54) FIBER OPTIC CONNECTION CASSETTE

(71) Applicant: COMMSCOPE TECHNOLOGIES LLC, Hickory, NC (US)

(72) Inventors: Kristofer Bolster, Jordan, MN (US); Matthew J. Holmberg, Le Center, MN (US); Jill Anne Malecha, New Prague, MN (US); Loren J. Mattson, Richfield, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/757,226

(22) PCT Filed: Oct. 17, 2018

(86) PCT No.: PCT/US2018/056243
§ 371 (c)(1),
(2) Date: Apr. 17, 2020

(87) PCT Pub. No.: WO2019/079419
PCT Pub. Date: Apr. 25, 2019

(65) Prior Publication Data

US 2021/0191059 A1 Jun. 24, 2021

Related U.S. Application Data

(60) Provisional application No. 62/573,743, filed on Oct. 18, 2017, provisional application No. 62/577,005,
(Continued)

(51) Int. Cl.
*G02B 6/44* (2006.01)
*G02B 6/46* (2006.01)
(Continued)

(52) U.S. Cl.
CPC ......... *G02B 6/4454* (2013.01); *G02B 6/3874* (2013.01); *G02B 6/3897* (2013.01); *G02B 6/4471* (2013.01)

(58) Field of Classification Search
CPC ... G02B 6/4454; G02B 6/3874; G02B 6/4471
(Continued)

(56) References Cited

U.S. PATENT DOCUMENTS 2,805,106 A 9/1957 Penkala
2,864,656 A 12/1958 Yorinks
(Continued)

FOREIGN PATENT DOCUMENTS

AU 40995/85 4/1985
AU 55314/86 3/1986
(Continued)

OTHER PUBLICATIONS

International Search Report and Written Opinion of the International Searching Authority for International Patent Application No. PCT/US2018/056243 dated Mar. 7, 2019, 8 pages.
(Continued)

*Primary Examiner* — Kaveh C Kianni
(74) *Attorney, Agent, or Firm* — Merchant & Gould P.C.

(57) ABSTRACT

A fiber optic cassette may include a cassette body defining a front end, a rear end, and an enclosed interior. Multiple identical apertures are included on the front end of the cassette body, where each aperture is configured to accept a fiber optic adapter. The cassette may further include an optical component located in an enclosed interior of the cassette body and configured to process a signal received from a fiber optic connector coupled to one of the fiber optic adapters, a crimp tube mounted to the front end of the cassette body, and at least one fiber optic cable attached to the crimp tube, extending from the cassette and configured
(Continued)

to carry the signal processed by the optical component. The fiber optic cable may include a jacket, a strength member crimped to the crimp tube, and optical fibers extending past the crimp tube into the interior of the cassette body, wherein the mounting structure for mounting the crimp tube to the cassette body is receivable within one of the identical apertures.

17 Claims, 128 Drawing Sheets

Related U.S. Application Data filed on Oct. 25, 2017, provisional application No. 62/658,030, filed on Apr. 16, 2018.

(51) Int. Cl.
*G02B 6/00* (2006.01)
*G02B 6/38* (2006.01)

(58) Field of Classification Search
USPC .......................................................... 385/135
See application file for complete search history.

(56) References Cited

U.S. PATENT DOCUMENTS 3,901,564 A 8/1975 Armstrong
4,070,076 A 1/1978 Zwillinger
4,172,625 A 10/1979 Swain
4,320,934 A 3/1982 Röck et al.
4,359,262 A 11/1982 Dolan
4,373,776 A 2/1983 Purdy
4,494,806 A 1/1985 Williams et al.
4,502,754 A 3/1985 Kawa
4,585,303 A 4/1986 Pinsard et al.
4,595,255 A 6/1986 Bhatt et al.
4,630,886 A 12/1986 Lauriello et al.
4,697,874 A 10/1987 Nozick
4,699,455 A 10/1987 Erbe et al.
4,708,430 A 11/1987 Donaldson et al.
4,717,231 A 1/1988 Dewez et al.
4,737,039 A 4/1988 Sekerich
4,765,710 A 8/1988 Burmeister et al.
4,792,203 A 12/1988 Nelson et al.
4,820,007 A 4/1989 Ross et al.
4,840,449 A 6/1989 Ghandeharizadeh
4,898,448 A 2/1990 Cooper
4,971,421 A 11/1990 Ori
4,986,762 A 1/1991 Keith
4,995,688 A 2/1991 Anton et al.
5,024,498 A 6/1991 Becker et al.
5,066,149 A 11/1991 Wheeler et al.
5,067,678 A 11/1991 Henneberger et al.
5,067,784 A * 11/1991 Debortoli ............. G02B 6/4452 385/53
5,071,211 A * 12/1991 Debortoli ............. G02B 6/4455 385/76
5,100,221 A 3/1992 Carney et al.
5,127,082 A 6/1992 Below et al.
5,129,030 A 7/1992 Petrunia
5,138,688 A 8/1992 Debortoli
5,142,606 A 8/1992 Carney et al.
5,142,607 A 8/1992 Petrotta et al.
5,167,001 A 11/1992 Debortoli et al.
5,174,675 A 12/1992 Martin
5,240,209 A 8/1993 Kutsch
5,247,603 A 9/1993 Vidacovich et al.
5,275,064 A 1/1994 Hobbs
5,285,515 A 2/1994 Milanowski et al.
5,289,558 A 2/1994 Teichler et al.
5,316,243 A 5/1994 Henneberger
5,323,480 A 6/1994 Mullaney et al.
5,335,349 A 8/1994 Kutsch et al.
5,339,379 A 8/1994 Kutsch et al.
5,353,367 A 10/1994 Czosnowski et al.
5,363,466 A 11/1994 Milanowskki et al.
5,363,467 A 11/1994 Keith
5,402,515 A 3/1995 Vidacovich et al.
5,412,751 A 5/1995 Siemon et al.
5,430,823 A 7/1995 Dupont et al.
5,438,641 A 8/1995 Malacarne
5,446,822 A * 8/1995 Keith ................... G02B 6/3897 174/117 R
5,490,229 A 2/1996 Ghanderharizadeh et al.
5,497,444 A 3/1996 Wheeler
5,509,096 A 4/1996 Easley
5,511,144 A 4/1996 Hawkins et al.
5,530,783 A 6/1996 Belopolsky et al.
5,570,450 A 10/1996 Fernandez et al.
5,613,030 A 3/1997 Hoffer et al.
5,640,481 A 6/1997 Llewellyn et al.
5,655,044 A 8/1997 Finzel et al.
5,717,810 A 2/1998 Wheeler
5,724,469 A 3/1998 Orlando
5,802,237 A 9/1998 Pulido
5,811,055 A 9/1998 Geiger
5,836,148 A 11/1998 Fukao
5,882,100 A 3/1999 Rock
5,887,106 A 3/1999 Cheeseman et al.
5,917,984 A 6/1999 Röseler et al.
5,923,753 A 7/1999 Haataja et al.
5,946,440 A * 8/1999 Puetz ................... G02B 6/4455 385/135
5,966,492 A 10/1999 Bechamps et al.
5,971,626 A 10/1999 Knodell et al.
5,975,769 A 11/1999 Larson et al.
5,978,540 A 11/1999 Bechamps et al.
6,009,224 A 12/1999 Allen
6,022,150 A 2/2000 Erdman et al.
6,027,252 A 2/2000 Erdman et al.
6,044,194 A 3/2000 Meyerhoefer
6,076,908 A 6/2000 Maffeo
6,215,938 B1 4/2001 Reitmeier et al.
6,226,436 B1 5/2001 Daoud et al.
6,236,795 B1 5/2001 Rodgers
6,269,214 B1 7/2001 Naudin et al.
6,301,424 B1 10/2001 Hwang
6,360,050 B1 * 3/2002 Moua ................... G02B 6/3897 385/135
6,377,722 B1 4/2002 Hoekstra
6,438,310 B1 8/2002 Lance et al.
6,439,523 B1 8/2002 Chandler et al.
6,496,638 B1 12/2002 Andersen
6,504,988 B1 1/2003 Trebesch et al.
6,591,051 B2 7/2003 Solheid et al.
6,594,434 B1 7/2003 Davidson et al.
6,600,866 B2 7/2003 Gatica et al.
RE38,311 E 11/2003 Burmeister et al.
6,677,520 B1 1/2004 Kim et al.
6,715,619 B2 4/2004 Kim et al.
6,738,555 B1 * 5/2004 Cooke .................. G02B 6/4471 385/136
6,748,155 B2 6/2004 Kim et al.
6,768,860 B2 7/2004 Liberty
6,804,447 B2 * 10/2004 Smith .................. G02B 6/4453 385/134
6,809,258 B1 10/2004 Dang et al.
6,810,193 B1 10/2004 Müller
6,845,208 B2 1/2005 Thibault et al.
6,865,331 B2 3/2005 Mertesdorf
6,925,241 B2 8/2005 Bohle et al.
6,934,457 B2 8/2005 Vincent et al.
6,945,620 B2 9/2005 Lam et al.
6,968,111 B2 11/2005 Trebesch et al.
7,006,748 B2 2/2006 Dagley et al.
7,068,907 B2 6/2006 Schray
7,079,744 B2 7/2006 Douglas et al.
7,116,777 B2 10/2006 Knudsen et al.
7,120,348 B2 10/2006 Trebesch et al.
7,171,099 B2 1/2007 Barnes et al.
7,302,153 B2 11/2007 Thom

(56) References Cited

U.S. PATENT DOCUMENTS 7,302,154 B2 11/2007 Trebesch et al.
7,308,184 B2 12/2007 Barnes et al.
7,367,823 B2 * 5/2008 Rapp .................... G02B 6/4452 439/137
7,373,031 B2 * 5/2008 Wang .................... G02B 6/4292 385/14
7,373,071 B2 5/2008 Douglas et al.
7,406,240 B2 7/2008 Murano
7,409,137 B2 8/2008 Barnes
7,460,757 B2 12/2008 Hoehne et al.
7,463,811 B2 12/2008 Trebesch et al.
7,496,268 B2 2/2009 Escoto et al.
7,499,623 B2 3/2009 Barnes et al.
7,570,860 B2 8/2009 Smrha et al.
7,664,361 B2 2/2010 Trebesch et al.
7,689,089 B2 * 3/2010 Wagner .................... H04Q 1/13 385/135
7,706,656 B2 * 4/2010 Zimmel ............... G02B 6/3897 385/135
7,715,681 B2 5/2010 Krampotich et al.
7,747,125 B1 6/2010 Lee et al.
RE41,460 E 7/2010 Wheeler
7,751,674 B2 7/2010 Hill
7,764,859 B2 7/2010 Krampotich et al.
7,856,166 B2 12/2010 Biribuze et al.
7,869,683 B2 1/2011 Barnes et al.
7,876,993 B2 1/2011 Krampotich et al.
7,889,961 B2 2/2011 Cote et al.
7,945,135 B2 5/2011 Cooke et al.
7,945,138 B2 5/2011 Hill et al.
8,027,558 B2 5/2011 Barnes et al.
8,059,932 B2 * 11/2011 Hill .......................... G02B 6/46 385/135
8,078,030 B2 12/2011 Trebesch et al.
8,165,442 B2 * 4/2012 Burek .................. G02B 6/4471 385/134
8,195,022 B2 6/2012 Coburn et al.
8,285,104 B2 * 10/2012 Davis ................... G02B 6/4471 385/135
8,374,477 B2 2/2013 Hill
8,433,171 B2 4/2013 Cooke et al.
8,452,148 B2 5/2013 Cooke et al.
8,452,149 B2 5/2013 Krampotich et al.
8,559,785 B2 * 10/2013 Barlowe .............. G02B 6/4471 385/135
8,600,208 B2 12/2013 Badar et al.
8,639,081 B2 1/2014 Barnes et al.
8,655,136 B2 2/2014 Trebesch et al.
8,690,593 B2 4/2014 Anderson et al.
8,705,926 B2 4/2014 Giraud et al.
8,855,458 B2 10/2014 Belenkiy et al.
9,020,320 B2 4/2015 Cooke et al.
9,075,203 B2 7/2015 Holmberg
9,075,217 B2 7/2015 Giraud et al.
9,348,105 B2 5/2016 Rudenick et al.
9,535,229 B2 1/2017 Ott et al.
9,618,702 B2 4/2017 Takano et al.
9,709,765 B2 7/2017 Wells et al.
9,804,340 B1 10/2017 Yu-Ching
9,933,582 B1 4/2018 Yu-Ching
10,082,636 B2 9/2018 Solheid et al.
2001/0001270 A1 5/2001 Vigliaturo
2001/0043778 A1 11/2001 Griffis et al.
2002/0181922 A1 12/2002 Xin et al.
2003/0007767 A1 1/2003 Douglas et al.
2003/0128951 A1 7/2003 Lecomte et al.
2003/0165315 A1 9/2003 Trebesch et al.
2003/0174996 A1 * 9/2003 Henschel ............. G02B 6/3897 385/135
2003/0190035 A1 * 10/2003 Knudsen ................ H04Q 1/068 379/325
2004/0011750 A1 * 1/2004 Kim ..................... G02B 6/4452 211/26
2004/0013390 A1 1/2004 Kim et al.
2004/0033027 A1 2/2004 Pang et al.
2004/0136676 A1 7/2004 Mertesdorf
2004/0175090 A1 9/2004 Vastmans et al.
2004/0258384 A1 12/2004 Trebesch et al.
2005/0025444 A1 * 2/2005 Barnes ................. A47B 88/443 385/135
2005/0058421 A1 * 3/2005 Dagley ................ G02B 6/4452 385/135
2005/0078929 A1 4/2005 Iwanek
2005/0100301 A1 * 5/2005 Solheid .................... H04Q 1/14 385/135
2005/0111809 A1 * 5/2005 Giraud ................. G02B 6/4455 385/135
2005/0123261 A1 6/2005 Bellekens et al.
2006/0093302 A1 5/2006 Solheid et al.
2006/0269206 A1 11/2006 Zimmel
2006/0275008 A1 * 12/2006 Xin ...................... G02B 6/4455 385/135
2007/0003204 A1 1/2007 Makrides-Saravanos et al.
2007/0031099 A1 2/2007 Herzog et al.
2007/0036503 A1 * 2/2007 Solheid ................ G02B 6/4452 385/134
2007/0047893 A1 3/2007 Kramer et al.
2007/0201806 A1 8/2007 Douglas et al.
2008/0080828 A1 * 4/2008 Leon .................... G02B 6/4452 385/135
2008/0175550 A1 7/2008 Cobum et al.
2009/0067800 A1 * 3/2009 Vazquez ................ A47B 46/00 385/135
2009/0067802 A1 3/2009 Hoehne et al.
2009/0097813 A1 4/2009 Hill
2009/0129033 A1 5/2009 Srnrha et al.
2009/0214171 A1 * 8/2009 Coburn ................ G02B 6/4452 385/135
2009/0226142 A1 9/2009 Barnes et al.
2009/0245743 A1 * 10/2009 Cote .................... G02B 6/4454 385/135
2009/0274431 A1 11/2009 Krampotich et al.
2010/0129043 A1 * 5/2010 Cooke .................. G02B 6/3849 385/139
2010/0142910 A1 6/2010 Hill et al.
2010/0158465 A1 * 6/2010 Smrha .................. G02B 6/4453 385/135
2010/0183276 A1 * 7/2010 Smith .................. G02B 6/4452 385/135
2010/0189403 A1 * 7/2010 Keith ................... G02B 6/4455 385/135
2010/0266253 A1 10/2010 Krampotich et al.
2010/0310225 A1 12/2010 Anderson et al.
2010/0316346 A1 12/2010 Krampotich et al.
2010/0322578 A1 12/2010 Cooke et al.
2010/0322580 A1 * 12/2010 Beamon ............... G02B 6/4452 385/135
2011/0018809 A1 1/2011 Nochi et al.
2011/0019964 A1 * 1/2011 Nhep ................... G02B 6/3825 385/135
2011/0026894 A1 * 2/2011 Rudenick ............... G02B 6/445 385/135
2011/0188809 A1 8/2011 LeBlanc et al.
2011/0211799 A1 * 9/2011 Conner ................ G02B 6/4471 385/135
2011/0217016 A1 9/2011 Mullsteff
2011/0267742 A1 11/2011 Togami et al.
2011/0267794 A1 * 11/2011 Anderson ............ H05K 7/1401 361/810
2011/0268404 A1 * 11/2011 Cote .................... G02B 6/4452 385/135
2011/0268407 A1 11/2011 Cowen et al.
2011/0268408 A1 11/2011 Giraud et al.
2011/0268410 A1 11/2011 Giraud et al.
2011/0268412 A1 11/2011 Giraud et al.
2011/0286712 A1 11/2011 Puetz et al.
2011/0317974 A1 * 12/2011 Krampotich ......... G02B 6/4455 385/135
2012/0051708 A1 * 3/2012 Badar .................. G02B 6/4453 385/135
2012/0057838 A1 3/2012 Hill et al.

(56) References Cited

U.S. PATENT DOCUMENTS

| | | | | |
|---|---|---|---|---|
| 2012/0237173 | A1* | 9/2012 | Alston | G02B 6/3874 385/97 |
| 2012/0321269 | A1 | 12/2012 | Kramer et al. | |
| 2013/0039623 | A1 | 2/2013 | Zhang | |
| 2013/0089292 | A1 | 4/2013 | Ott et al. | |
| 2013/0089298 | A1 | 4/2013 | Holmberg et al. | |
| 2013/0108231 | A1 | 5/2013 | Mertesdorf | |
| 2013/0148936 | A1 | 6/2013 | Hill | |
| 2013/0183018 | A1 | 7/2013 | Holmberg | |
| 2013/0287356 | A1 | 10/2013 | Solheid et al. | |
| 2013/0322832 | A1 | 12/2013 | Wang et al. | |
| 2014/0086545 | A1 | 3/2014 | Solheid et al. | |
| 2014/0133819 | A1 | 5/2014 | Trebesch et al. | |
| 2014/0150237 | A1 | 6/2014 | Wright et al. | |
| 2014/0153875 | A1 | 6/2014 | Bradley et al. | |
| 2014/0334790 | A1 | 11/2014 | Zhang | |
| 2015/0234131 | A1 | 8/2015 | Tseng | |
| 2016/0259135 | A1 | 9/2016 | Gniadek et al. | |
| 2017/0131485 | A1 | 5/2017 | Murray et al. | |
| 2018/0031783 | A1 | 2/2018 | Lewallen et al. | |

FOREIGN PATENT DOCUMENTS

| | | | |
|---|---|---|---|
| CN | 102203653 | | 9/2011 |
| DE | 2735106 | | 2/1979 |
| DE | 2918309 | | 11/1980 |
| DE | 3308682 | | 9/1984 |
| DE | 3836273 | | 4/1990 |
| DE | 4413136 | | 5/1995 |
| DE | 29504191 | | 3/1996 |
| EP | 0146478 | | 6/1985 |
| EP | 0149250 | | 7/1985 |
| EP | 0356942 | | 3/1990 |
| EP | 0406151 | | 1/1991 |
| EP | 0464570 | | 1/1992 |
| EP | 0479226 | | 4/1992 |
| EP | 0196102 | | 3/1993 |
| EP | 0538164 | | 4/1993 |
| EP | 0606152 | | 7/1994 |
| EP | 0801317 | A2 | 10/1997 |
| EP | 0563995 | | 10/1999 |
| FR | 2531576 | | 2/1984 |
| FR | 2587127 | | 3/1987 |
| FR | 2678076 | | 12/1992 |
| JP | 59-74523 | | 4/1984 |
| JP | 60-169811 | | 9/1985 |
| JP | 61-55607 | | 3/1986 |
| JP | 61-90104 | | 5/1986 |
| JP | 2002270286 | | 9/2002 |
| KR | 200337929 | | 1/2004 |
| KR | 20080033420 | | 4/2008 |
| WO | WO 91/10927 | | 7/1991 |
| WO | WO 95/07480 | | 3/1995 |
| WO | WO 96/10203 | | 4/1996 |
| WO | WO 99/00619 | | 1/1999 |
| WO | WO 03/005095 | | 1/2003 |
| WO | WO 2010/083369 | A1 | 7/2010 |
| WO | 2013/055591 | A2 | 4/2013 |
| WO | WO 2013/177413 | | 11/2013 |

OTHER PUBLICATIONS

"ITU Fiber Handbook" with English translation, 14 pages, Mar. 1992.
"Precision Mechanical" with English translation, 5 pages.
Northern Telecom Bulletin #91-004, Issue #2, 16 pages, May 1991.
AT&T Product Bulletin 2987D-DLH-7/89, "High Density Interconnect System (HDIC)," Issue 2, 4 pages (Copyright 1989).
Preface to the book "Structure, Installation, Connection and Protection of Communication Optical Fiber Cable," in Chinese with English Translation, 14 pages (Mar. 1992).
Complaint relating to Civil Action No. 5:11-cv-02509-JS, *ADC Telecommunications, Inc* v. *Opterna Am, Inc.* filed Apr. 11, 2011 (14 pages).
Complaint relating to Civil Action No. 1:11cv-735 (GBL-IDD), *ADC Telecommunications, Inc* v. *Opterna Am, Inc.* filed Jul. 12, 2011 (6 pages).
Plaintiff's Notice of Dismissal relating to Civil Action No. 5:11-cv-02509-JD, *ADC Telecommunications, Inc* v. *Opterna Am, Inc.* filed Jul. 12, 2011 (1 page).
Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

* cited by examiner

Section A-A

Section B-B

FIBER OPTIC CONNECTION CASSETTE

CROSS-REFERENCE TO RELATED APPLICATIONS

This application is a National Stage Application of PCT/US2018/056243, filed on Oct. 17, 2018, which claims the benefit of U.S. Patent Application Ser. No. 62/573,743, filed on Oct. 18, 2017, and claims the benefit of U.S. Patent Application Ser. No. 62/577,005, filed on Oct. 25, 2017, and claims the benefit of U.S. Patent Application Ser. No. 62/658,030, filed on Apr. 16, 2018, the disclosures of which are incorporated herein by reference in their entireties. To the extent appropriate, a claim of priority is made to each of the above disclosed applications.

TECHNICAL FIELD

The present disclosure relates generally to fiber optic telecommunications equipment. More specifically, the present disclosure relates to a fiber optic cassette and module designed for high density applications.

BACKGROUND

In the telecommunications industry, the demand for added capacity is growing rapidly. This demand is being met, in part, by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs), which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to a fiber optic telecommunications device. In some embodiments, the device is a fiber optic cassette, for attachment to a fiber optic module. In alternative embodiments, the device is a fiber optic module with integrated cassette features. In either case, the device includes multiple multi-fiber cables and multiple high-density connectors attached to a front side of the device.

In one embodiment, a fiber optic cassette includes a cassette body, at least one signal entry/exit port, an optical component, a crimp tube and at least one fiber optic cable. The cassette body defines a front end, a rear end and an enclosed interior. The signal entry/exit port is located in the front end of the cassette body and is defined by a fiber optic adapter. The optical component is located in the enclosed interior of the cassette body and is configured to process a signal received from a fiber optic connector coupled to the fiber optic adapter. The crimp tube is mounted to the front end of the cassette body. The fiber optic cable is attached to the crimp tube and extends from the cassette. It is configured to carry the signal processed by the optical component and may include a jacket, a strength member crimped to the crimp tube, and optical fibers extending past the crimp tube into the interior of the cassette body.

According to one aspect, the disclosure is directed to a fiber optic cassette that may include a cassette body defining a front end, a rear end, and an enclosed interior. Multiple identical apertures are included on the front end of the cassette body, where each aperture is configured to accept a fiber optic adapter. The cassette may further include an optical component located in an enclosed interior of the cassette body and configured to process a signal received from a fiber optic connector coupled to one of the fiber optic adapters, a crimp tube mounted to the front end of the cassette body, and at least one fiber optic cable attached to the crimp tube, extending from the cassette and configured to carry the signal processed by the optical component. The fiber optic cable may include a jacket, a strength member crimped to the crimp tube, and optical fibers extending past the crimp tube into the interior of the cassette body, wherein the mounting structure for mounting the crimp tube to the cassette body is receivable within one of the identical apertures.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

Figure 8:
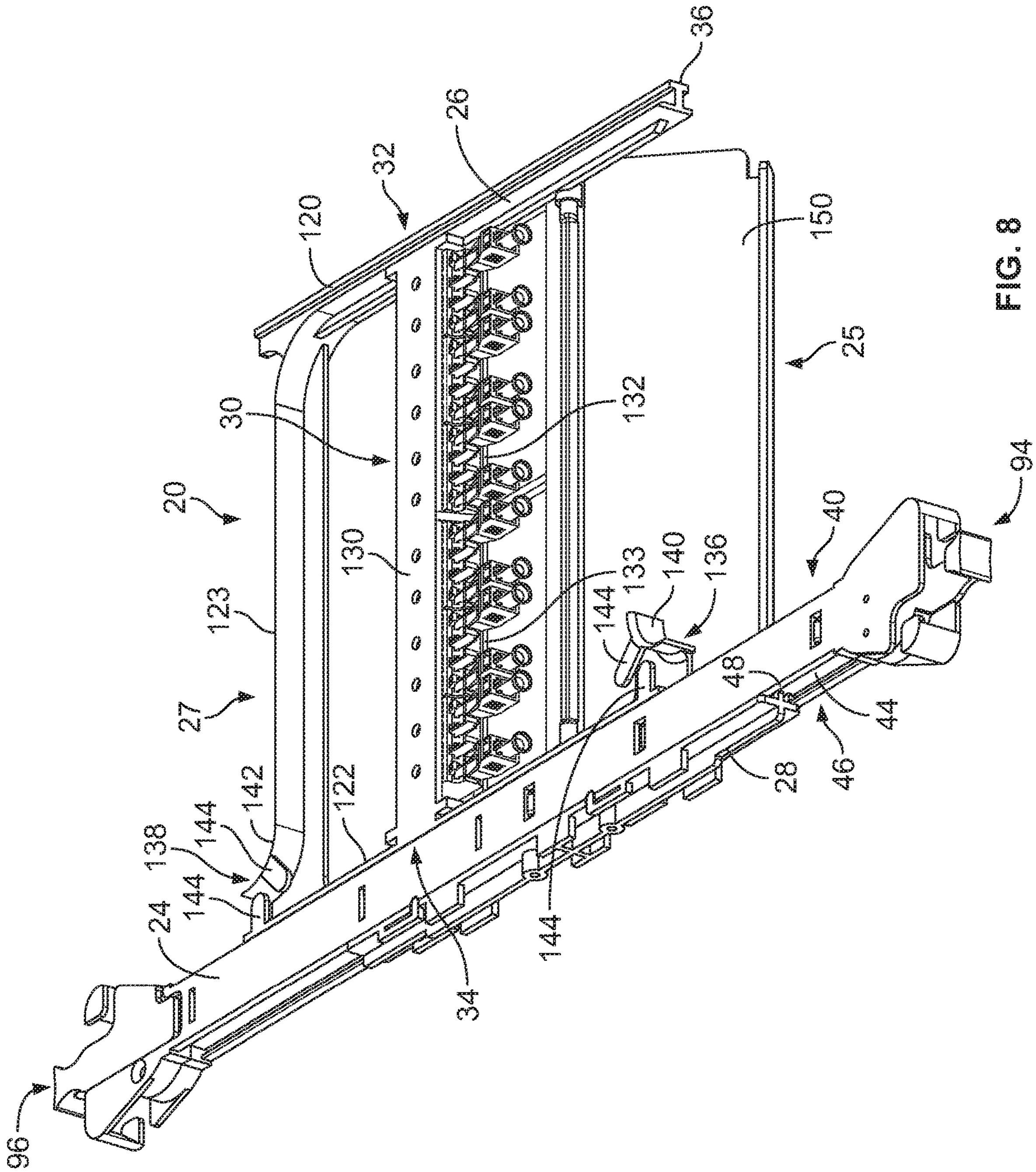
FIG. 8 is a front, left, top perspective view of one of the plurality of slidable fiber optic connection modules of FIG. 1 shown in isolation.
Figure 10:
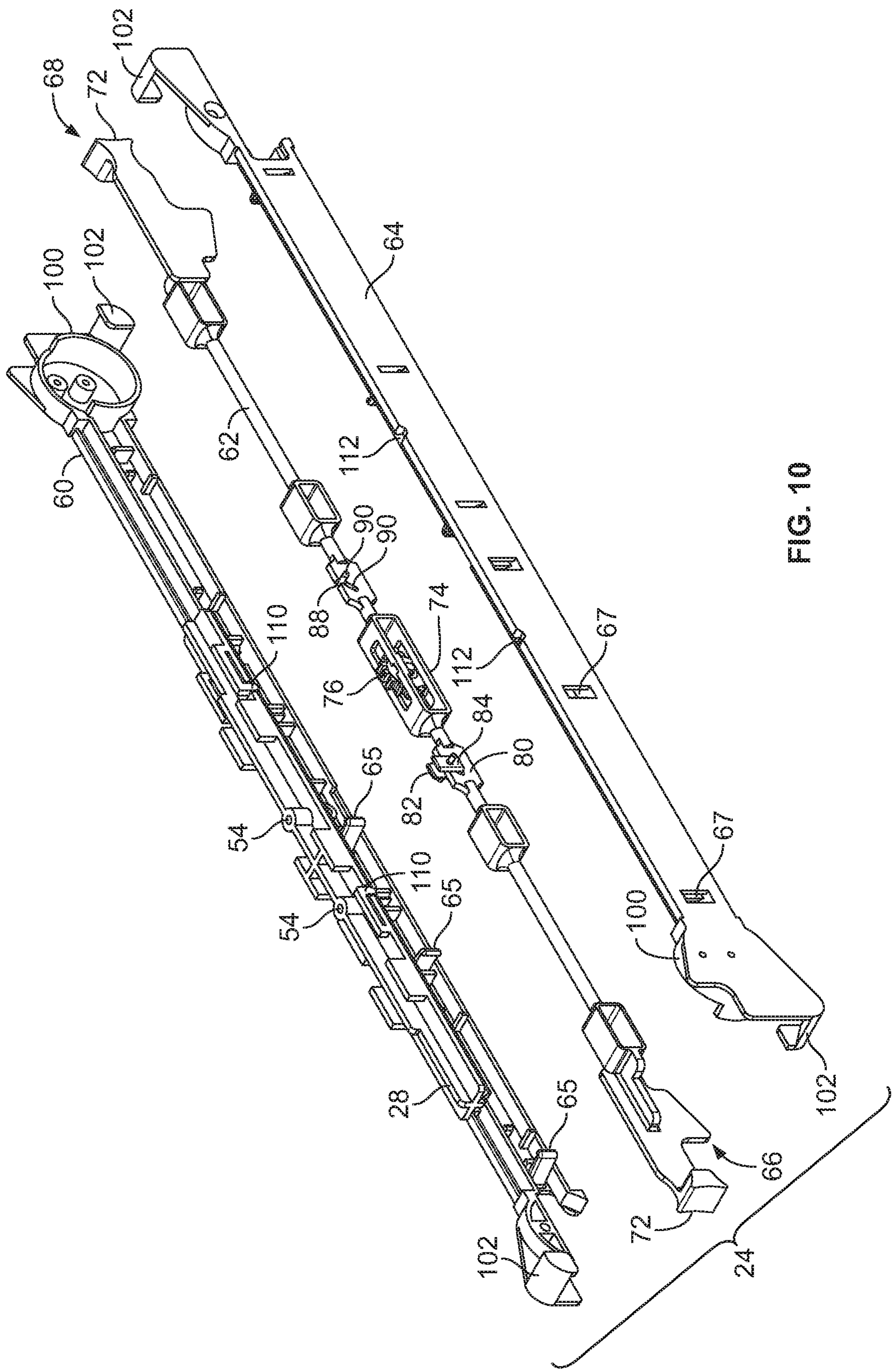
FIG. 10 is an exploded view of the center member of the slide assembly of the fiber optic connection module of FIG.
Figures 11, 12:
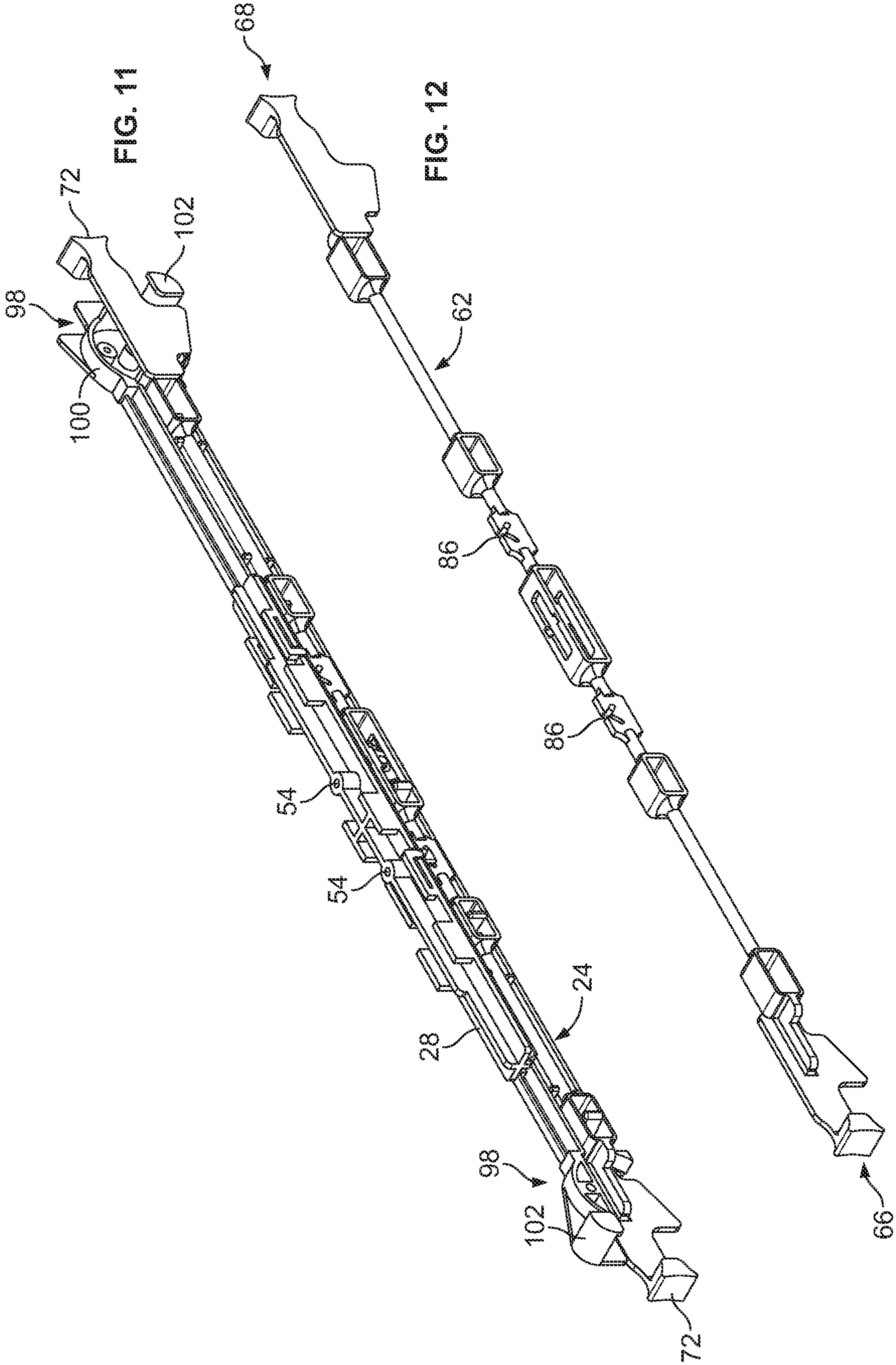
Figure 13:
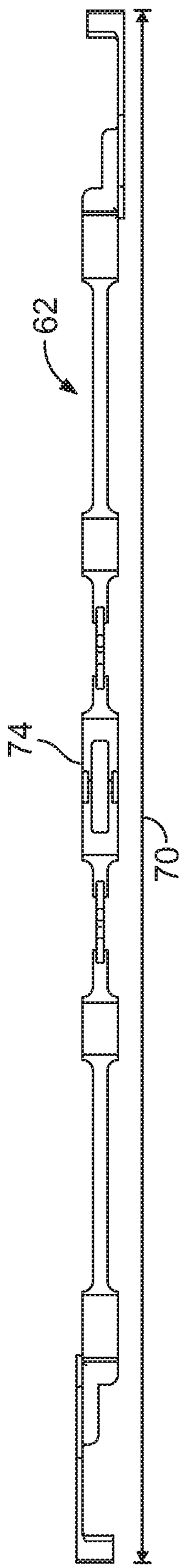
Figure 14:
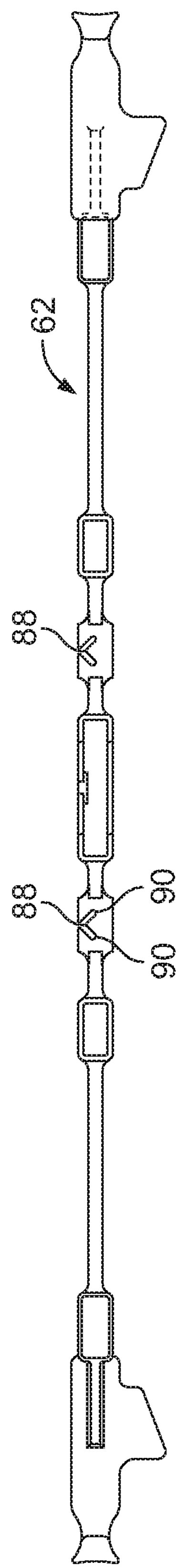
Figure 15:
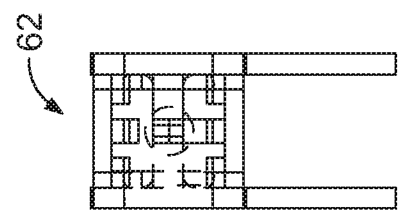
Figure 16:
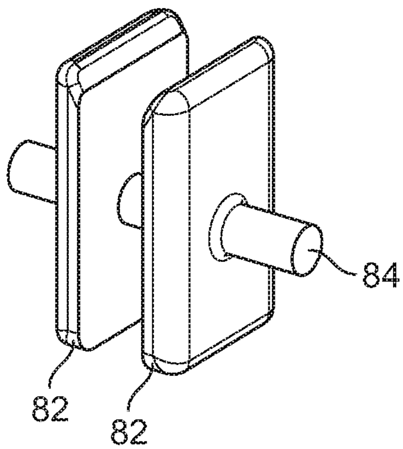
Figure 17:
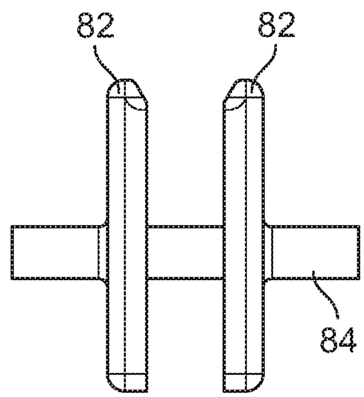
Figure 18:
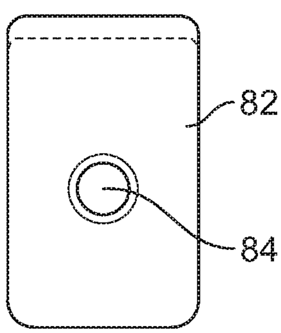
Figure 19:
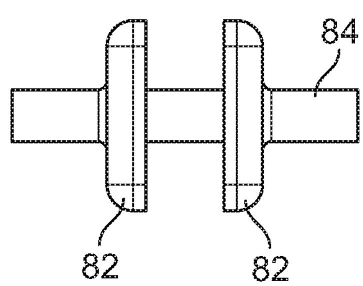
Figure 20:
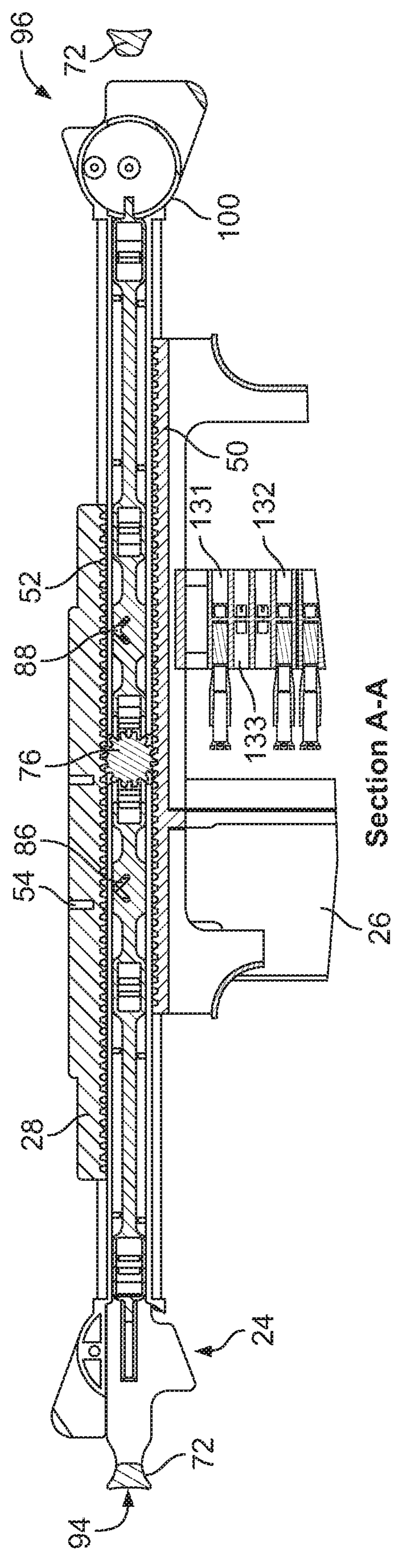
Figures 21, 22:
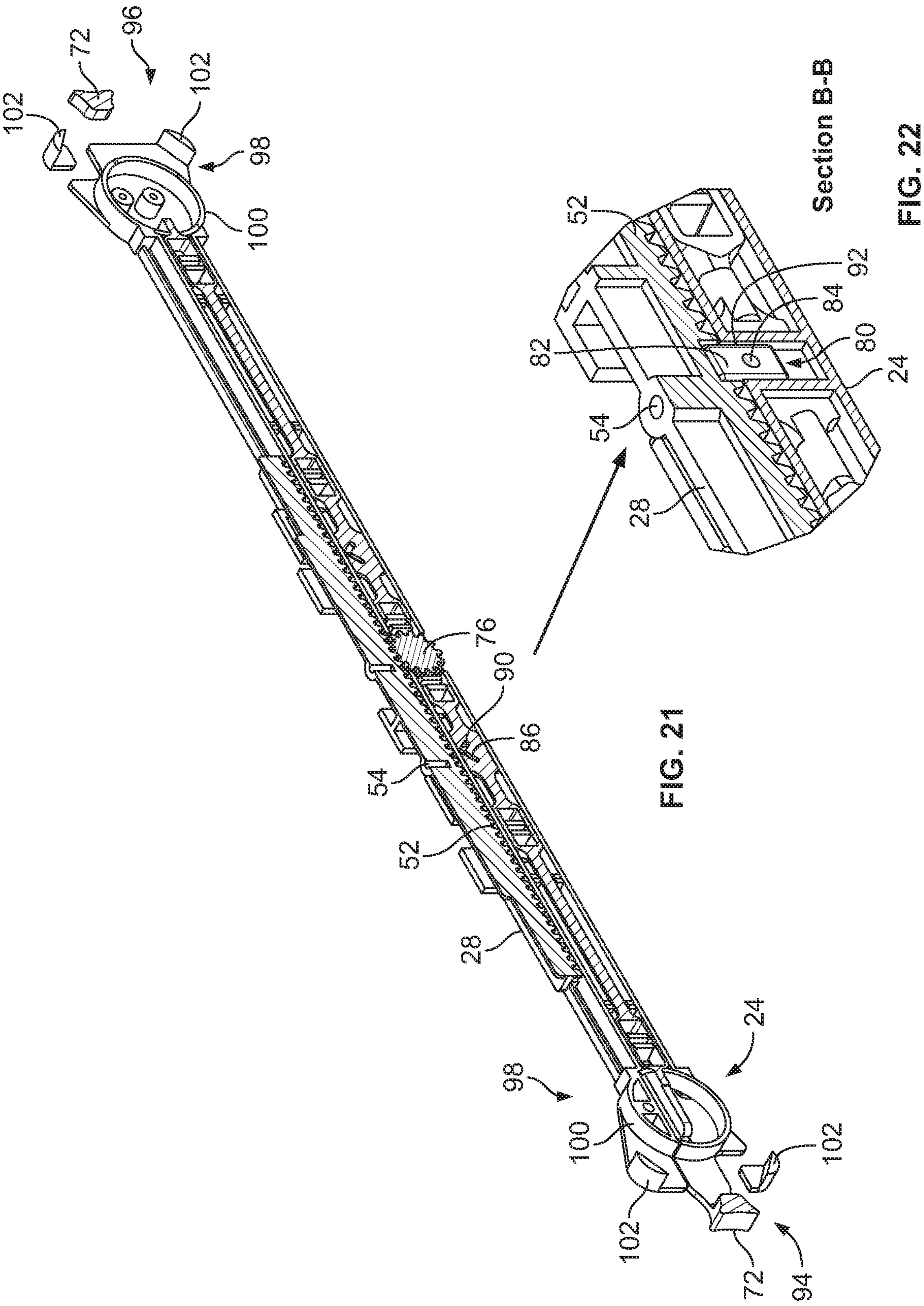
Figure 23:
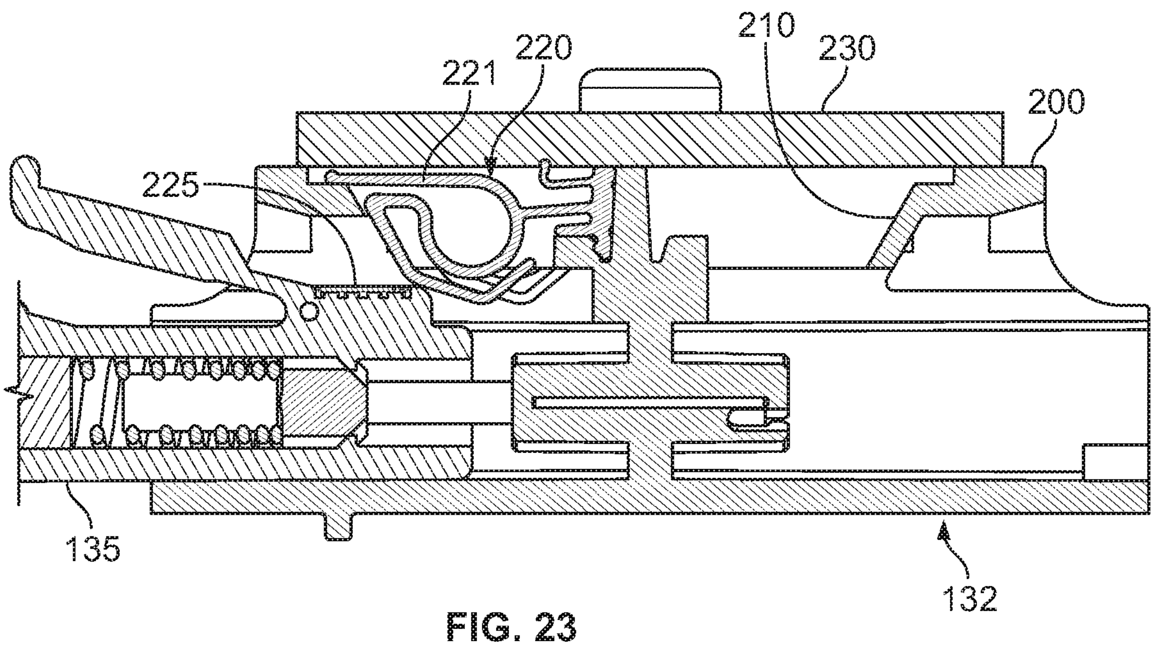
Figure 24:
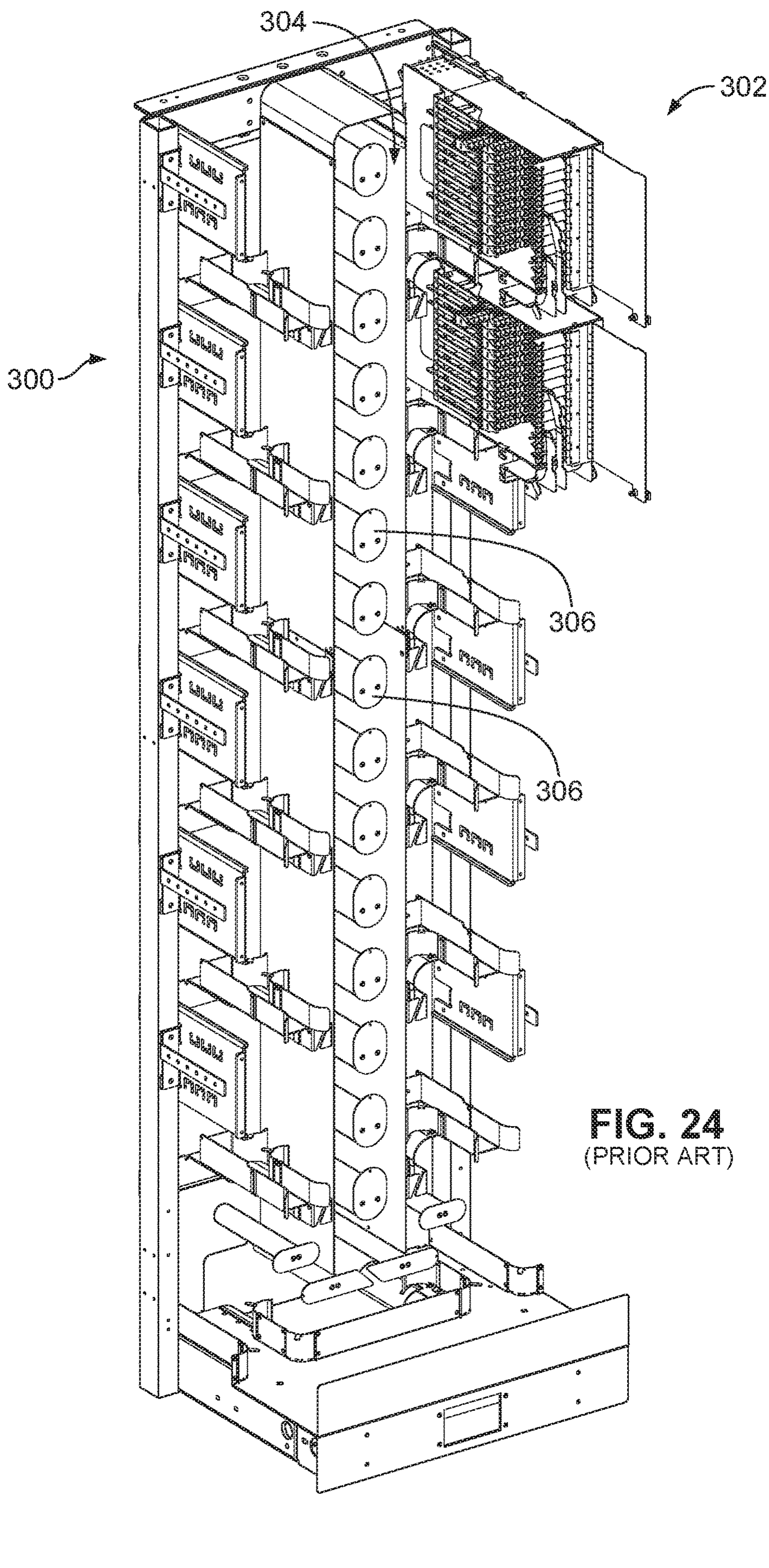
Figure 25:
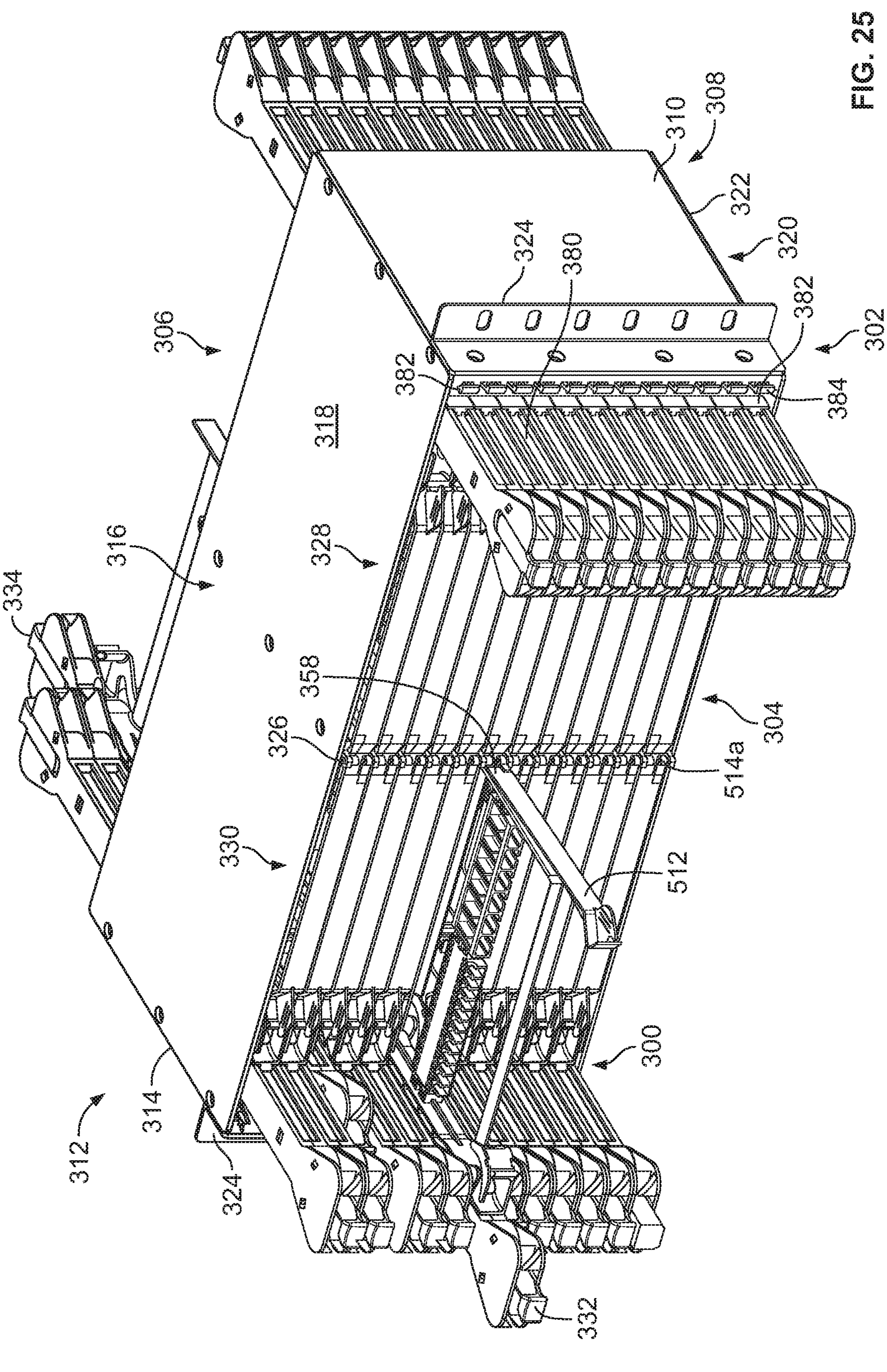
Figure 26:
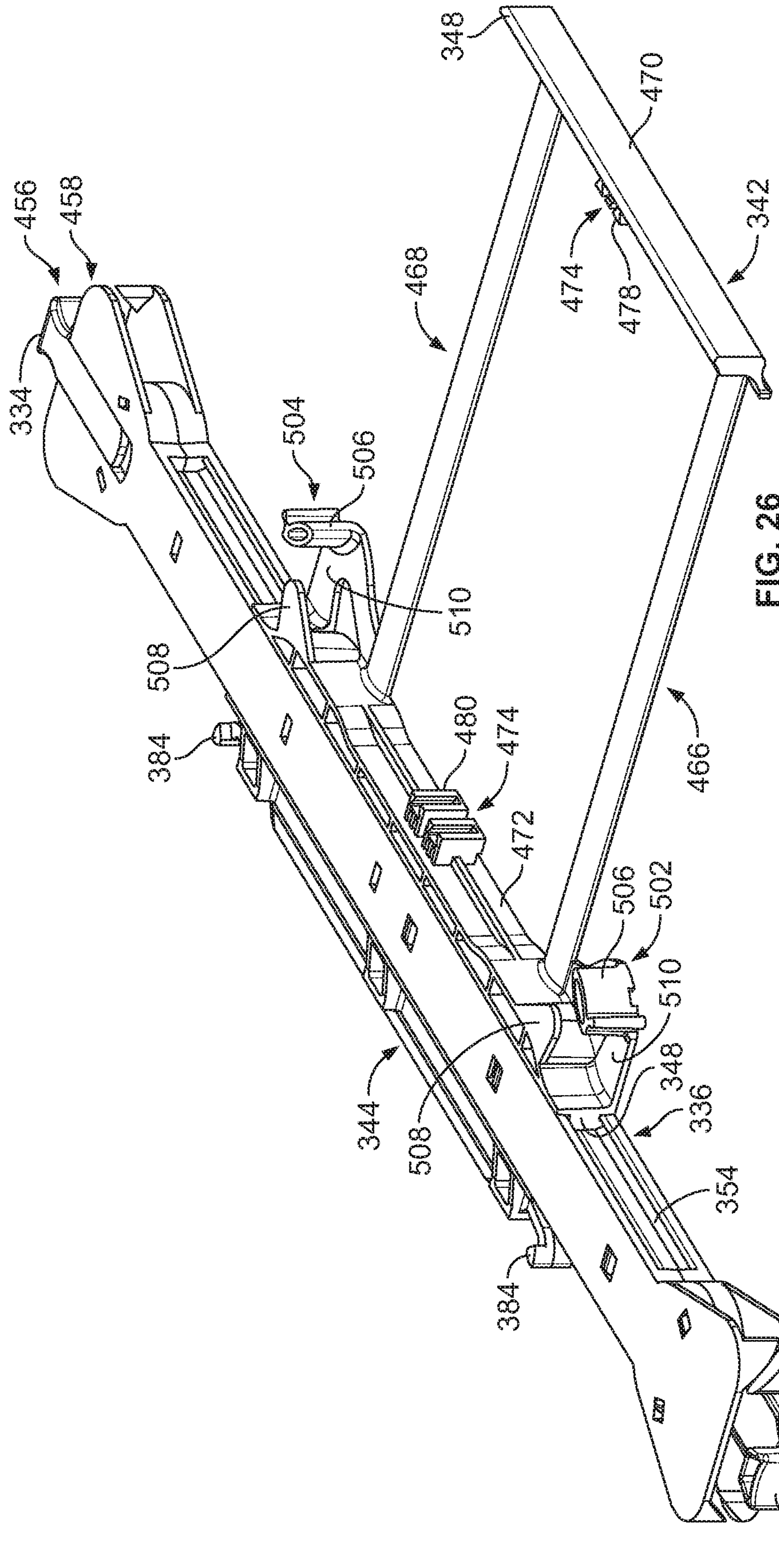
Figure 27:
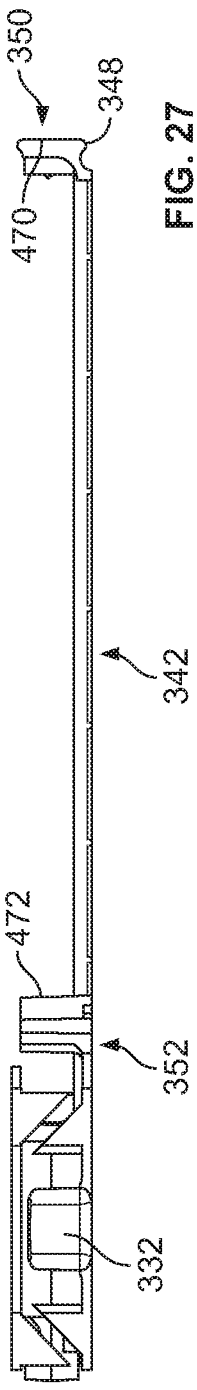
Figure 28:
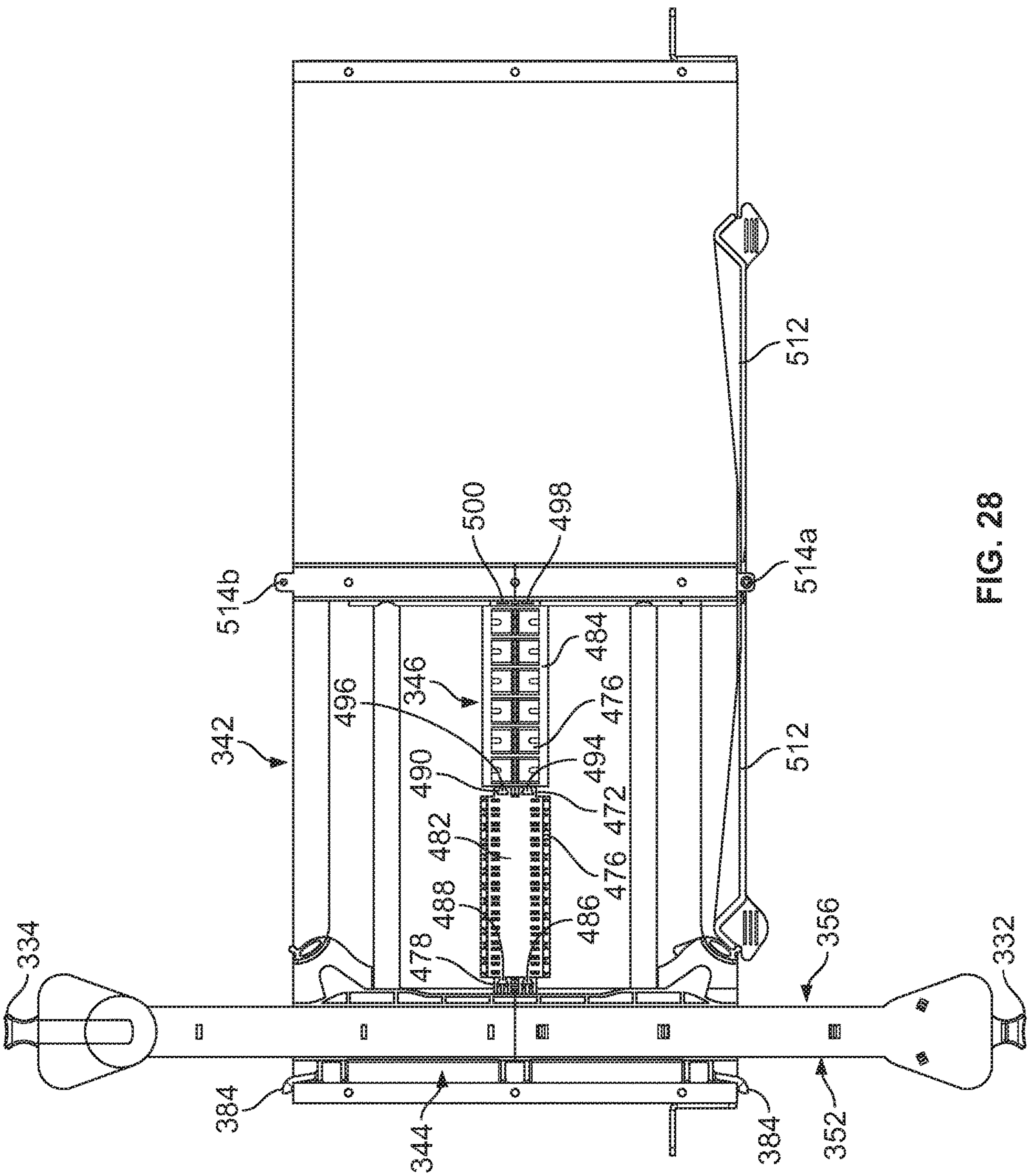
Figure 29:
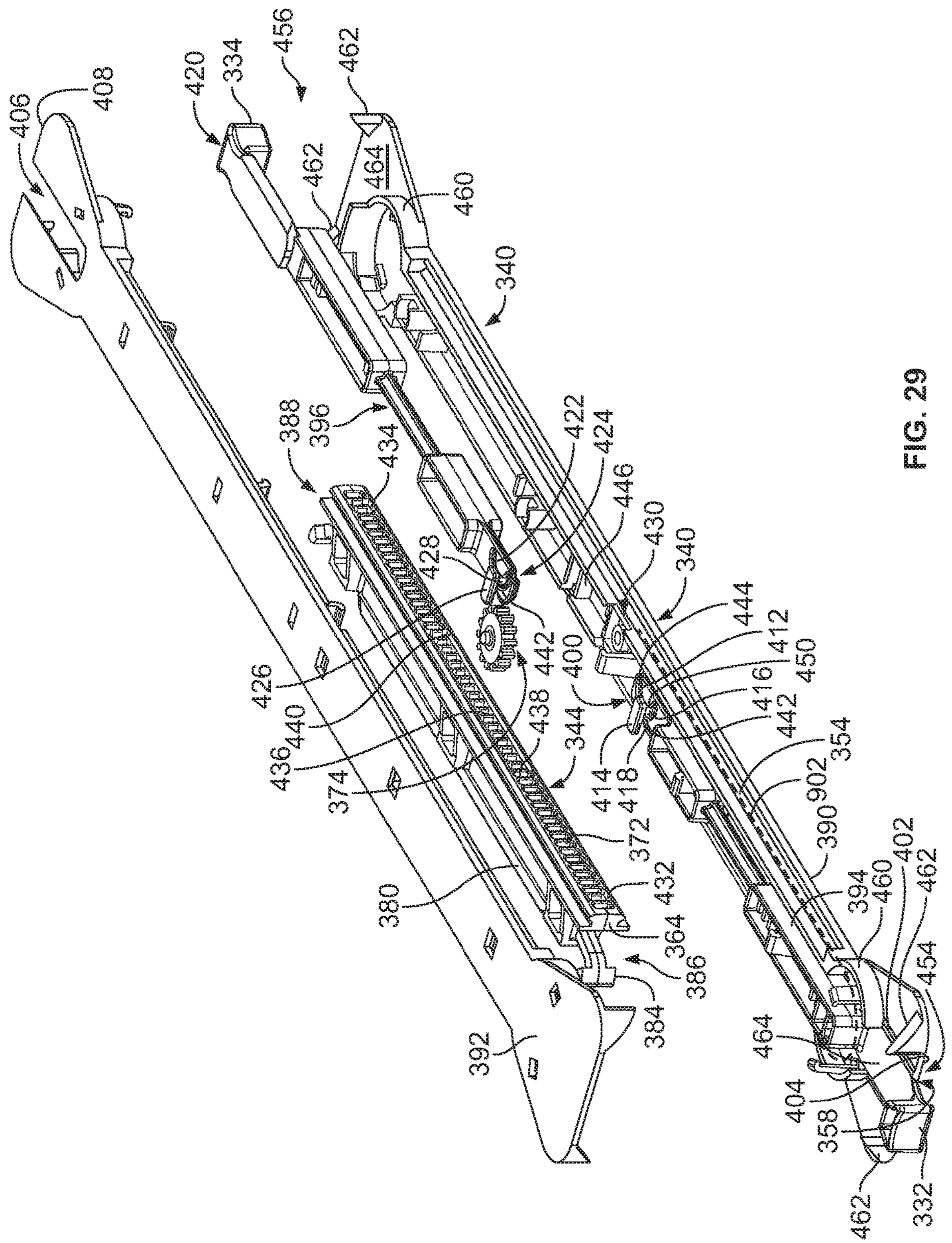
Figure 30:
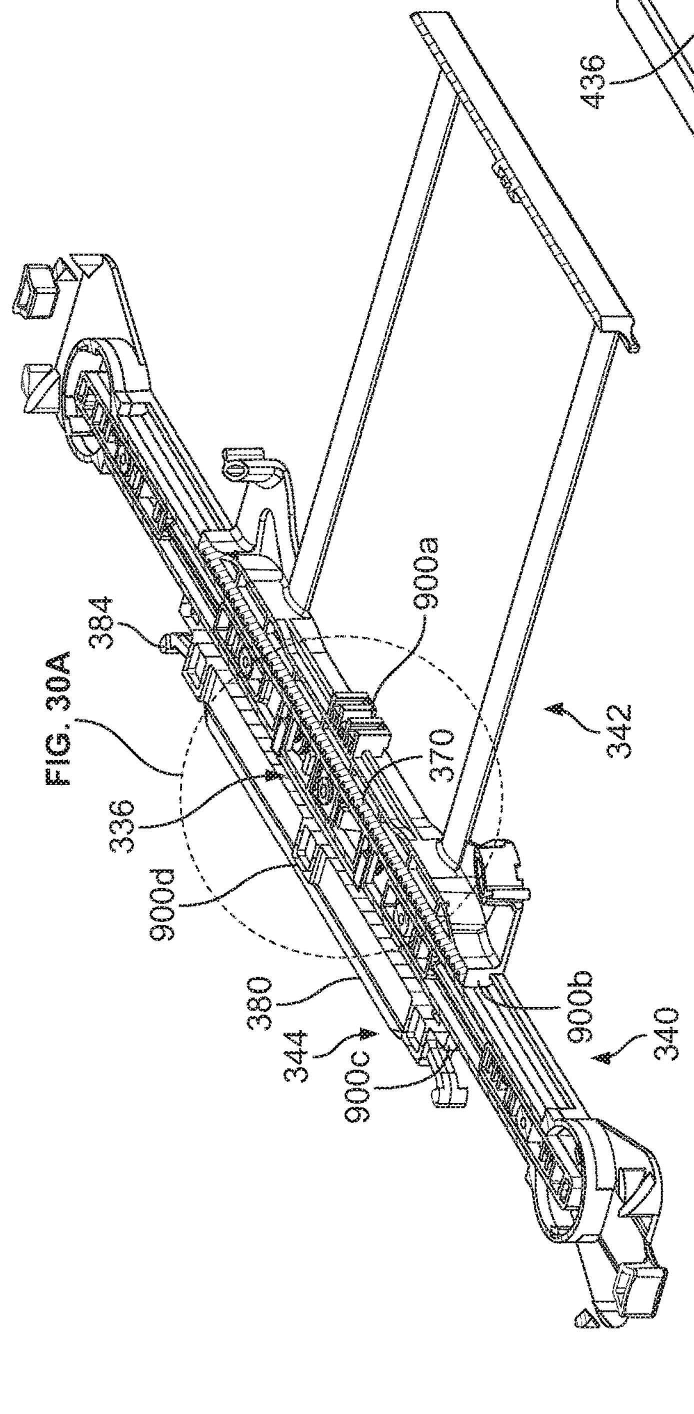
Figure 30A:
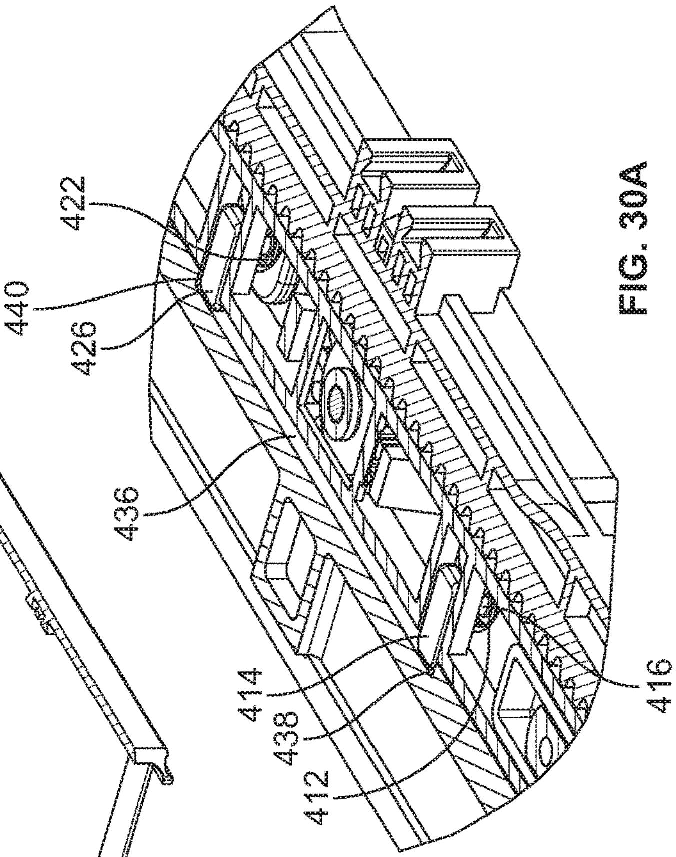
Figure 31:
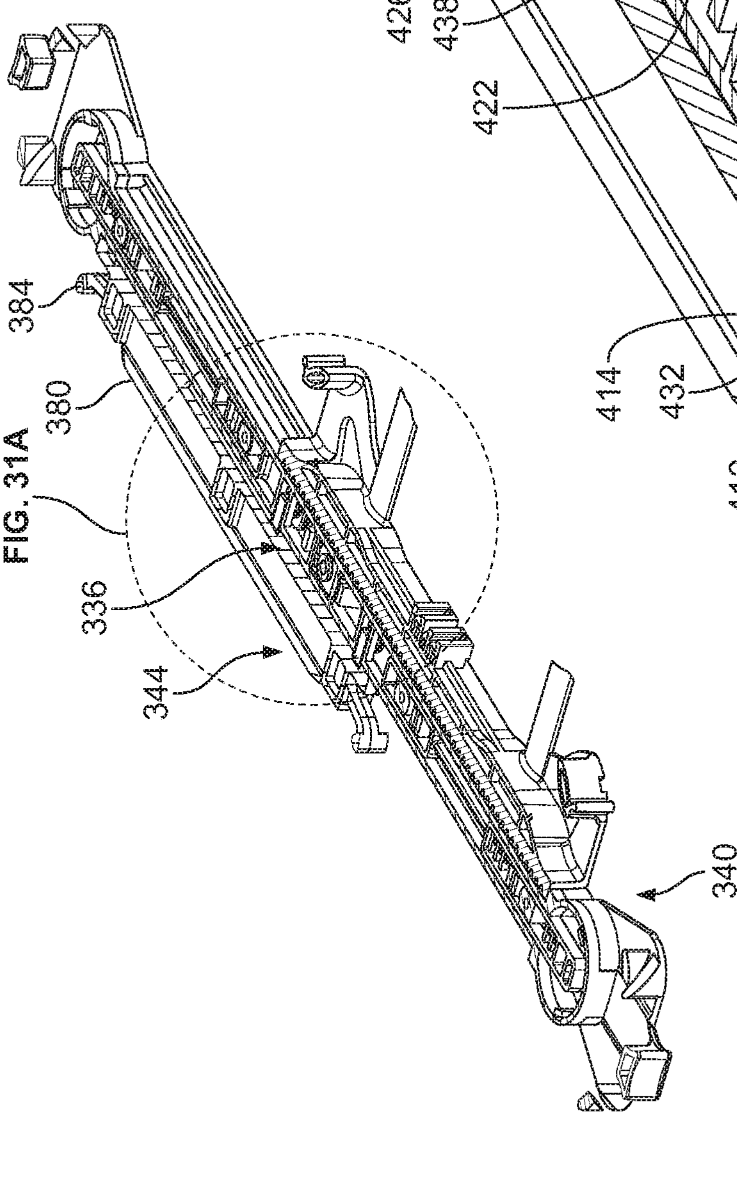
Figure 31A:
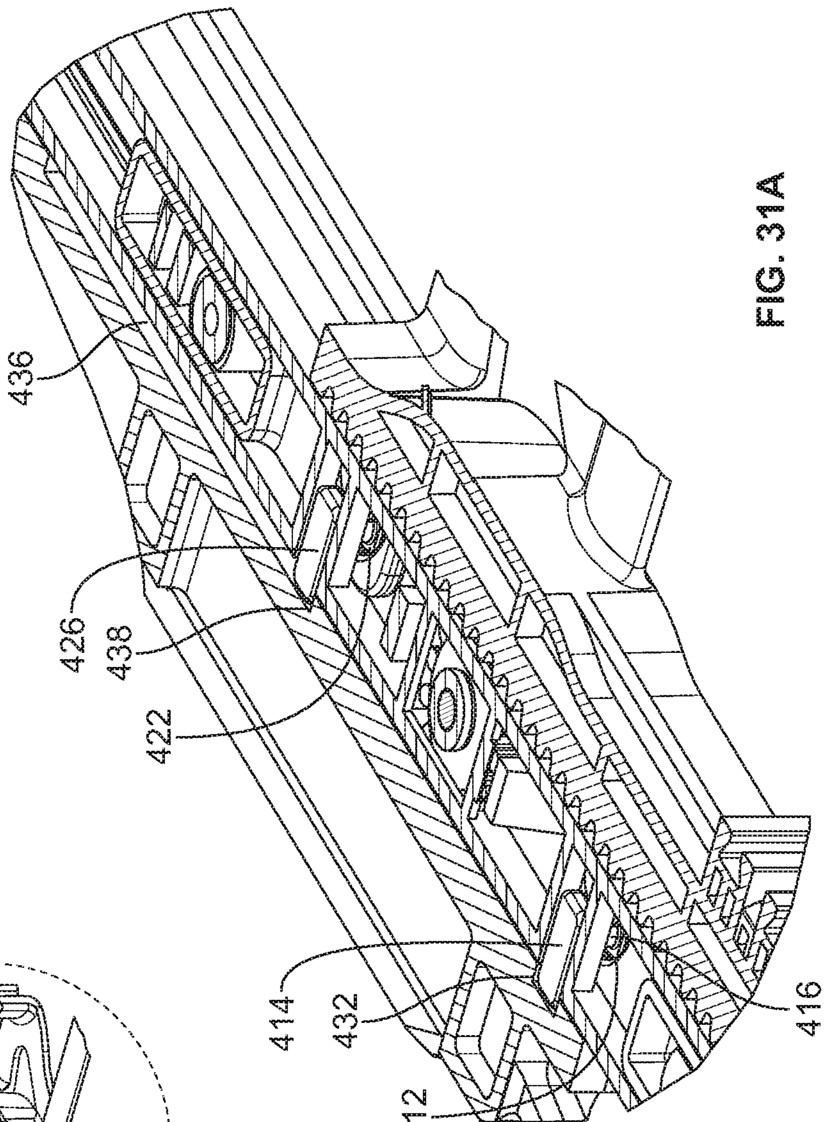
Figure 32:
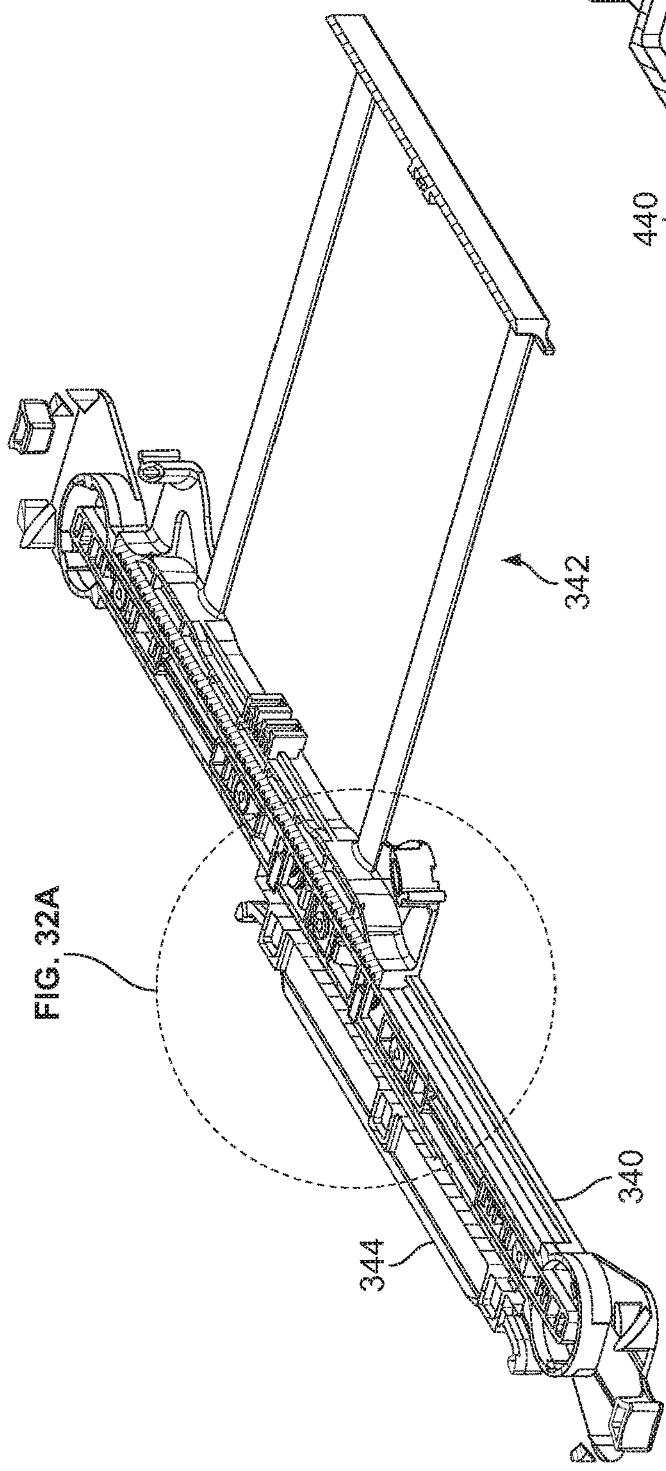
Figure 32A:
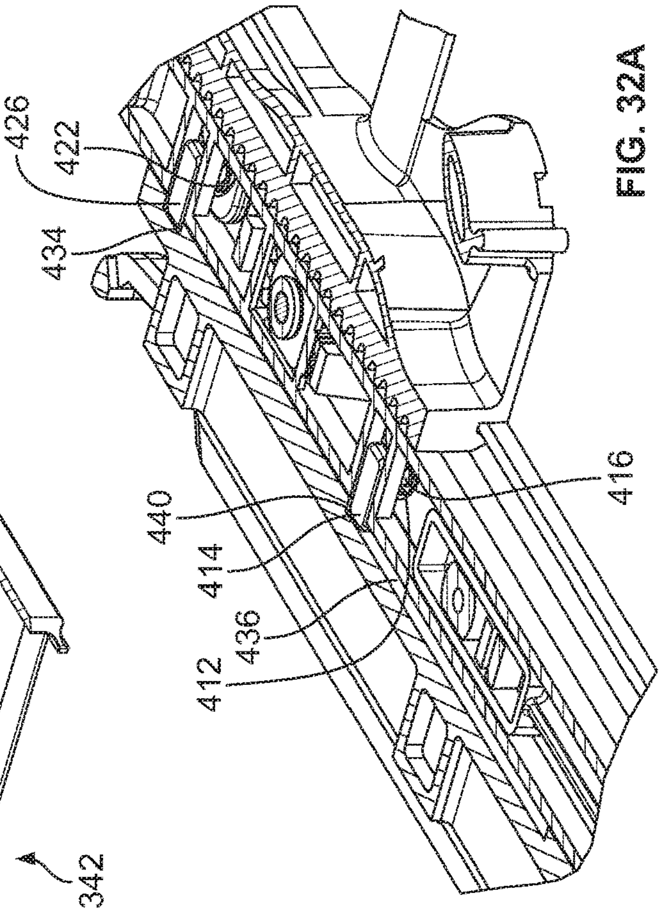
Figure 33:
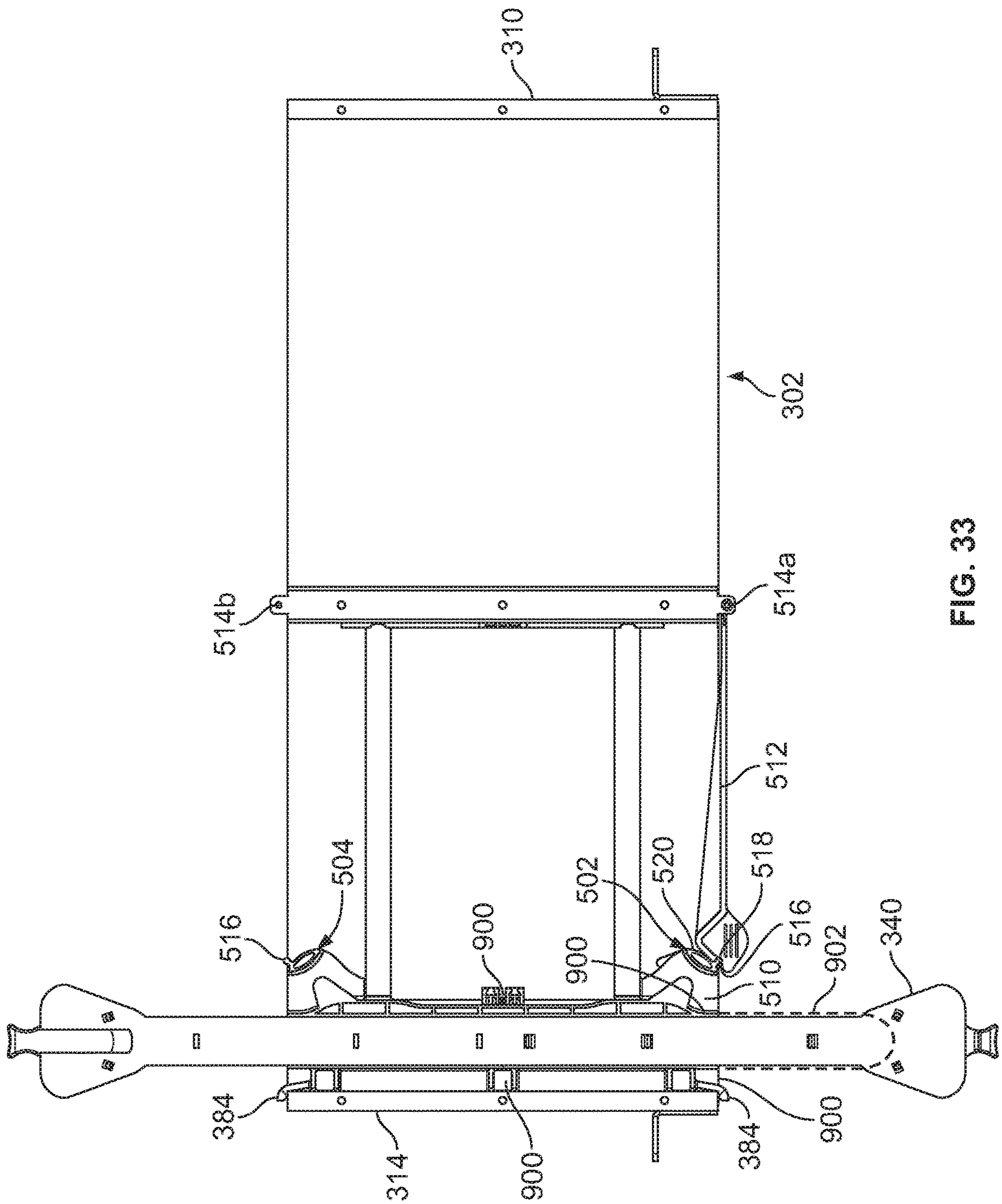
Figure 34:
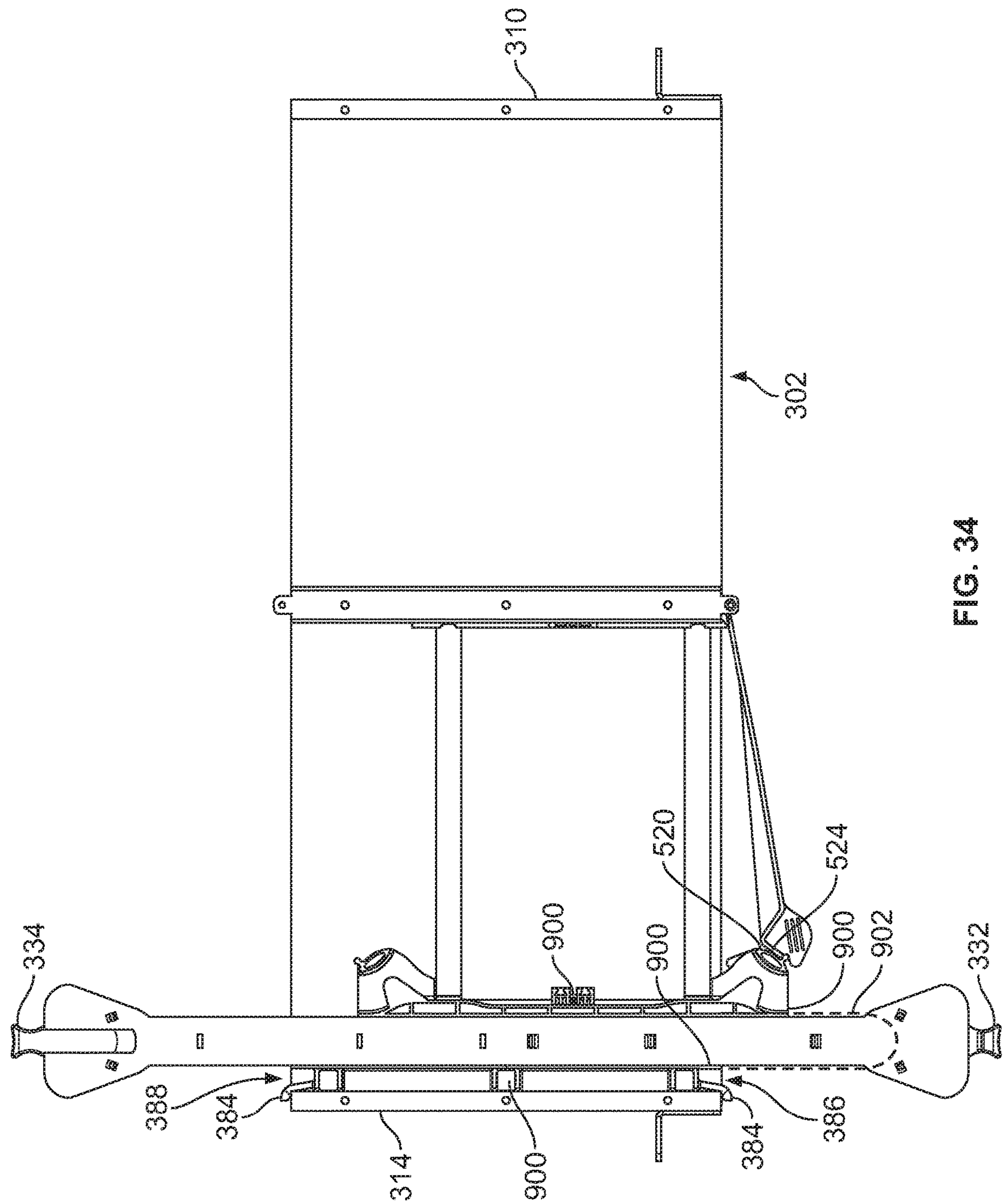
Figure 35:
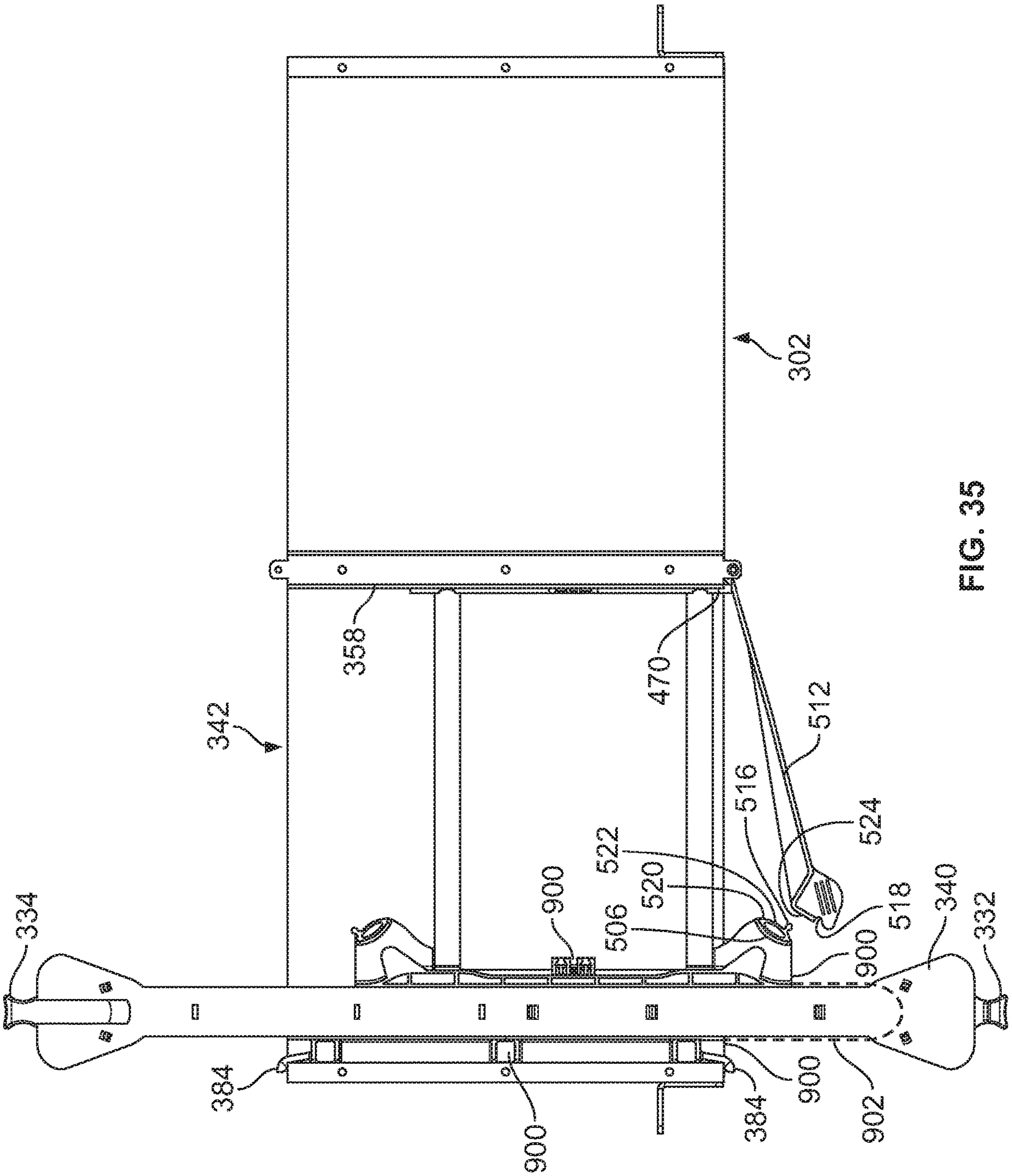
Figure 36:
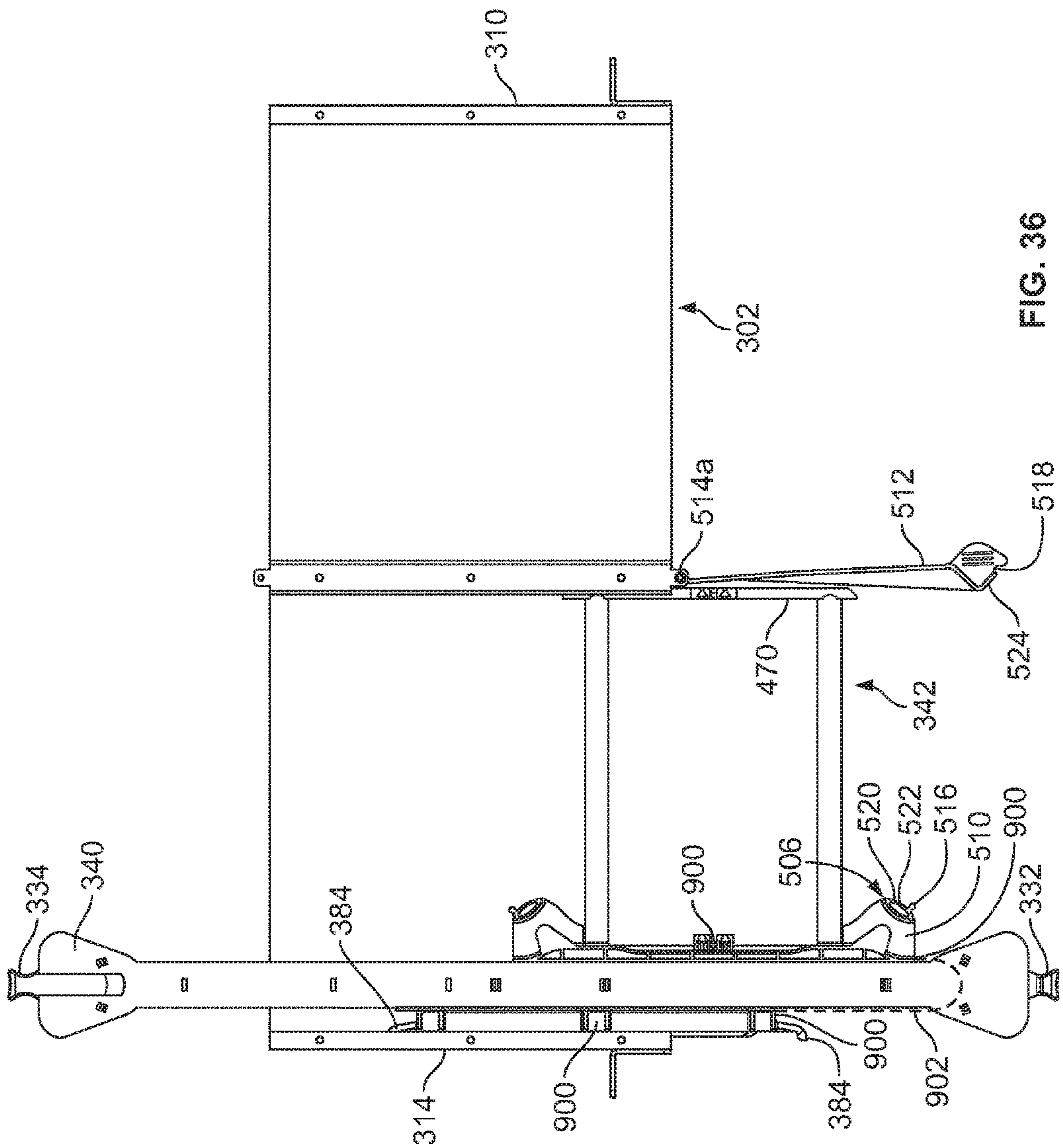
Figure 37:
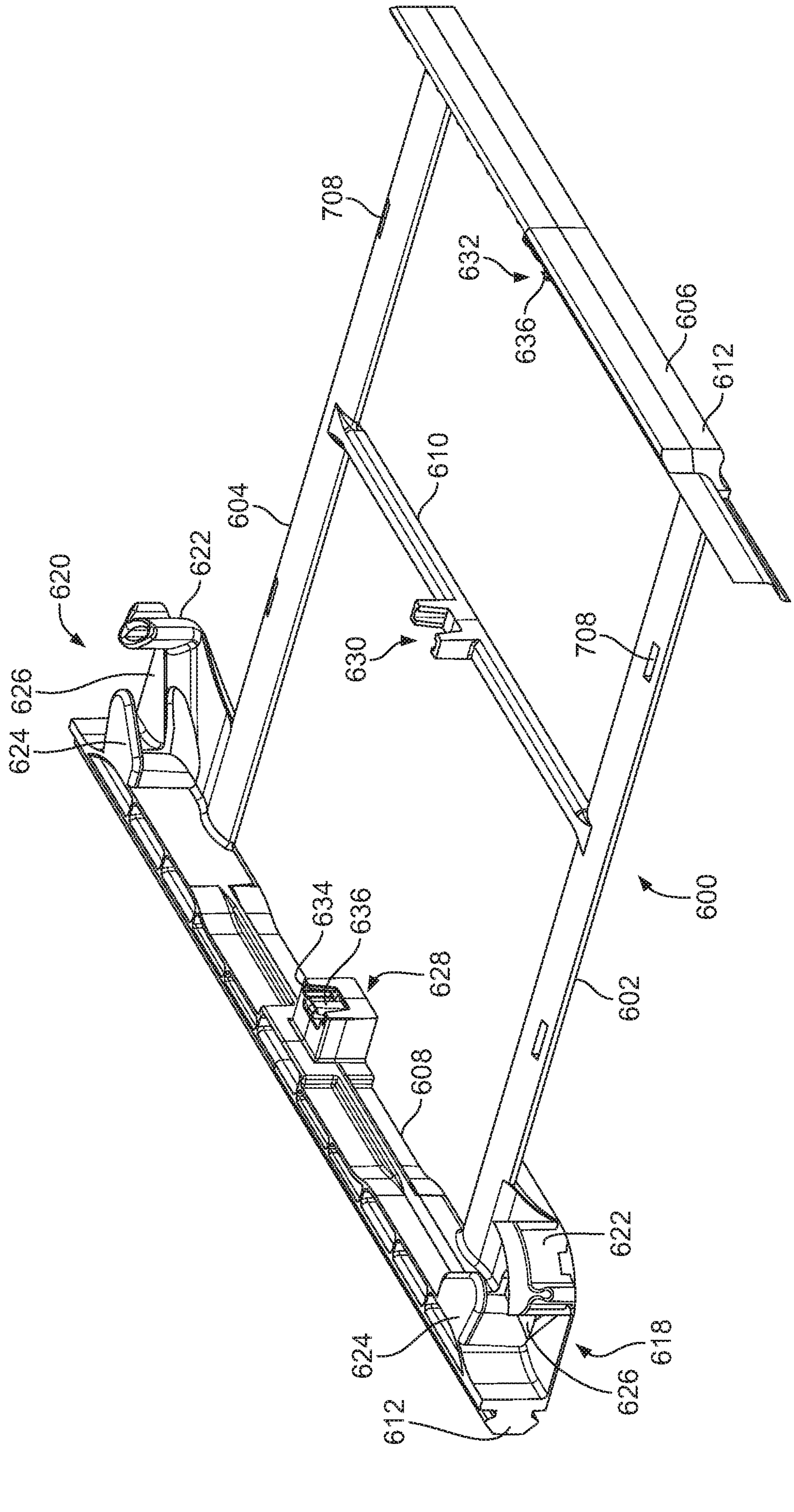
Figure 38:
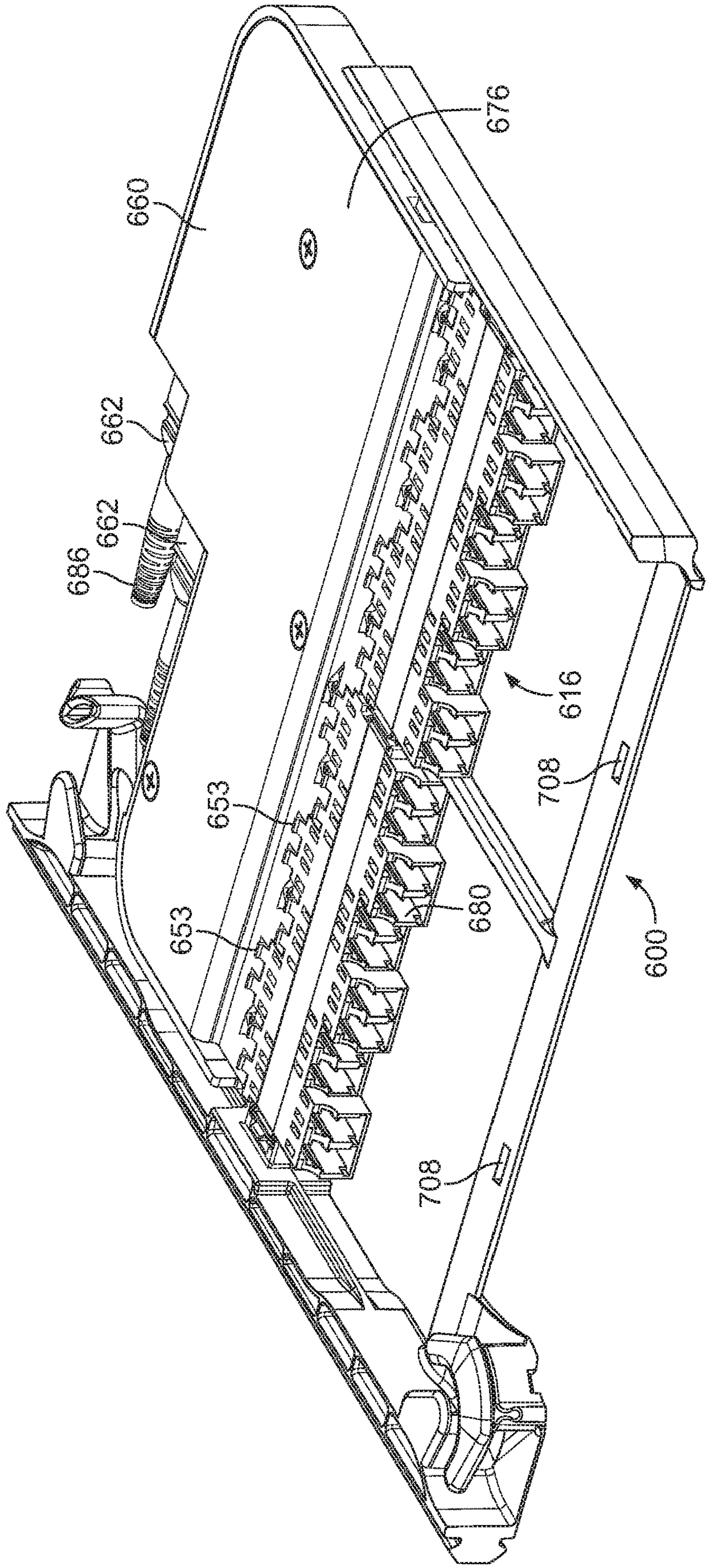
Figure 39:
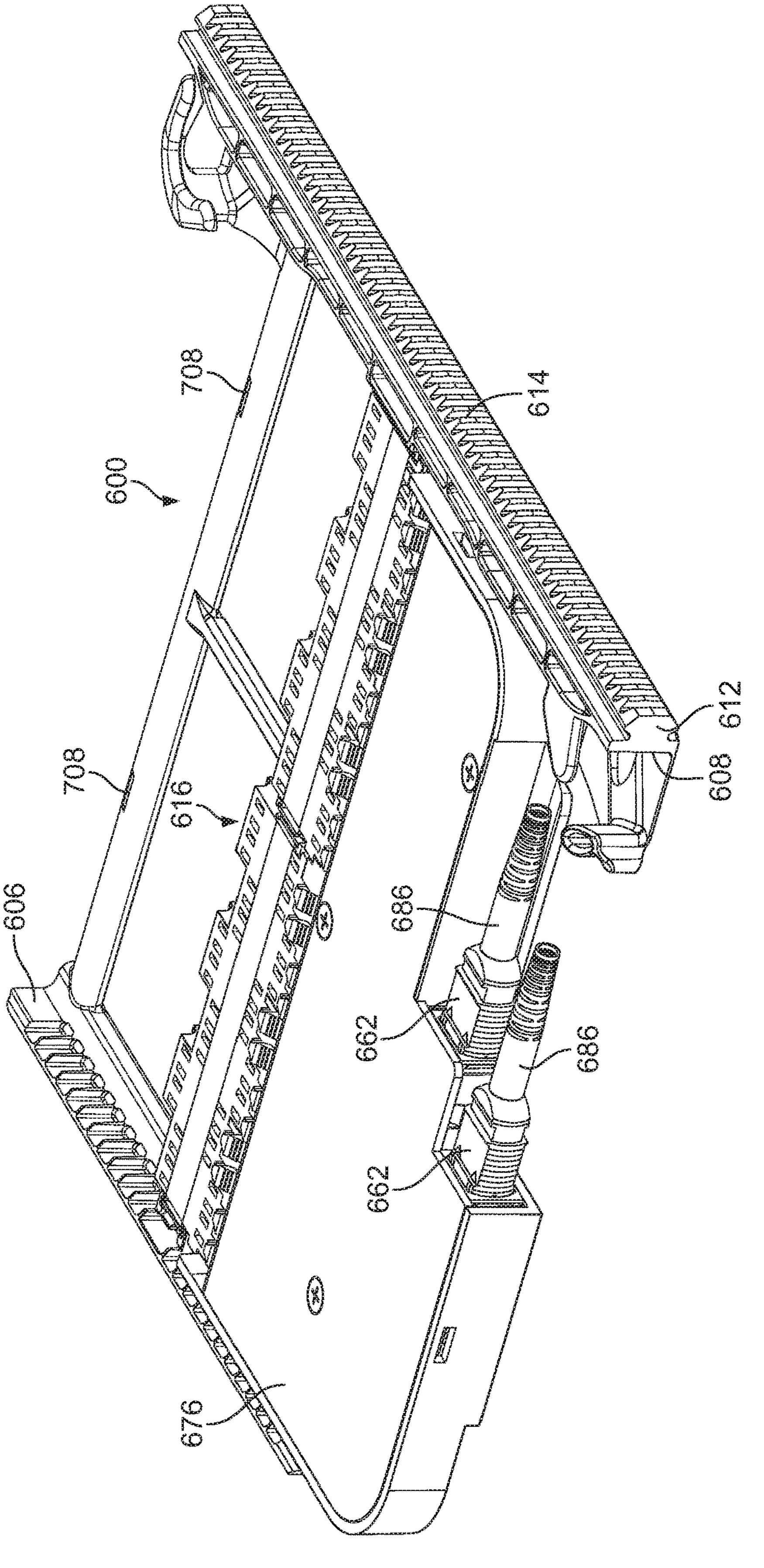
Figure 40:
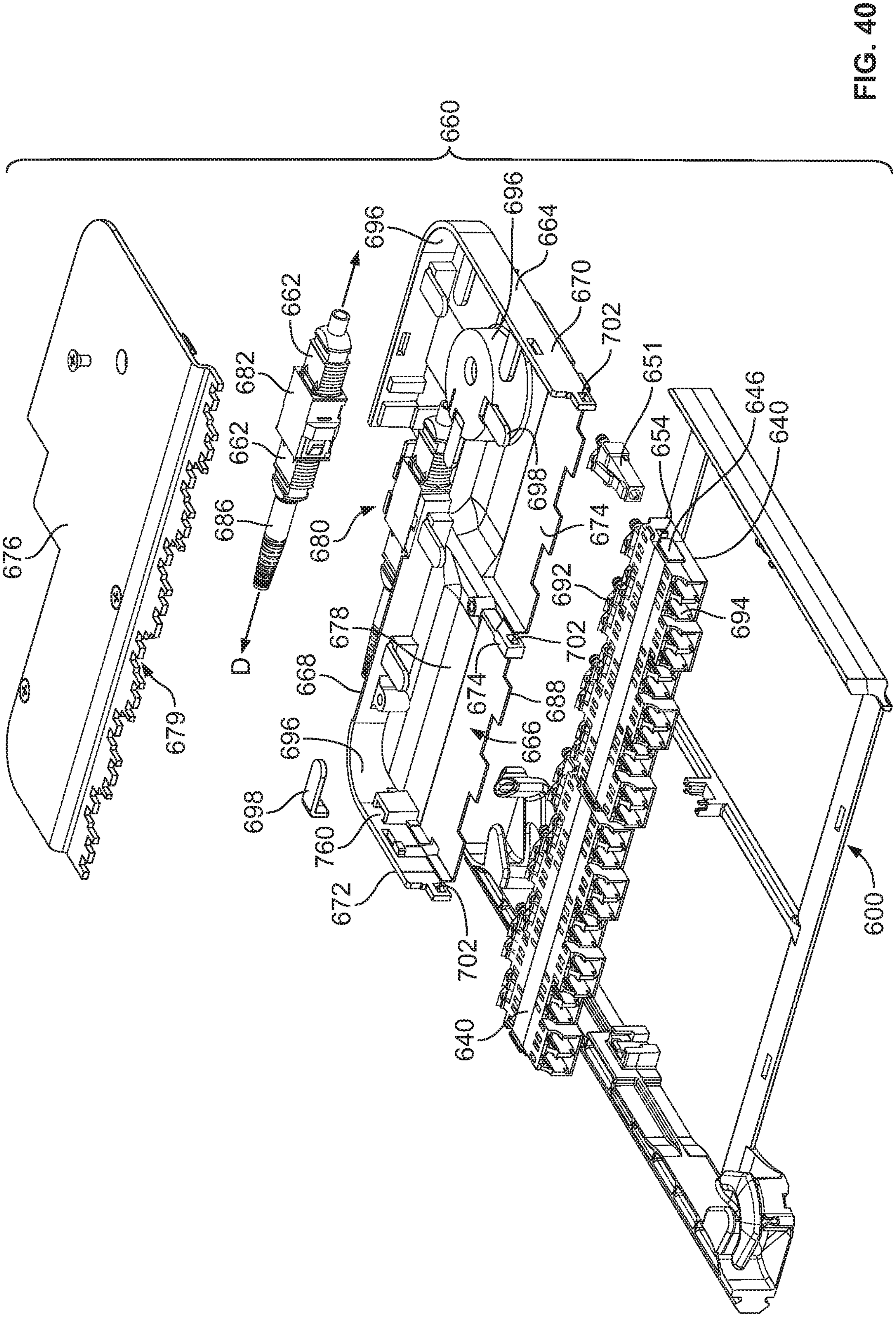
Figure 41:
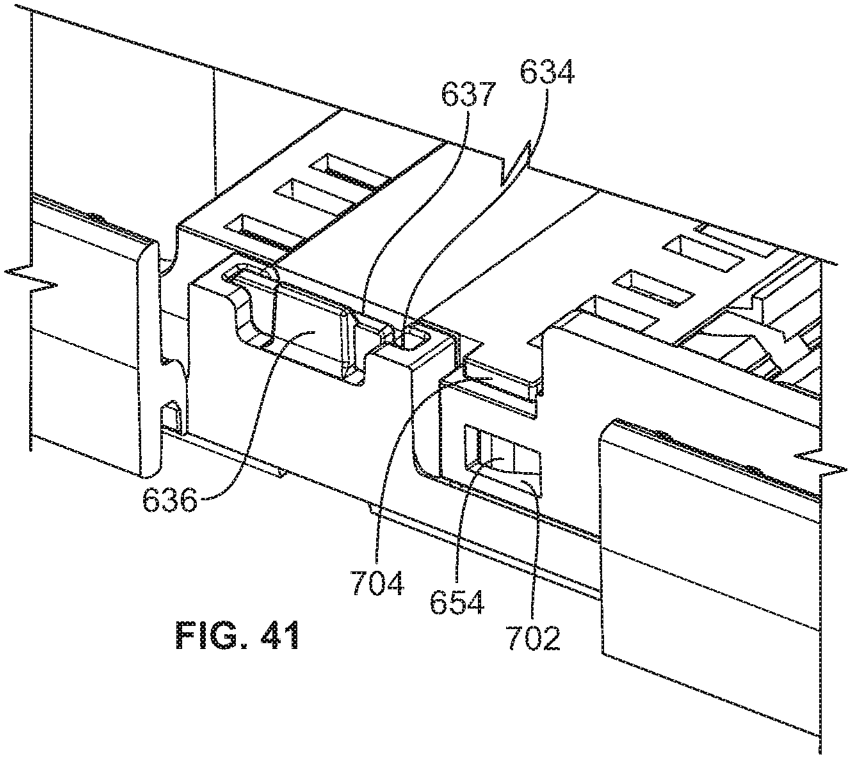
Figure 42:
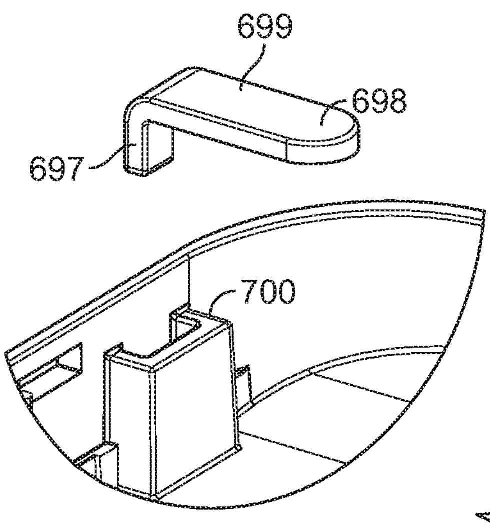
Figure 43:
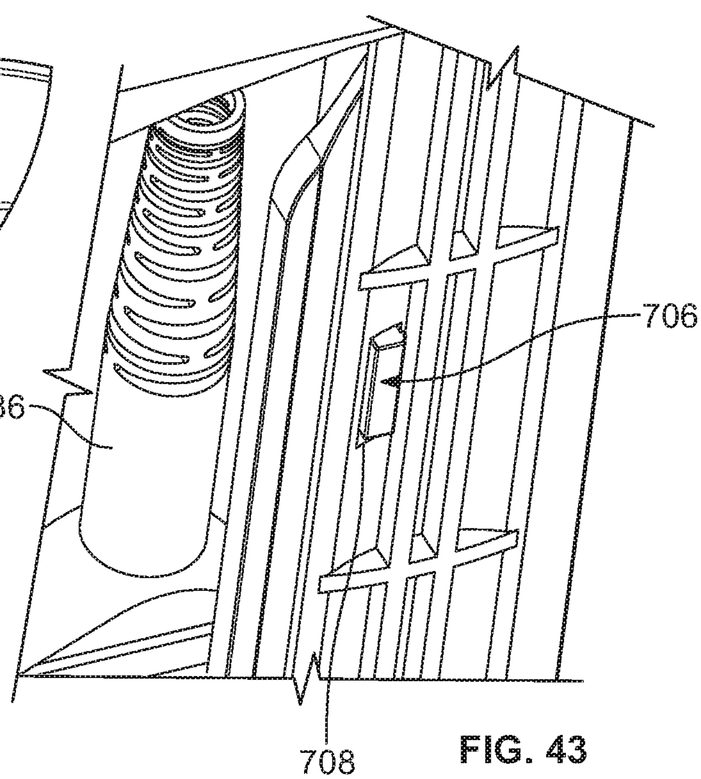
Figure 44:
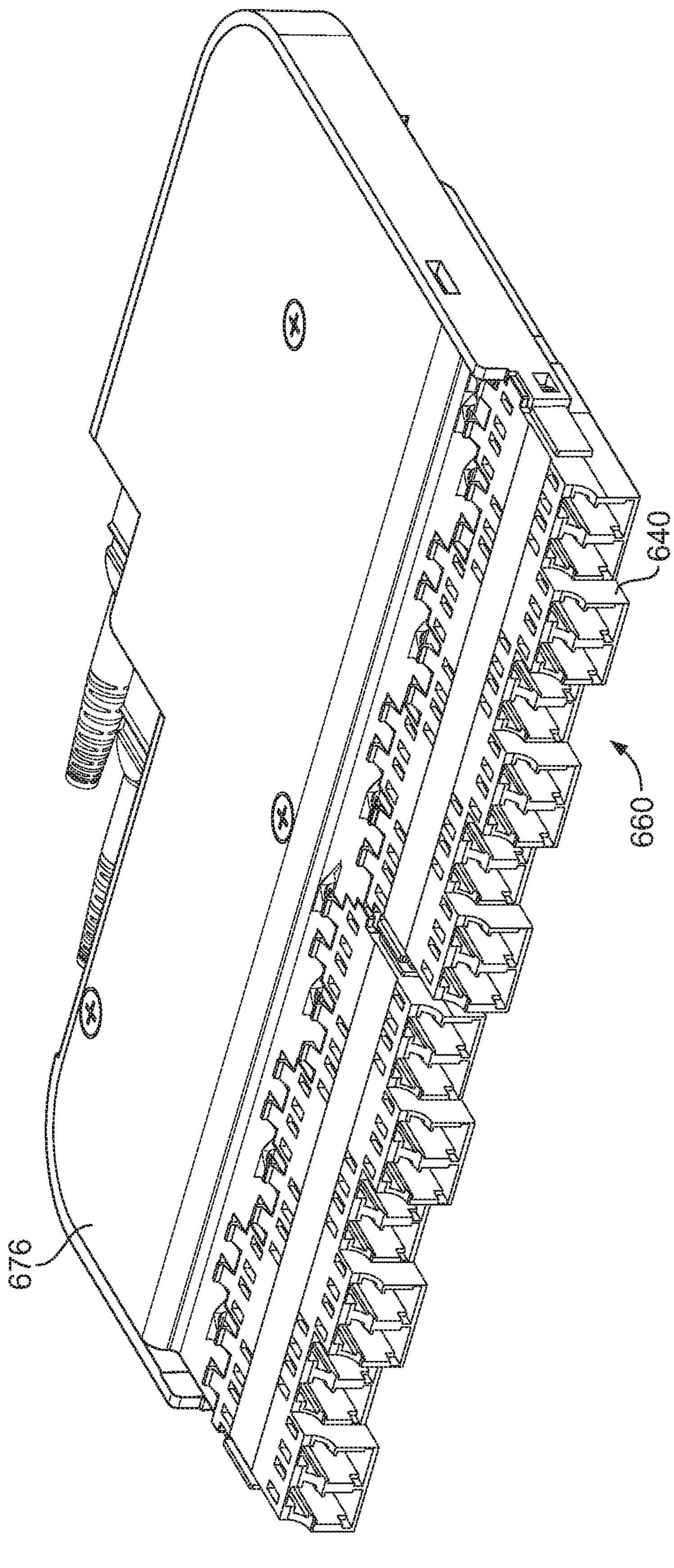
Figure 45:
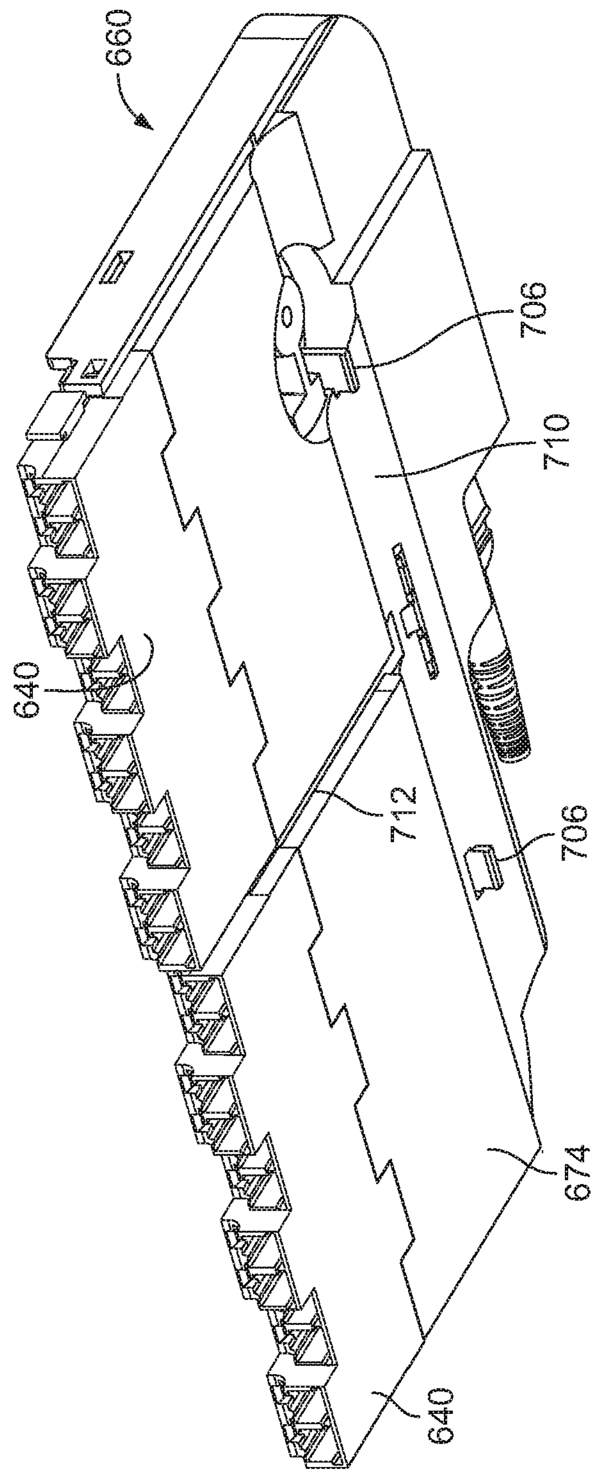
Figure 46:
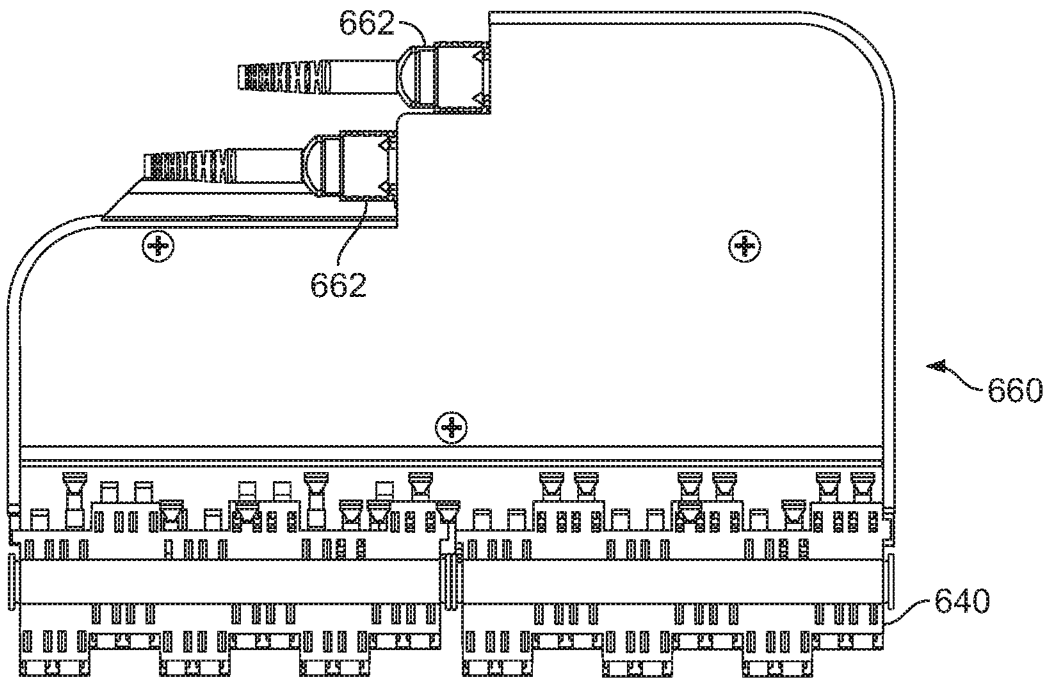
Figure 47:
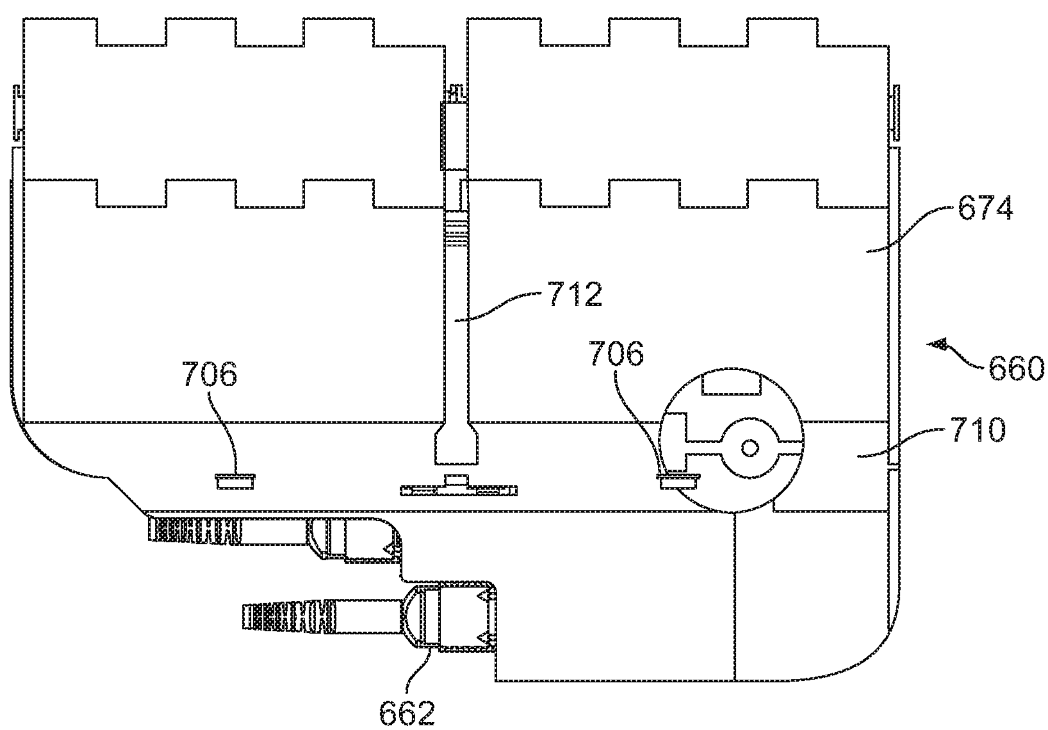
Figure 48:
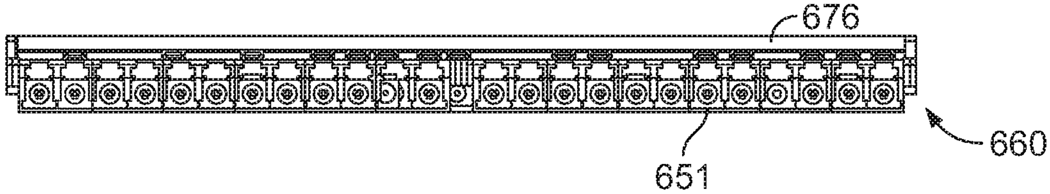
Figure 49:
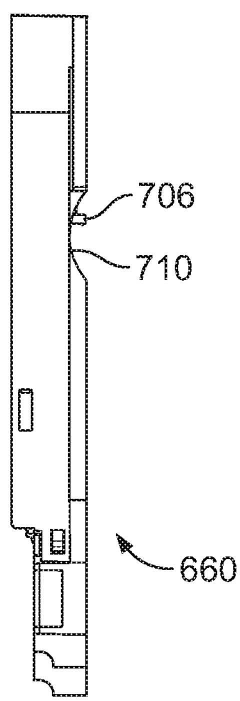
Figure 50:
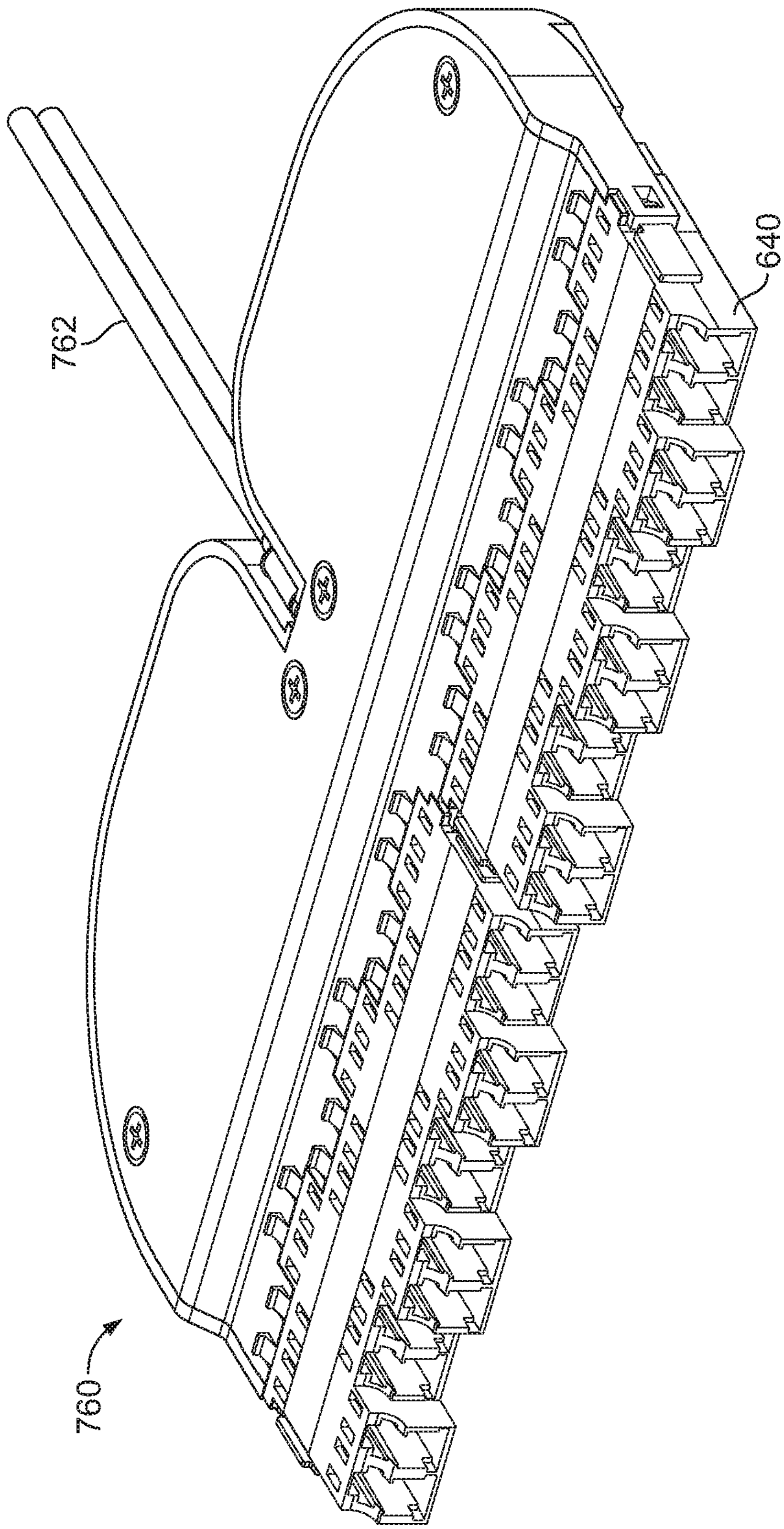
Figure 51:
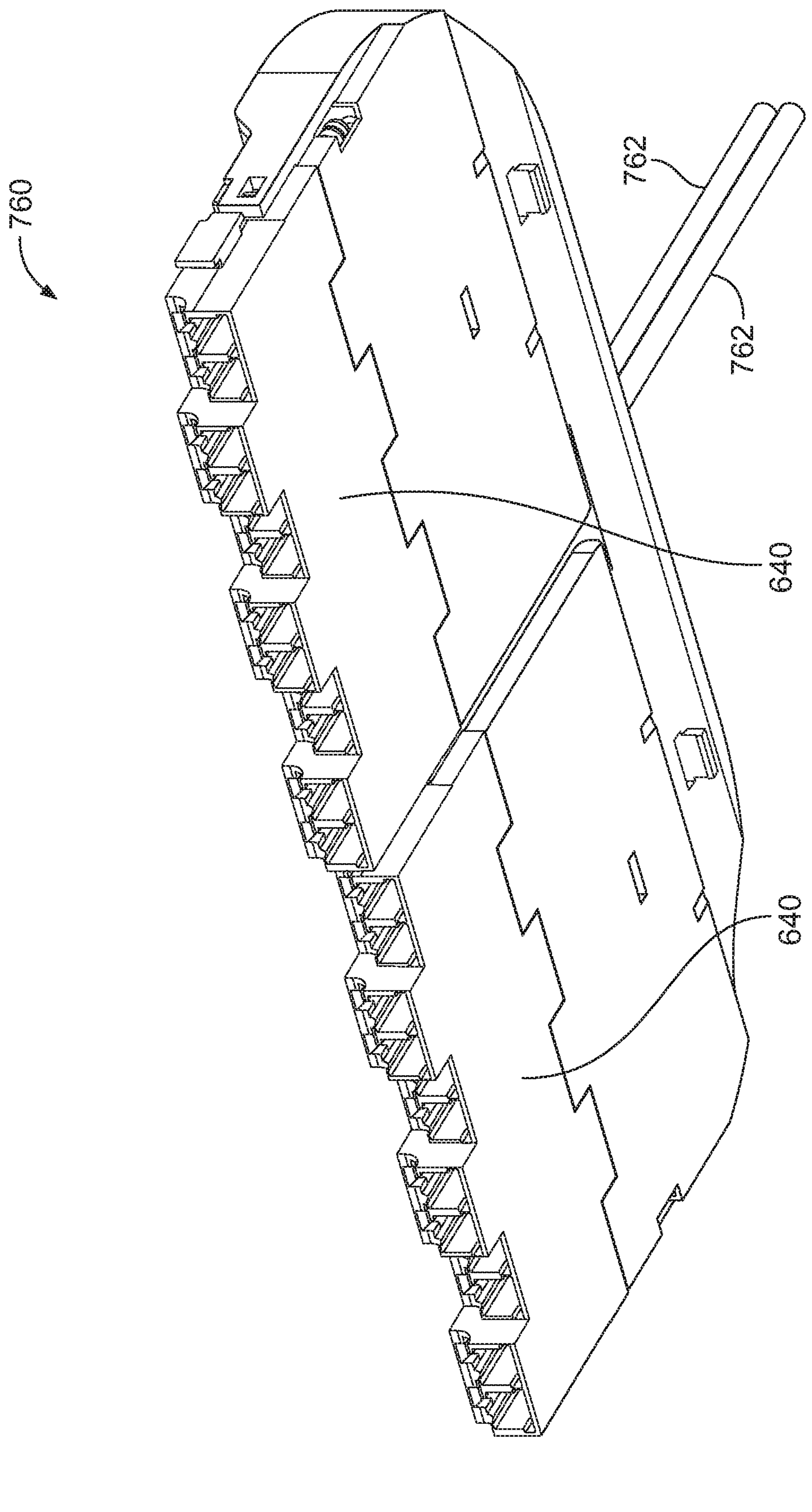
Figure 52:
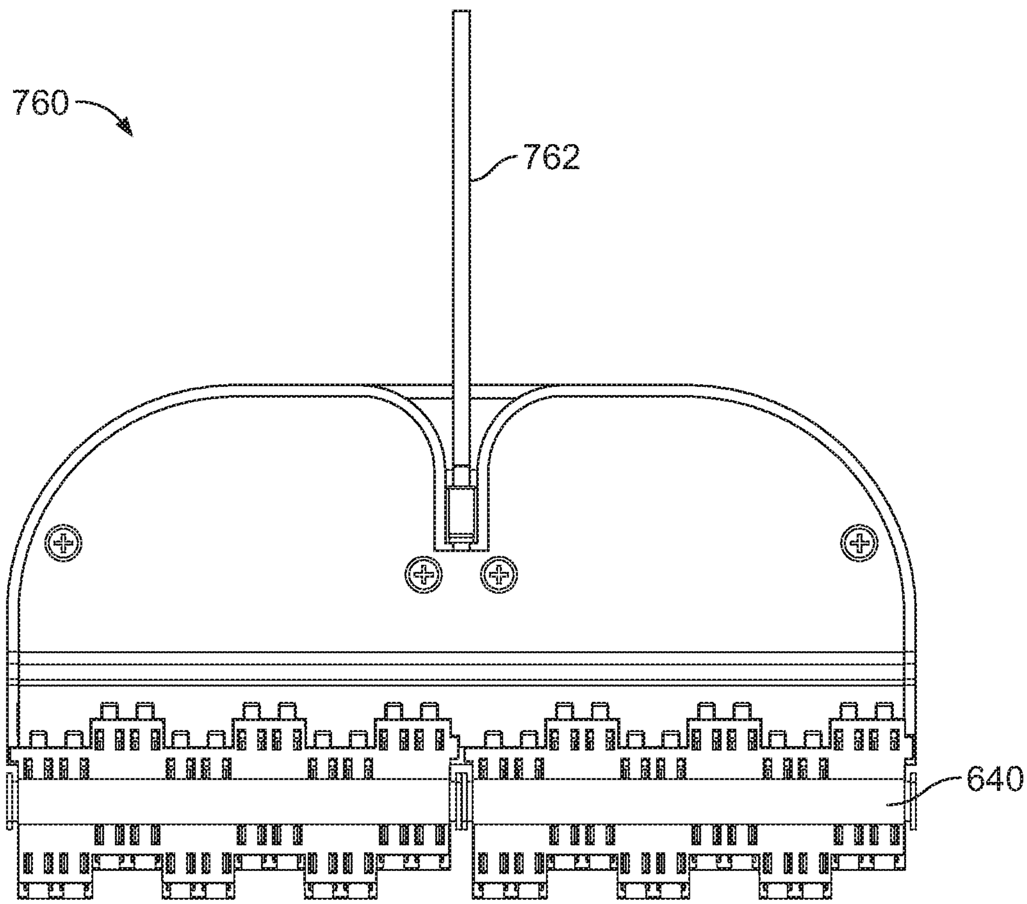
Figure 53:
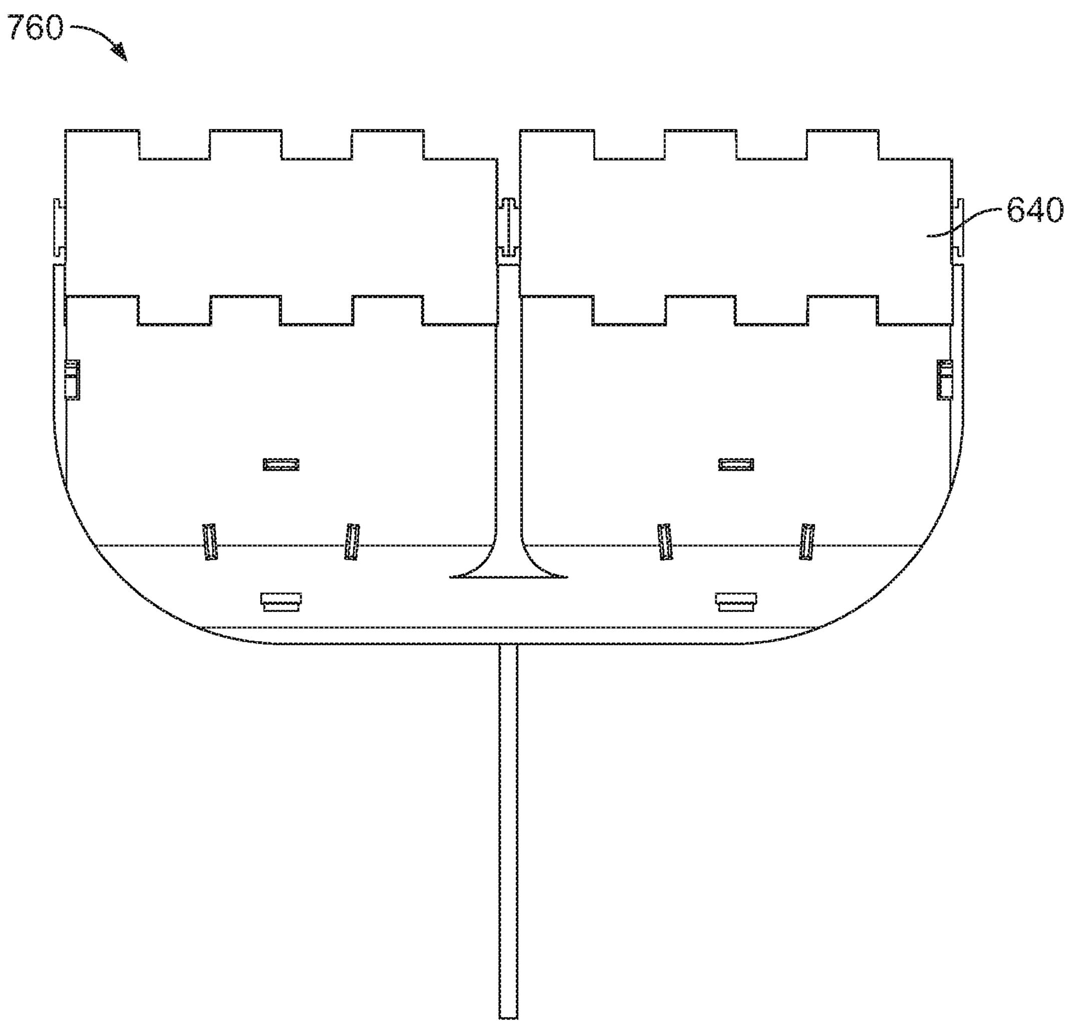
Figure 54:
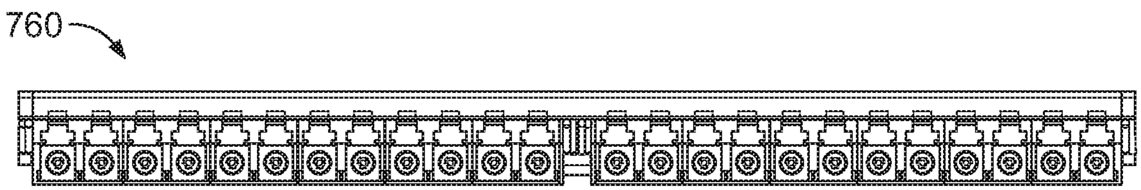
Figure 55:
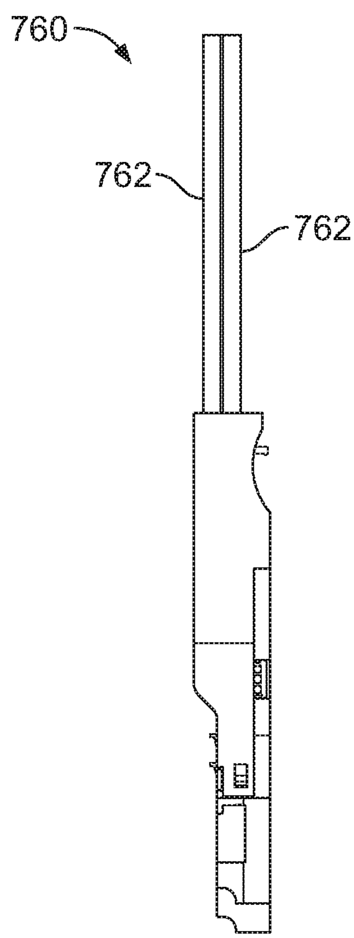
Figure 56:
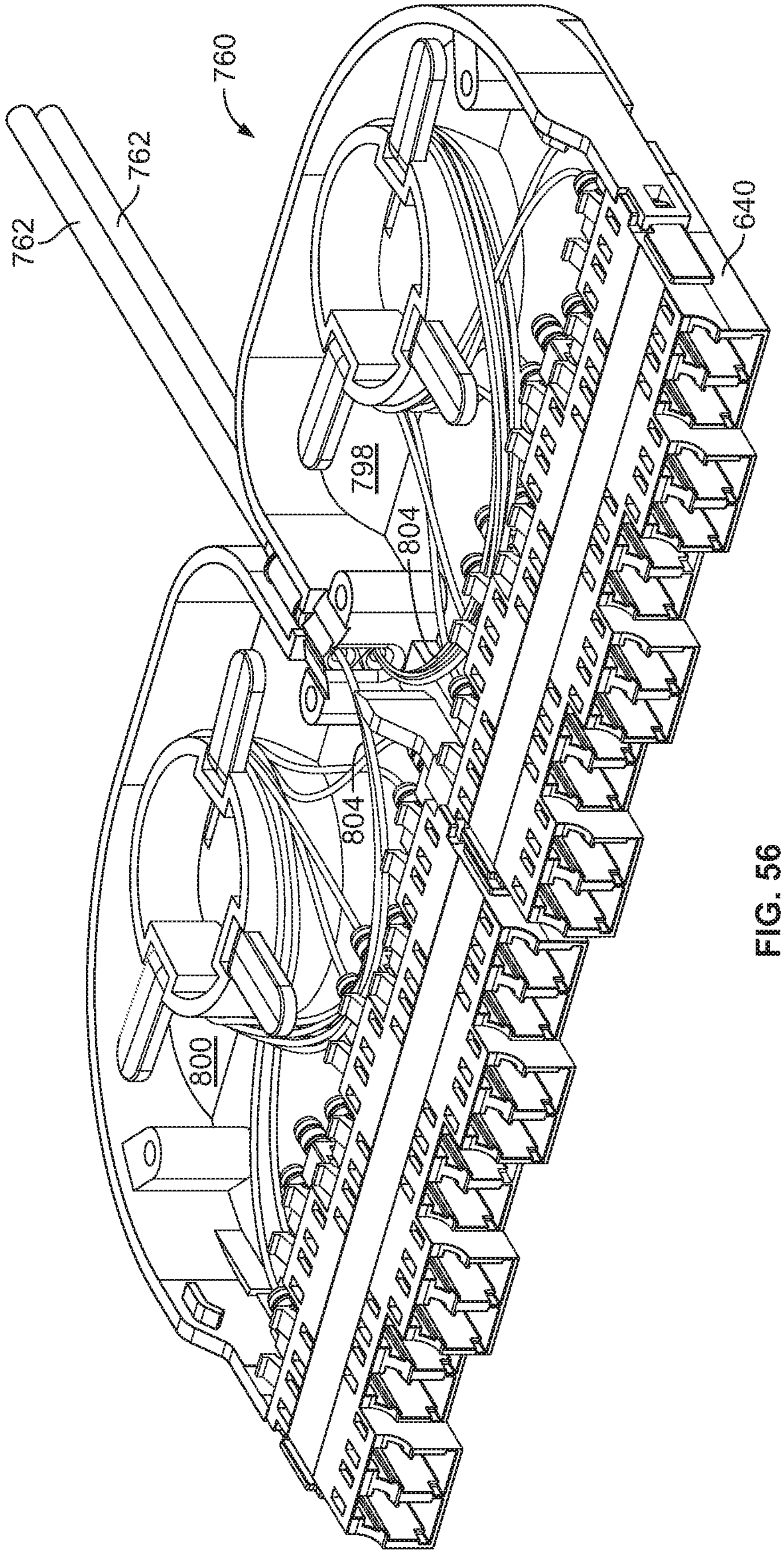
Figure 57:
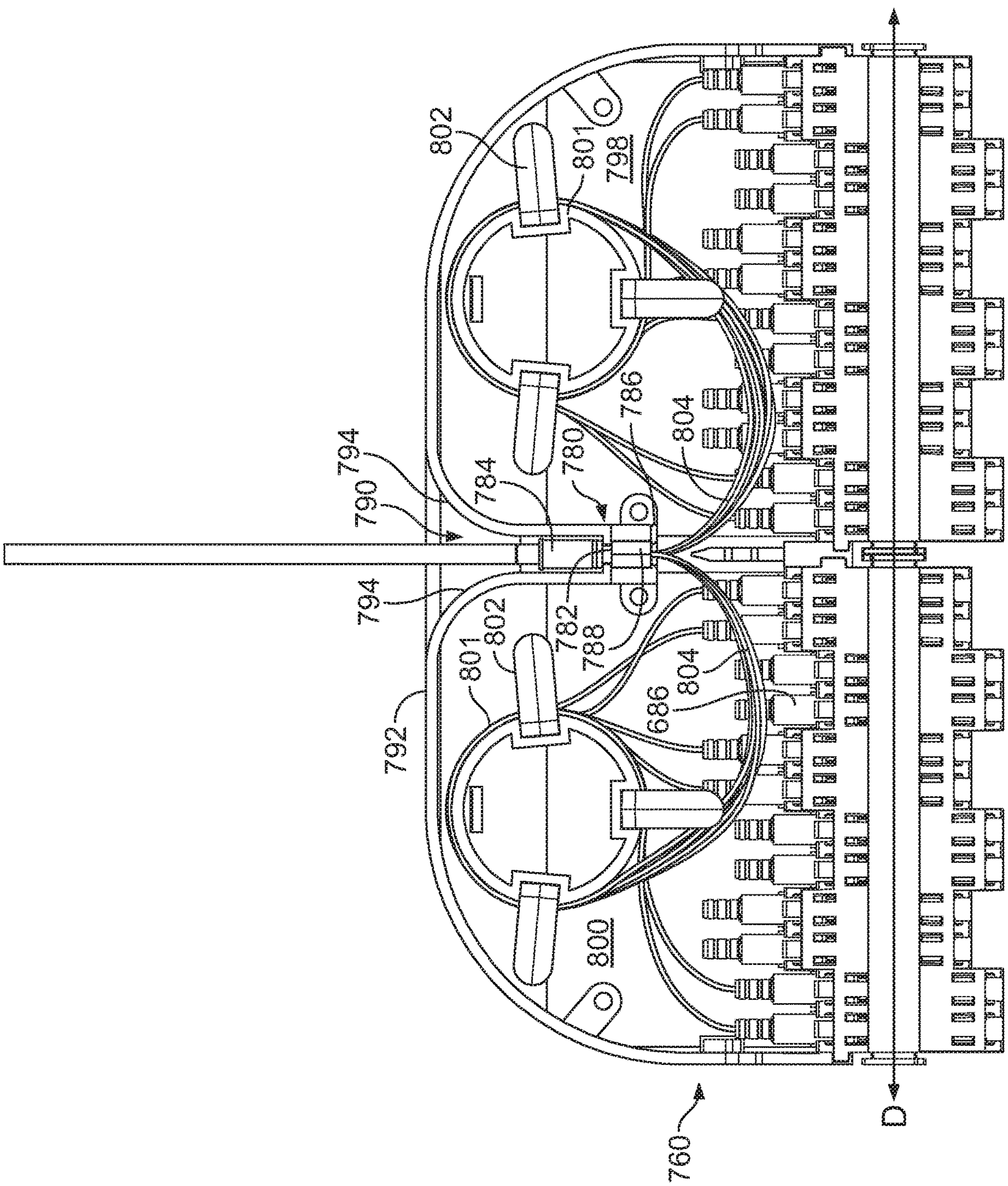
Figure 58:
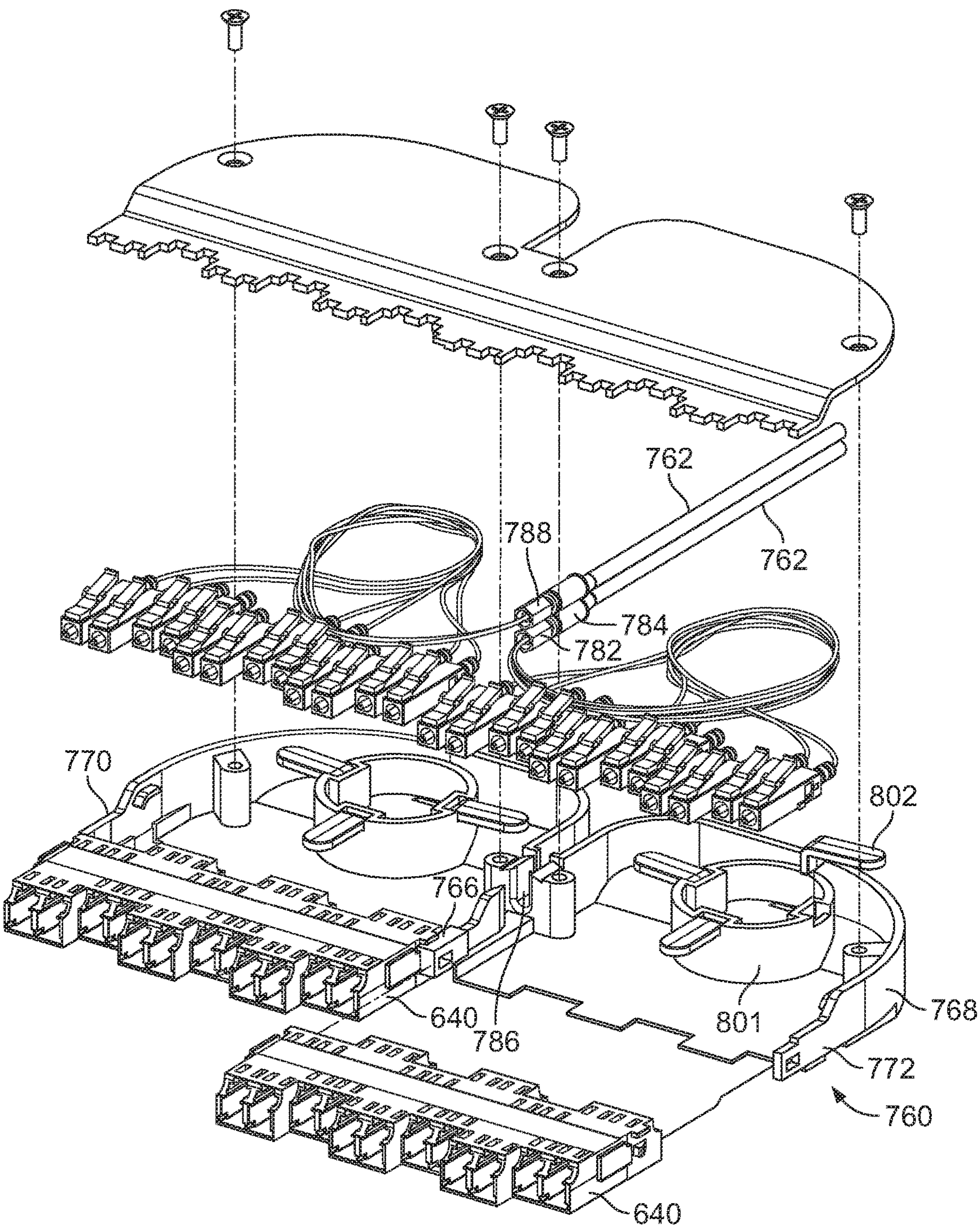
Figure 59:
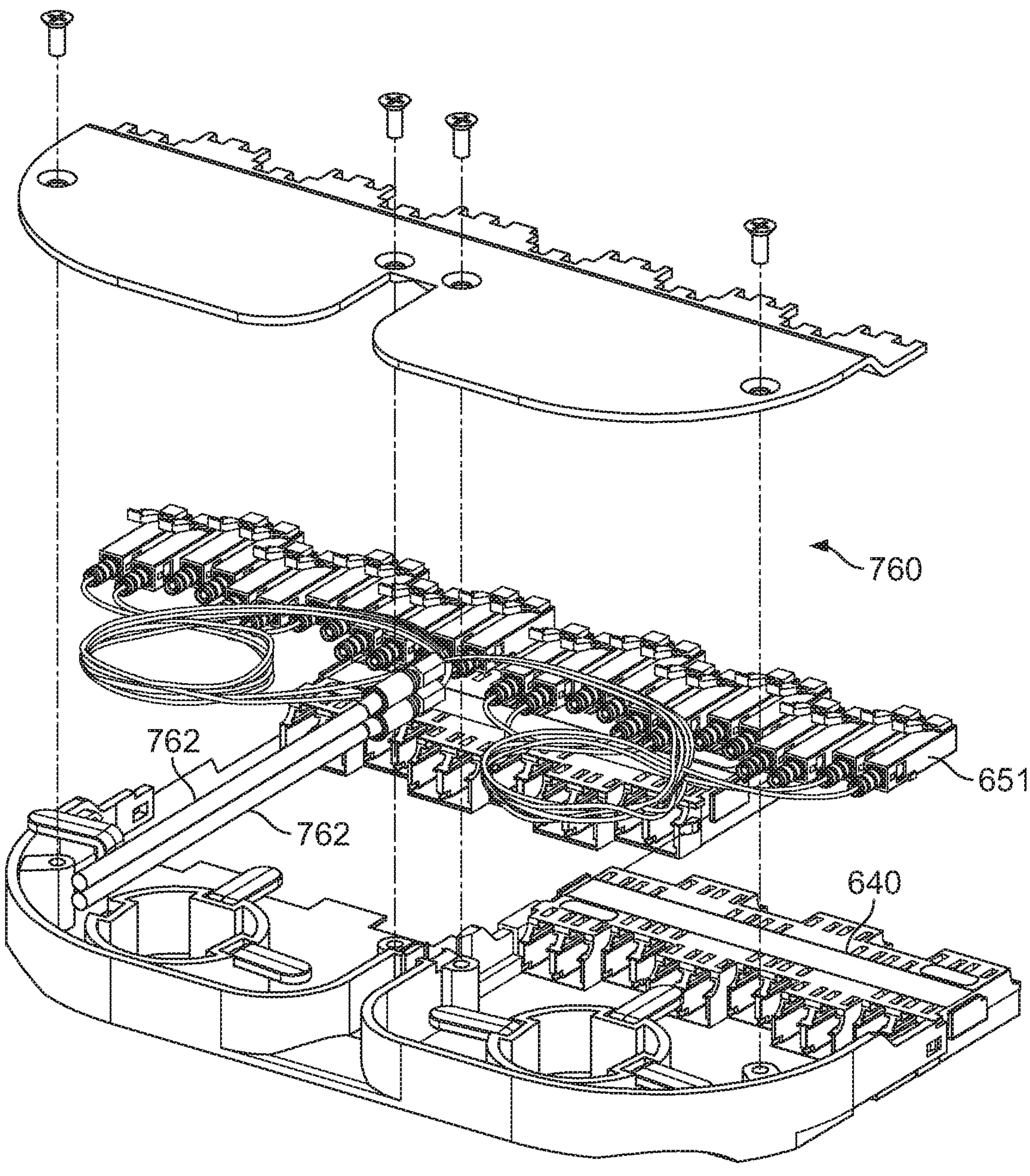
Figure 60:
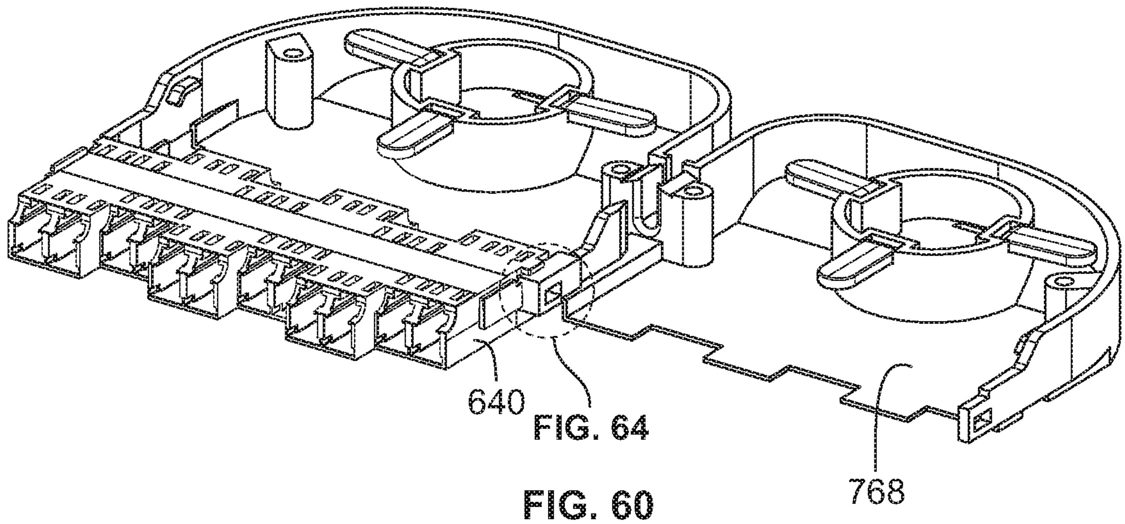
Figure 61:
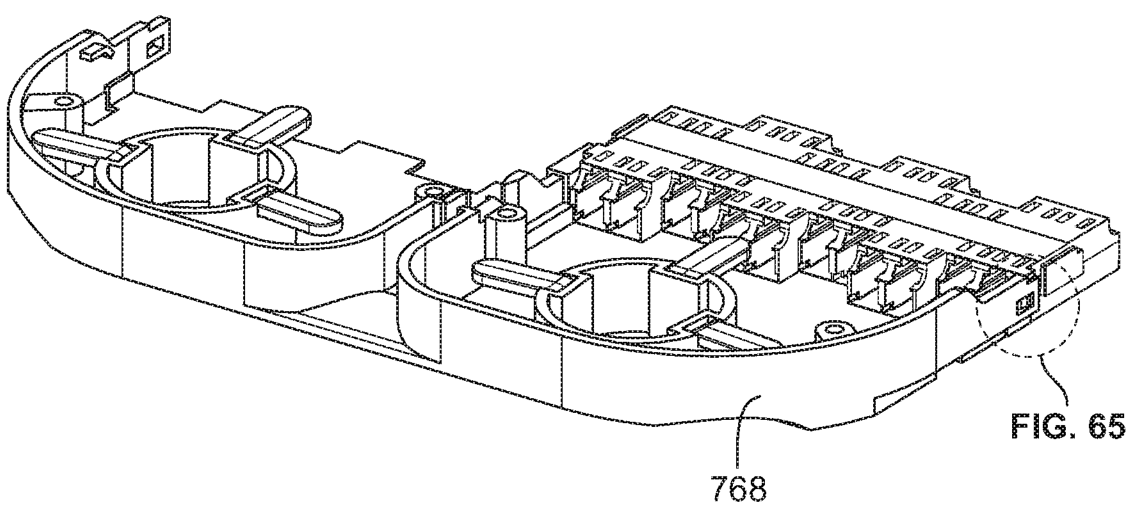
Figure 62:
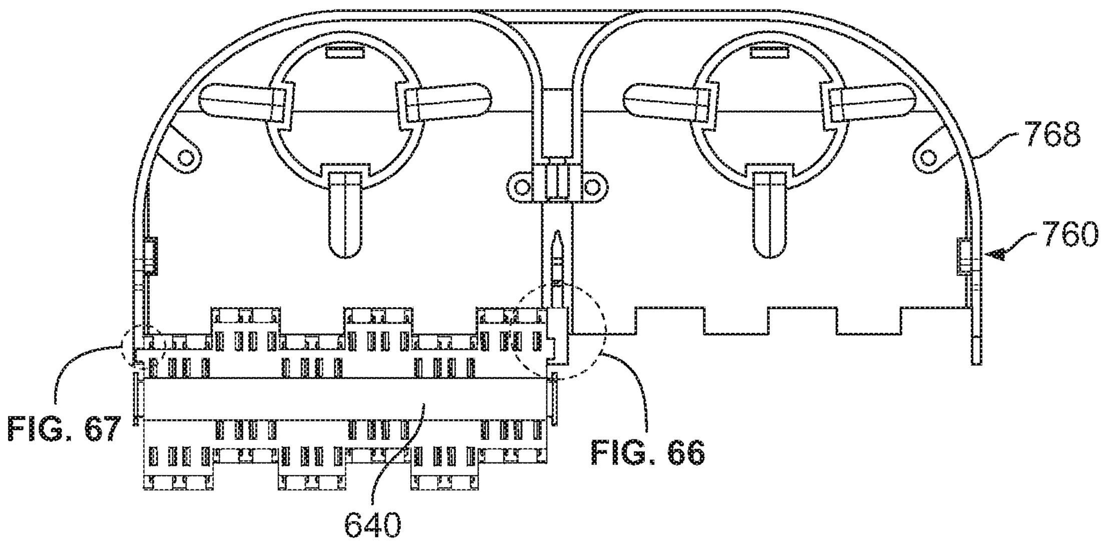
Figure 63:
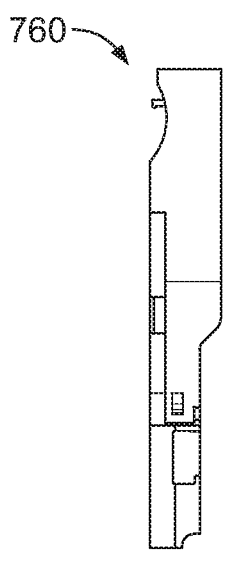
Figure 64:
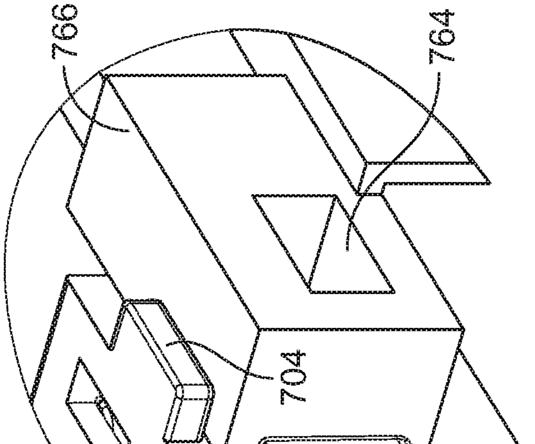
Figure 65:
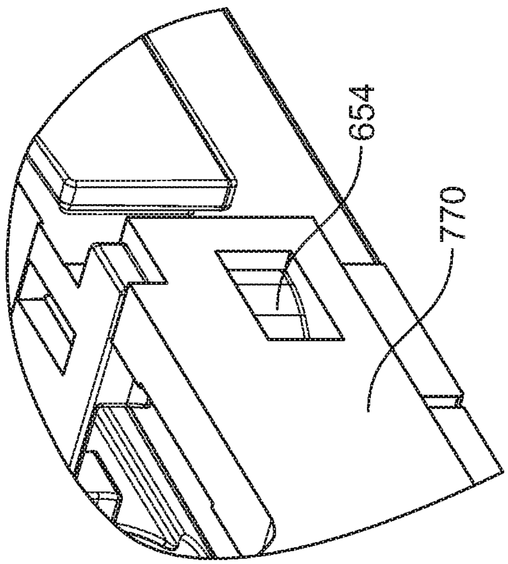
Figure 66:
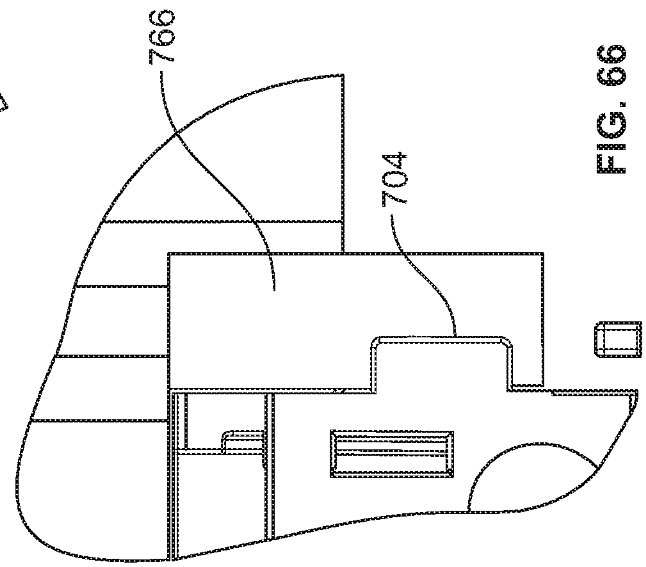
Figure 67:
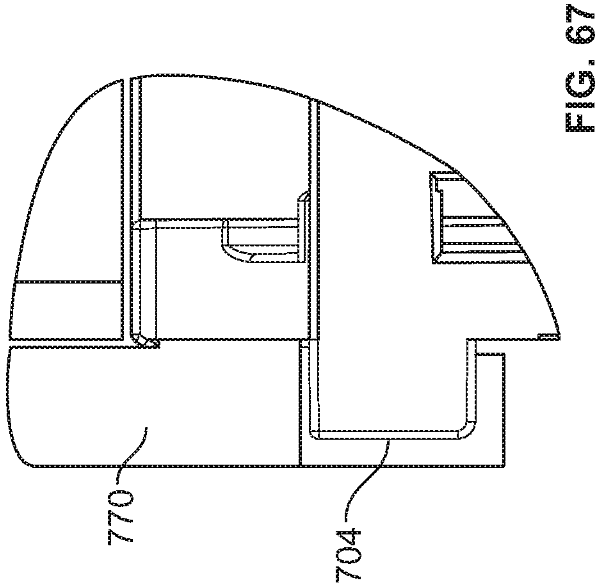
Figure 68:
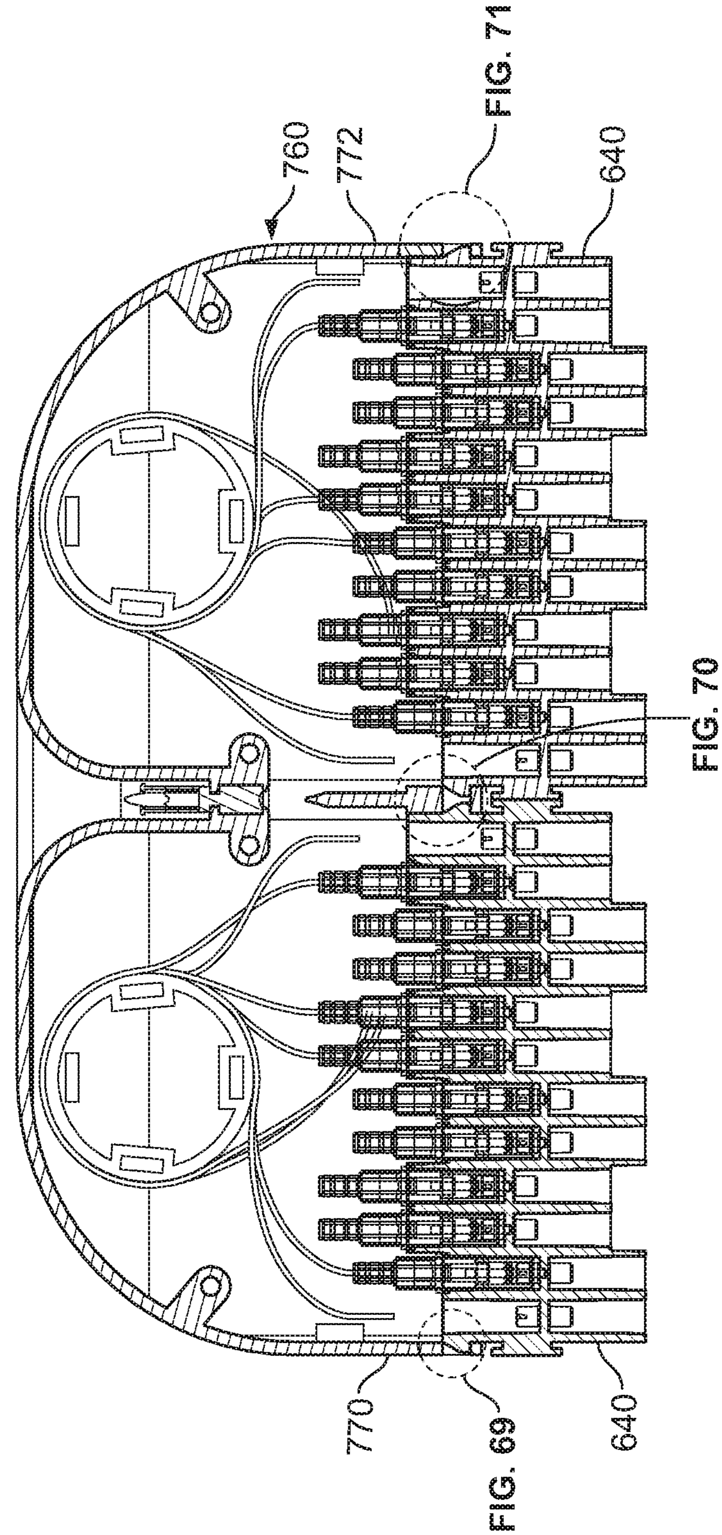
Figure 71:
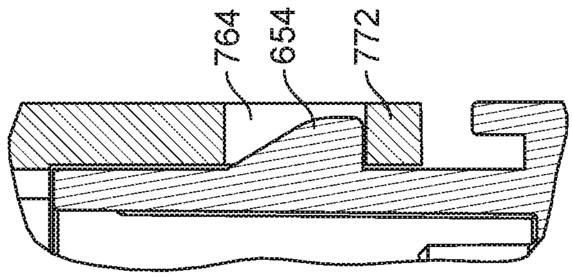
Figure 70:
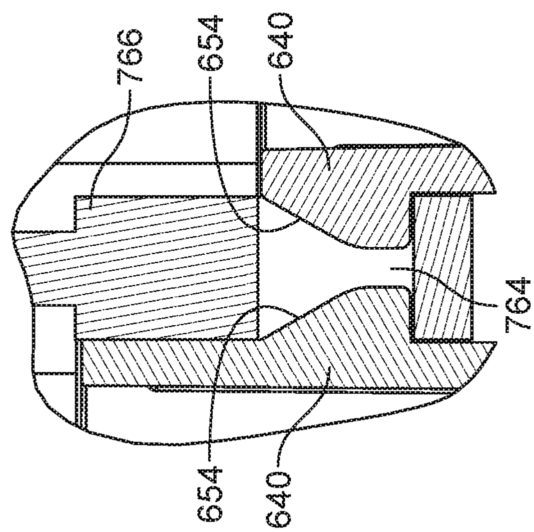
Figure 69:
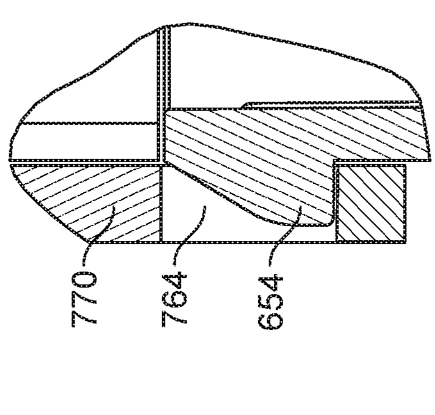
Figure 72:
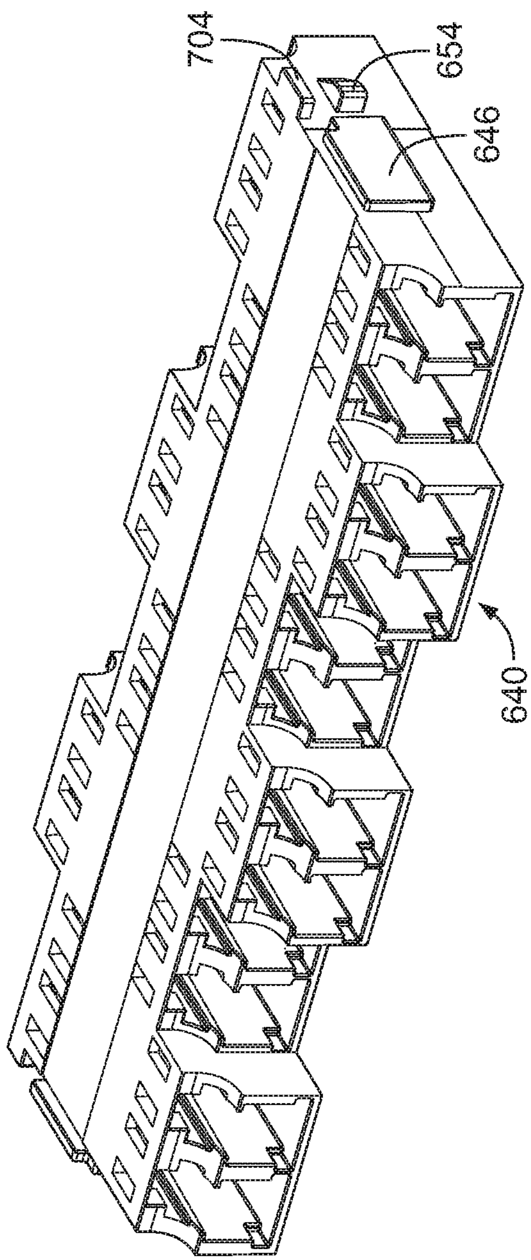
Figure 73:
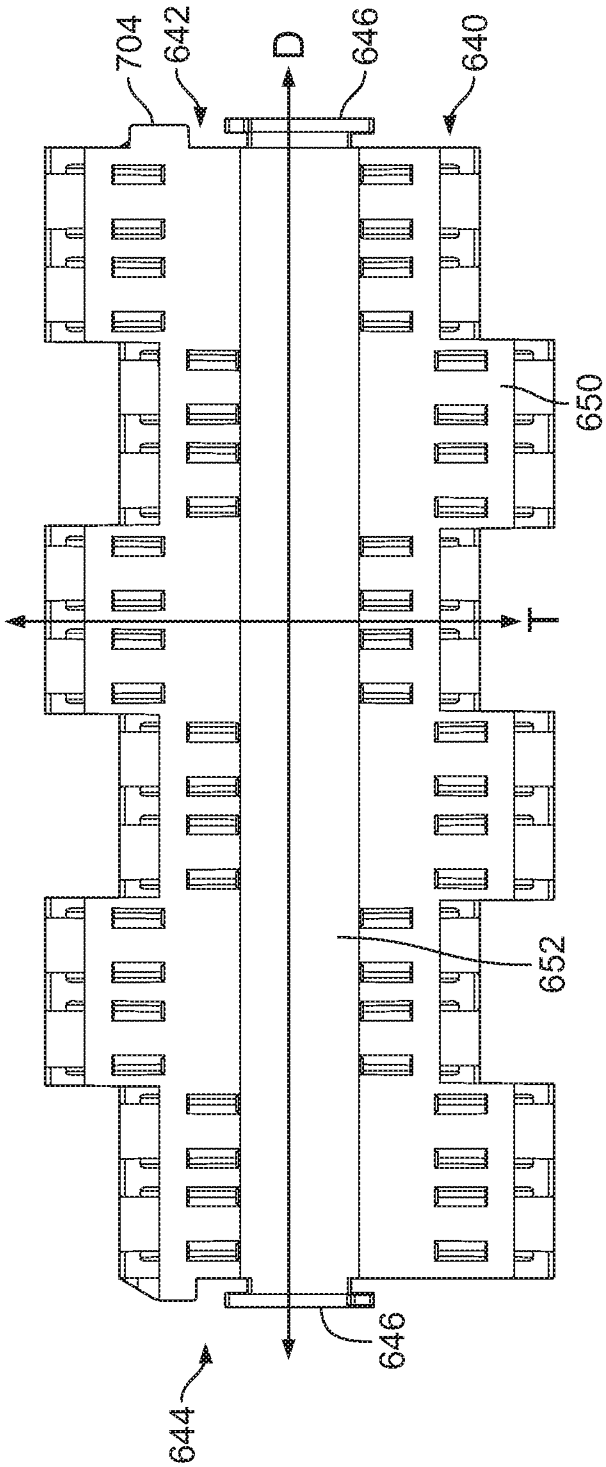

8, the center member shown slidably mounted to the rack mount member of the slide assembly;

FIG. 11 illustrates the center member of FIG. 10 with the latch rod inserted into the base member thereof, the center member shown slidably mounted to the rack mount member of the slide assembly;

FIG. 12 is a perspective view of the latch rod of the center member of the slide assembly of FIG. 10;

FIG. 13 is a left plan view of the latch rod of FIG. 12;

FIG. 14 is a top plan view of the latch rod of FIG. 12;

FIG. 15 is a front view of the latch rod of FIG. 12;

FIG. 16 is a perspective view of the floating plate of the latch rod as shown in FIG. 10;

FIG. 17 is a front view of the floating plate of FIG. 16;

FIG. 18 is a top plan view of the floating plate of FIG. 16;

FIG. 19 is a left plan view of the floating plate of FIG. 16;

FIG. 20 is a cross-sectional view of the fiber optic connection module of FIG. 8, the cross-sectional view illustrating the rack/pinion arrangement among the rack mount member, the center member, and the main frame member of the module;

FIG. 21 is a perspective cross-sectional view illustrating the rack/pinion arrangement between the rack mount member and the center member of the slide assembly;

FIG. 22 is a close-up perspective cross-sectional view illustrating the interaction between the floating plate of the latch rod and the rack mount member of the slide assembly;

FIG. 23 is a cross-sectional view of an example adapter having a media reading interface configured to collect information stored in memory disposed on a fiber optic connector;

FIG. 24 illustrates a telecommunications rack with multiple prior art distribution frames or blocks mounted thereon;

FIG. 25 illustrates a rack mount telecommunications panel having features that are examples of inventive aspects in accordance with the present disclosure, the telecommunications panel including another embodiment of a slidable fiber optic connection module having features that are examples of inventive aspects in accordance with the present disclosure;

FIG. 26 is a front, right, top perspective view of one of the plurality of slidable fiber optic connection modules that are positioned adjacent the left side of the panel of FIG. 25, the connection module shown in isolation;

FIG. 27 is a front view of the fiber optic connection module of FIG. 26;

FIG. 28 illustrates a top view of a fiber optic connection module of FIG. 26 mounted within the panel of FIG. 25;

FIG. 29 is an exploded view of the center member of the slide assembly of the fiber optic connection module of FIG. 26, the center member shown adjacent to a rack mount member of the slide assembly;

FIG. 30 is a cross-sectional view of the fiber optic connection module of FIG. 26, the cross-sectional view illustrating the fiber optic connection module at a neutral retracted position with respect to the telecommunications panel;

FIG. 30A is a close-up view of FIG. 30 illustrating the front and rear floating plates of the centering member of the slide assembly resting within the elongate middle notch of the rack mount member of the slide assembly when the connection module is at a neutral position;

FIG. 31 is a cross-sectional view of the fiber optic connection module of FIG. 26, the cross-sectional view illustrating the fiber optic connection module at a forwardly extended position with respect to the telecommunications panel;

FIG. 31A is a close-up view of FIG. 31 illustrating the front floating plate of the centering member nested within the front notch of the rack mount member and the rear floating plate of the centering member abutting against the front edge of the elongate middle notch of the rack mount member when the connection module is at the forwardly extended position;

FIG. 32 is a cross-sectional view of the fiber optic connection module of FIG. 26, the cross-sectional view illustrating the fiber optic connection module at a rearwardly extended position with respect to the telecommunications panel;

FIG. 32A is a close-up view of FIG. 32 illustrating the rear floating plate of the centering member nested within the rear notch of the rack mount member and the front floating plate of the centering member abutting against the rear edge of the elongate middle notch of the rack mount member when the connection module is at the rearwardly extended position;

FIG. 33 illustrates the position of the pivot door of the telecommunications panel when the connection module is at a neutral retracted position;

FIG. 34 illustrates the radius limiter of the connection module contacting the pivot door to unlock the door as the connection module is being pulled in the forward direction;

FIG. 35 illustrates the pivot door being opened by being contacted by the right wall of the connection module;

FIG. 36 illustrates the position of the pivot door when the connection module is at the full forwardly extended position;

FIG. 37 is a front, right, top perspective view of the main frame member of another embodiment of a slidable fiber optic connection module having features that are examples of inventive aspects in accordance with the present disclosure, the fiber optic connection module suitable for mounting to the telecommunications panel of FIG. 25;

FIG. 38 is a front, right, top perspective view of the main frame member of FIG. 37 with a fiber optic cassette mounted thereto;

FIG. 39 is a rear, left, top perspective view of the main frame member and the fiber optic cassette of FIG. 38;

FIG. 40 illustrates the main frame member and the fiber optic cassette of FIG. 38 in an exploded configuration;

FIG. 41 is a close-up view of one of the equipment mounts of the main frame member of FIG. 37;

FIG. 42 is a close-up view of one of the removable cable retention members of the fiber optic cassette of FIG. 40;

FIG. 43 is a close-up view illustrating one of the bottom tabs of the fiber optic cassette of FIGS. 38-40 snap-fitting into one of the openings of the main frame member of FIG. 37;

FIG. 44 is a front, right, top perspective view of the fiber optic cassette of FIGS. 38-40 shown in isolation;

FIG. 45 is a front, right, bottom perspective view of the fiber optic cassette of FIG. 44;

FIG. 46 is a top view of the fiber optic cassette of FIG. 44;

FIG. 47 is a bottom view of the fiber optic cassette of FIG. 44;

FIG. 48 is a front view of the fiber optic cassette of FIG. 44;

FIG. 49 is a right side view of the fiber optic cassette of FIG. 44;

FIG. 50 is a front, right, top perspective view of another embodiment of a fiber optic cassette suitable for mounting on the main frame member of FIG. 37;

FIG. 51 is a front, right, bottom perspective view of the fiber optic cassette of FIG. 50;

FIG. 52 is a top view of the fiber optic cassette of FIG. 50;

FIG. 53 is a bottom view of the fiber optic cassette of FIG. 50;

FIG. 54 is a front view of the fiber optic cassette of FIG. 50;

FIG. 55 is a right side view of the fiber optic cassette of FIG. 50;

FIG. 56 illustrates a front, right, top perspective view of the fiber optic cassette of FIG. 50 with the cover removed to show the internal features thereof;

FIG. 57 is a top view of the fiber optic cassette of FIG. 56;

FIG. 58 is a front, right, top exploded perspective view of the fiber optic cassette of FIG. 50;

FIG. 59 is a rear, left, top exploded perspective view of the fiber optic cassette of FIG. 50;

FIG. 60 illustrates a front, right, top perspective view of the body of the fiber optic cassette of FIG. 50, with the cover and one of the adapter blocks removed therefrom;

FIG. 61 is a rear, left, top perspective view of the cassette body of FIG. 60;

FIG. 62 is a top view of the cassette body of FIG. 60;

FIG. 63 is a left side view of the cassette body of FIG. 60;

FIG. 64 is a close-up perspective view illustrating a right ramped tab of the adapter block snap-fit into an opening on the center divider wall of the fiber optic cassette body;

FIG. 65 is a close-up perspective view illustrating a left ramped tab of the adapter block snap-fit into an opening on a side wall of the fiber optic cassette body;

FIG. 66 is a close-up top view illustrating the right ramped tab of the adapter block snap-fit into an opening on the center divider wall of the fiber optic cassette body;

FIG. 67 is a close-up top view illustrating the left ramped tab of the adapter block snap-fit into an opening on a side wall of the fiber optic cassette body;

FIG. 68 is a cross-sectional view of taken along line 68-68 of FIG. 56;

FIG. 69 is a close-up cross-sectional view illustrating the left ramped tab of the left adapter block snap-fit into an opening on a side wall of the fiber optic cassette body;

FIG. 70 is a close-up cross-sectional view illustrating the right ramped tab of the right adapter block and the left ramped tab of the left adapter block snap-fit into the opening on the center divider wall of the fiber optic cassette body;

FIG. 71 is a close-up cross-sectional view illustrating the right ramped tab of the right adapter block snap-fit into an opening on a side wall of the fiber optic cassette body;

FIG. 72 is a front, right, top perspective view of one of the adapter blocks suitable for mounting directly on the main frame member of FIG. 37 or mounting to the fiber optic cassettes of FIGS. 44-49 and FIGS. 50-55;

FIG. 73 is a top view of the adapter block of FIG. 72; and

Figure 74:
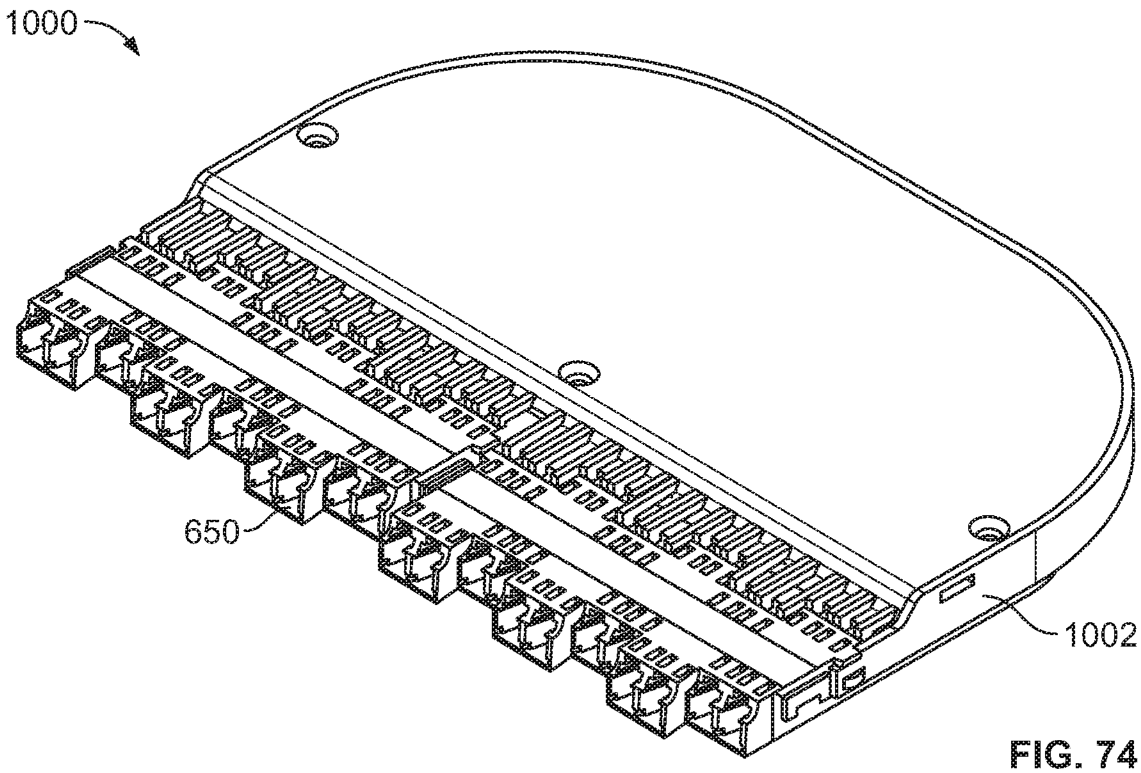
Figure 75:
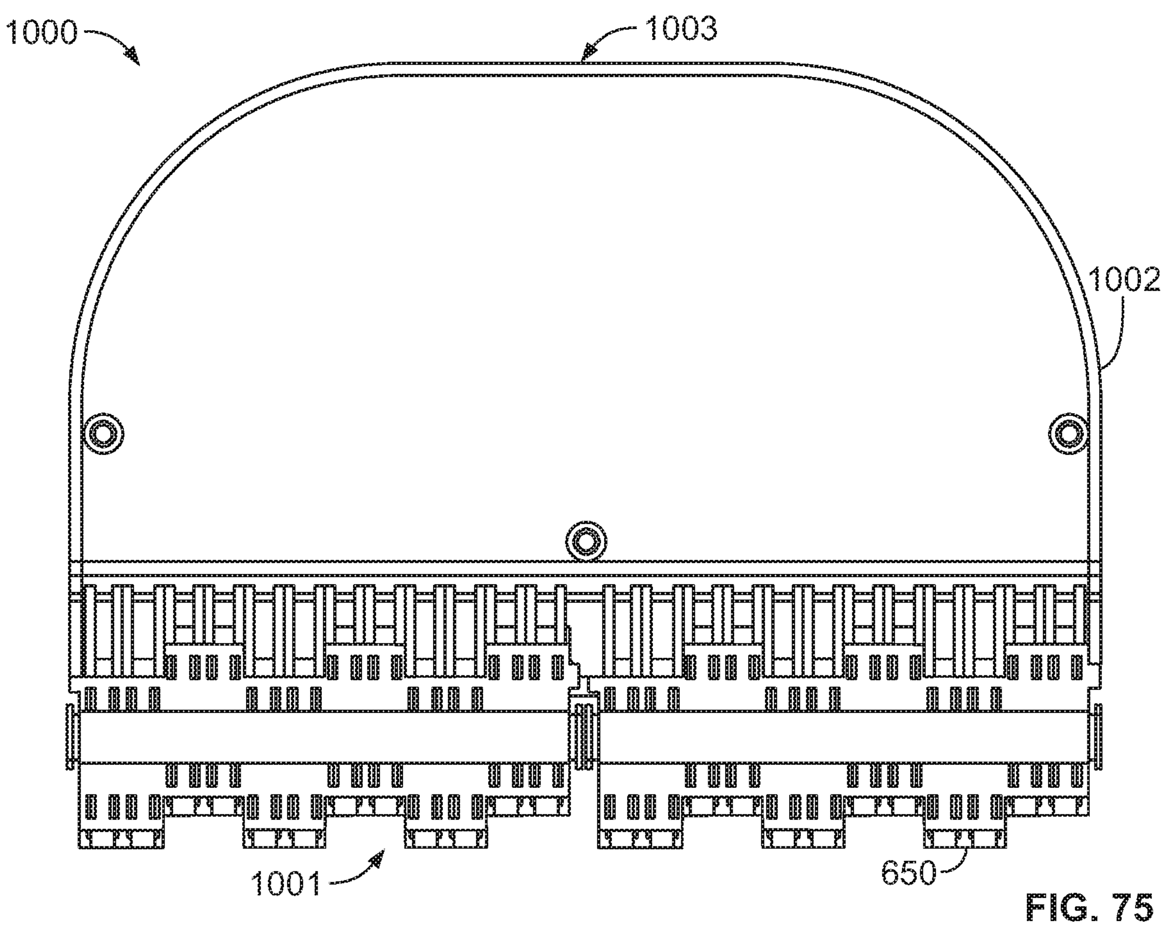
Figure 76:
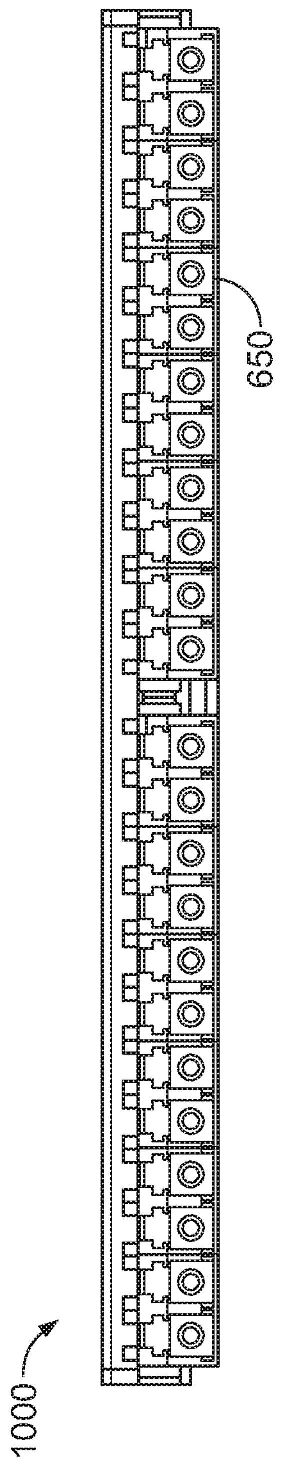
Figure 77:
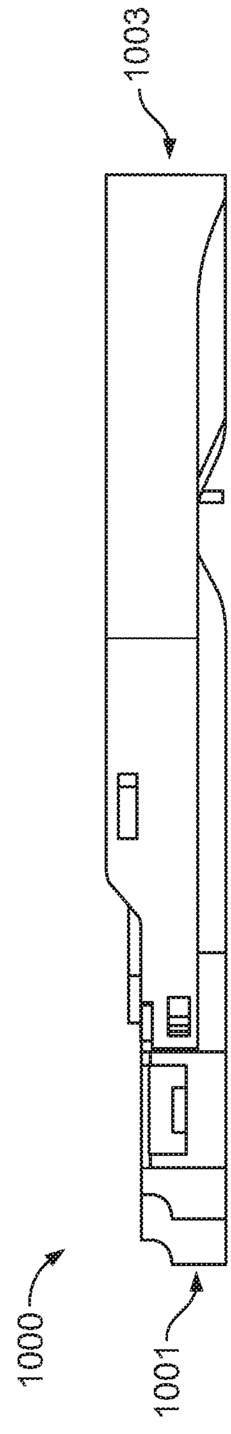
Figure 78:
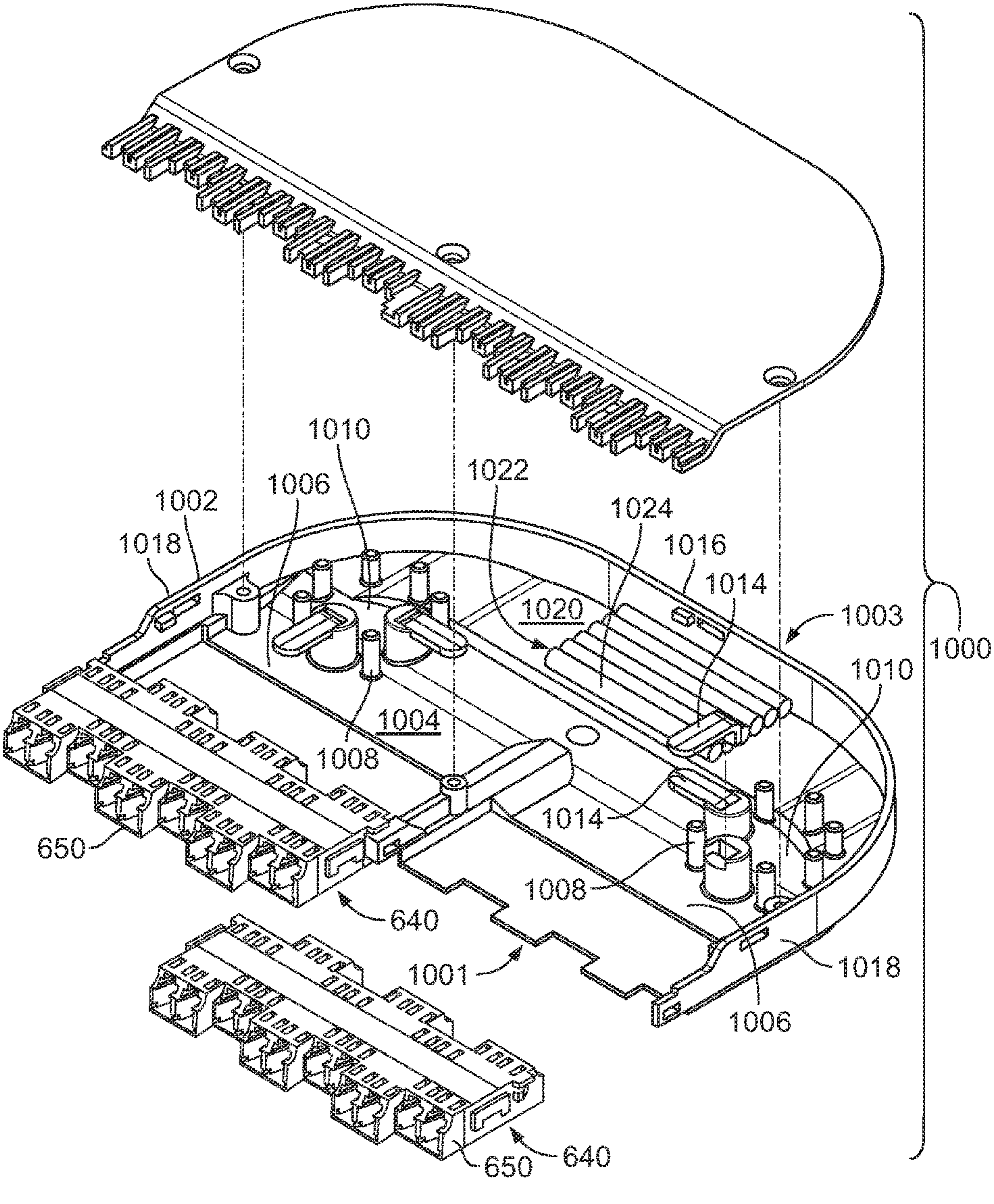
Figure 79:
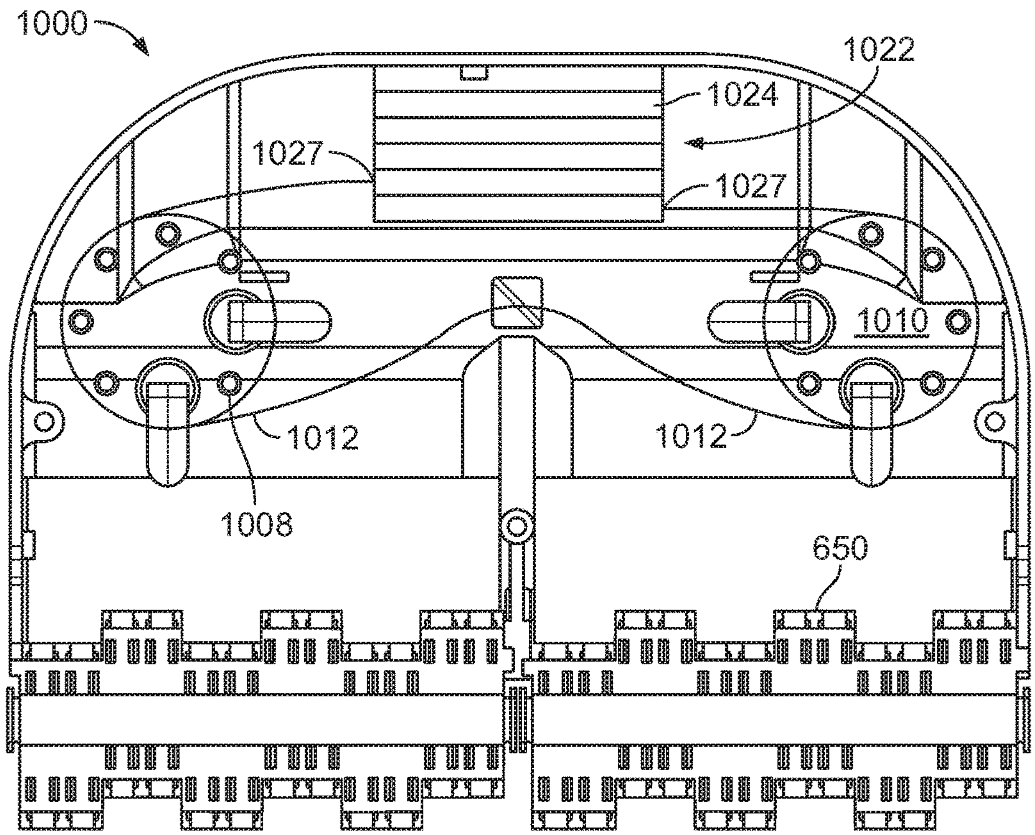
Figure 80:
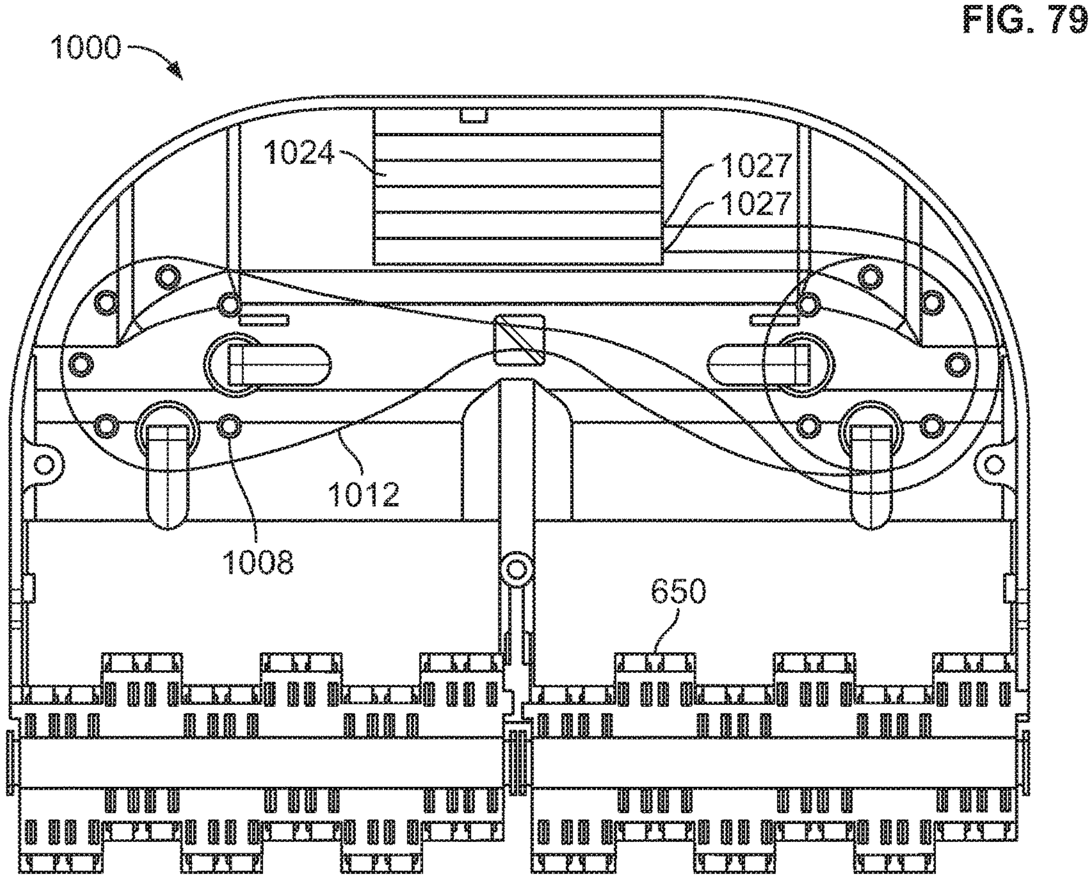
Figure 81:
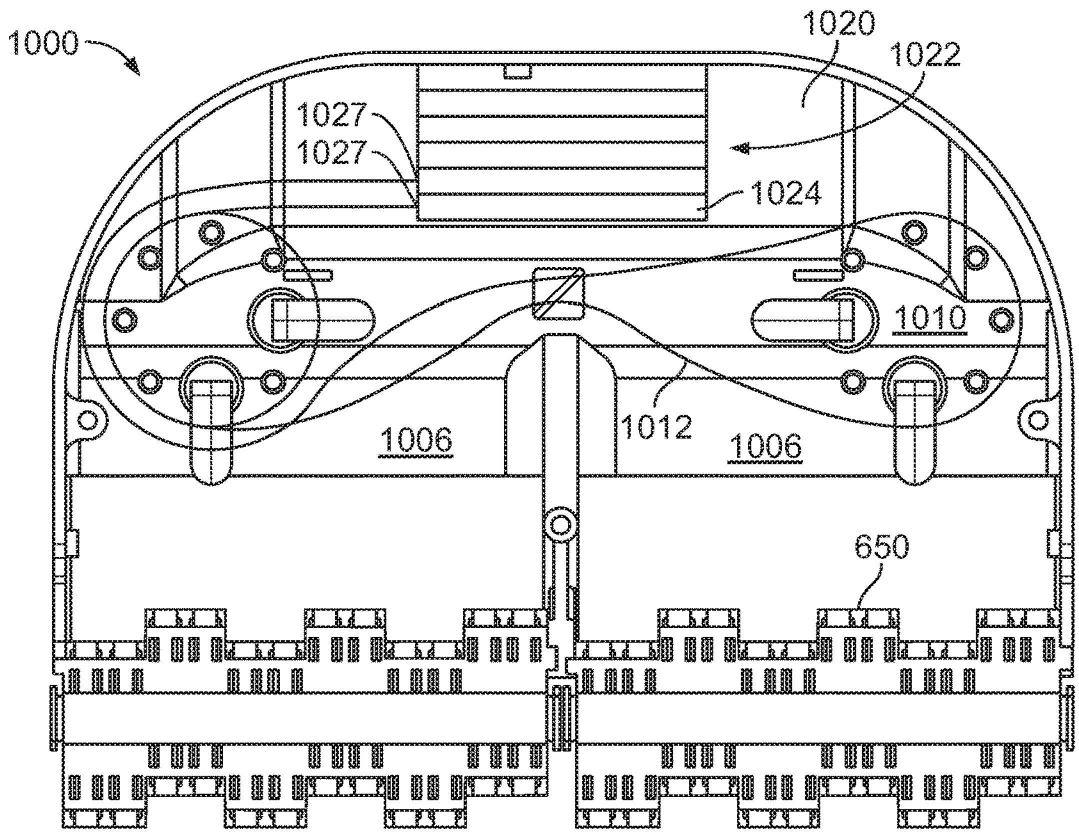
Figure 82:
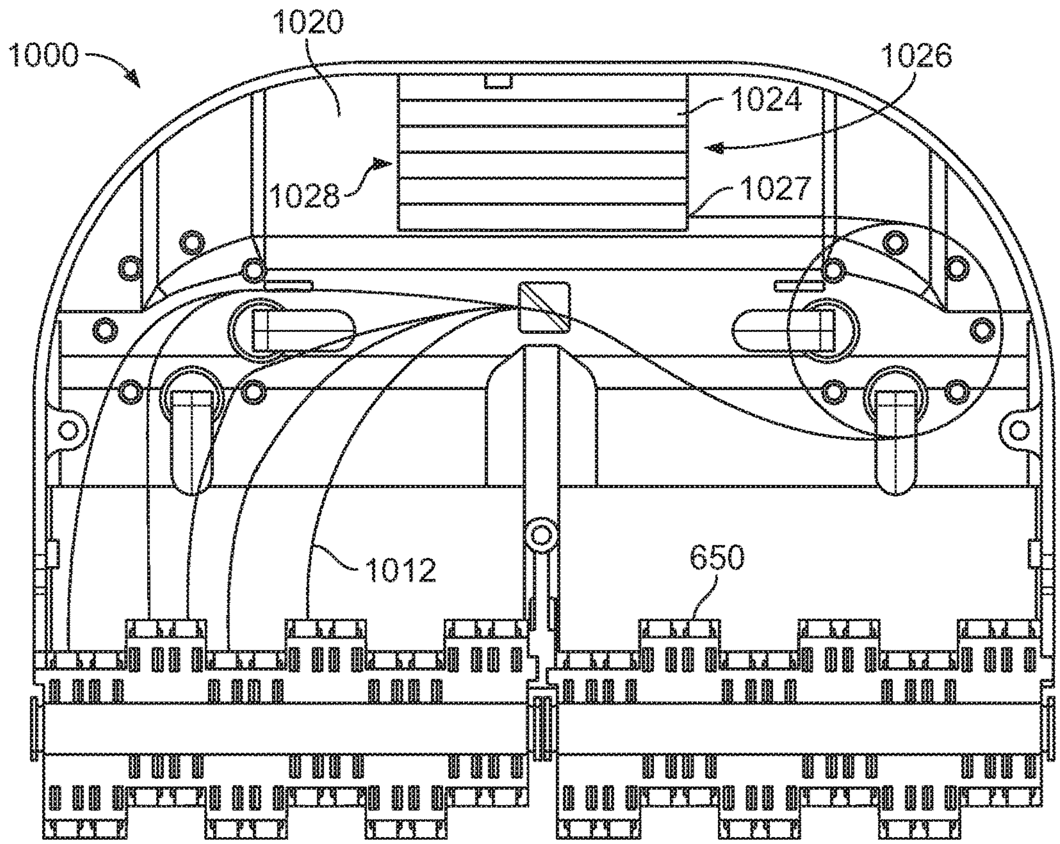
Figure 83:
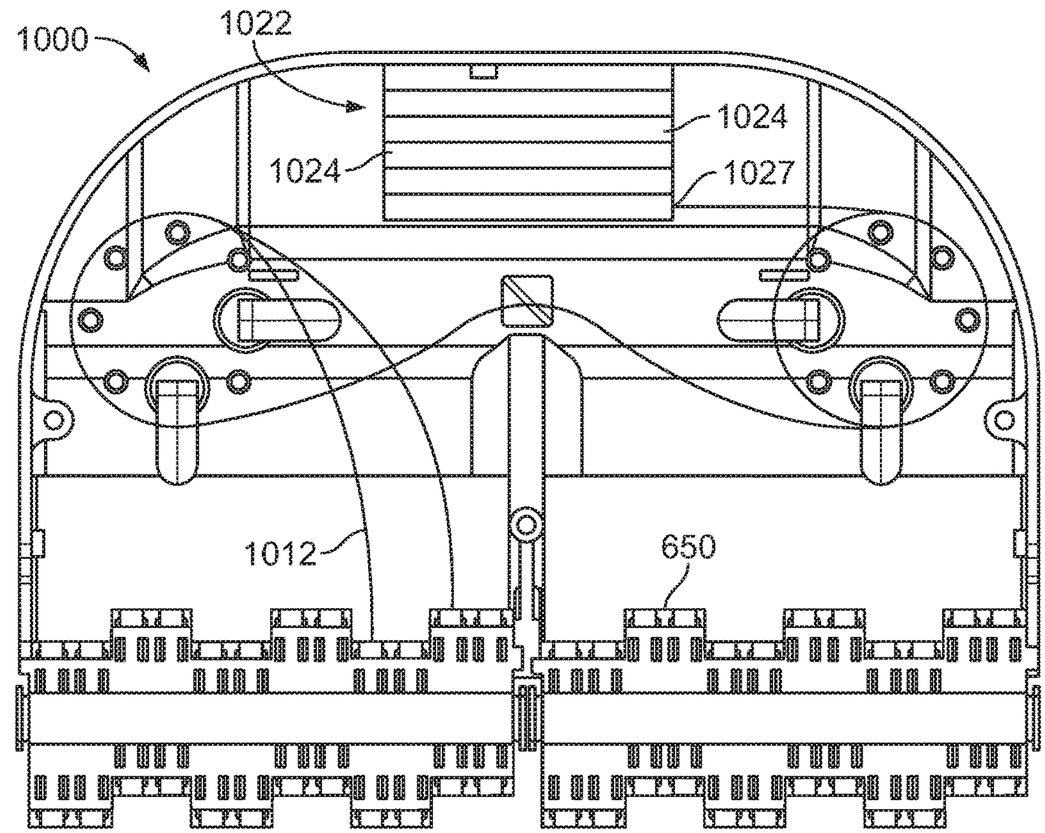
Figure 84:
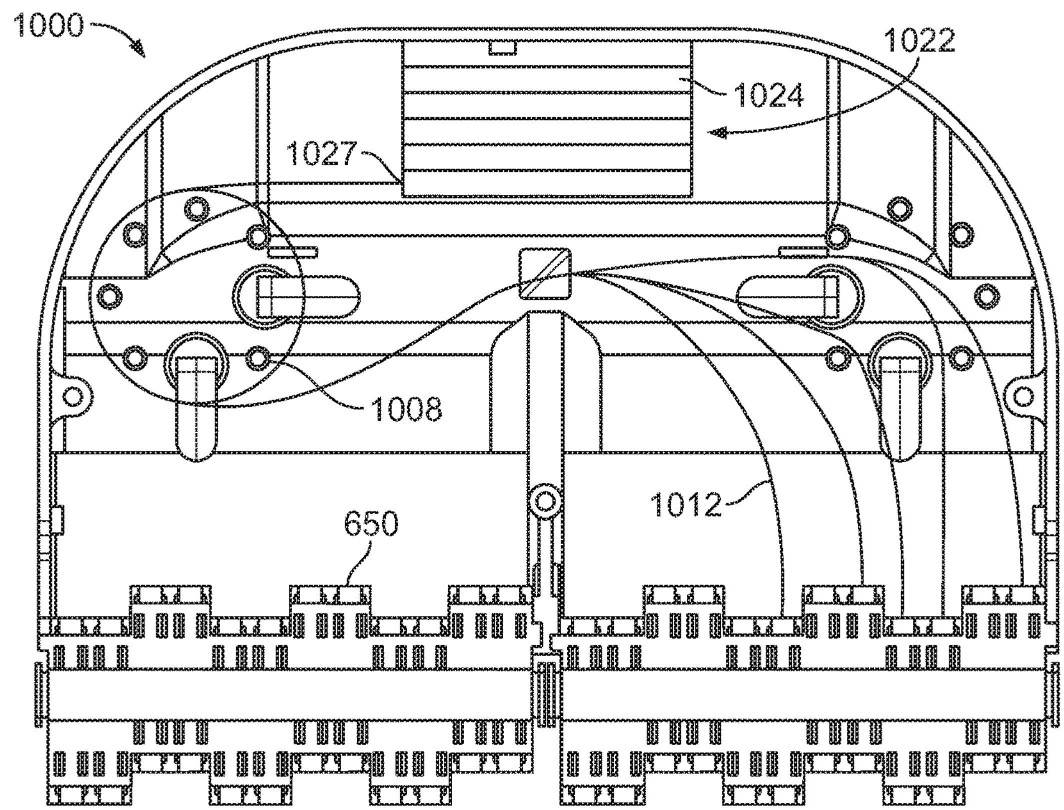
Figure 85:
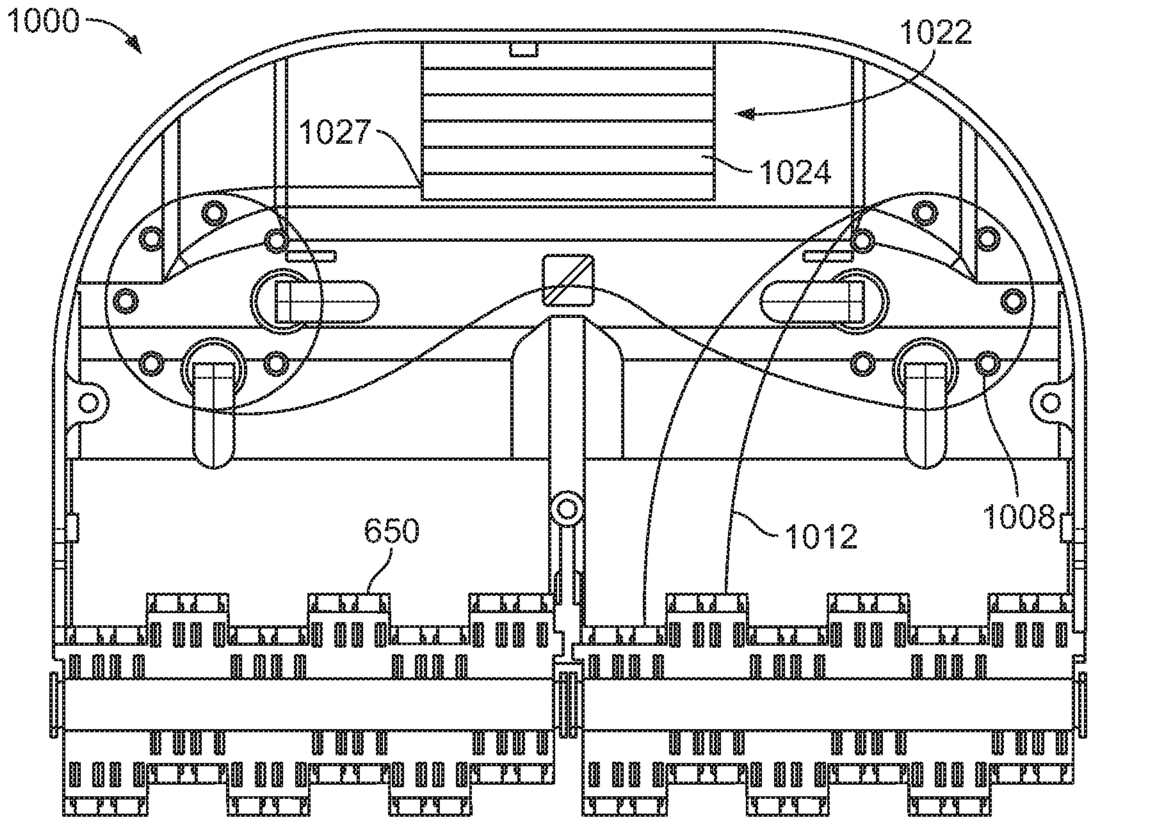
Figure 86:
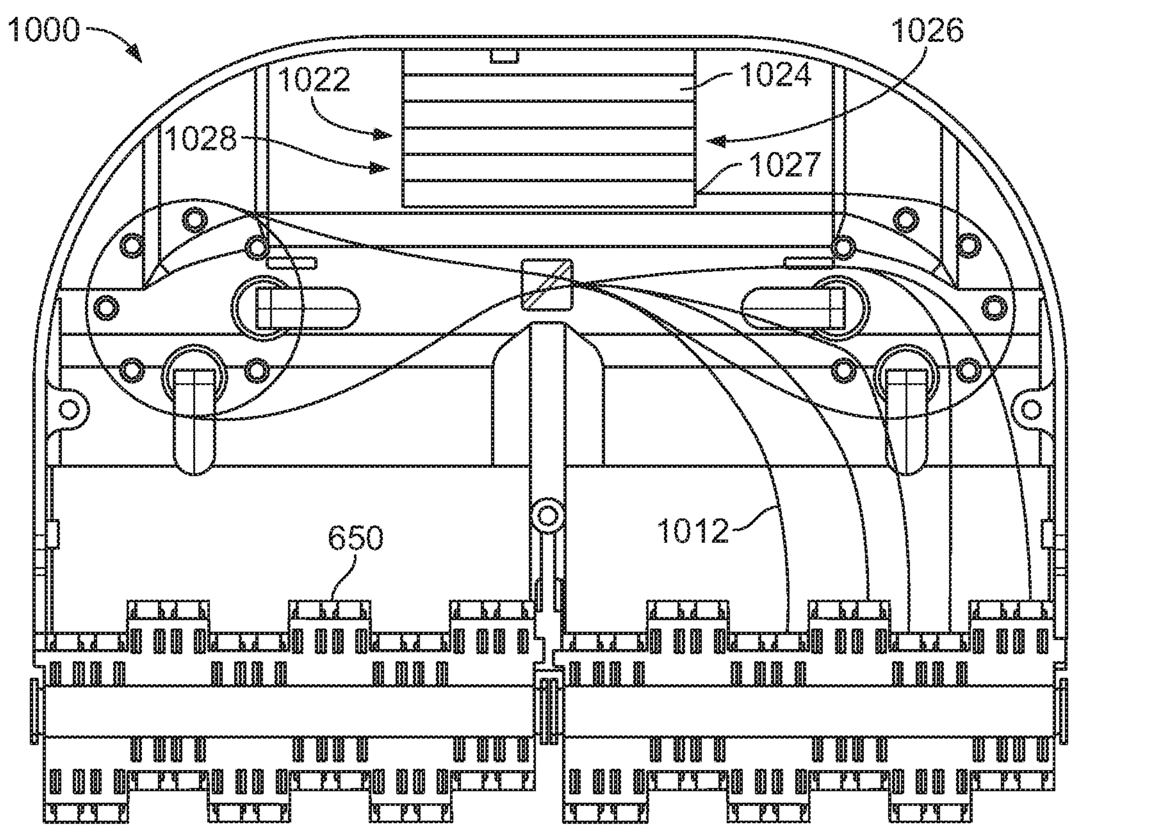
Figure 87:
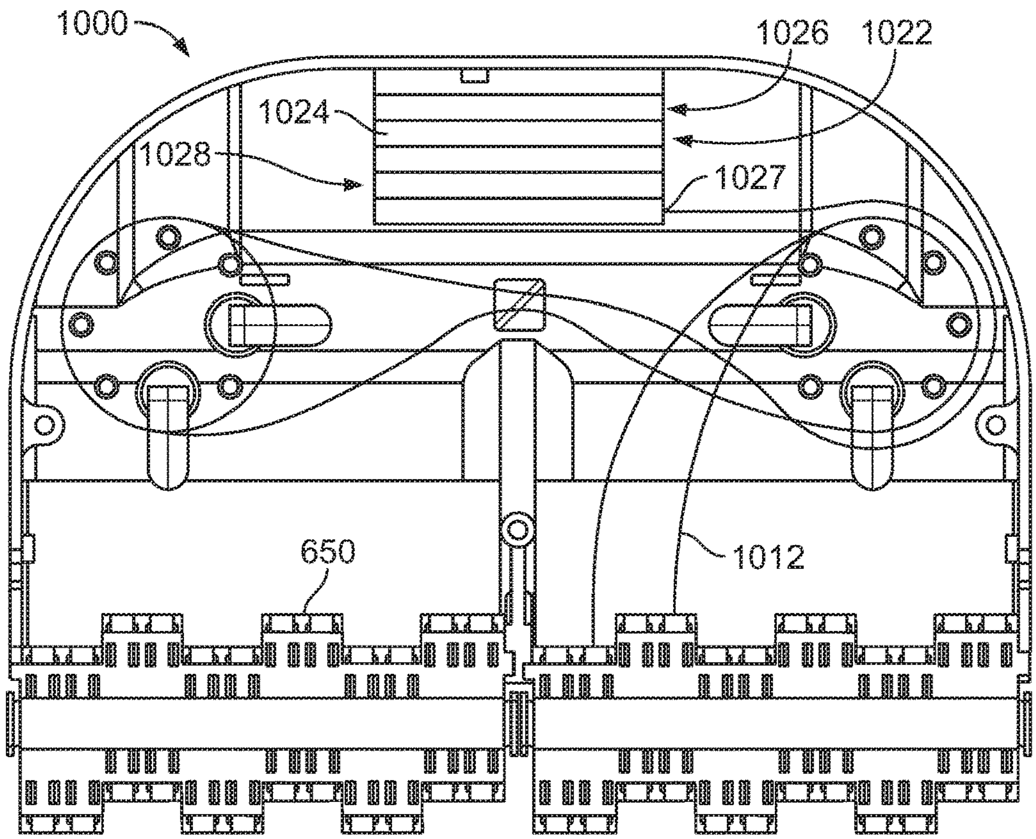
Figure 88:
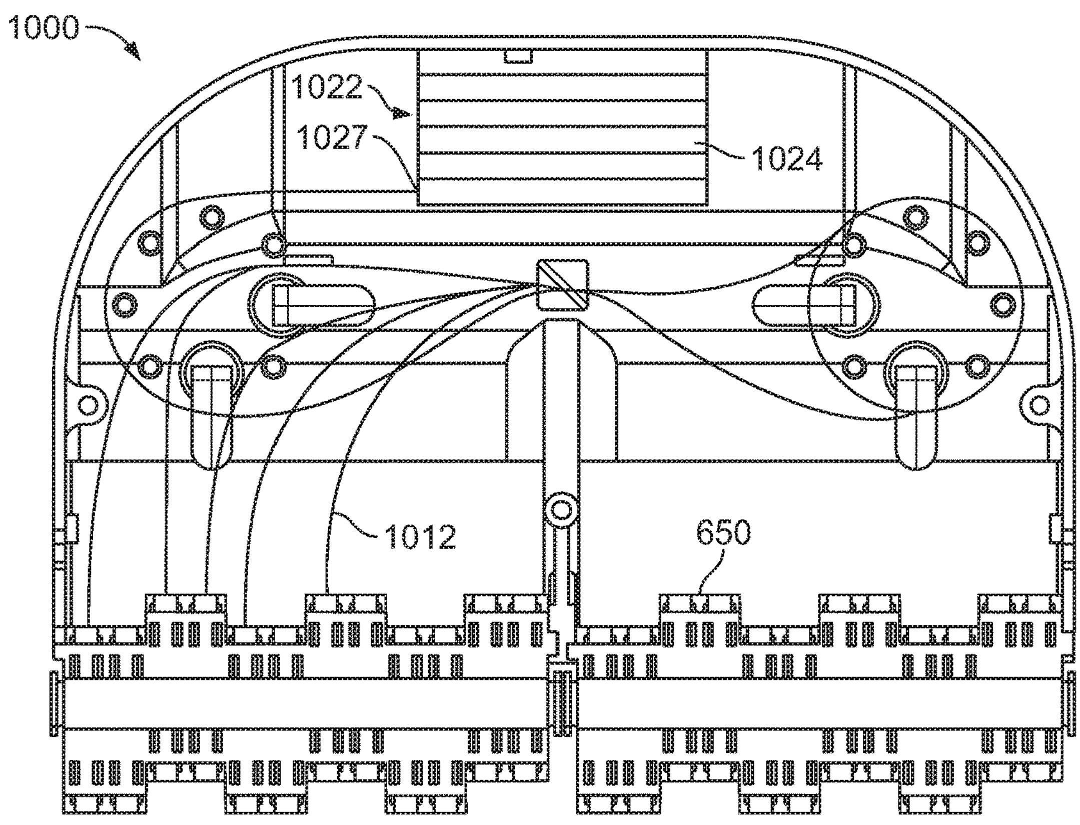
Figure 89:
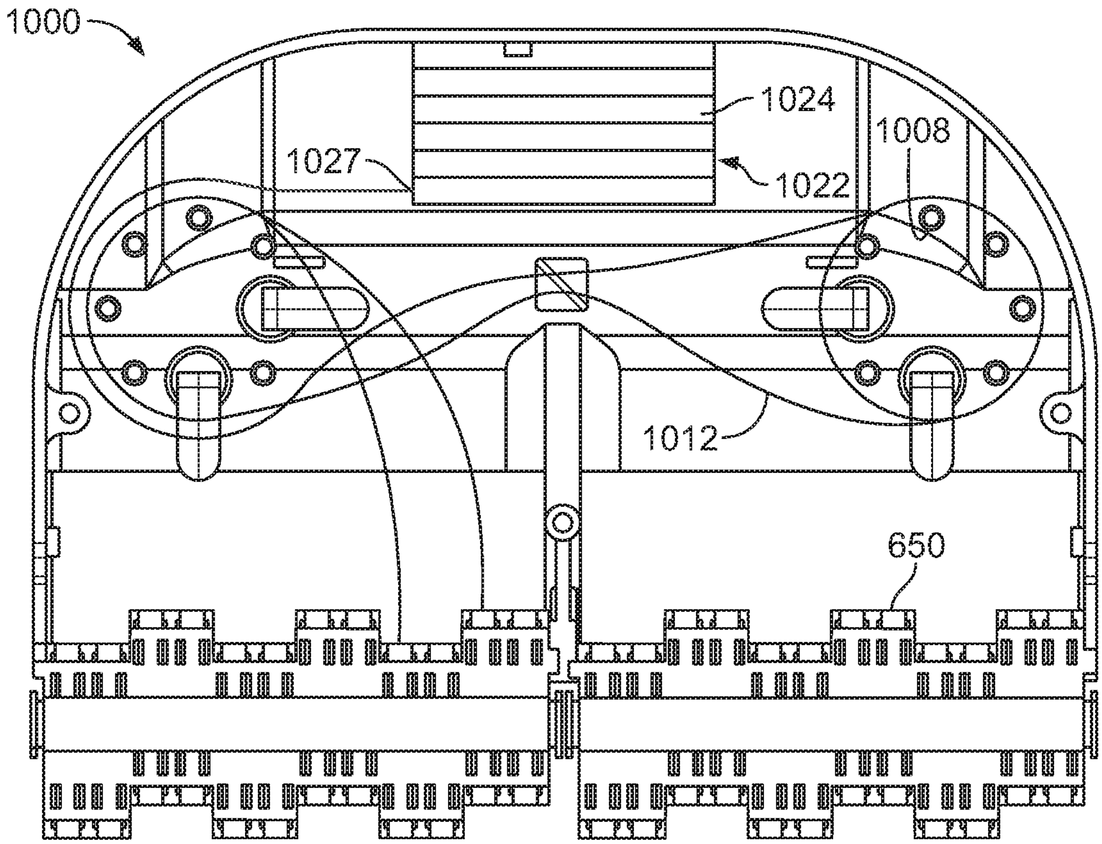
Figure 90:
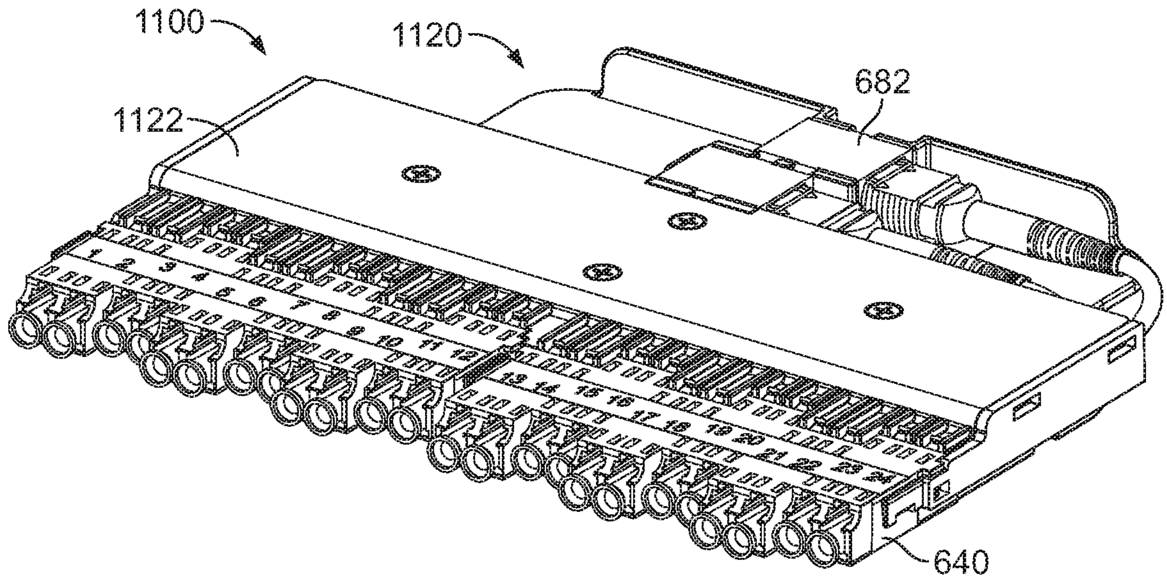
Figure 91:
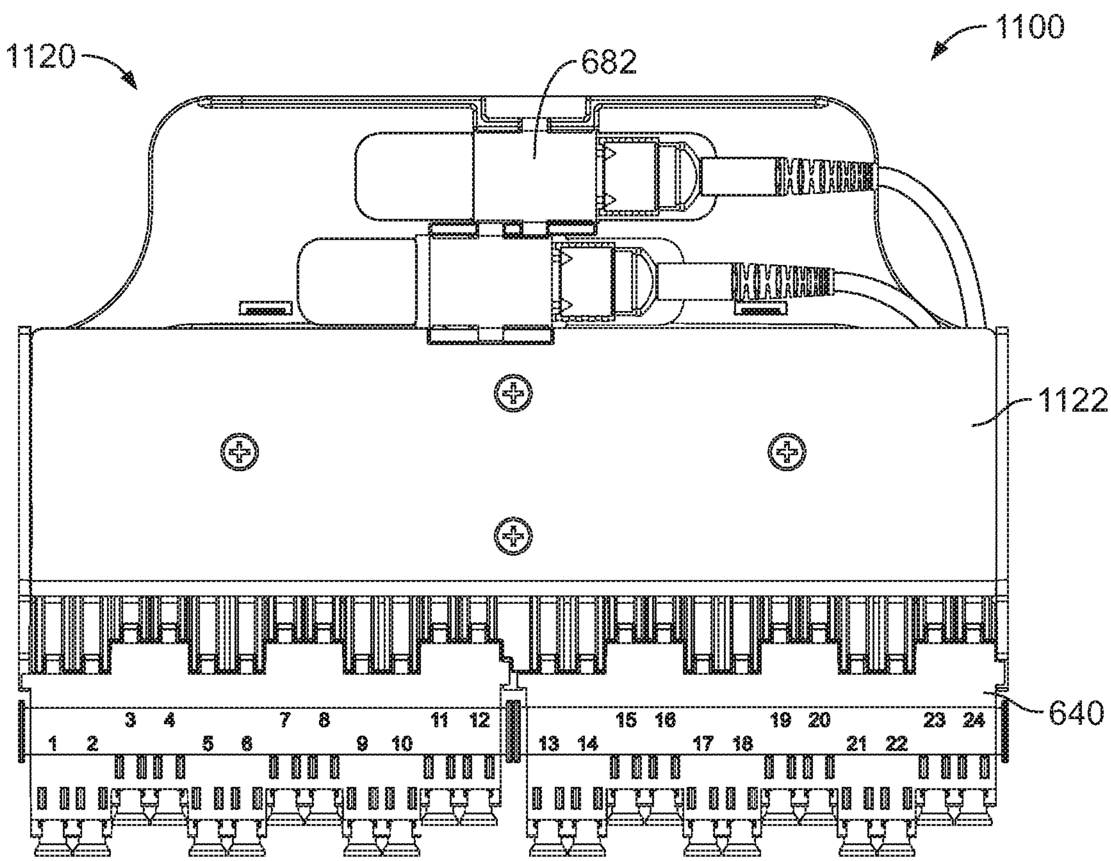
Figure 92:
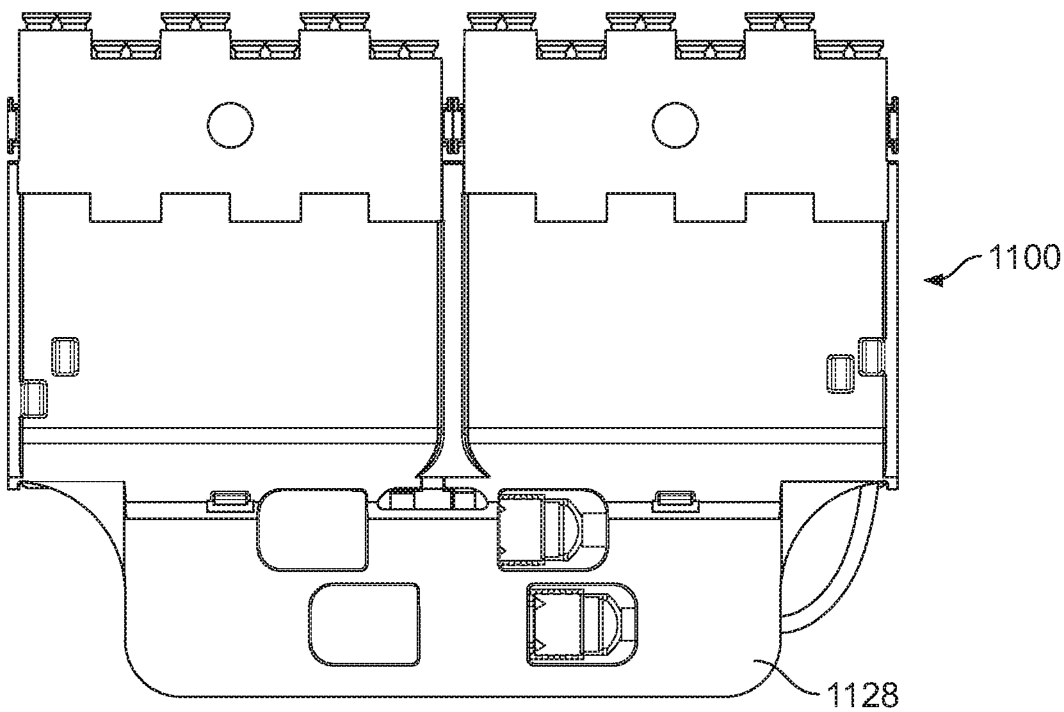
Figure 93:
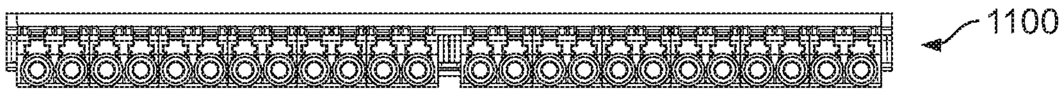
Figure 94:
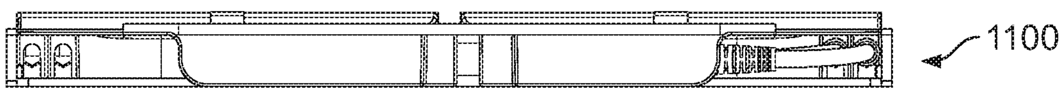
Figure 95:
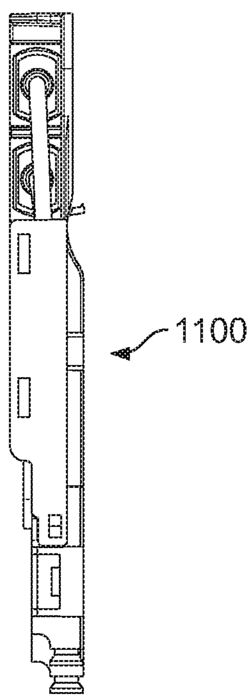
Figure 96:
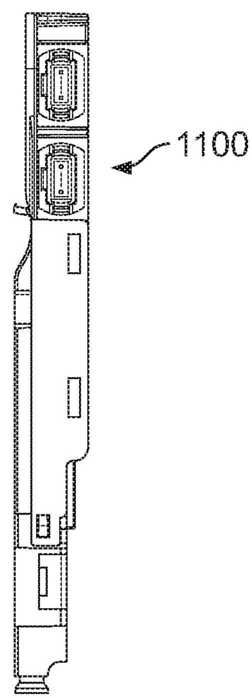
Figure 97:
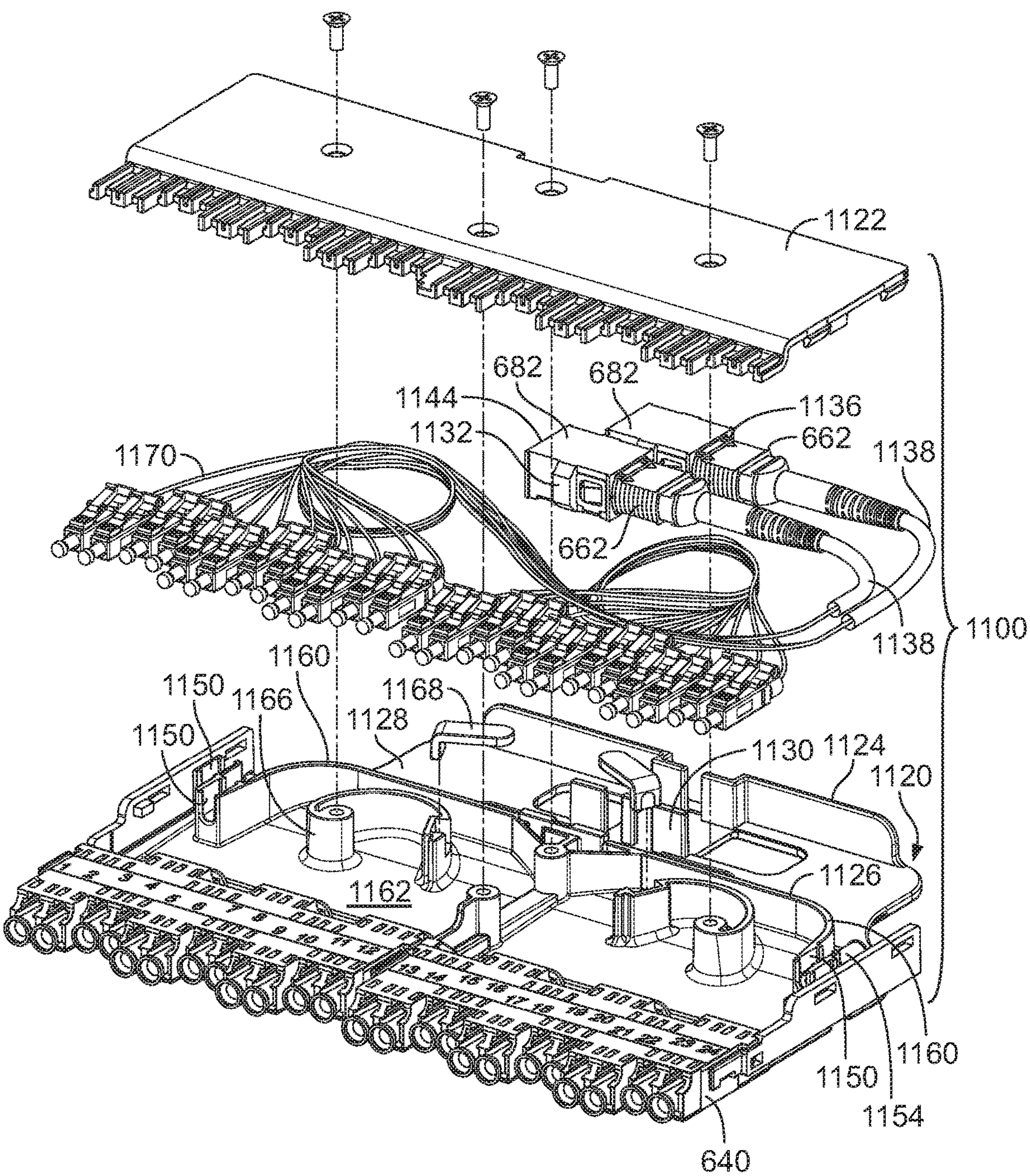
Figure 98:
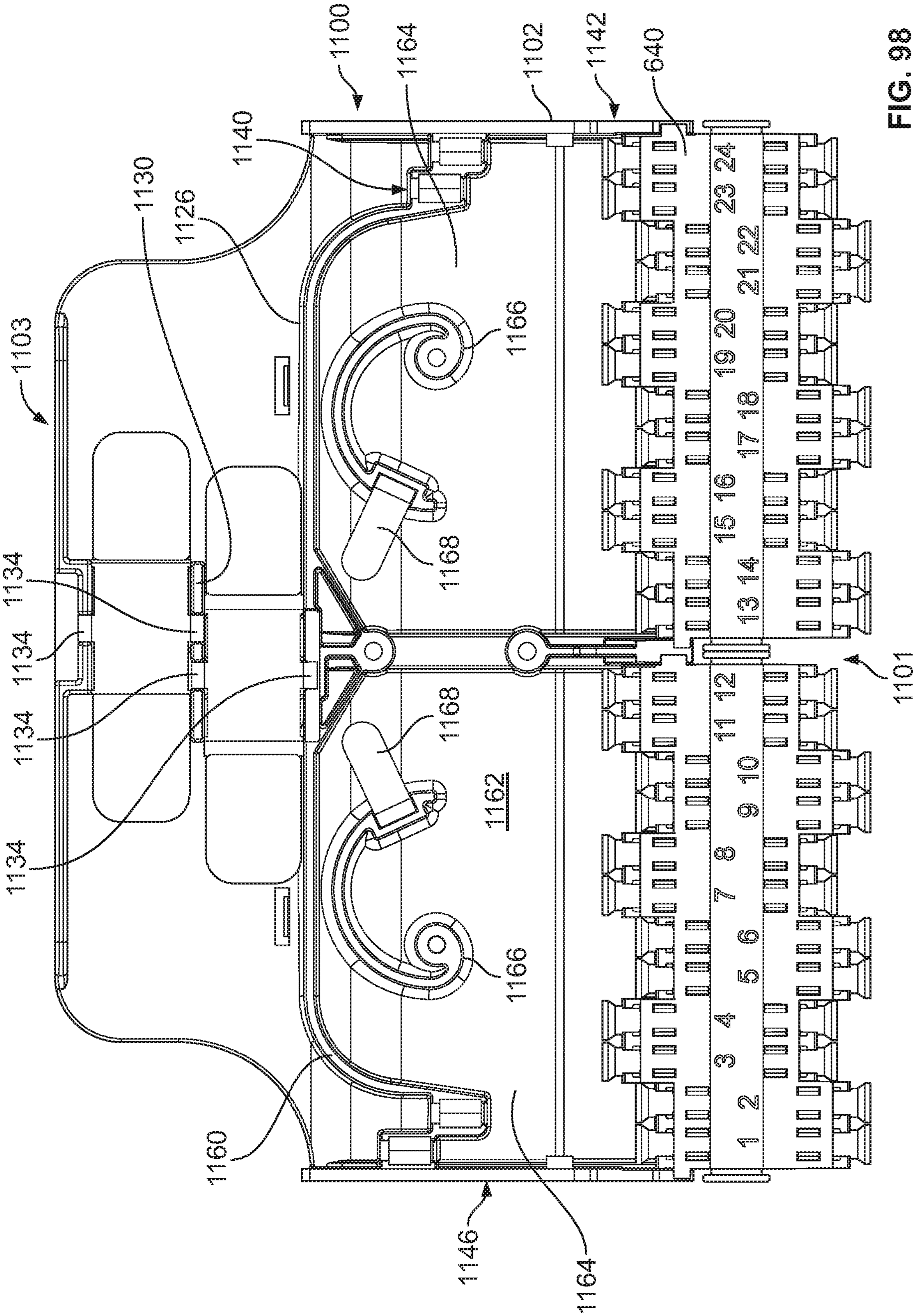
Figure 99:
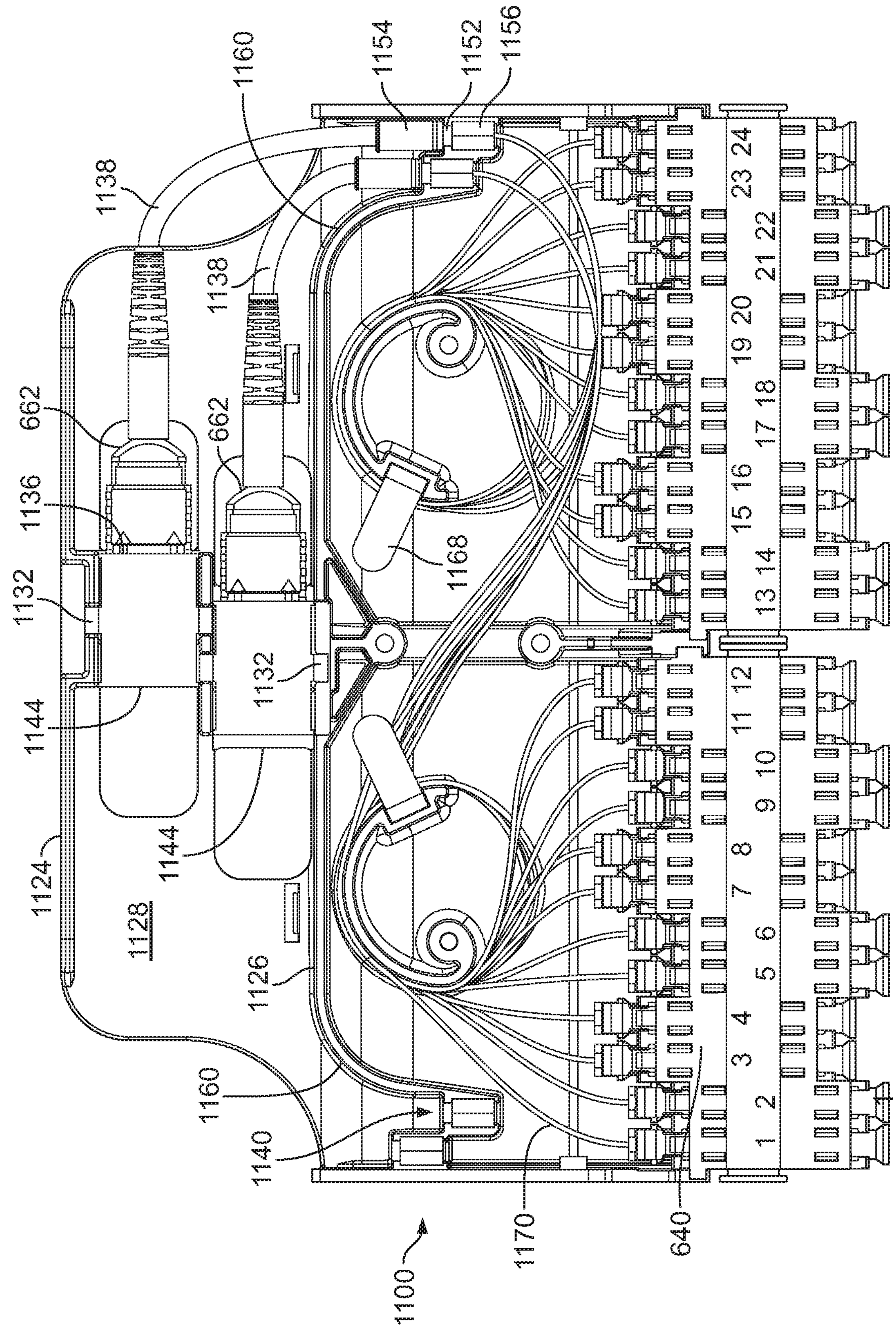
Figure 100:
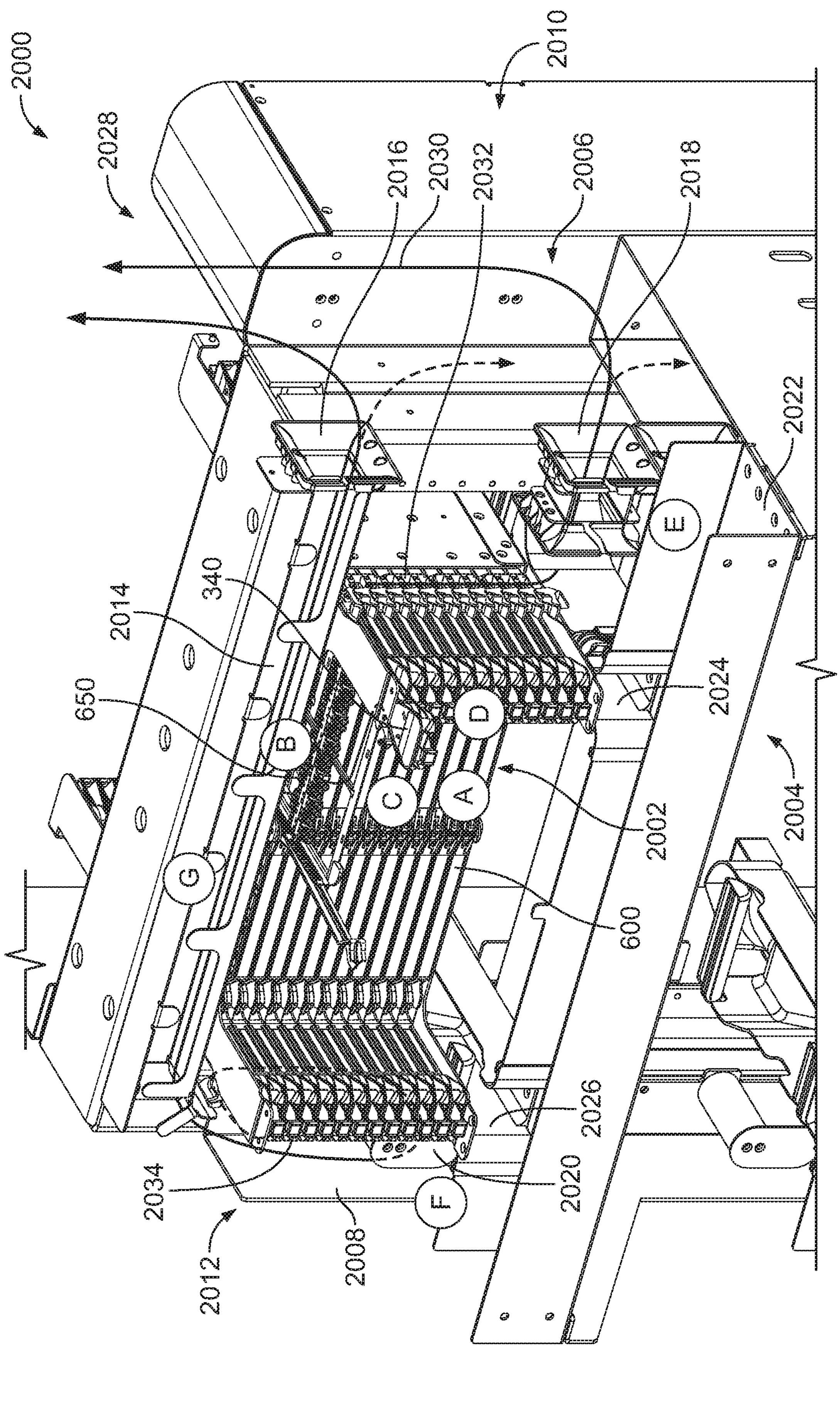
Figure 101:
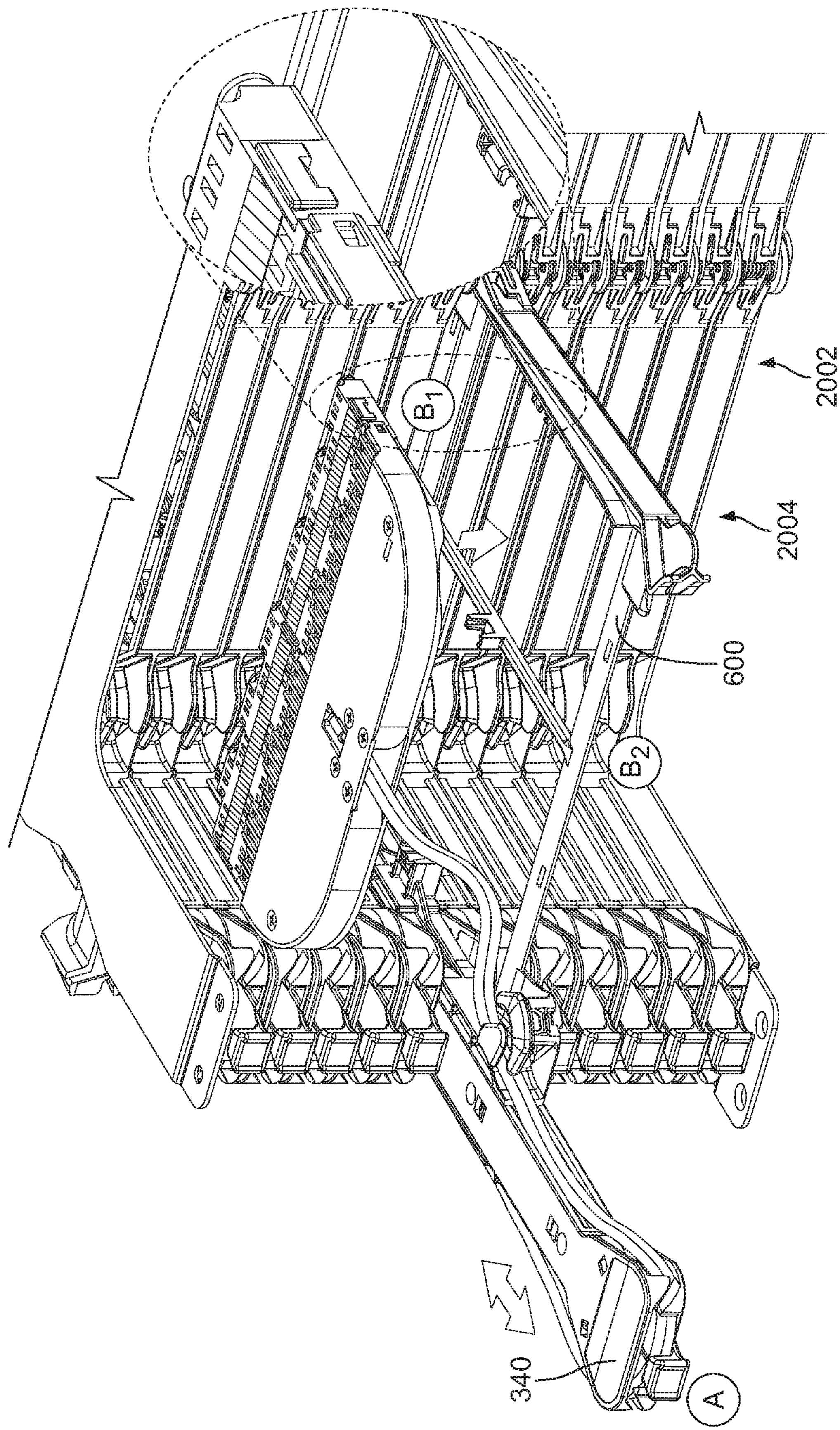
Figure 102:
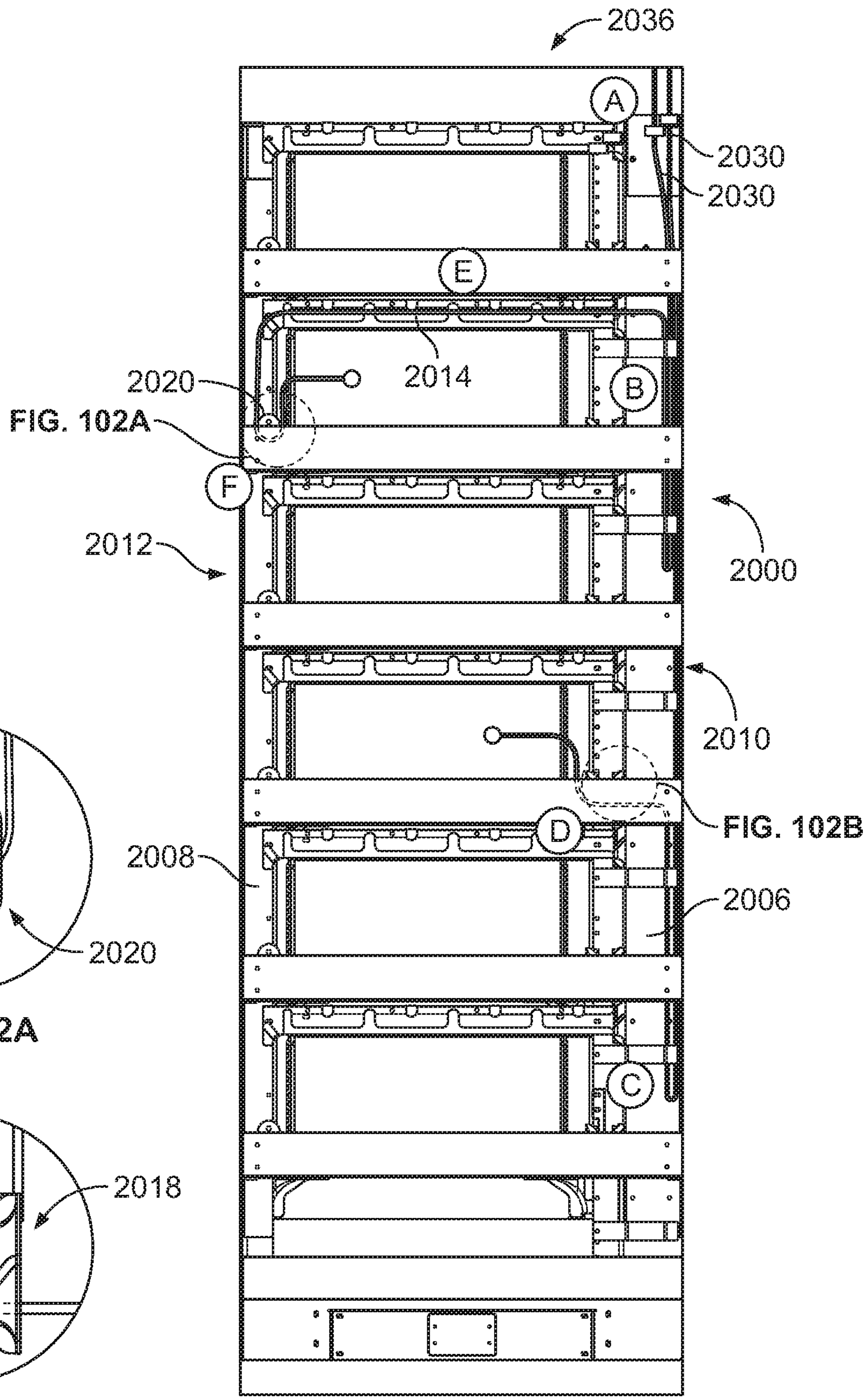
Figure 102A:
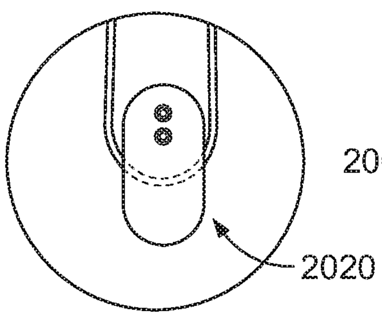
Figure 102B:
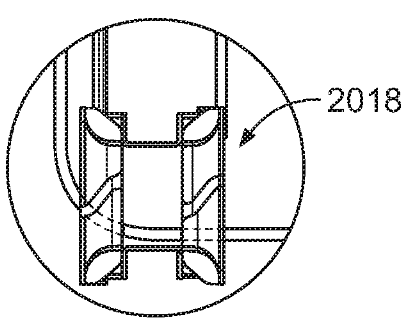
Figure 103A:
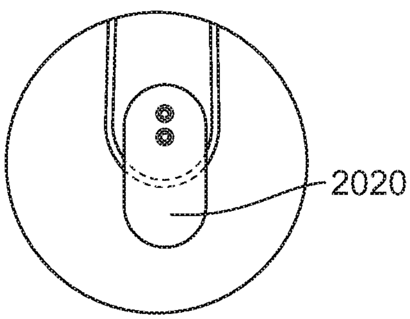
Figure 103B:
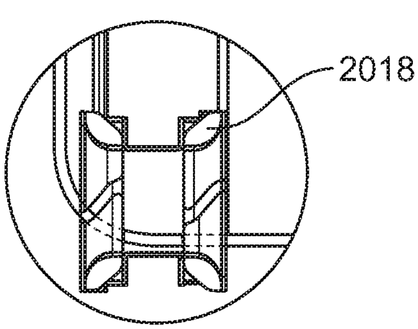
Figure 103:
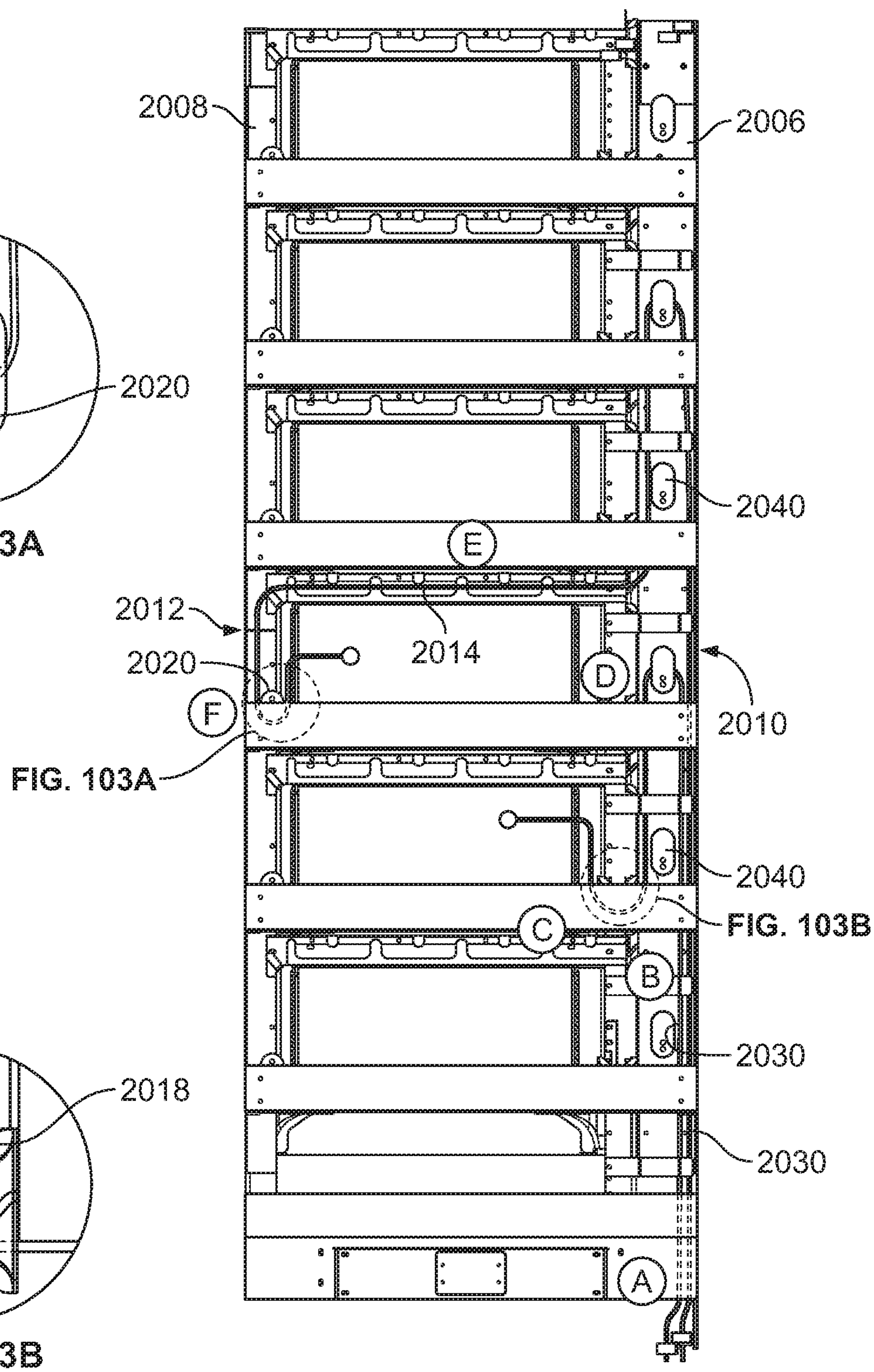
Figure 104A:
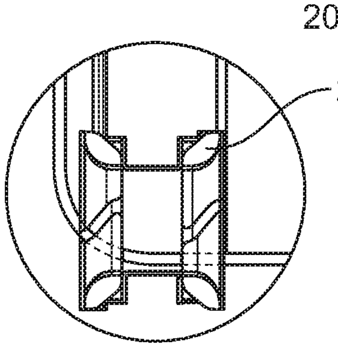
Figure 104:
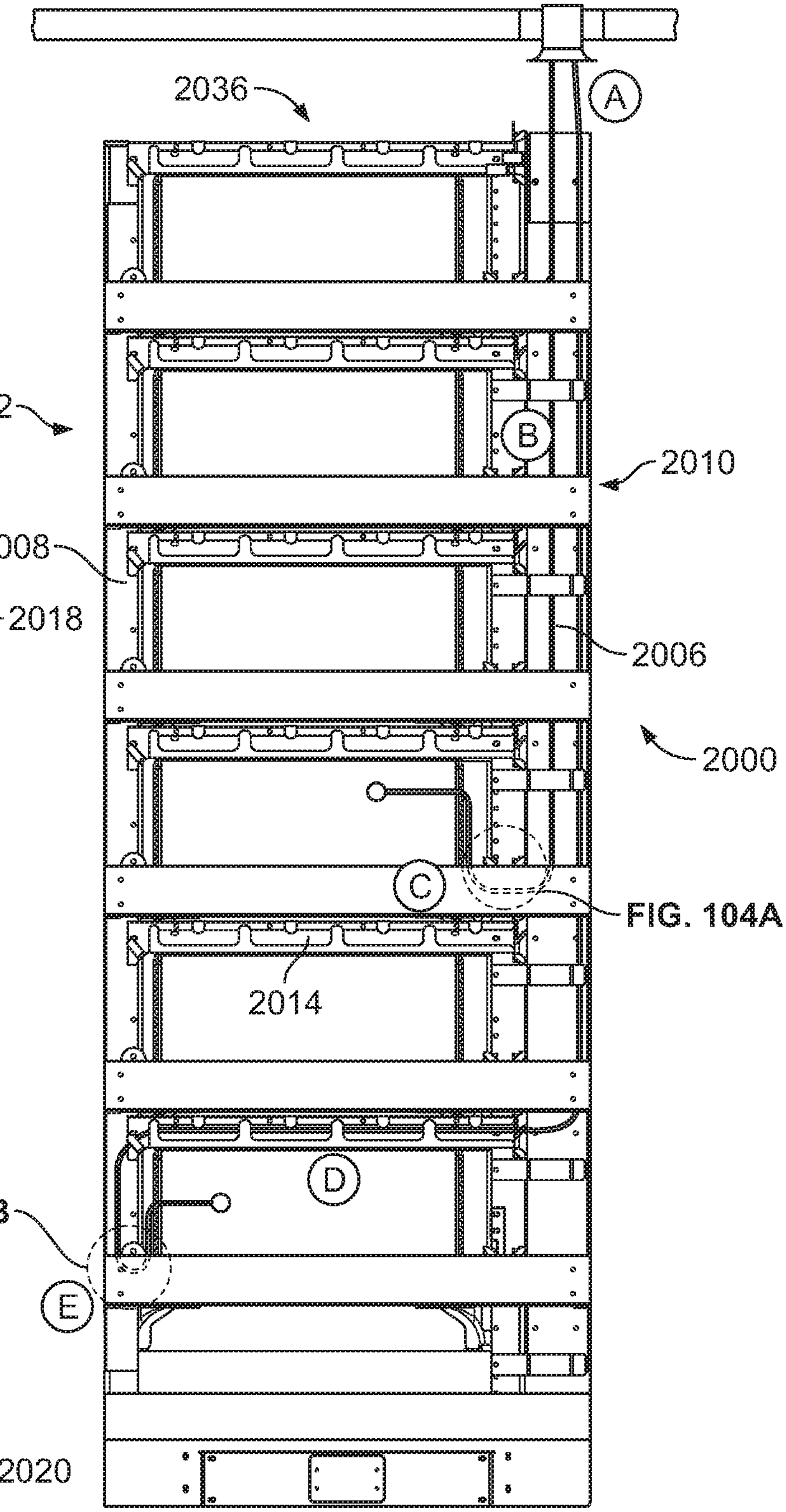
Figure 104B:
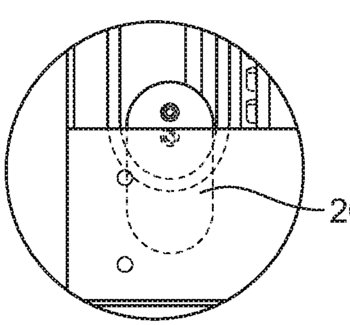
Figure 105:
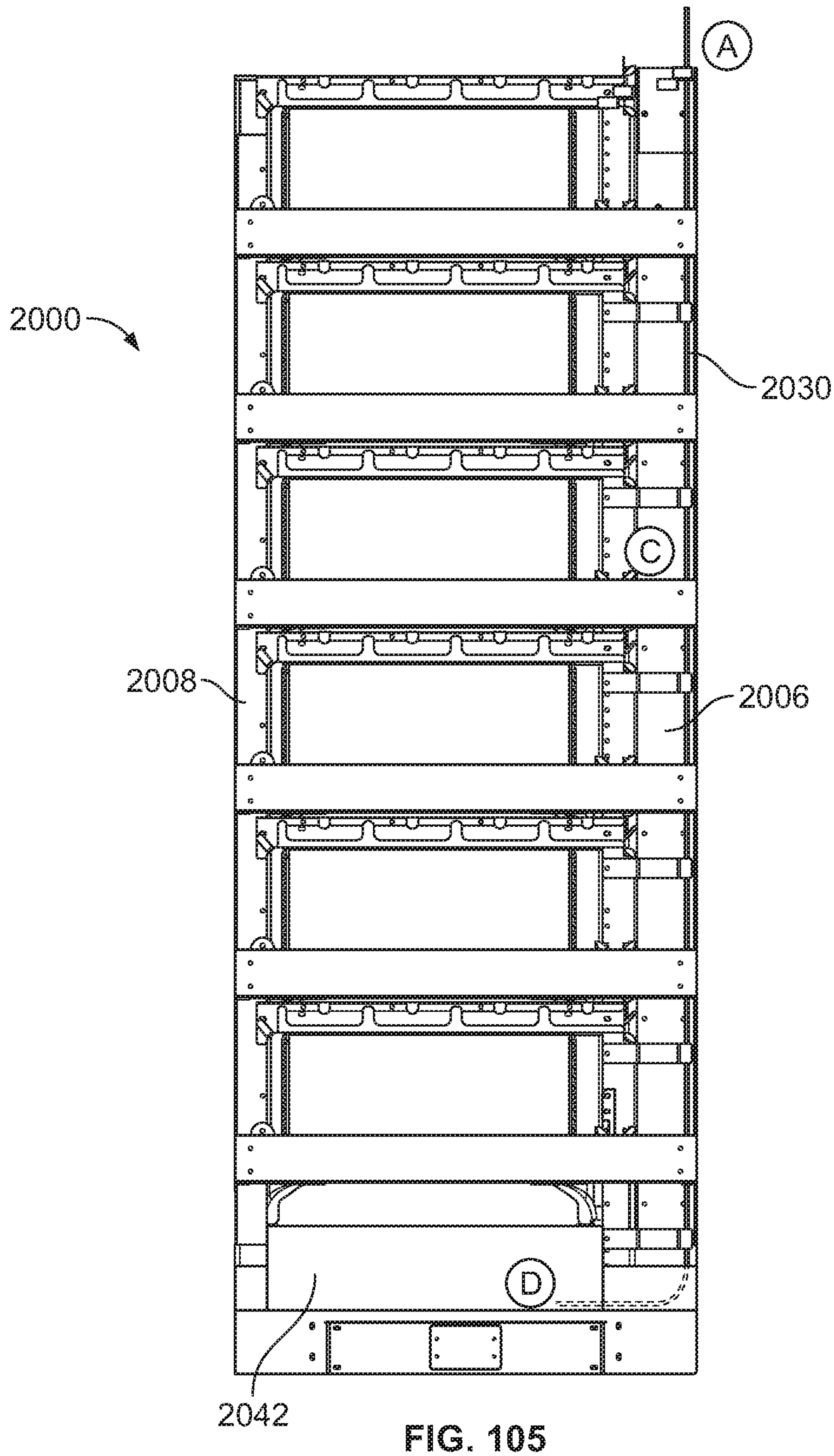
Figure 106:
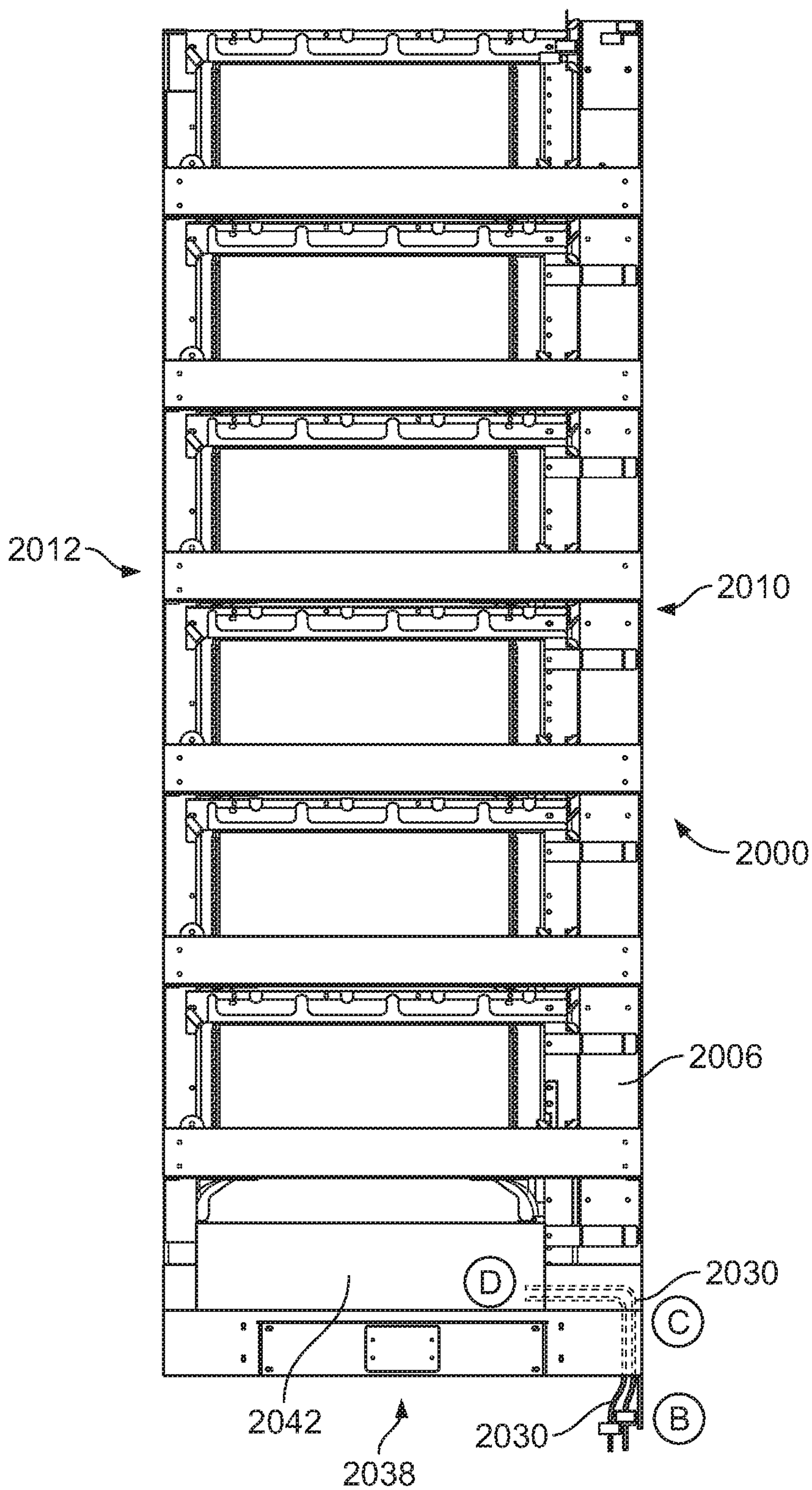
Figure 107A:
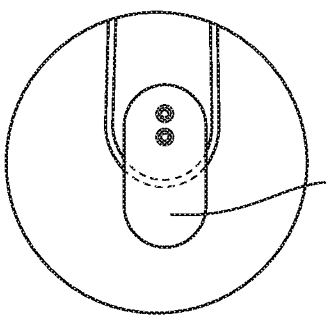
Figure 107:
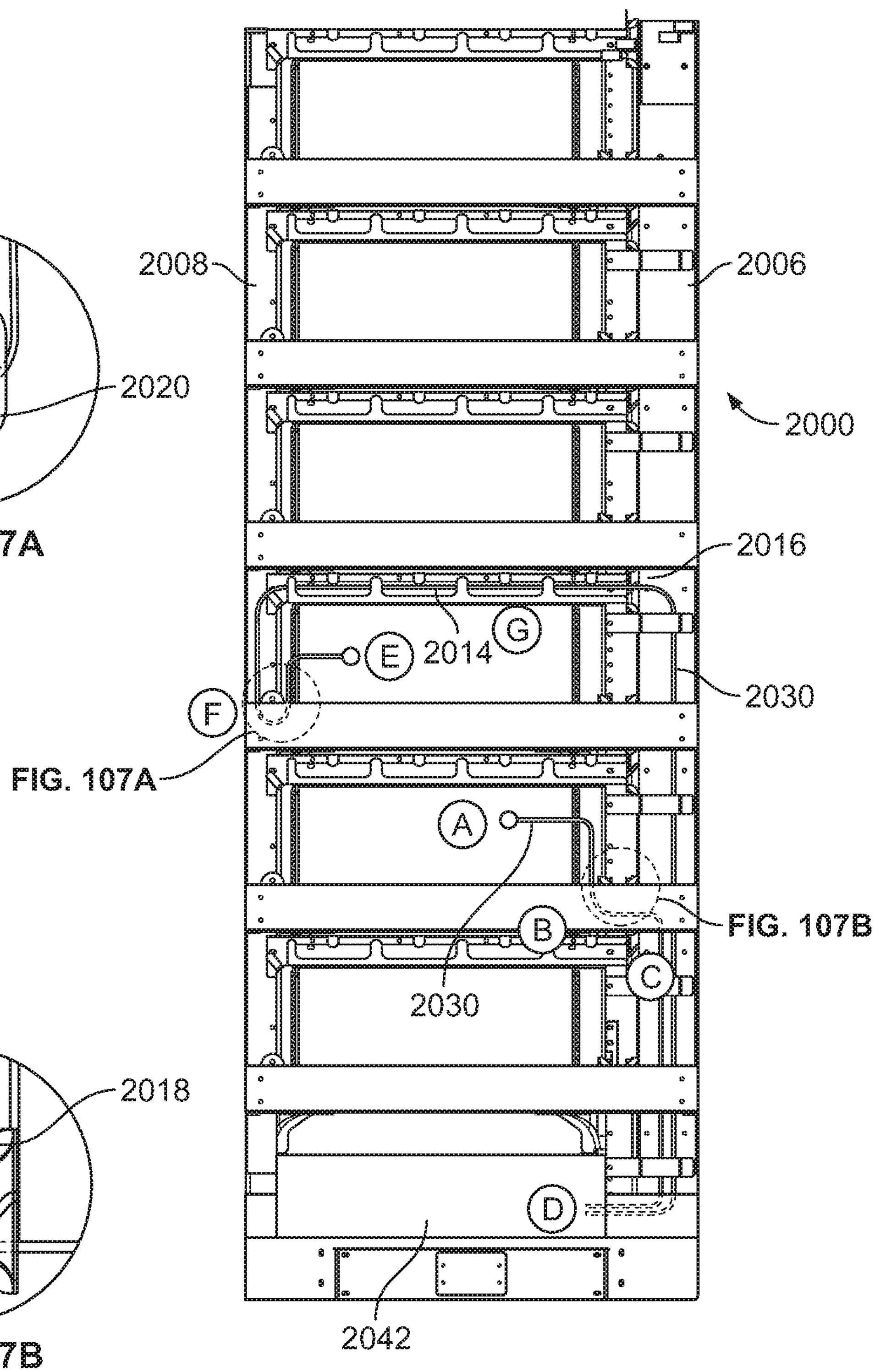
Figure 107B:
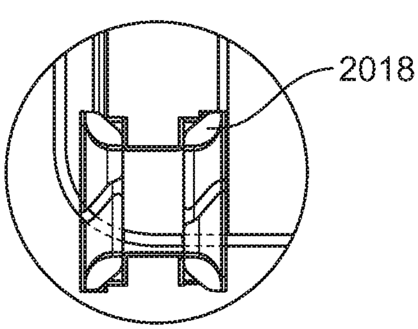
Figure 108:
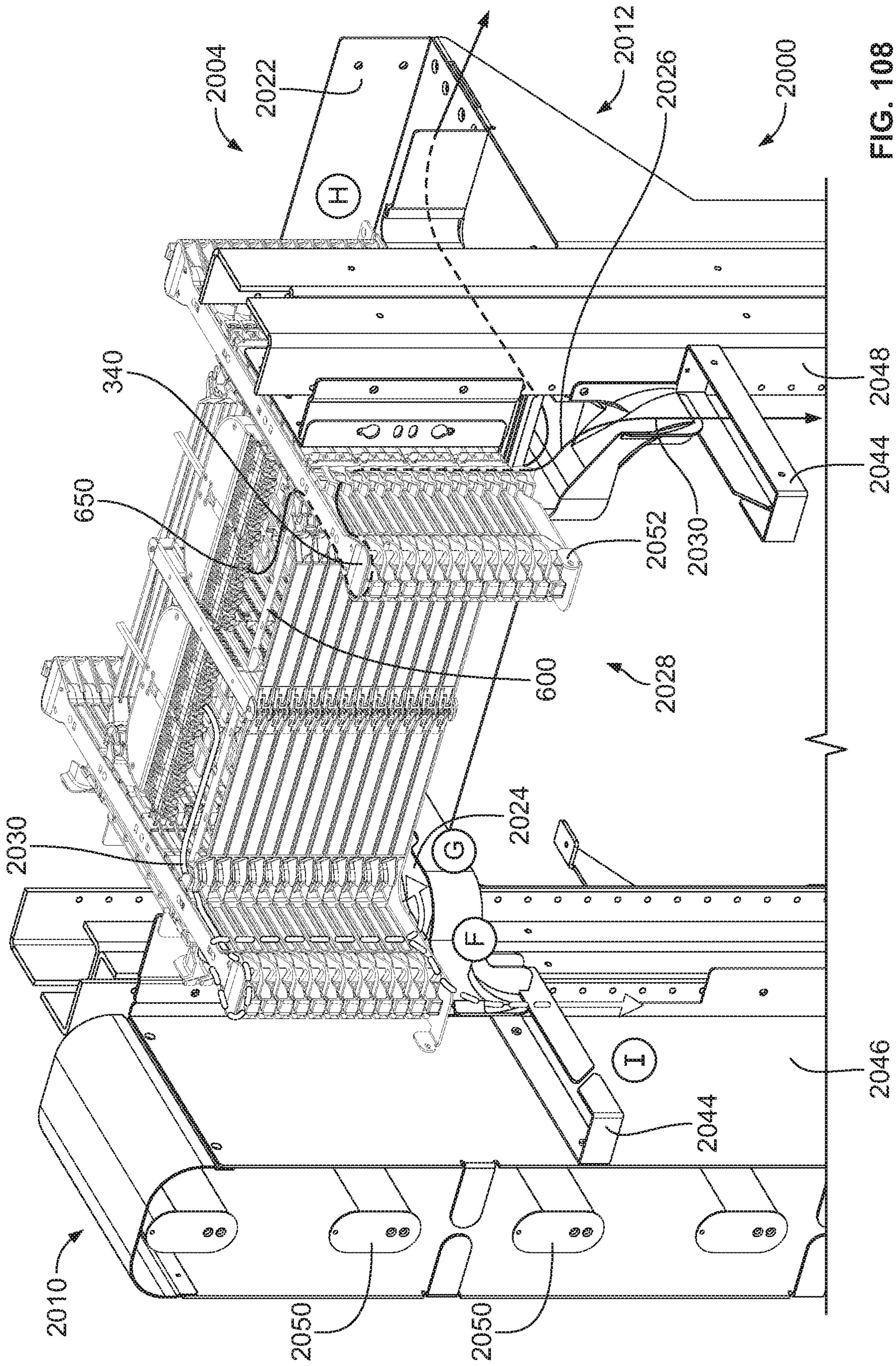
Figure 109:
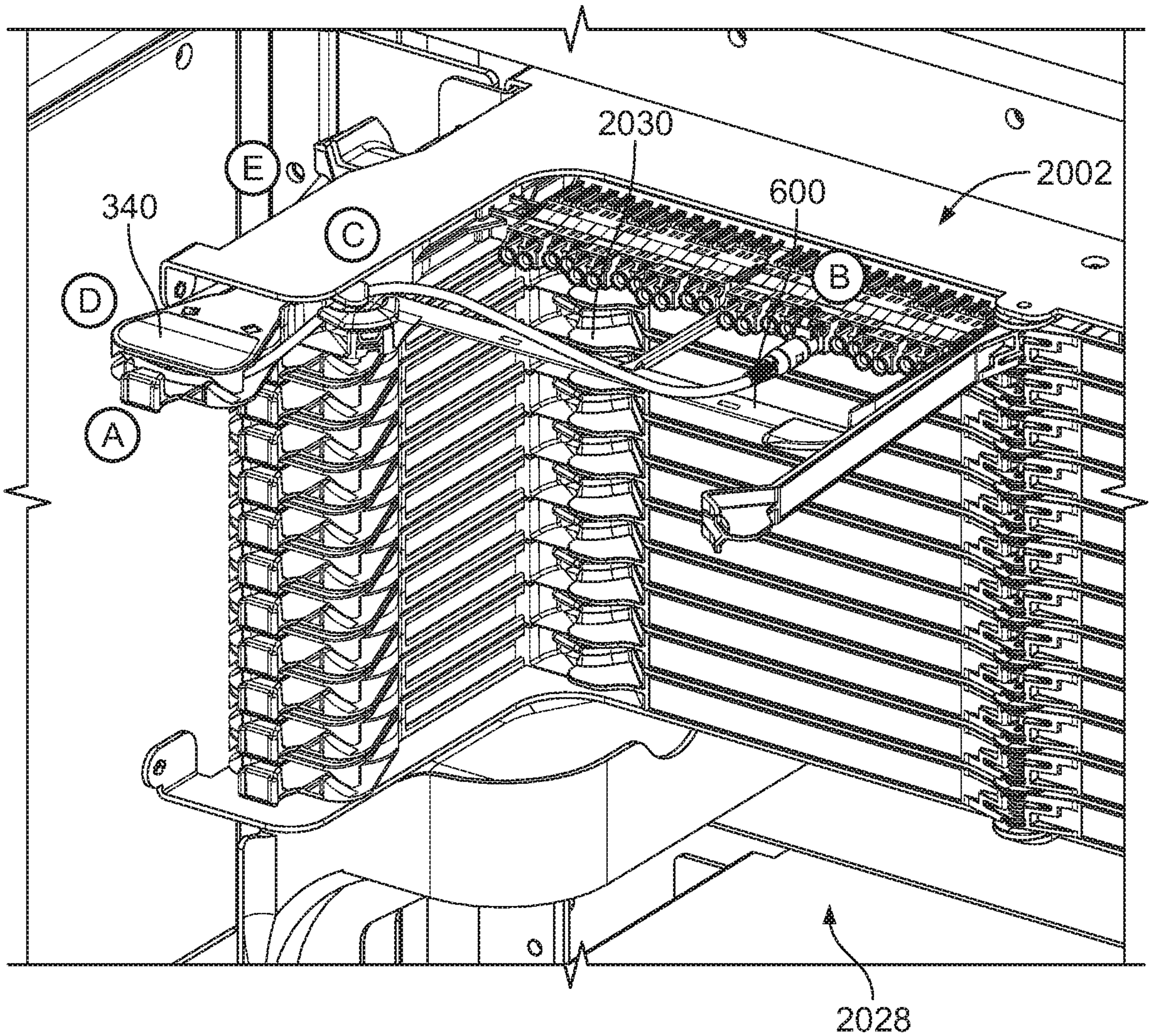
Figure 110:
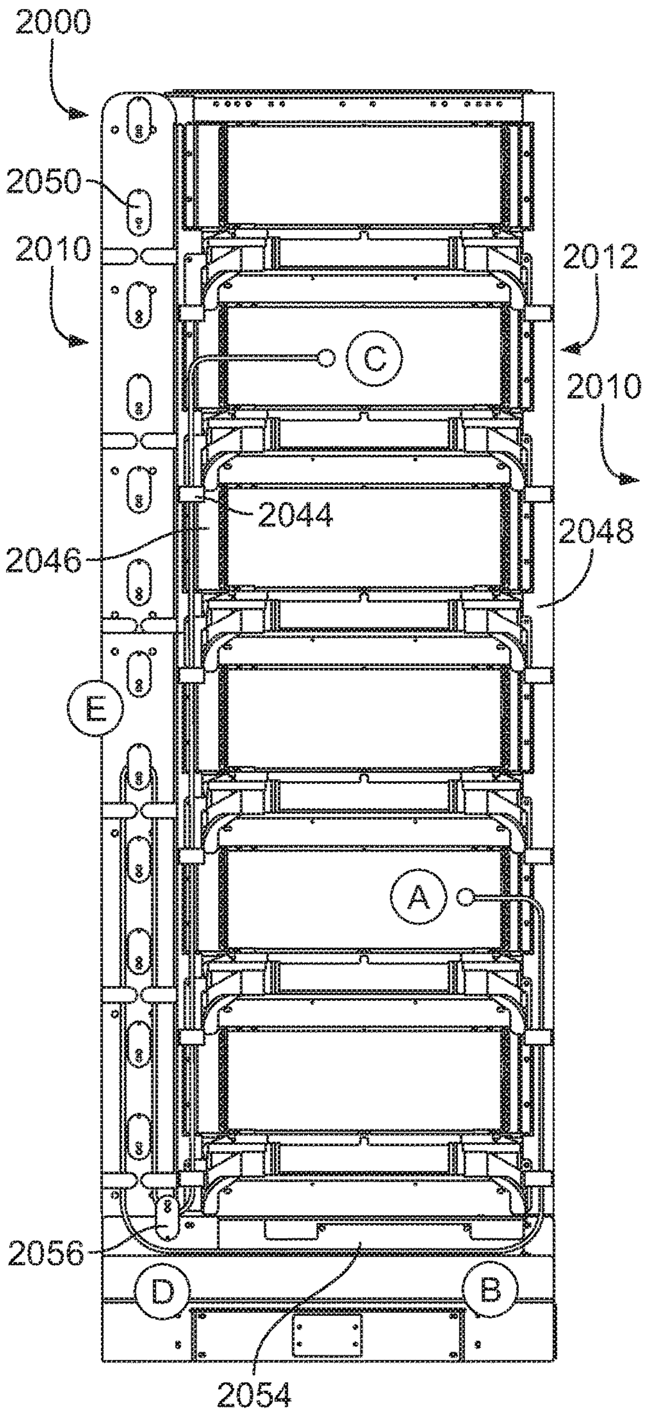
Figure 111:
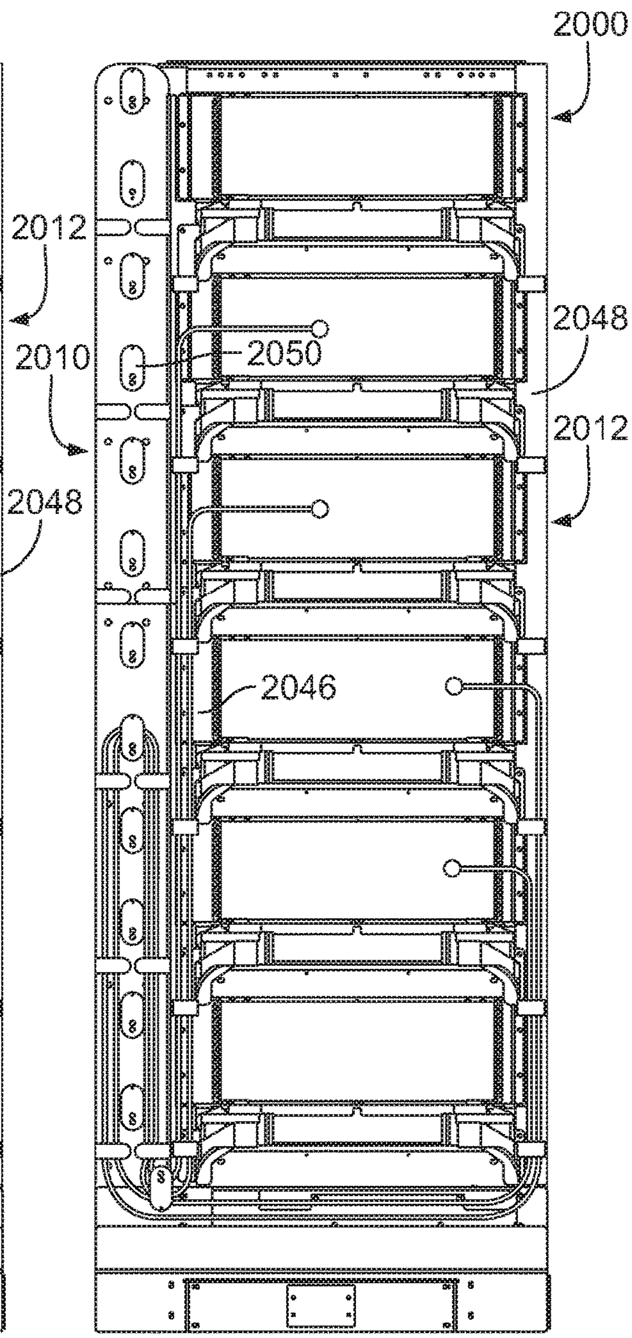
Figure 112:
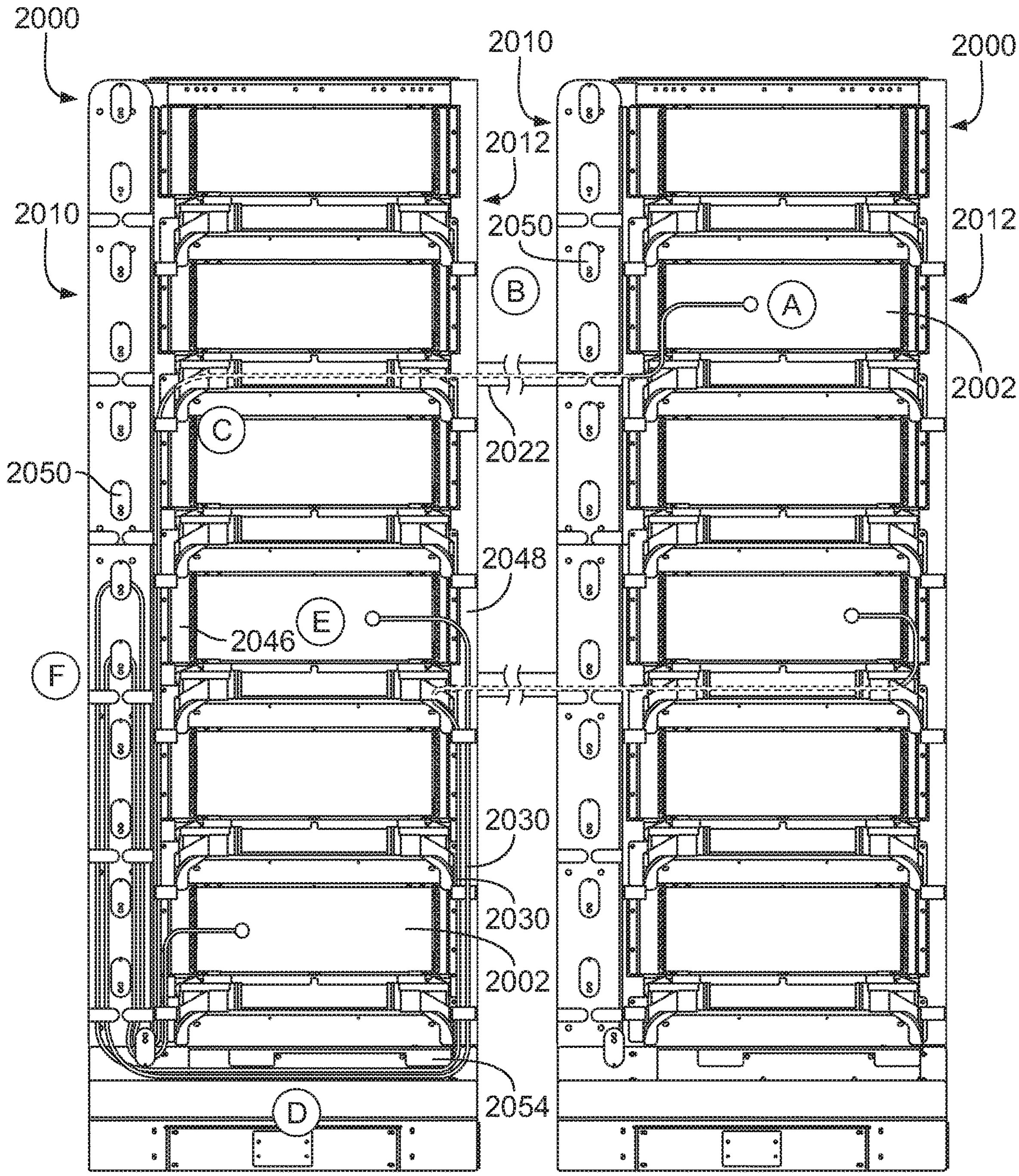
Figure 113:
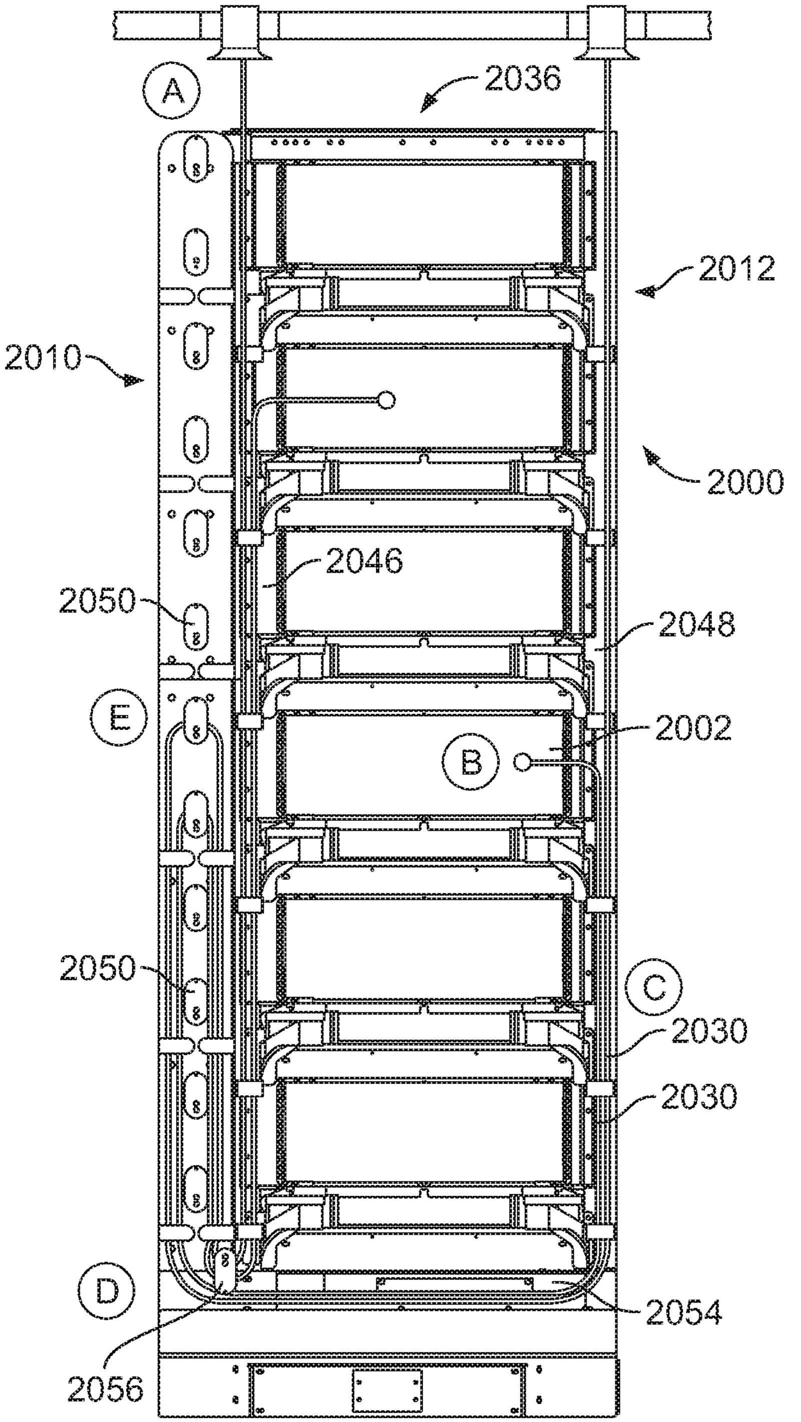
Figure 114:
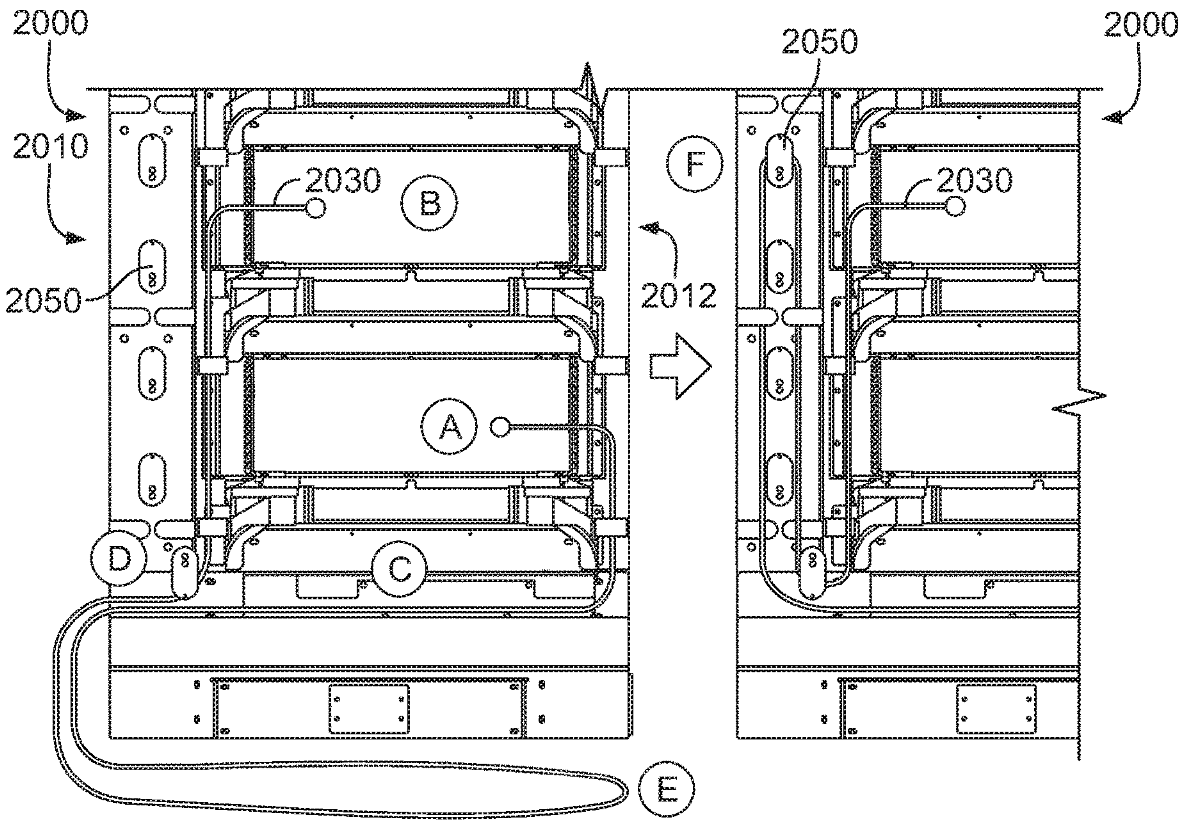
Figure 115:
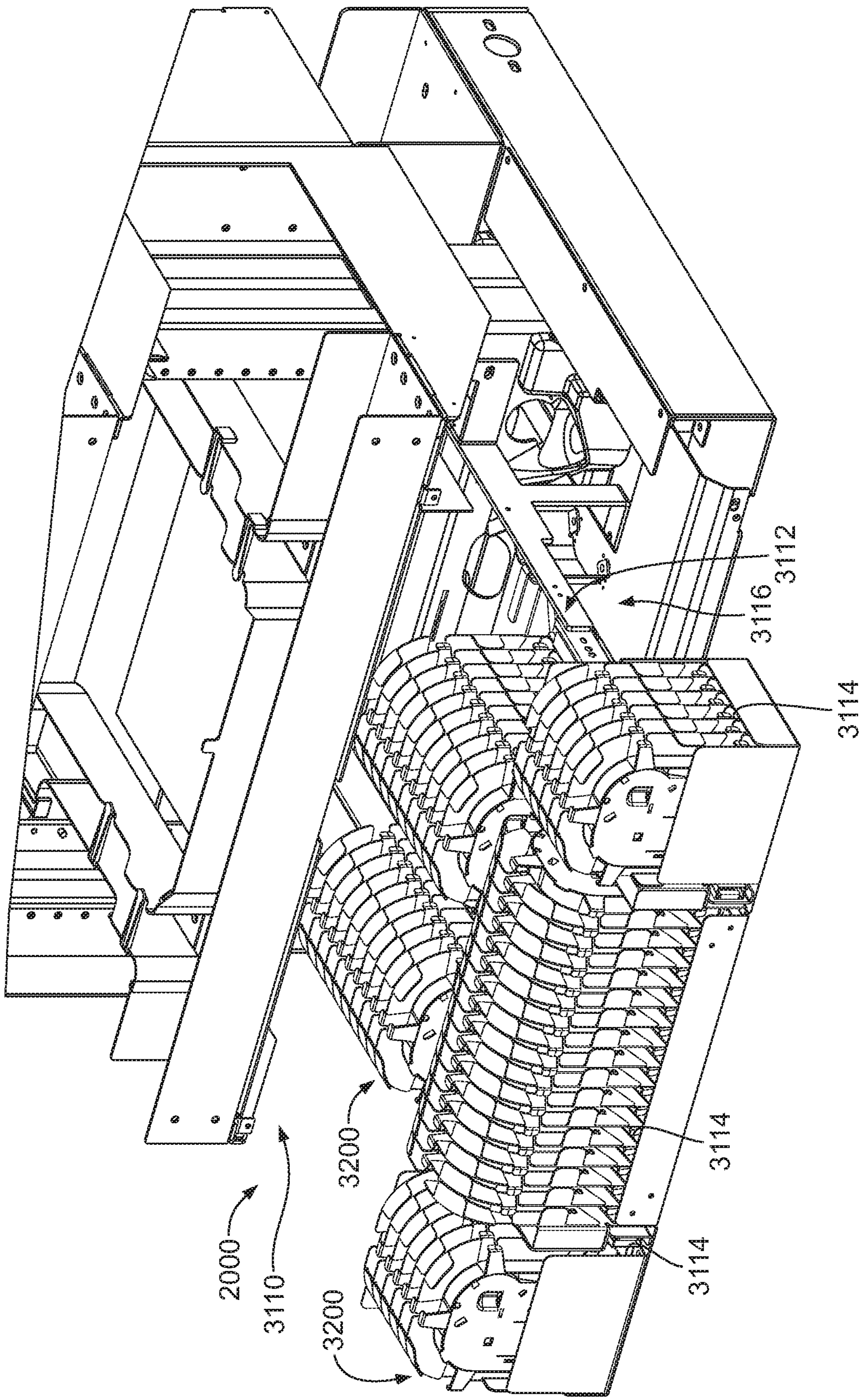
Figure 116:
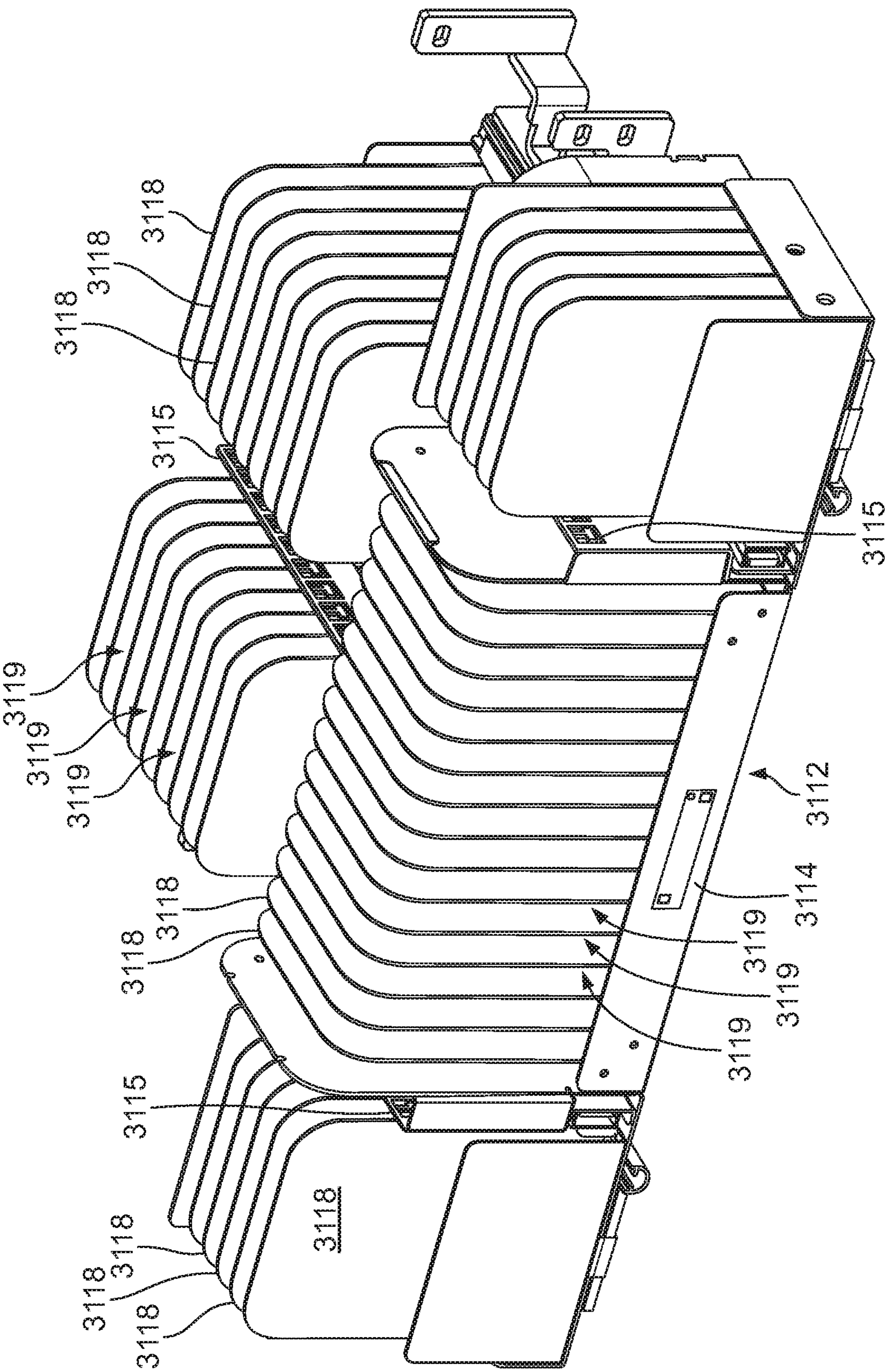
Figure 117:
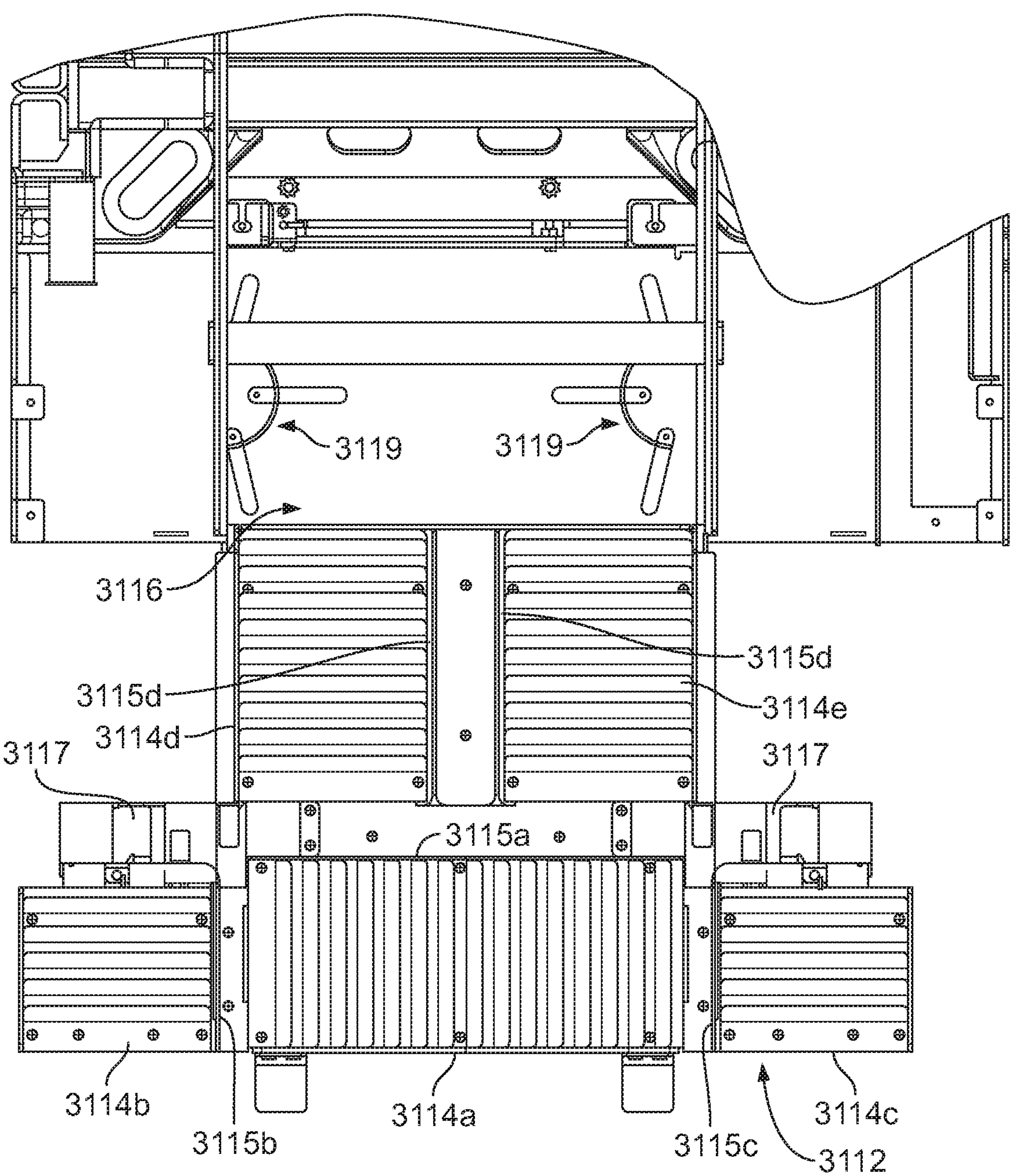
Figure 118:
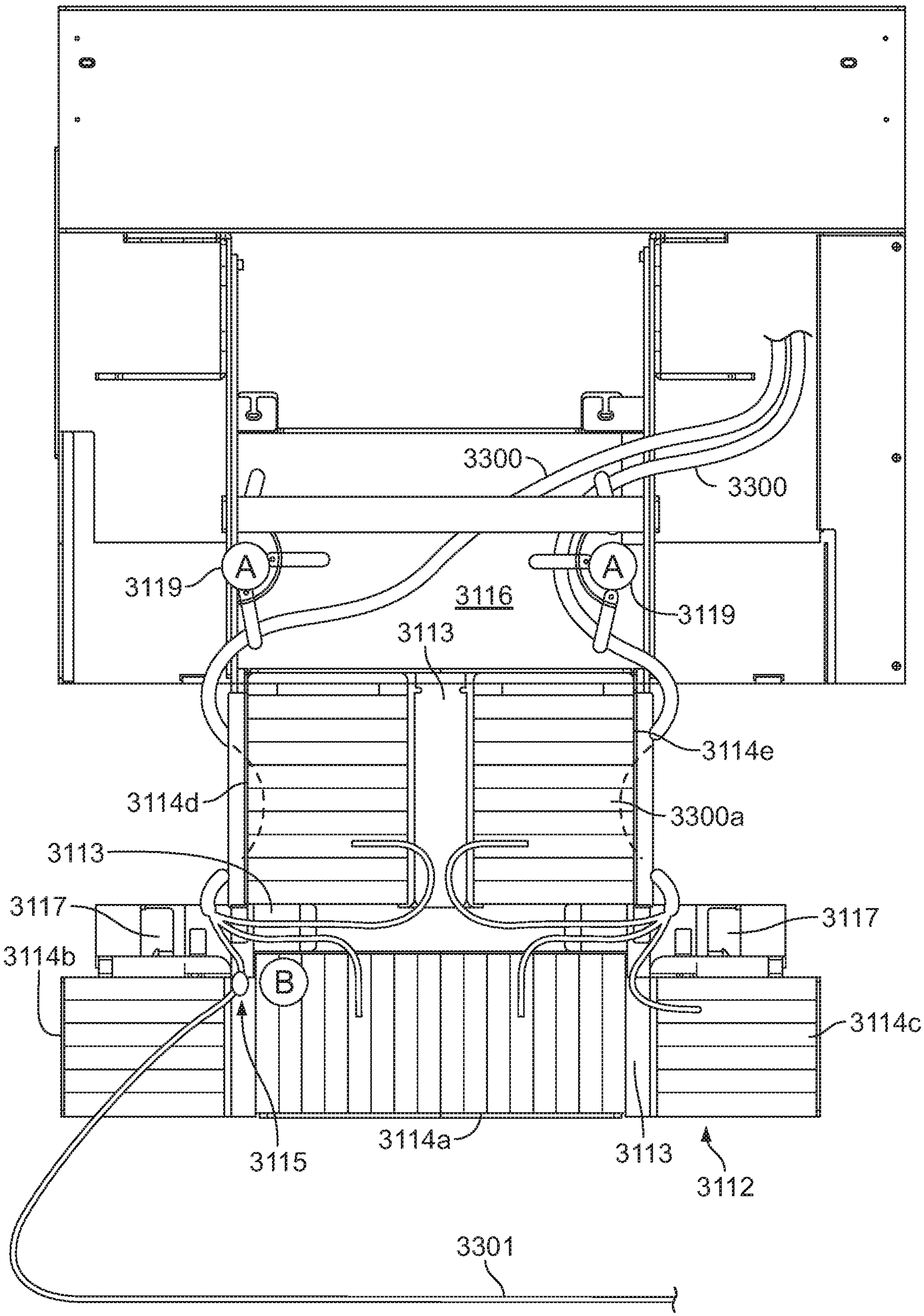
Figure 119:
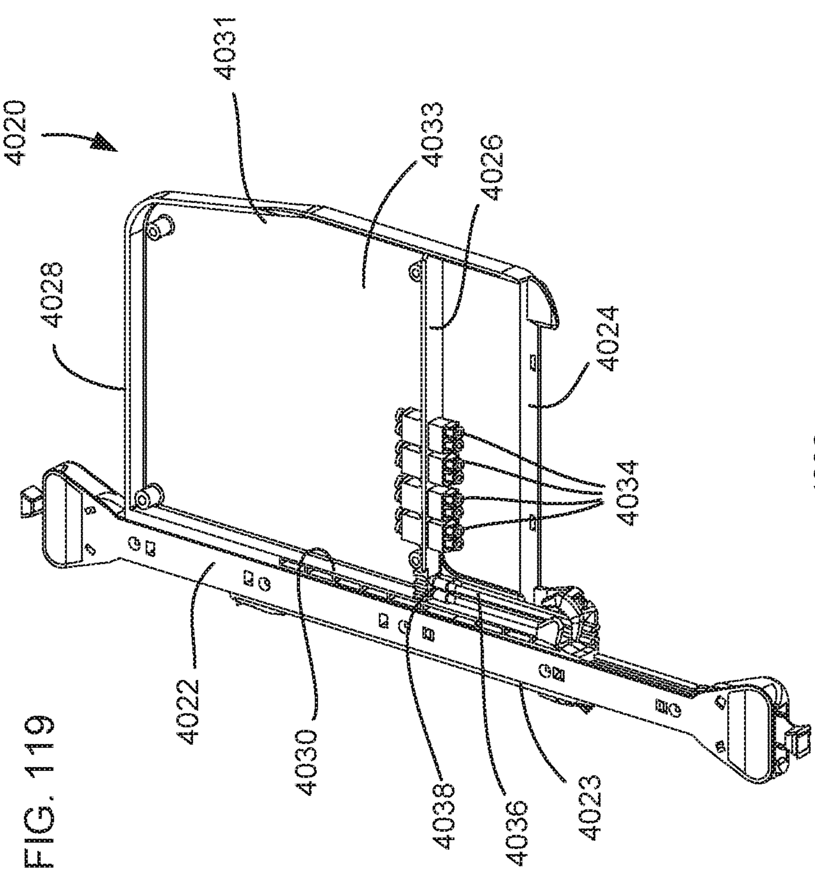
Figure 120:
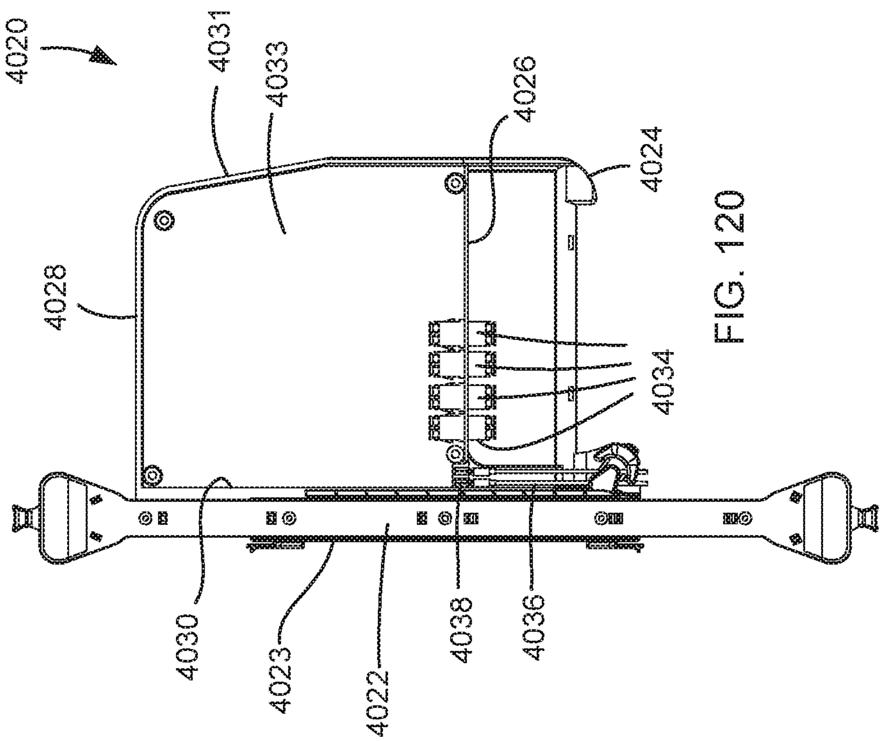
Figure 121:
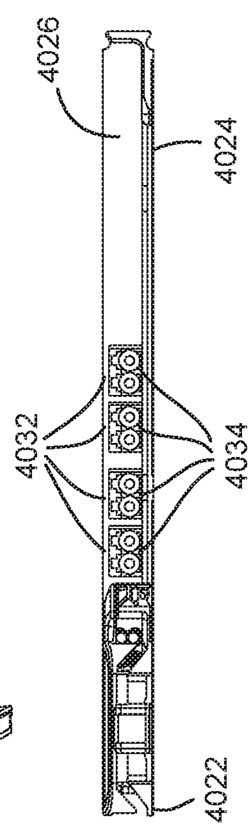
Figure 123:
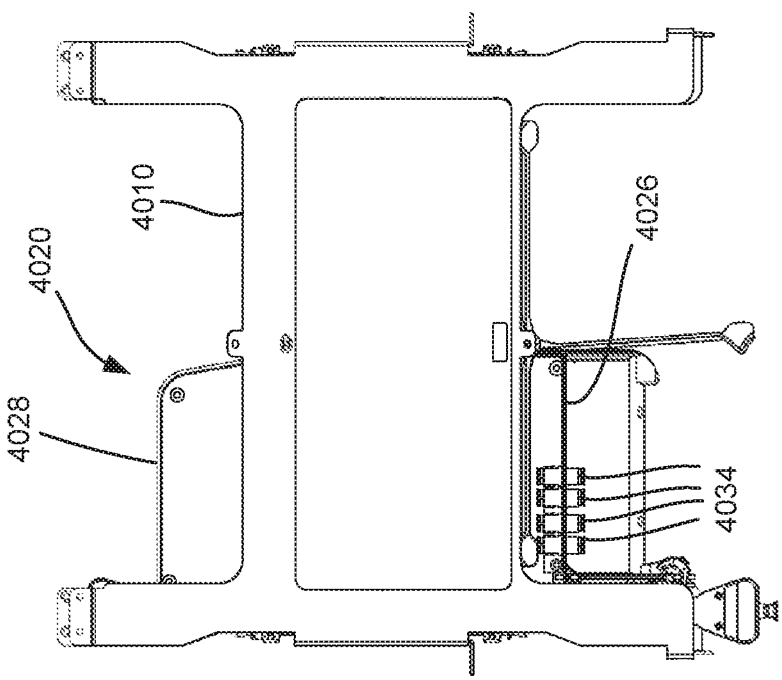
Figure 122:
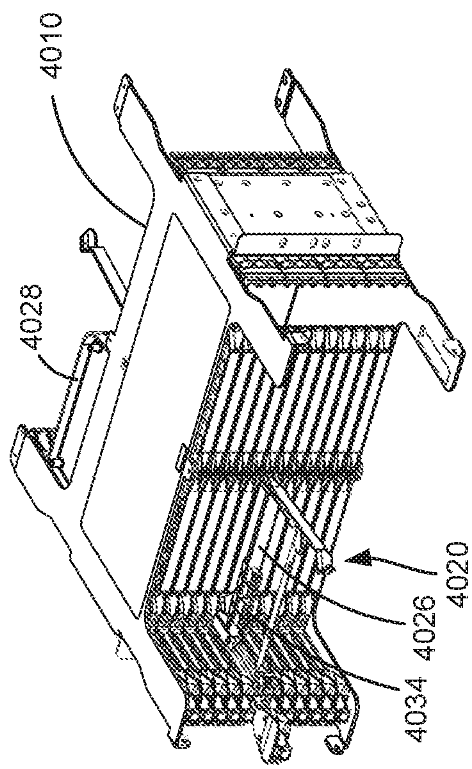
Figure 124:
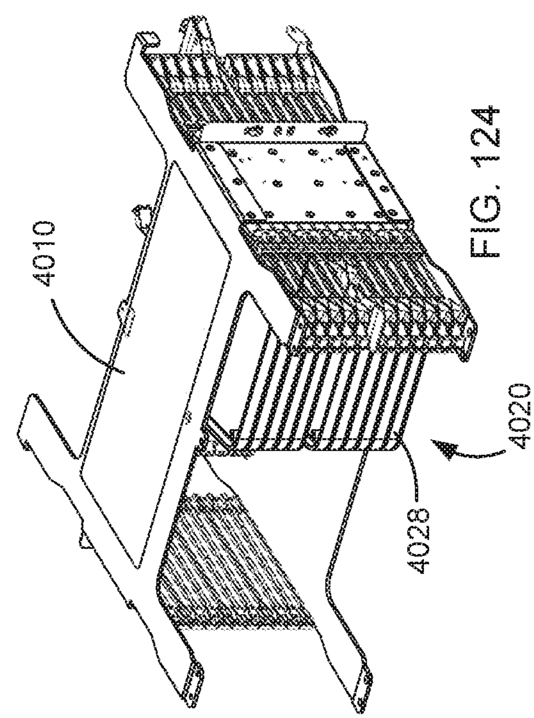
Figure 126:
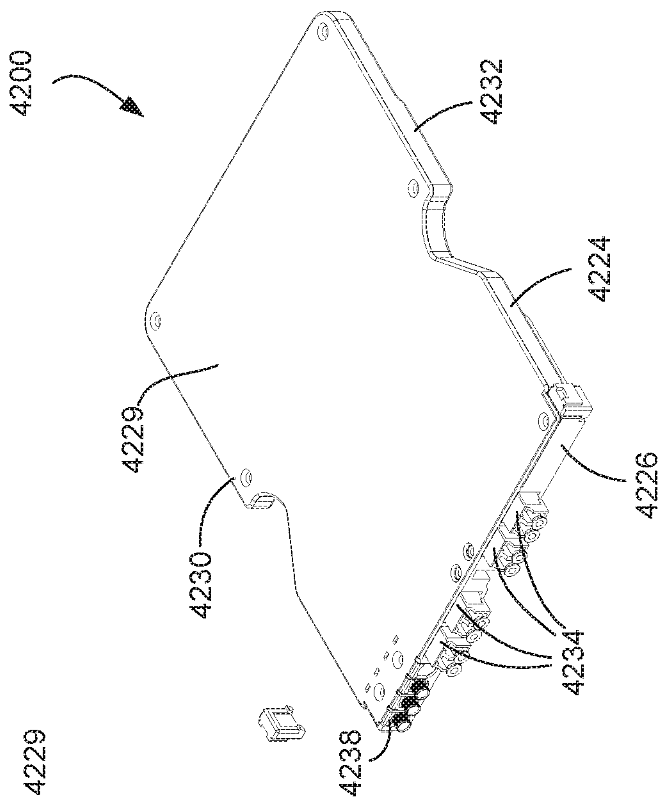
Figure 125:
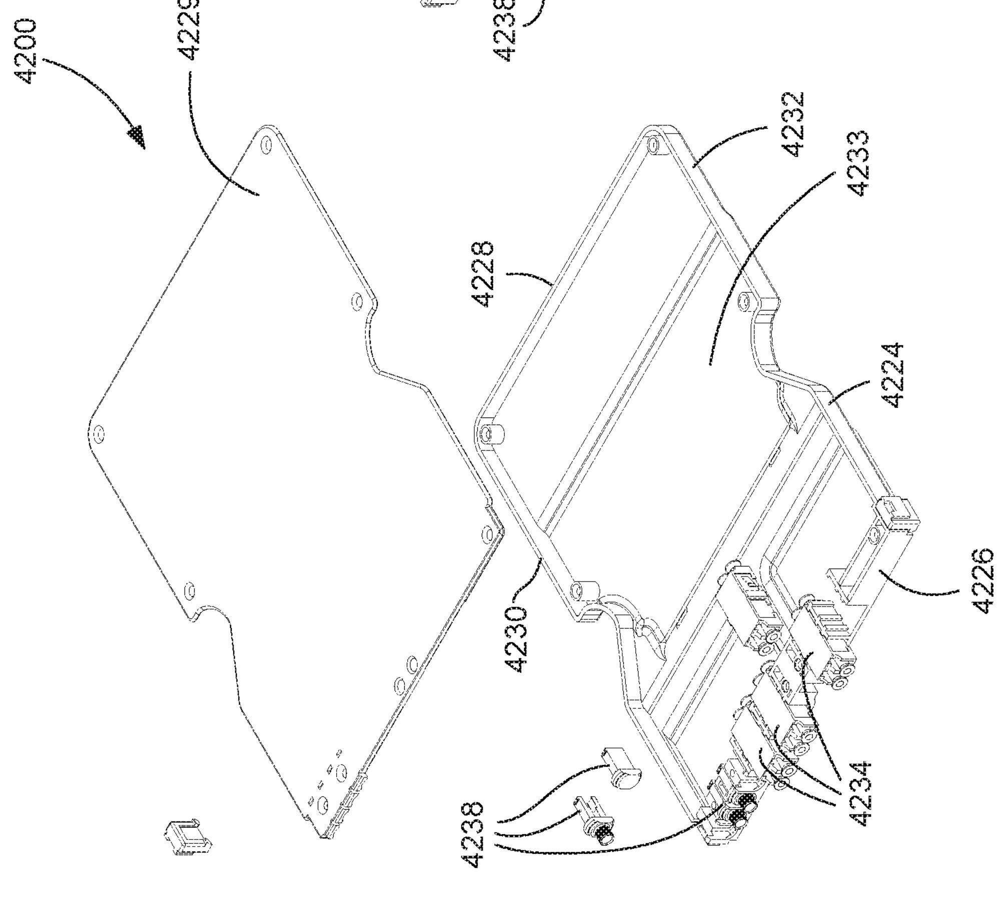
Figure 128:
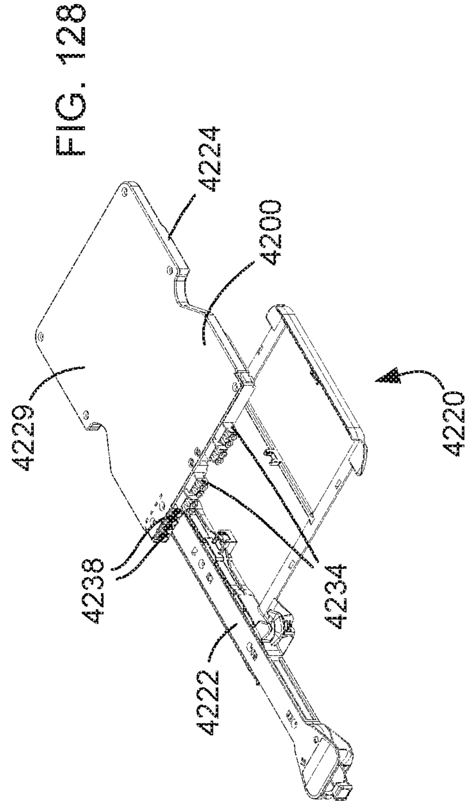
Figure 130:
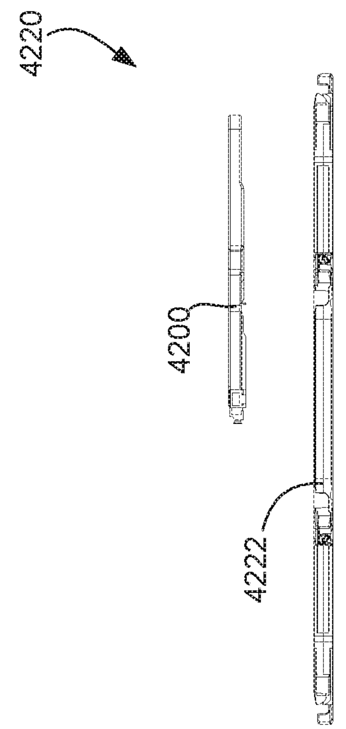
Figure 127:
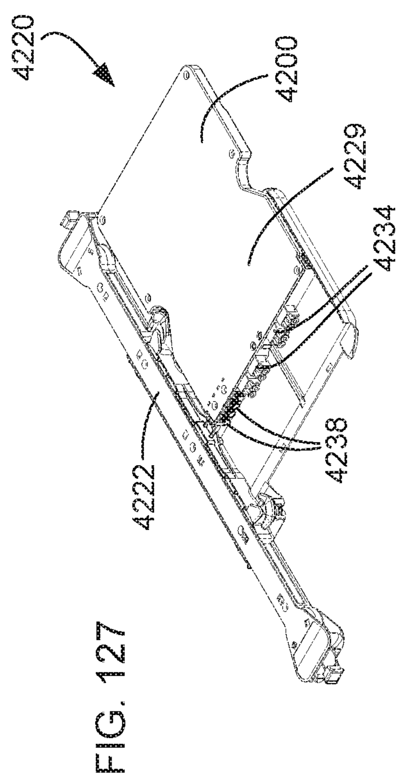
Figure 129:
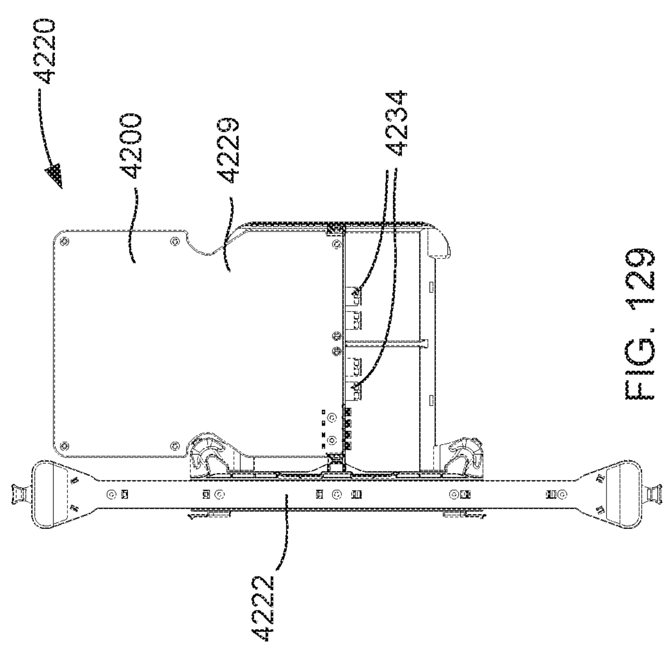
Figure 131:
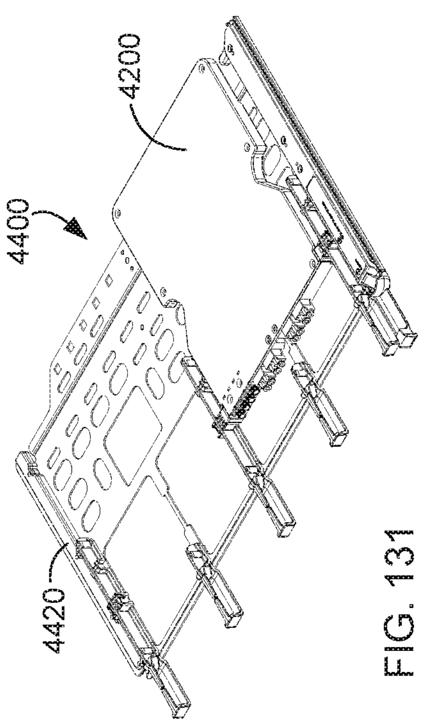
Figure 132:
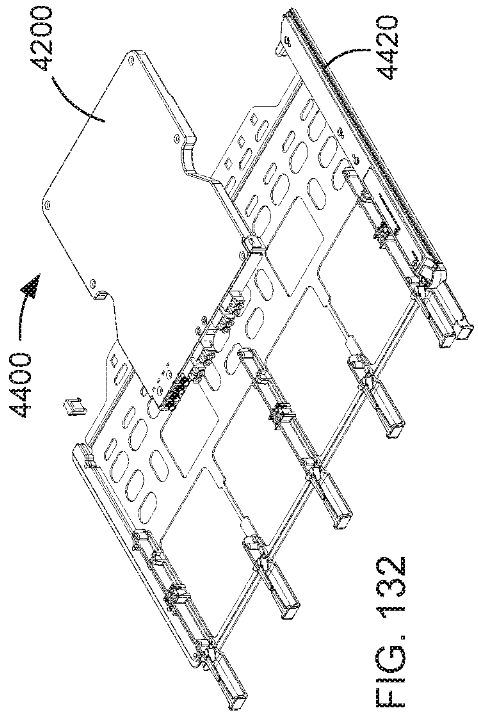
Figure 133:
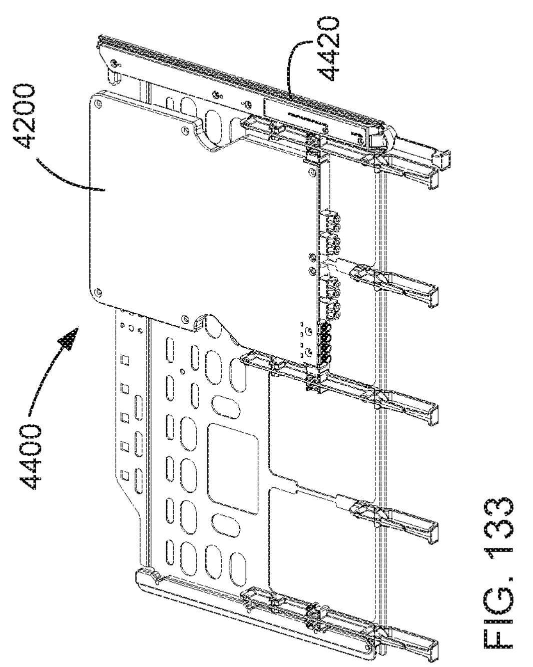
Figure 134:
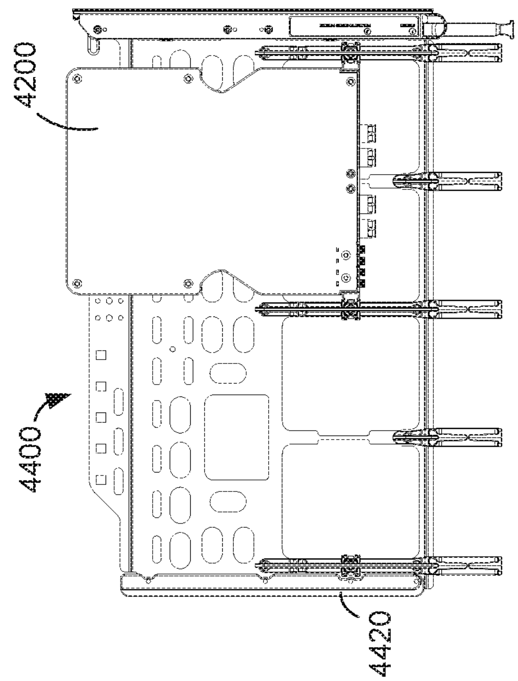
Figure 136:
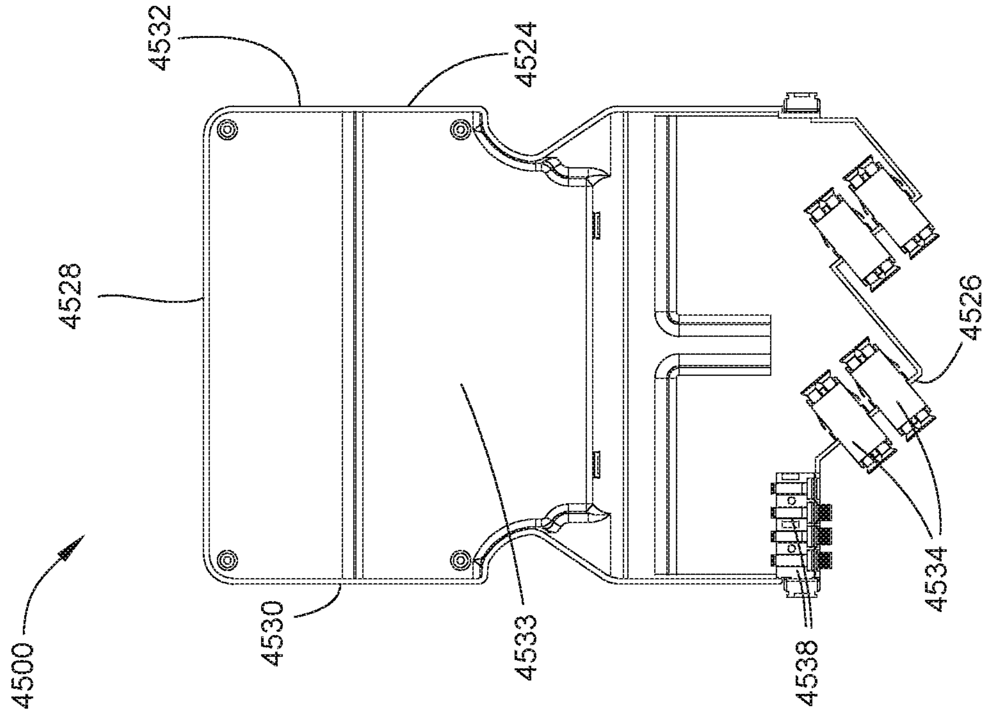
Figure 135:
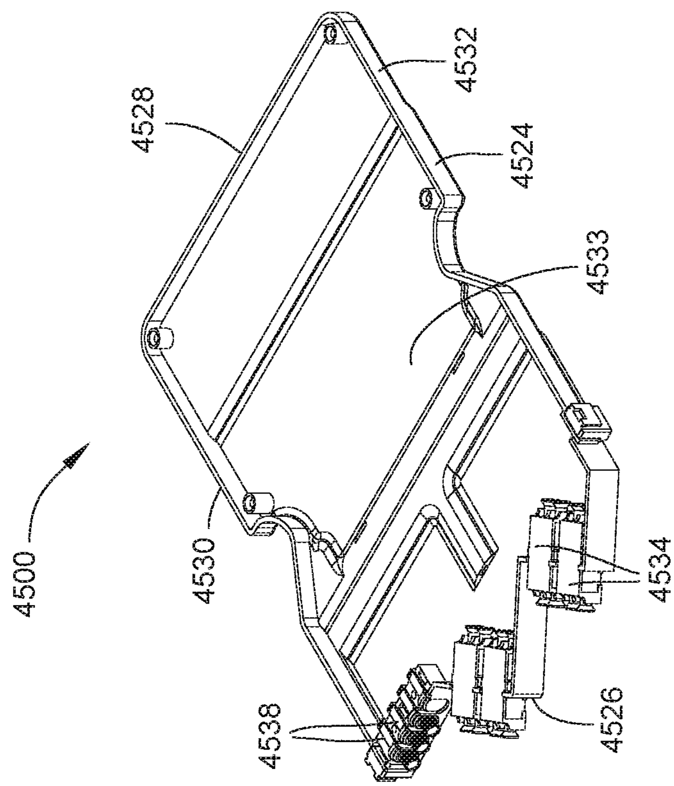
Figure 137A:
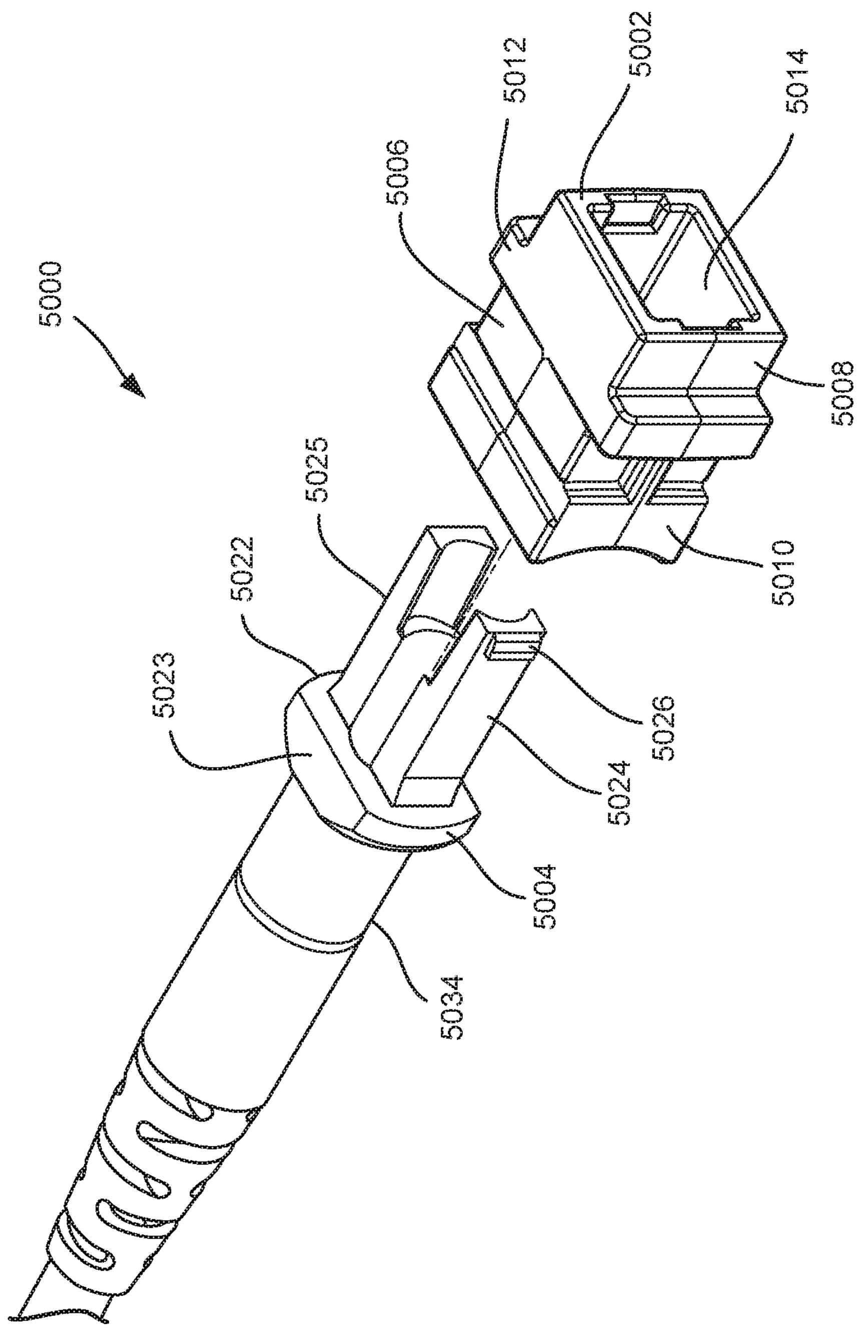
Figure 137B:
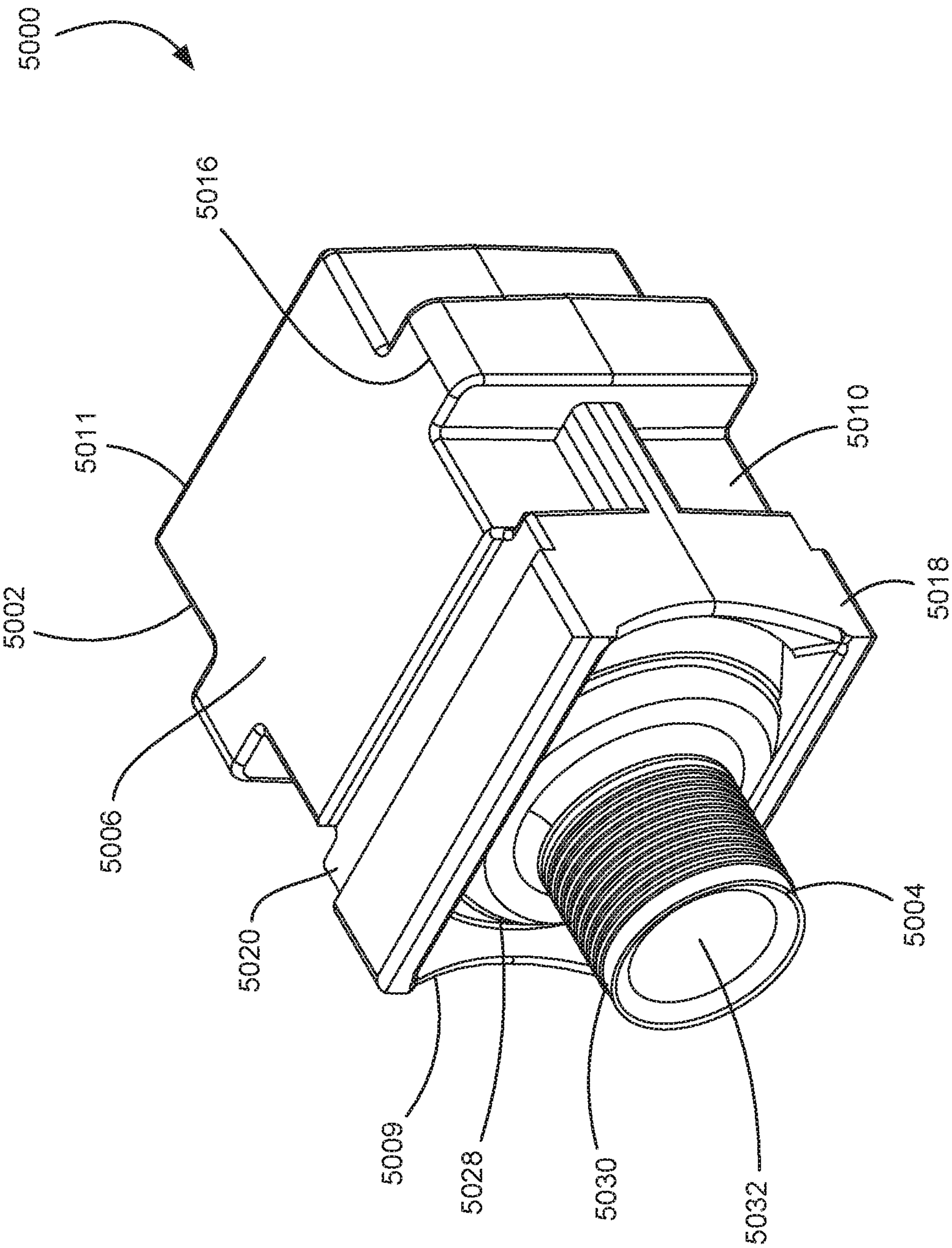
Figure 138A:
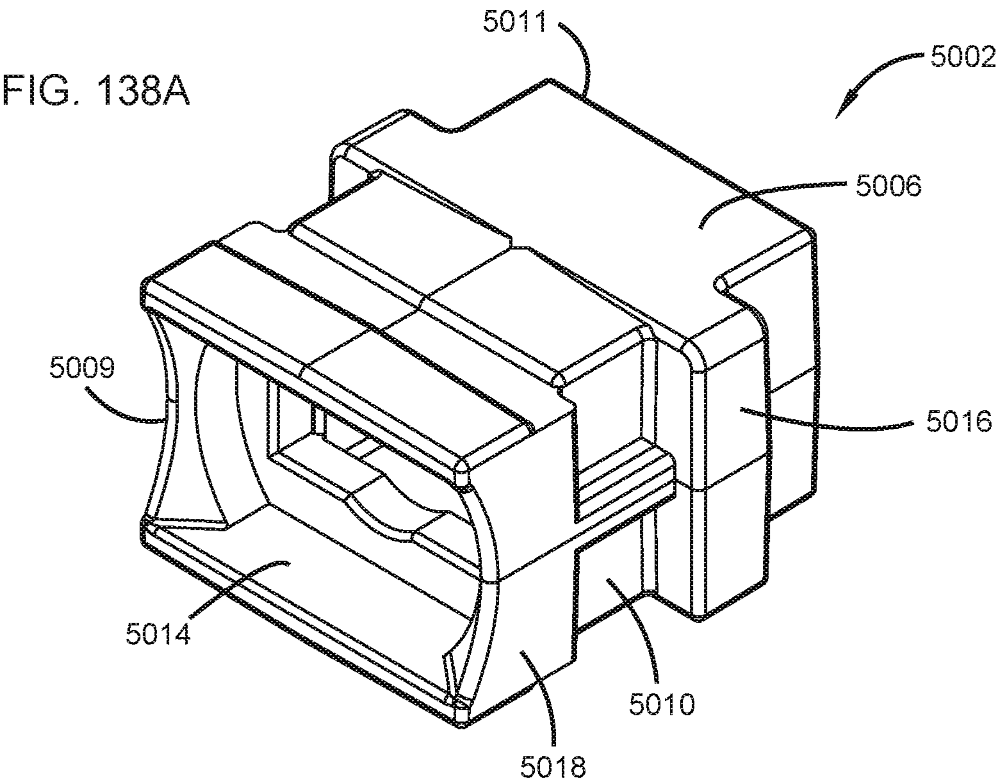
Figure 138B:
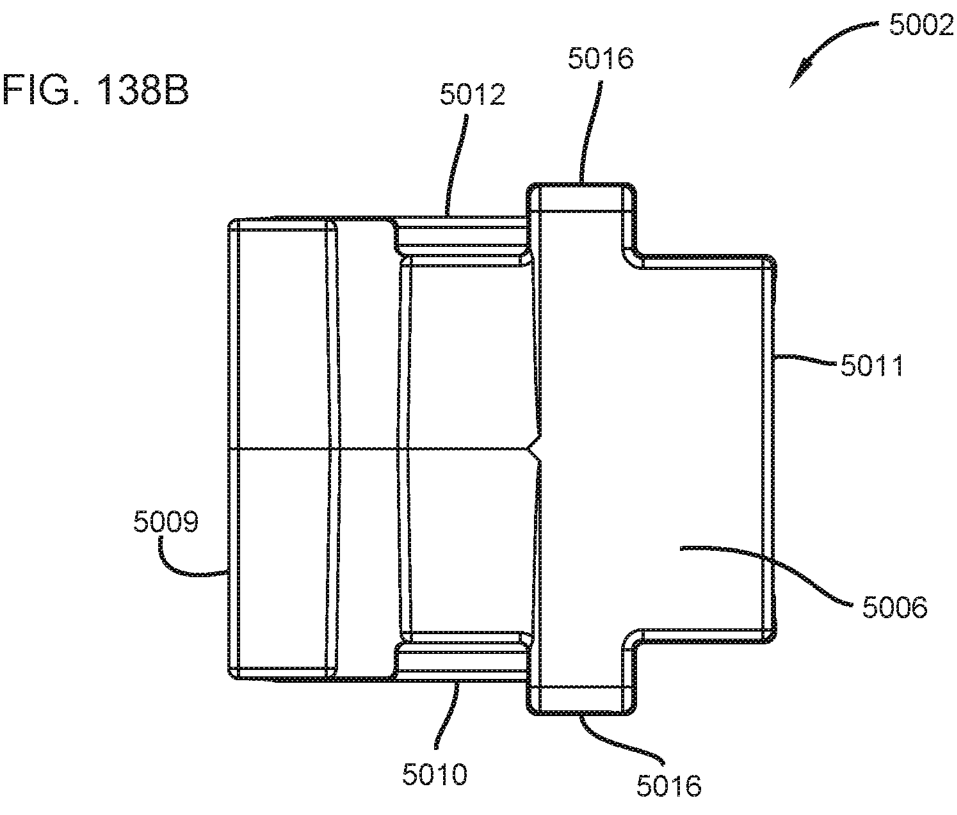
Figure 138C:
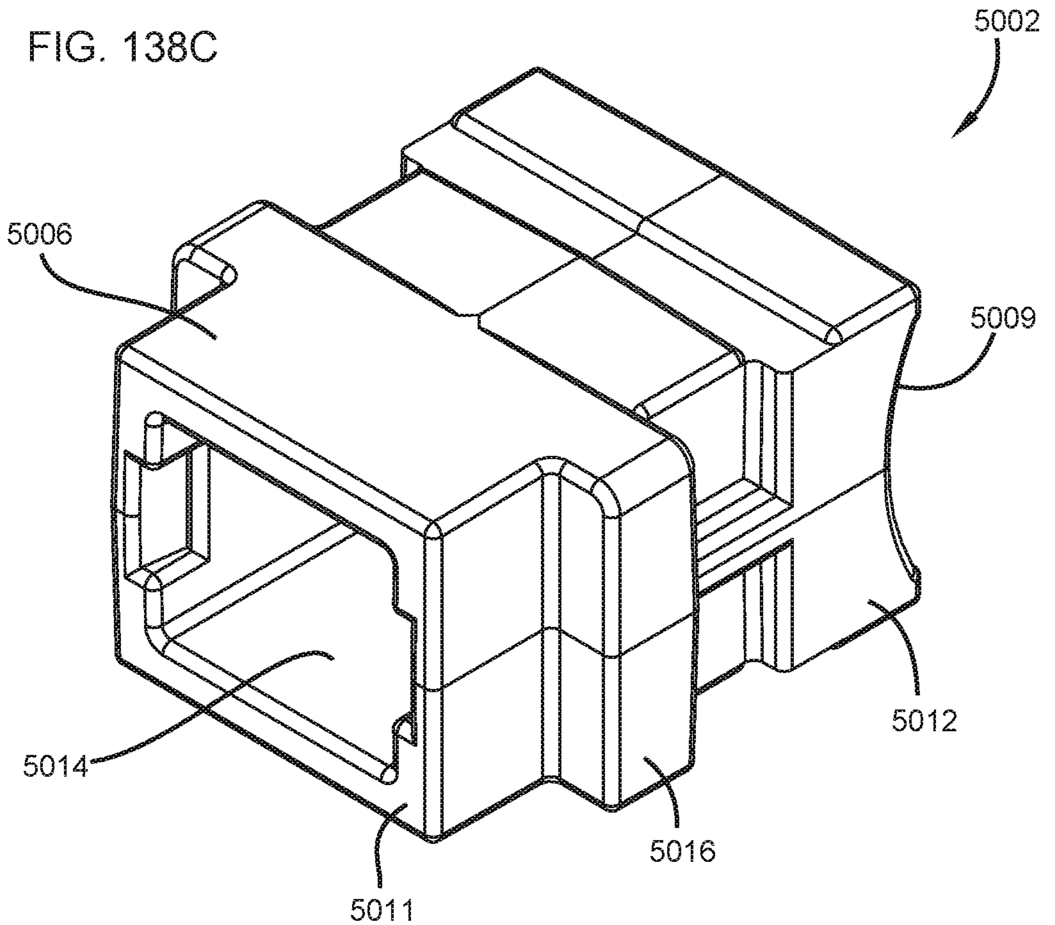
Figure 138D:
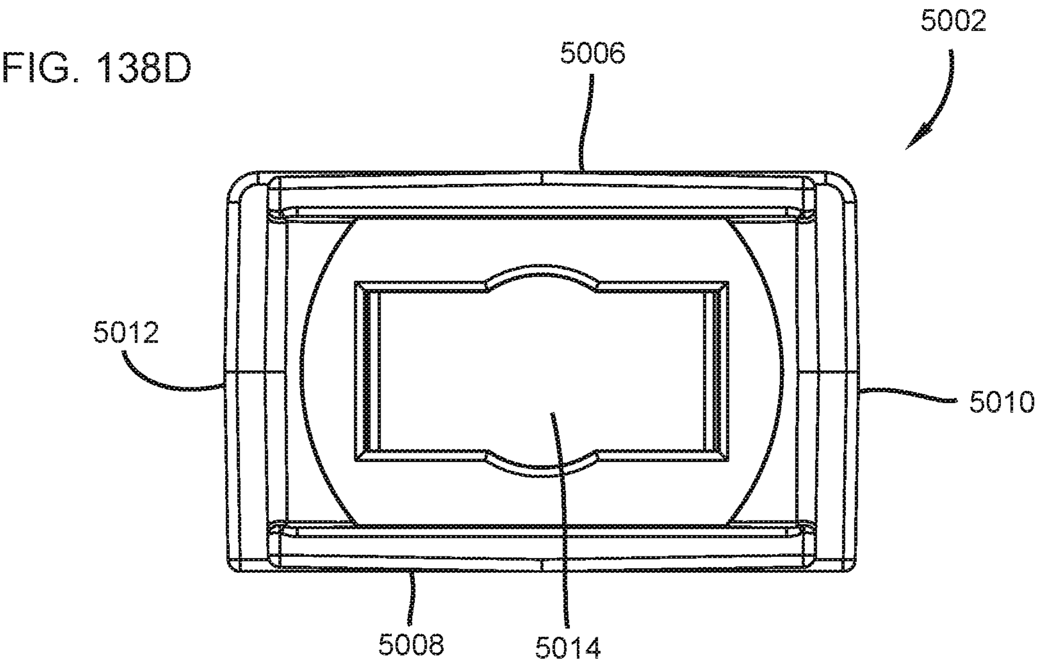
Figure 138E:
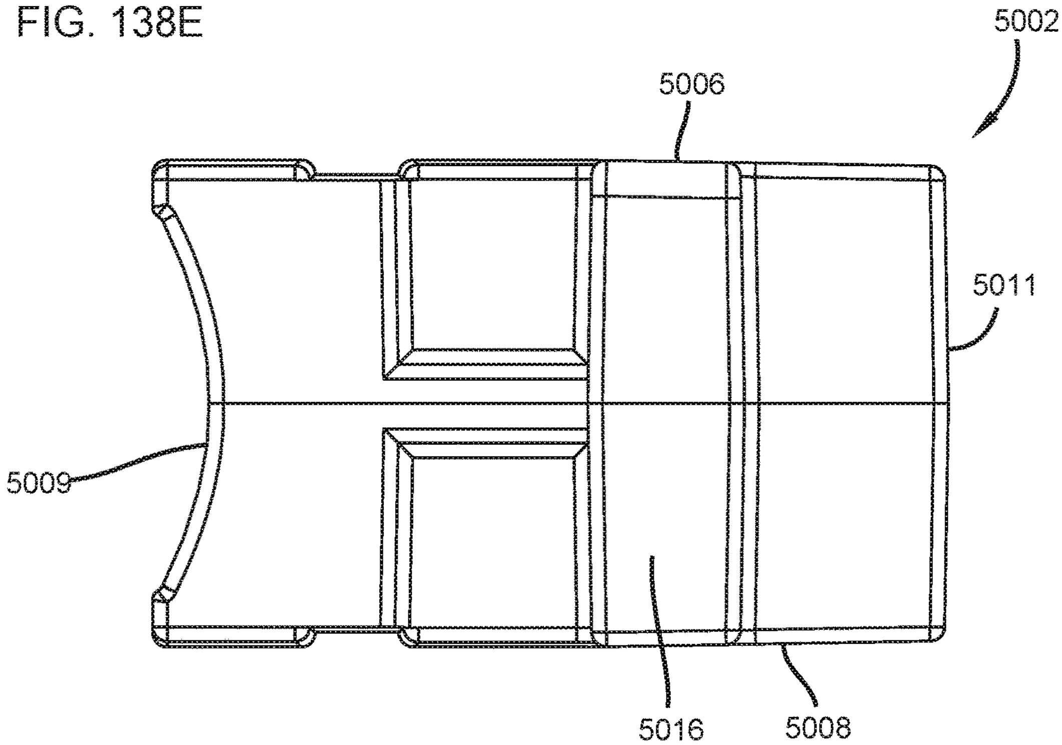
Figure 138F:
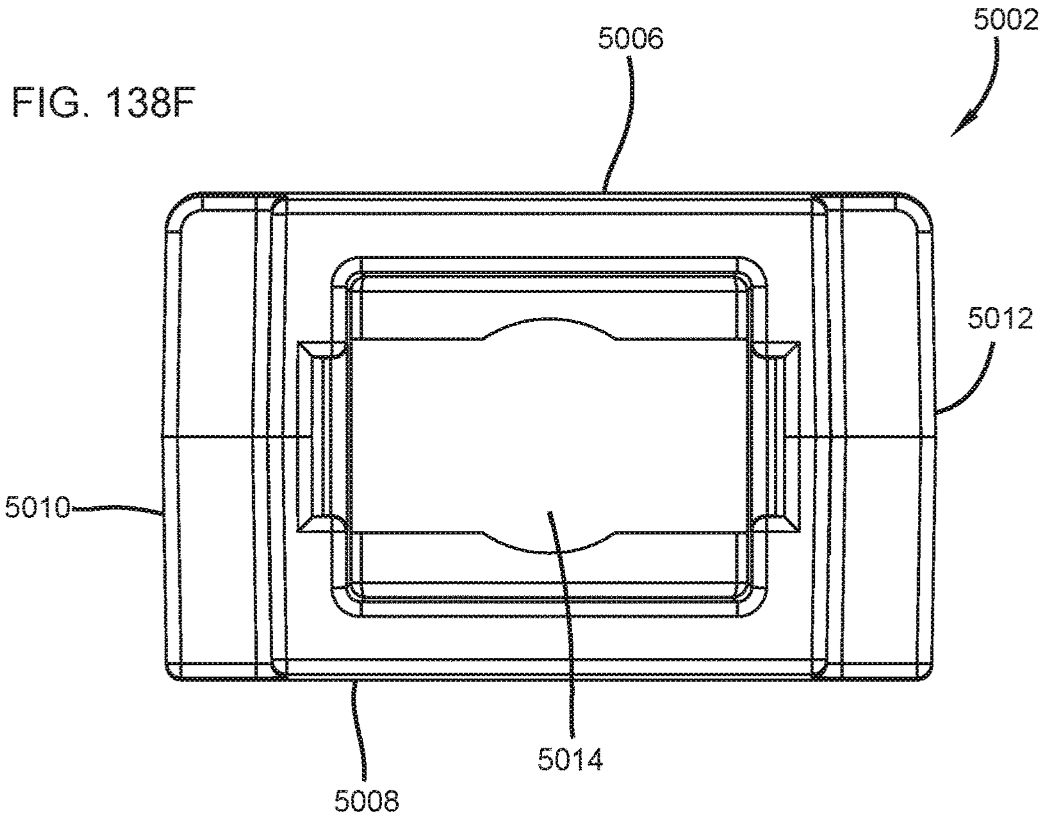
Figure 138G:
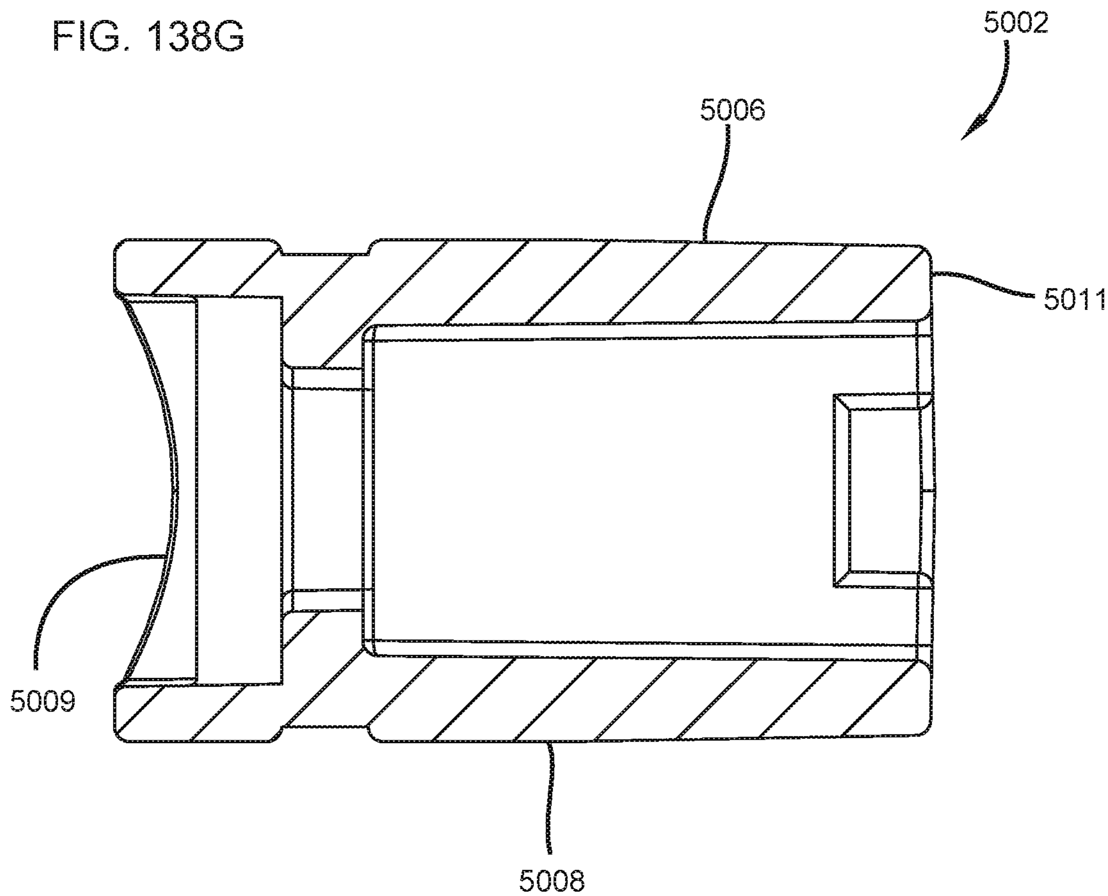
Figure 139:
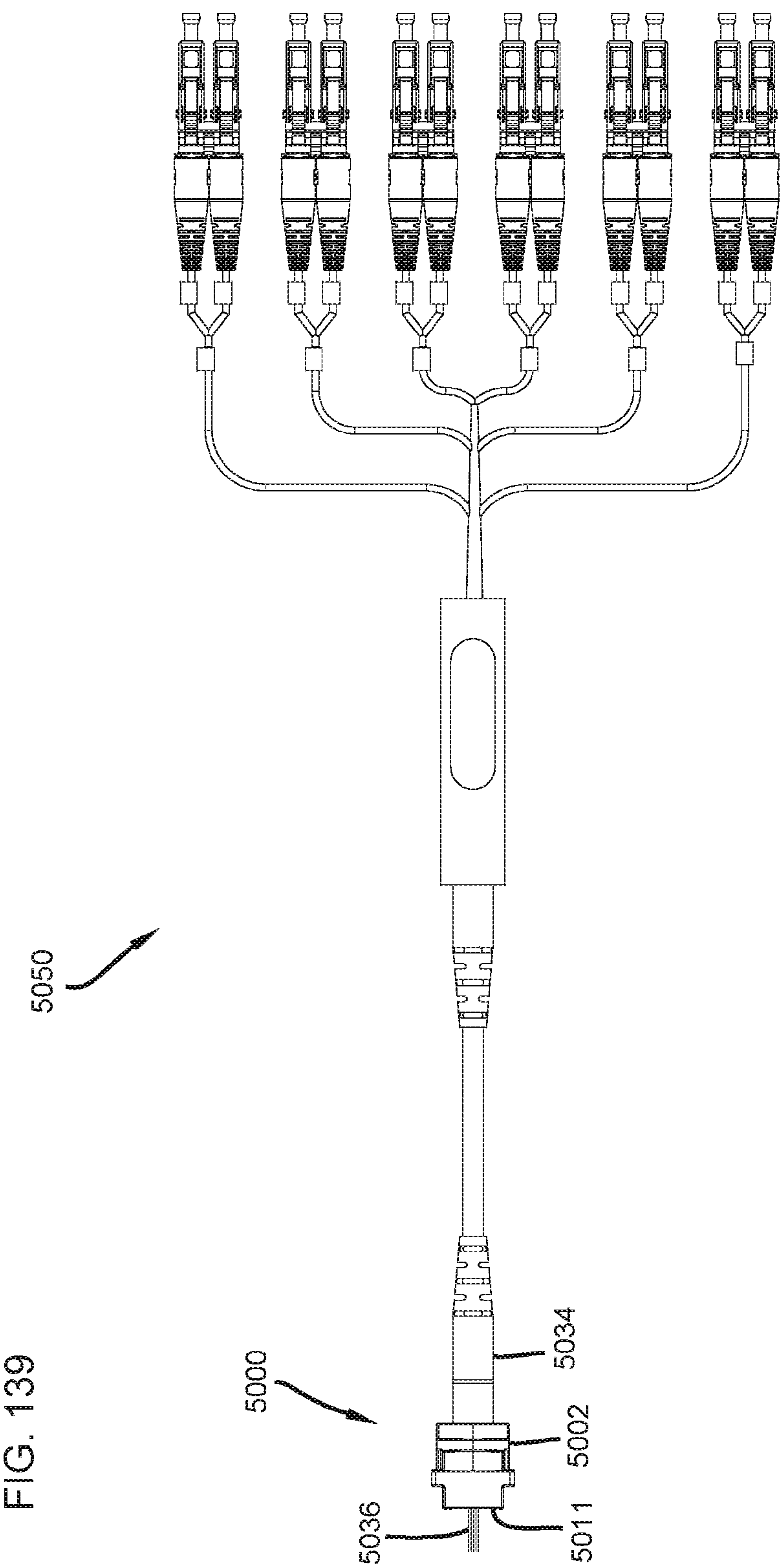
Figure 140:
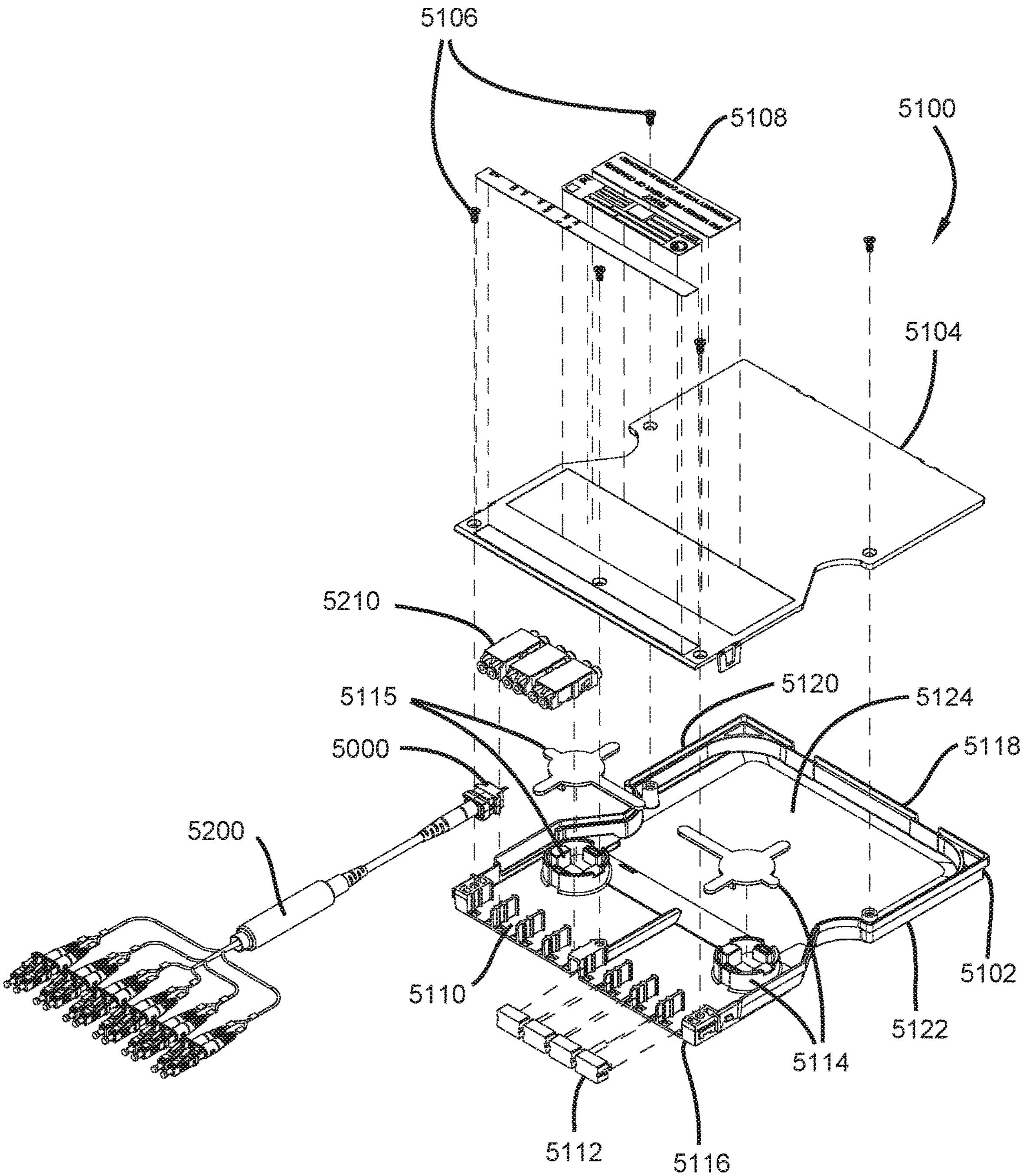
Figure 141:
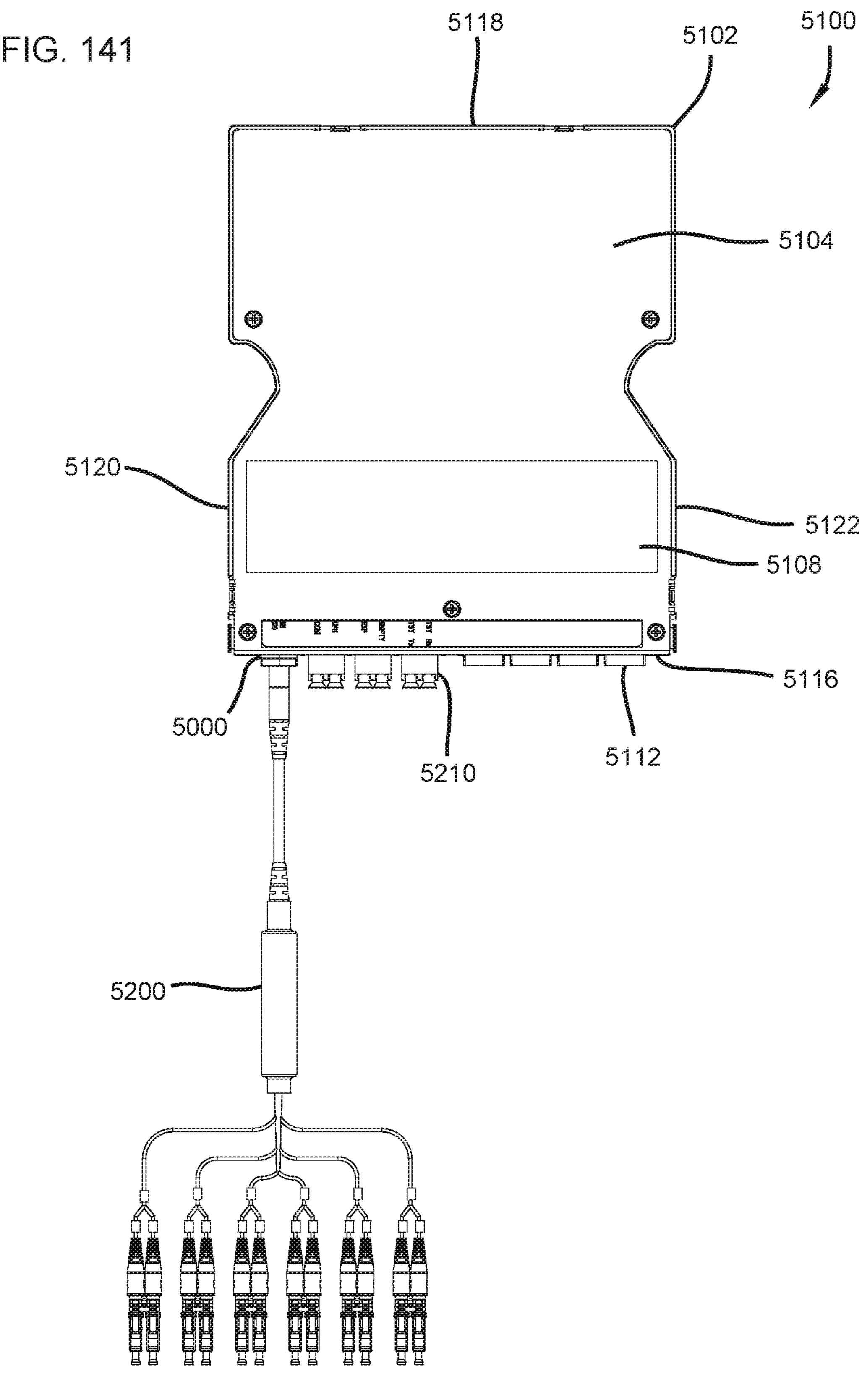
Figure 142:
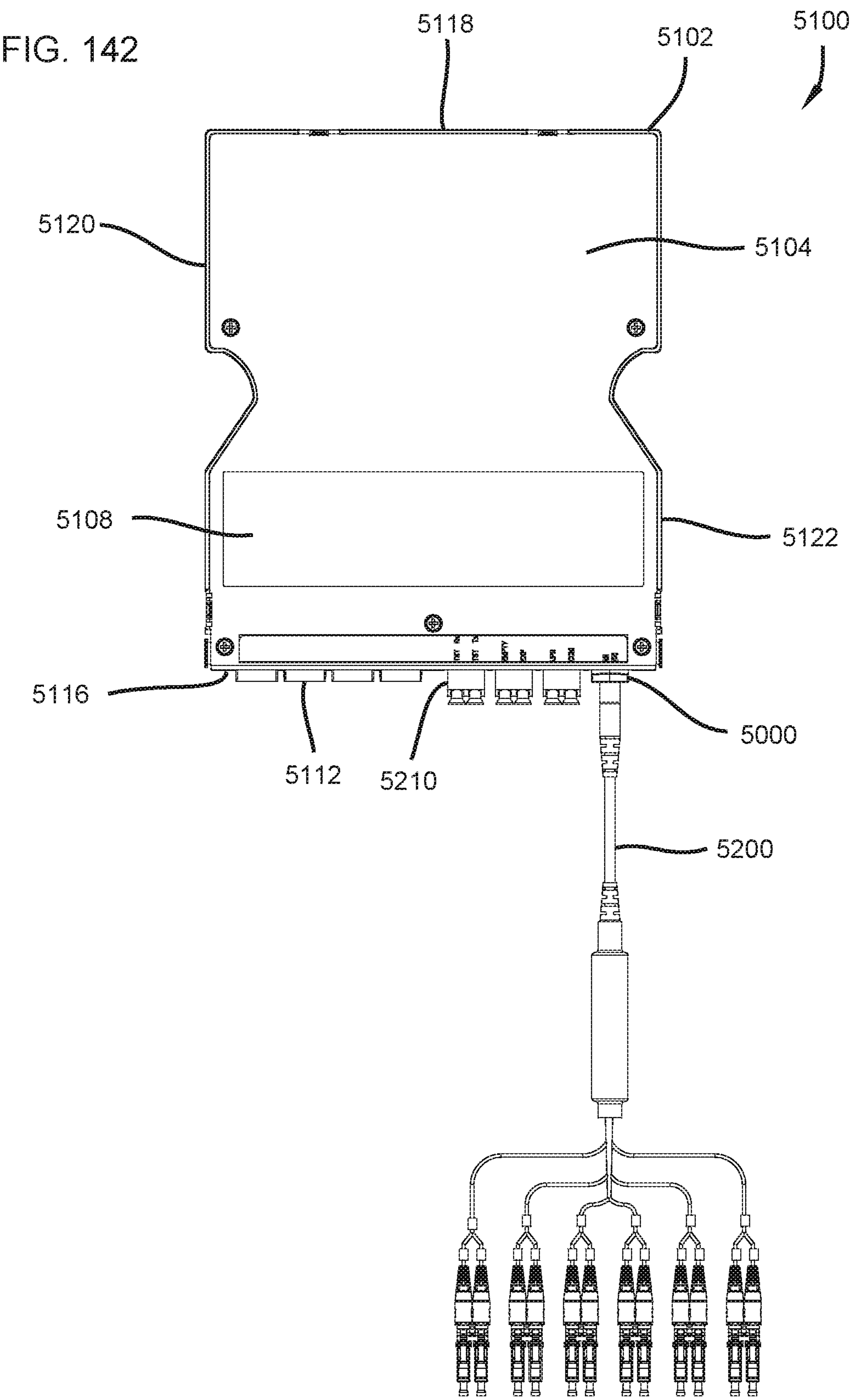
Figure 143:
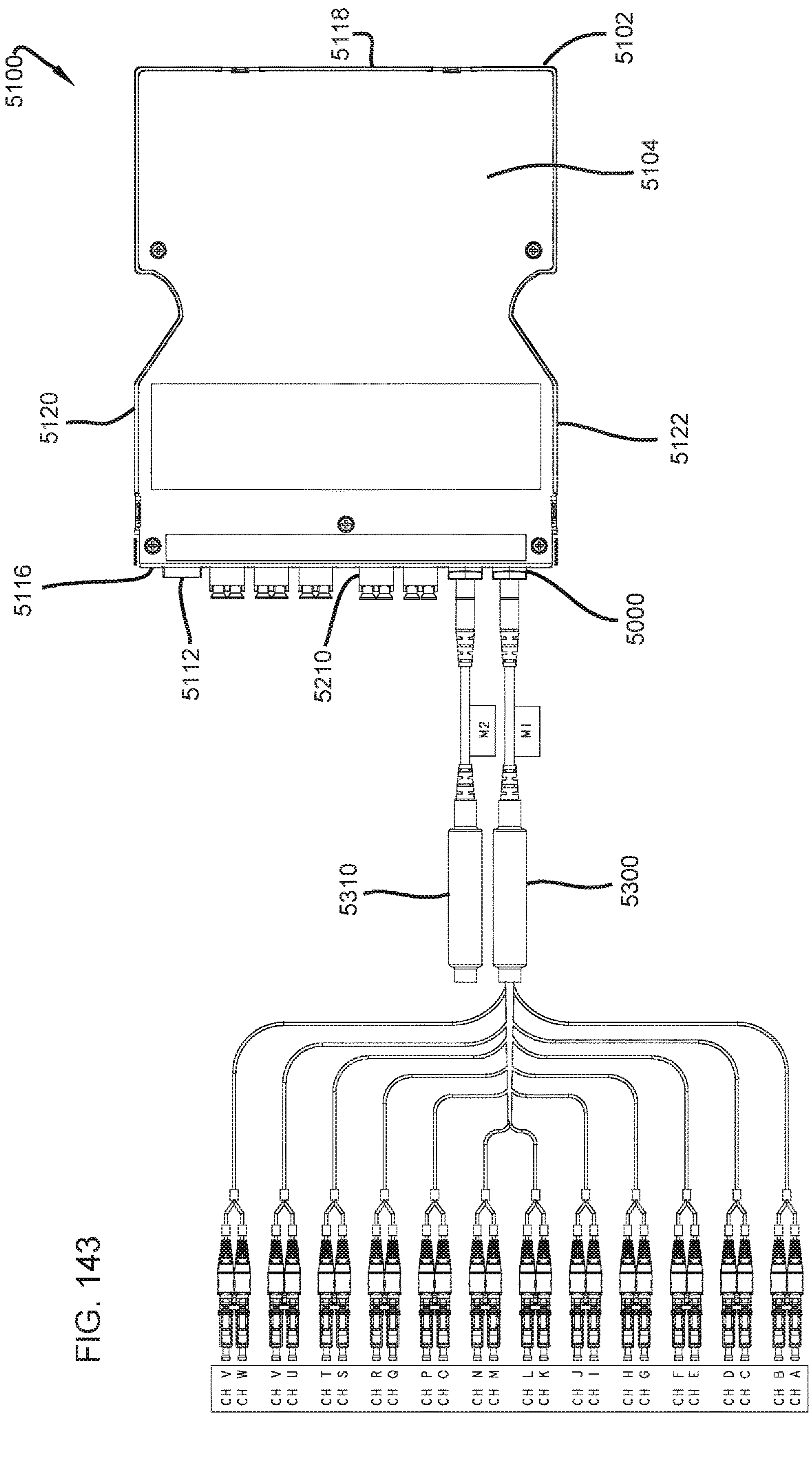
Figure 144:
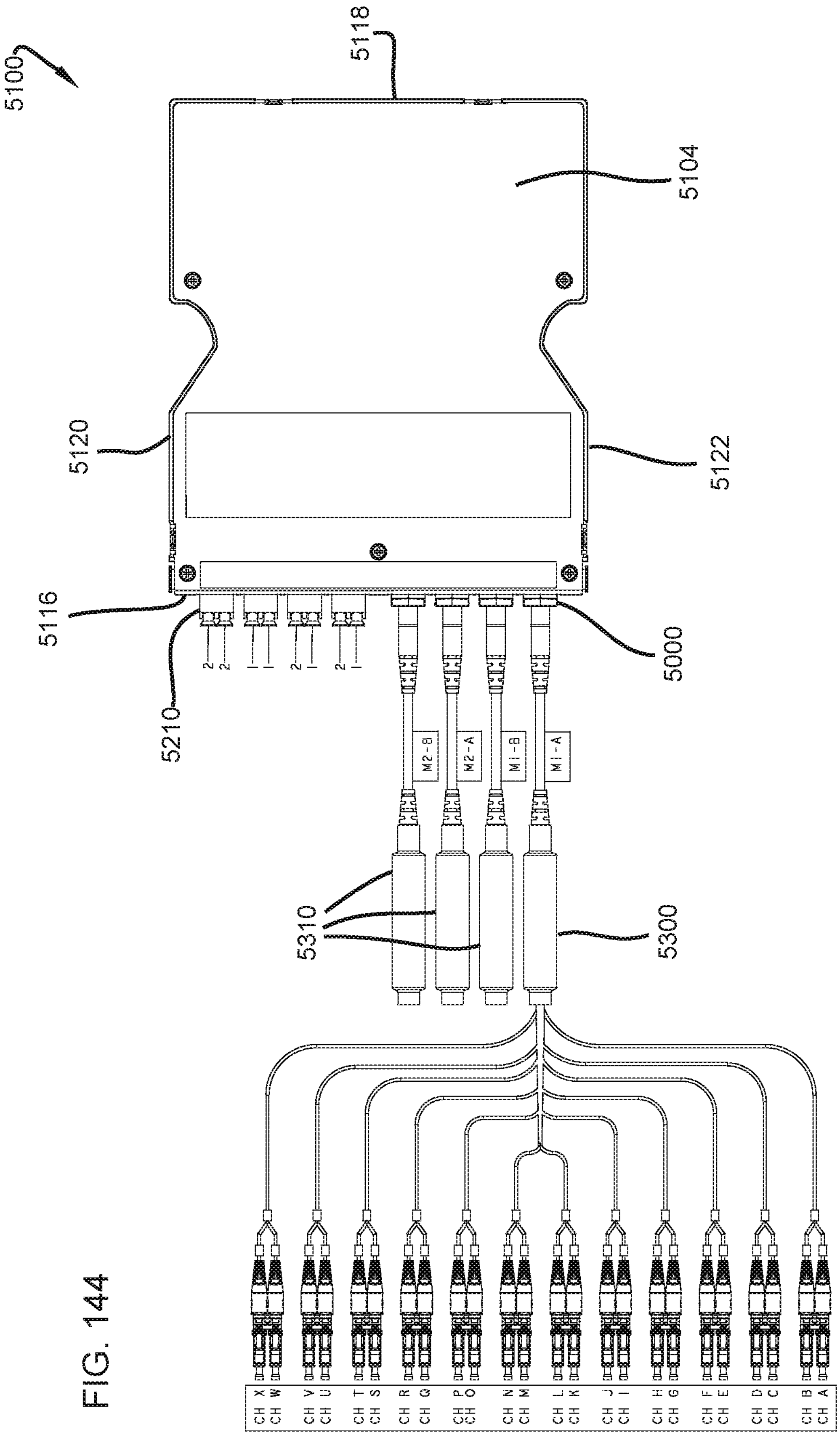
Figure 145A:
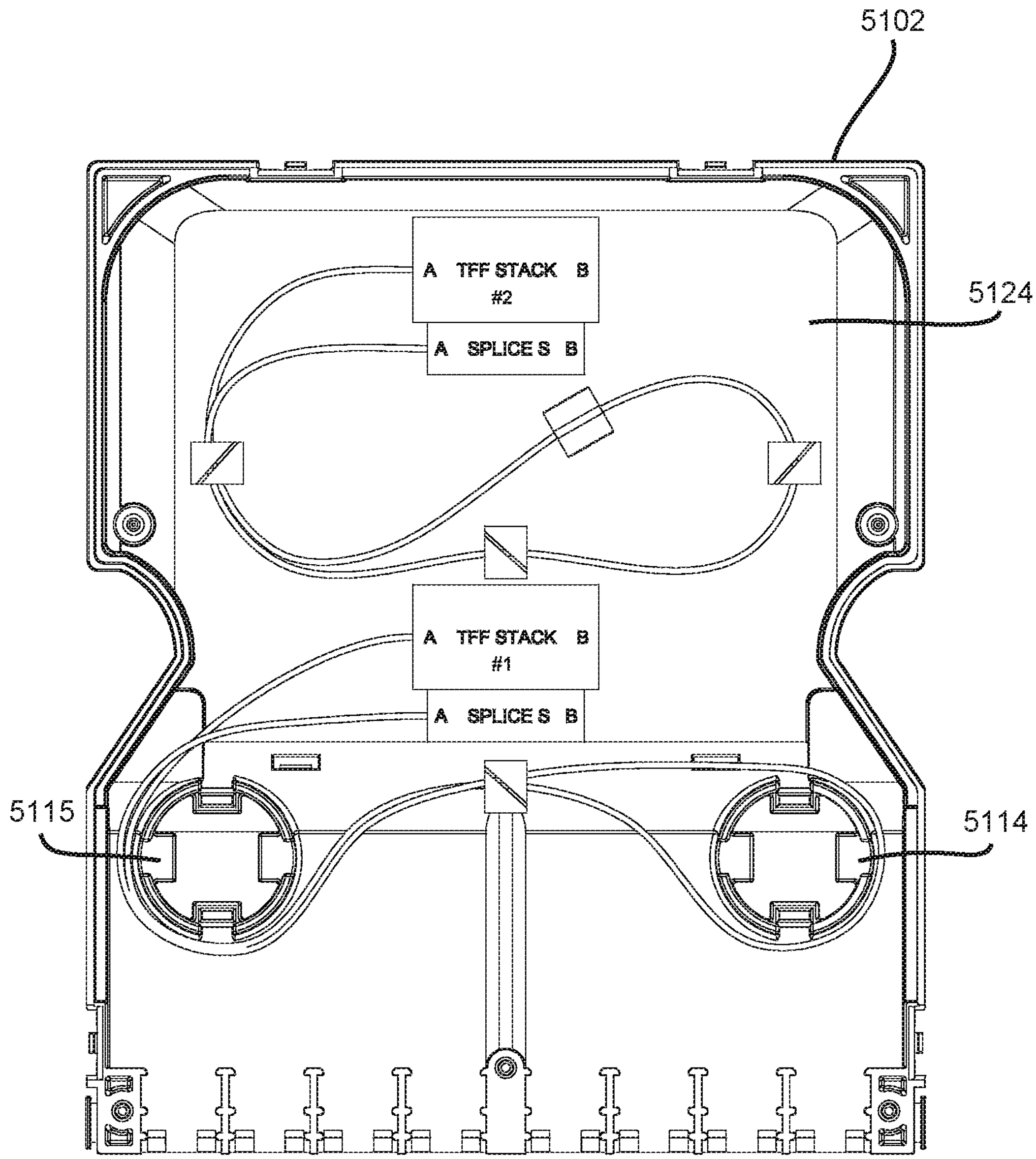
Figure 145B:
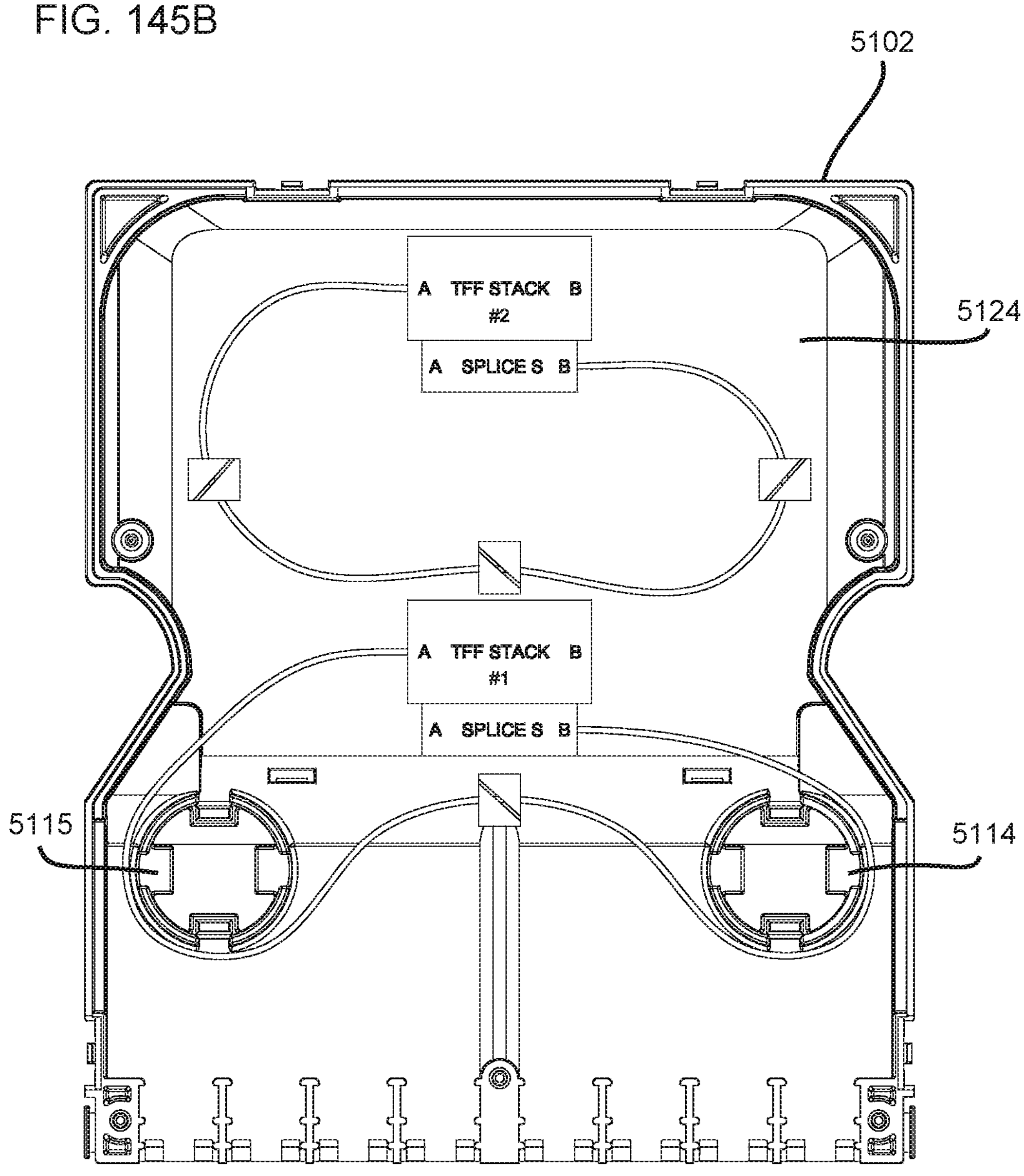
Figure 145C:
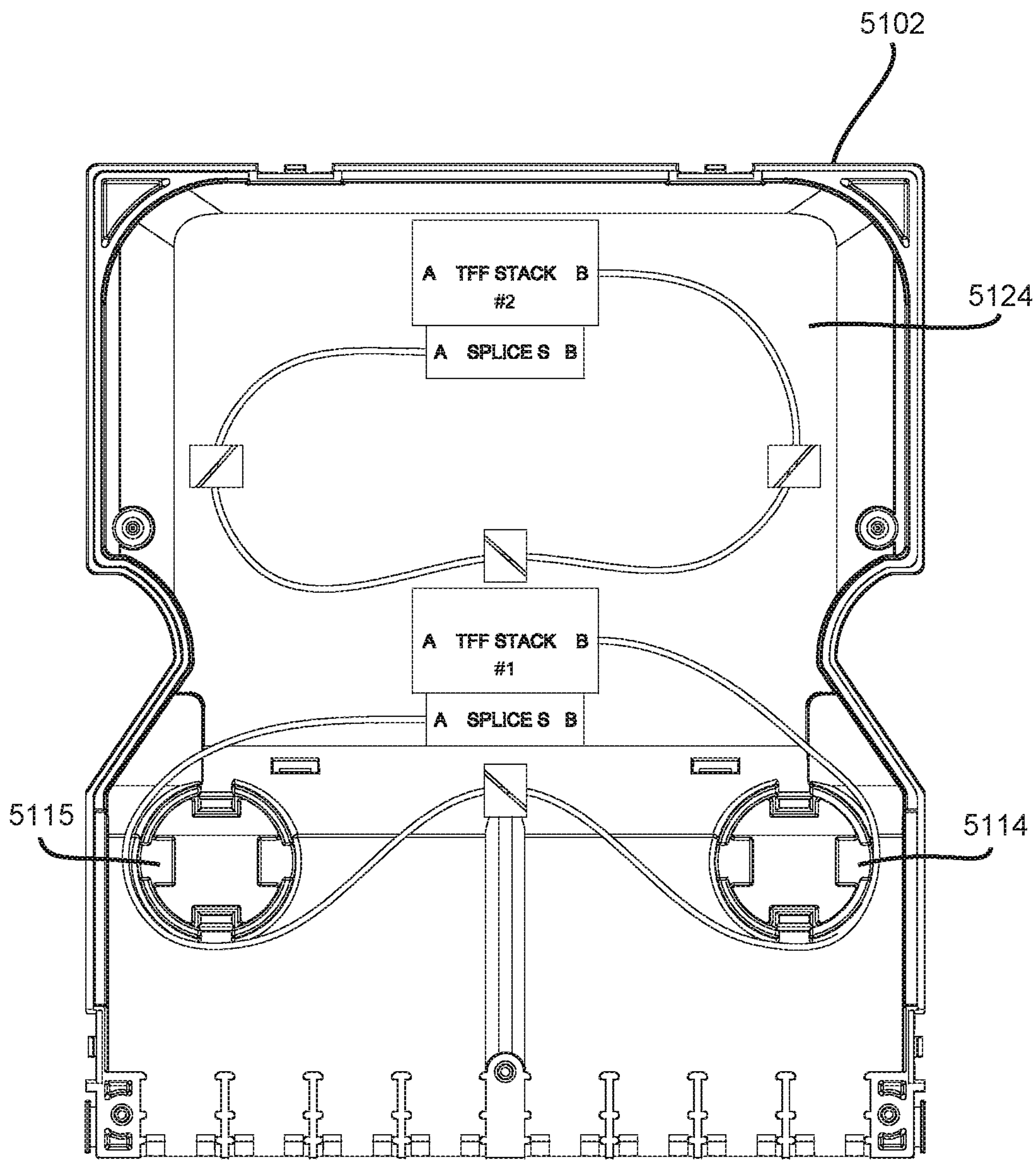
Figure 145D:
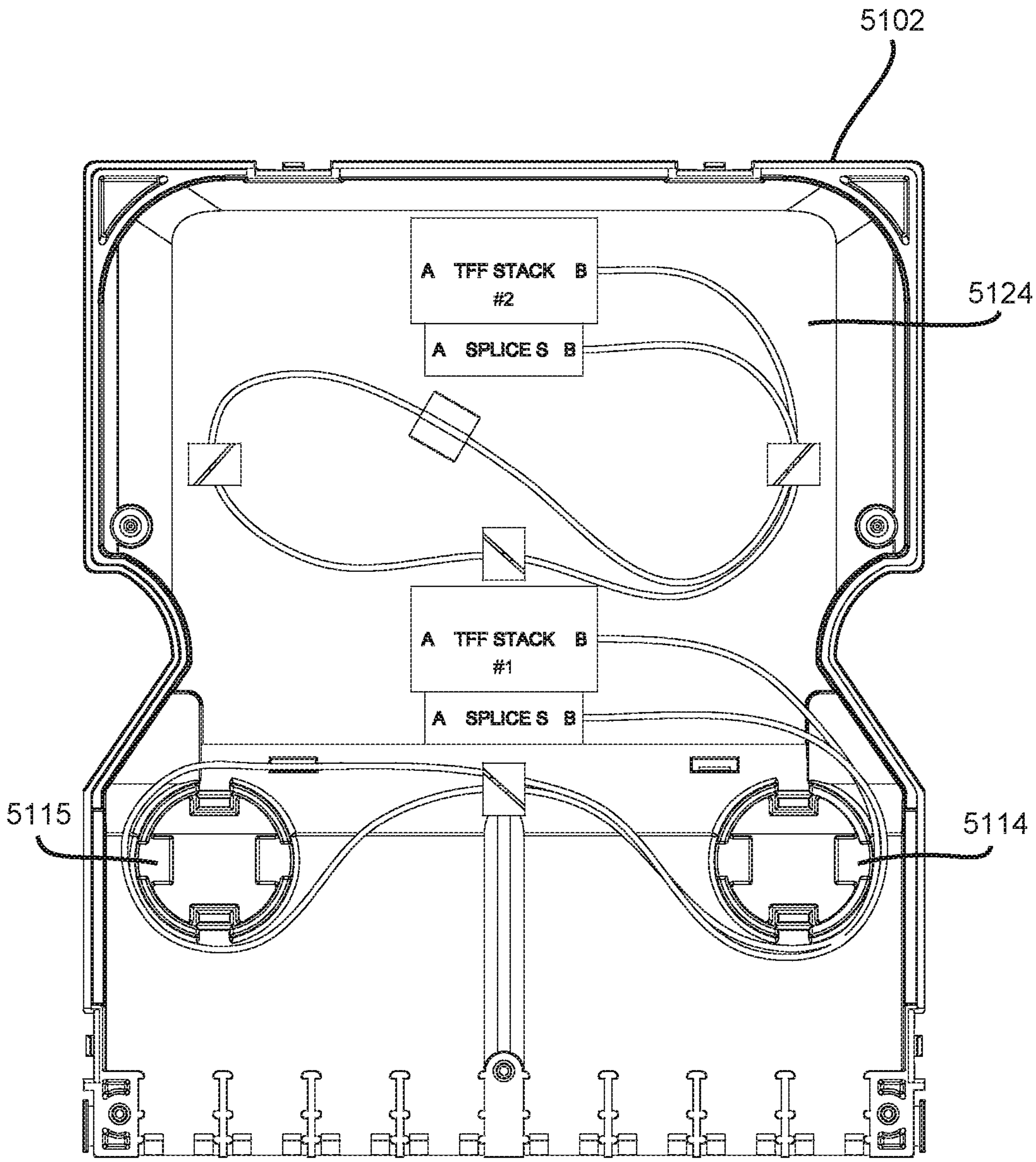
Figure 145E:
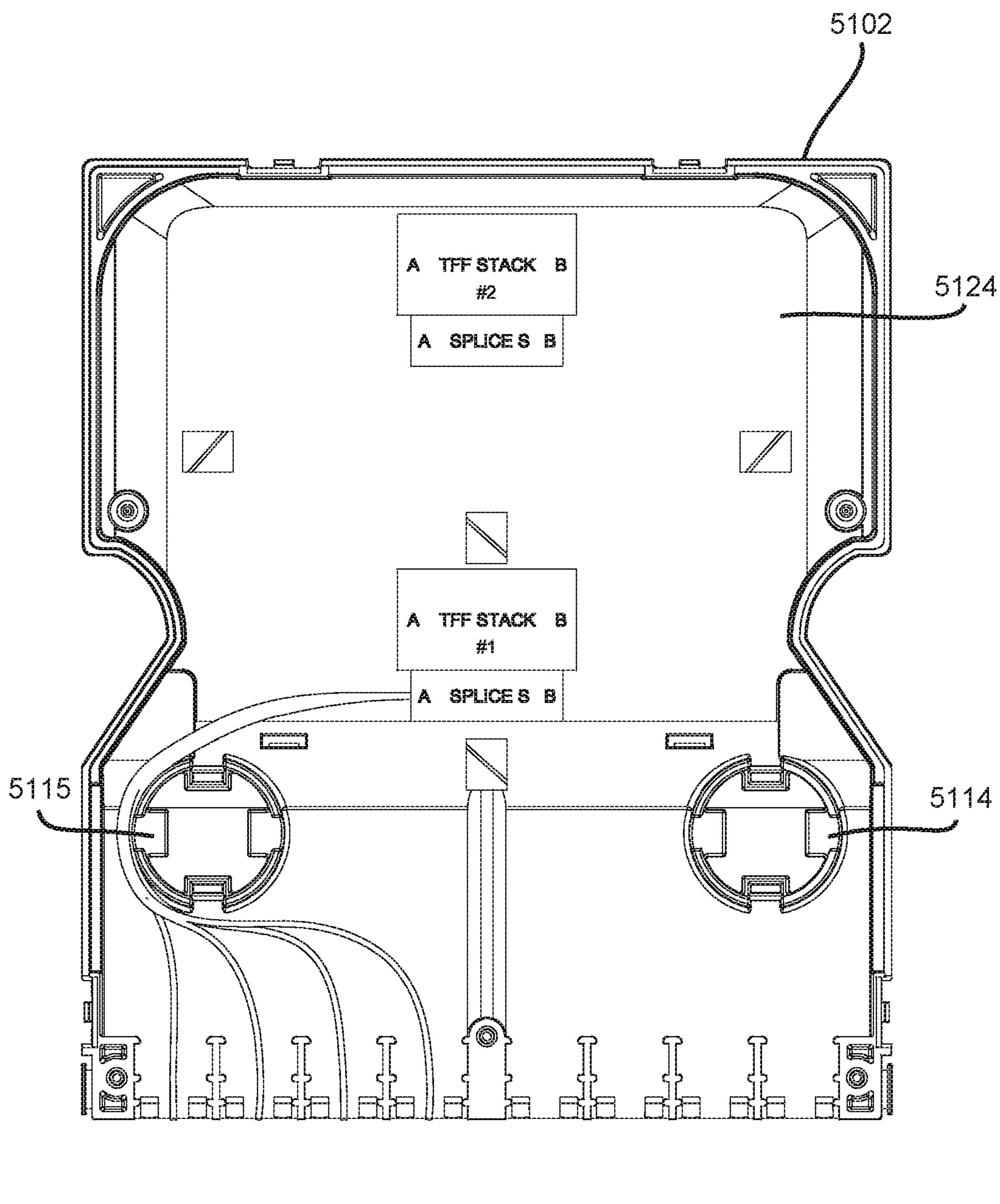
Figure 145F:
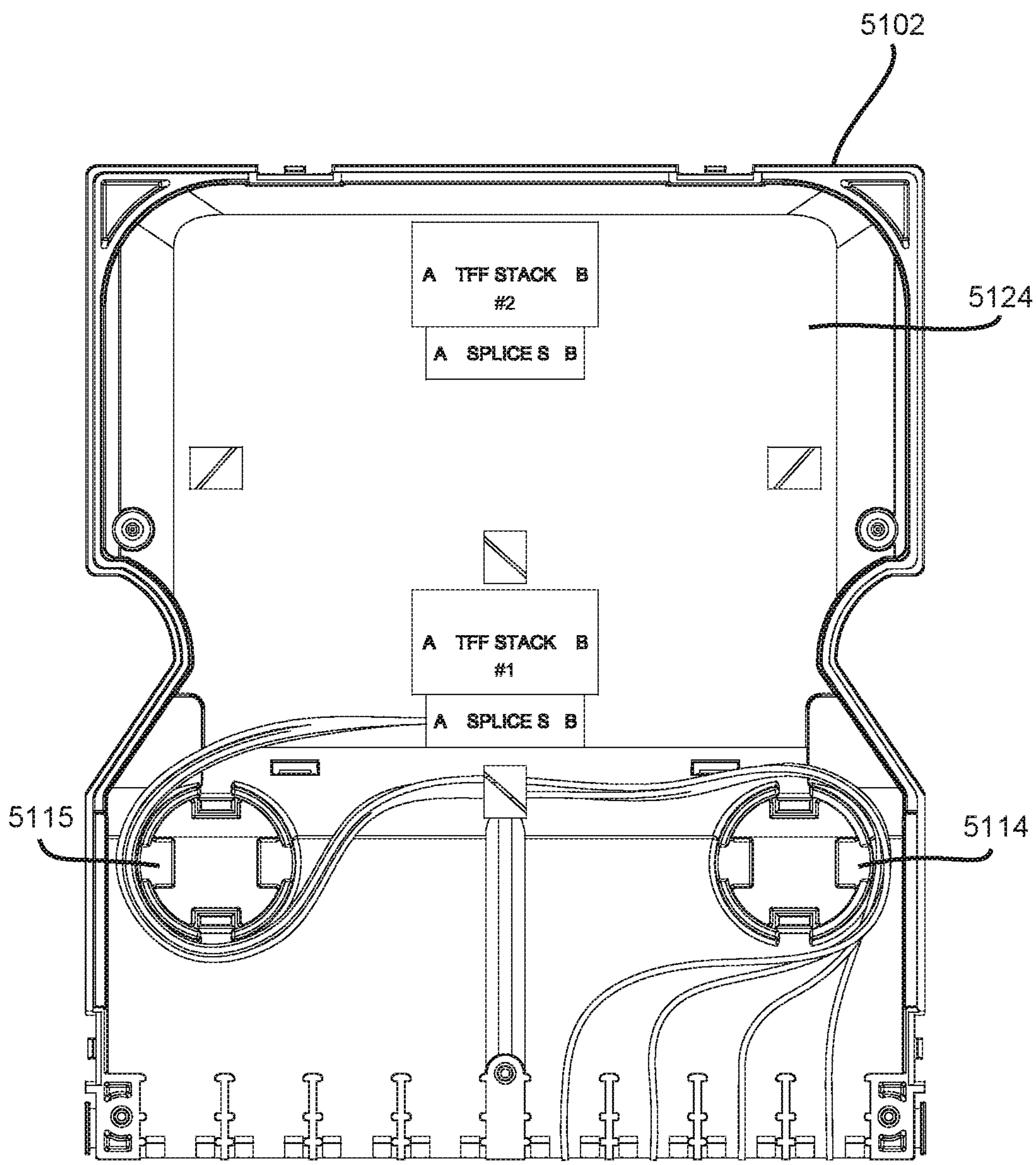
Figure 145G:
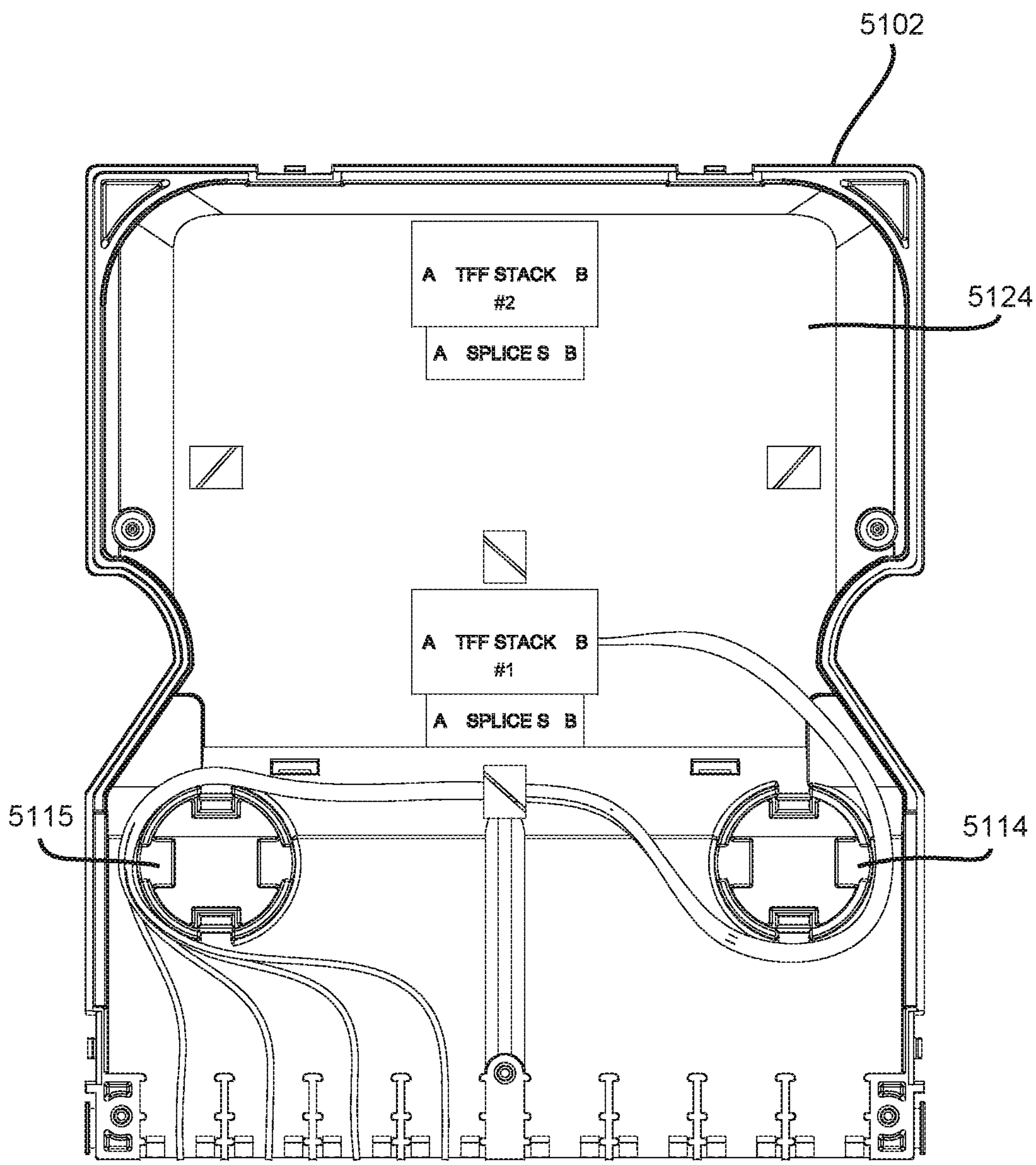
Figure 145H:
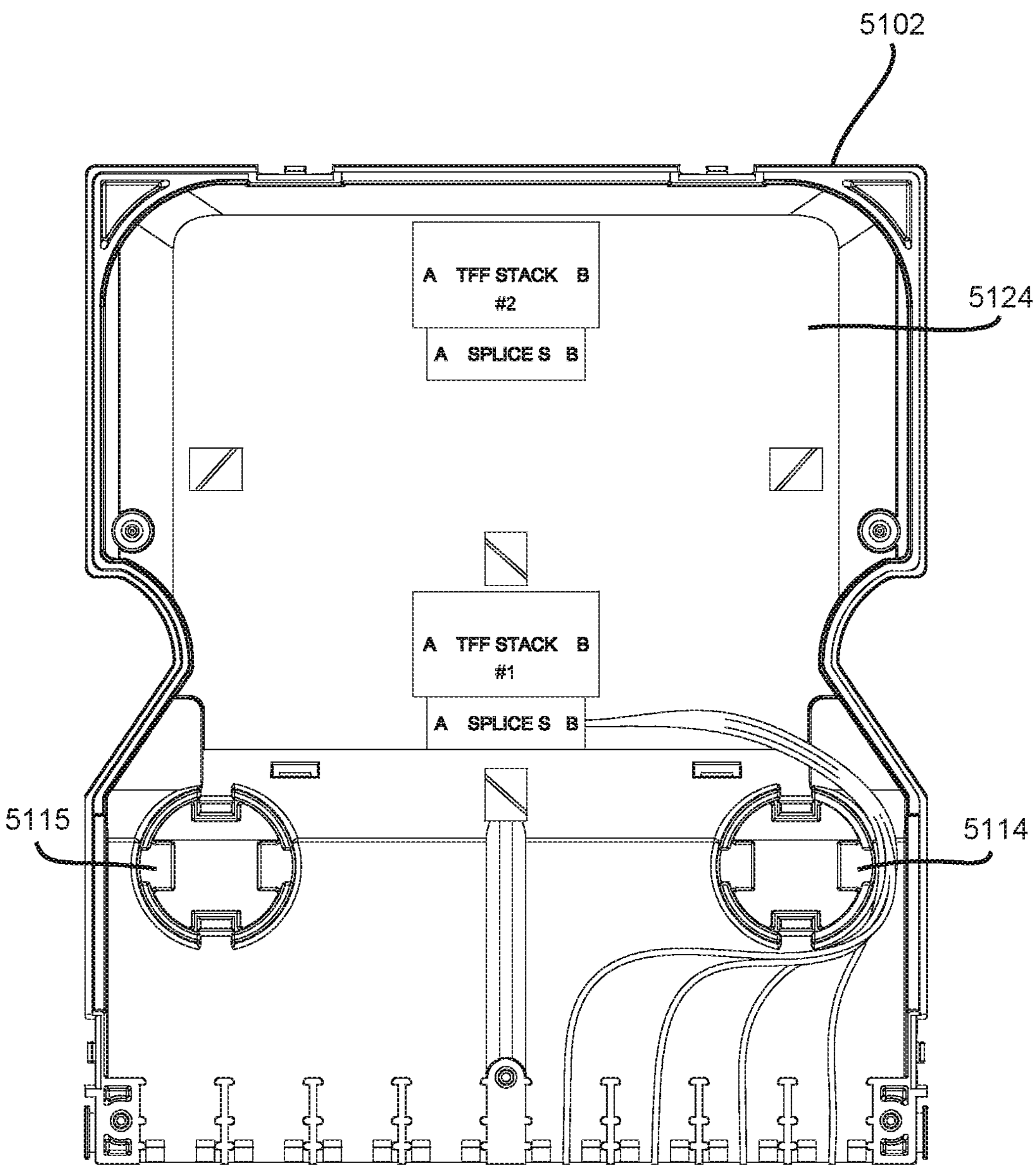
Figure 145I:
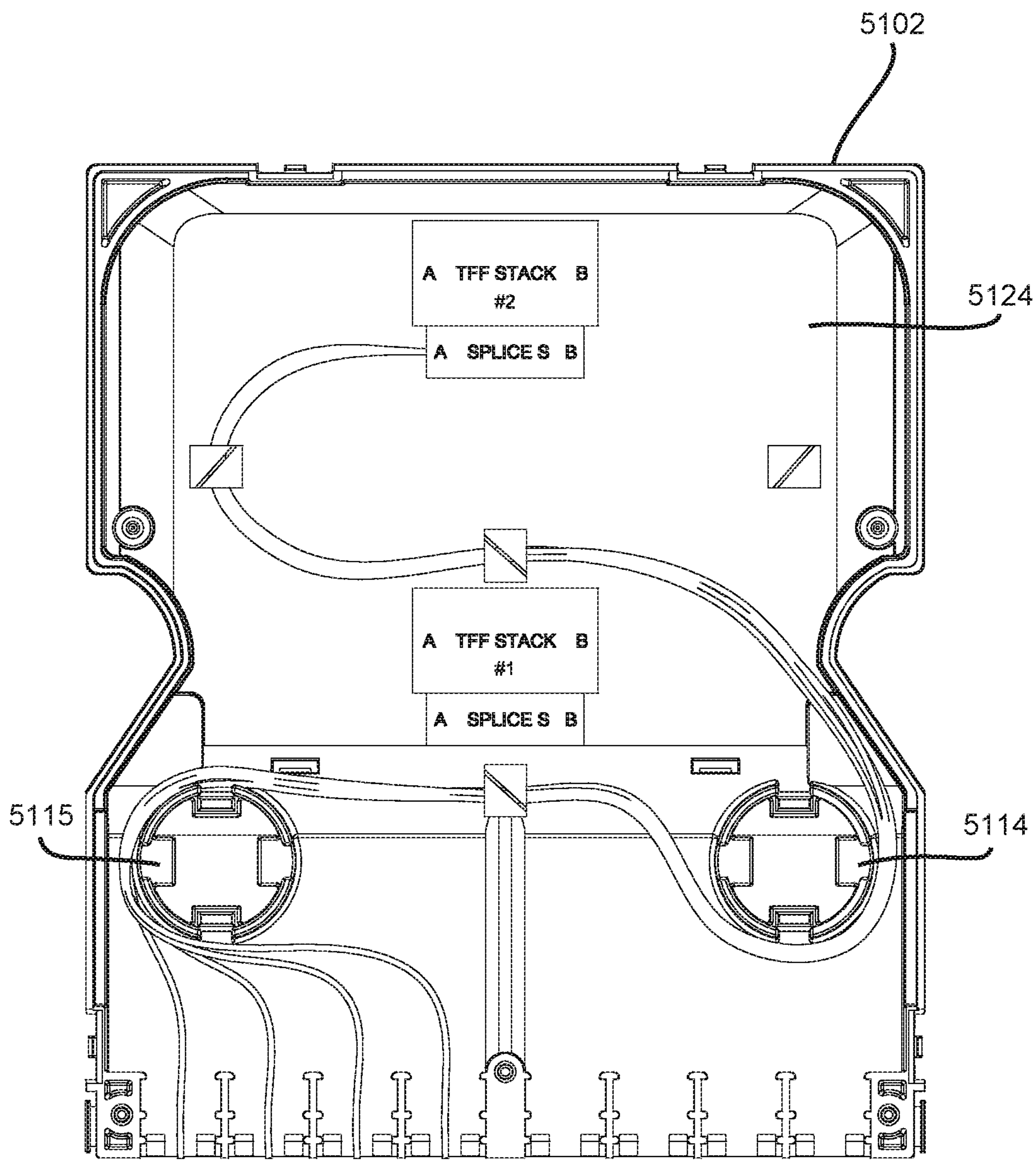
Figure 145J:
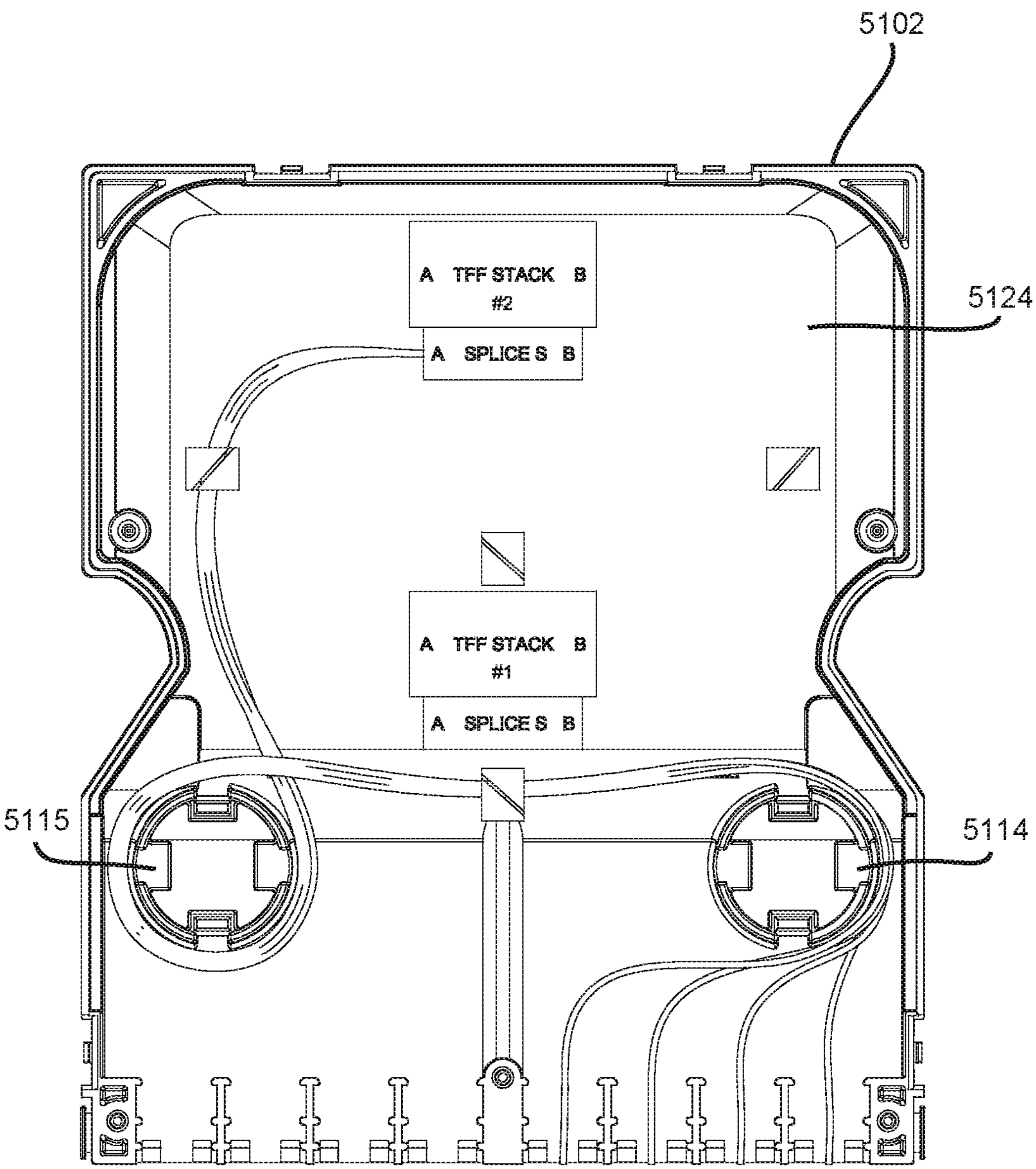
Figure 145K:
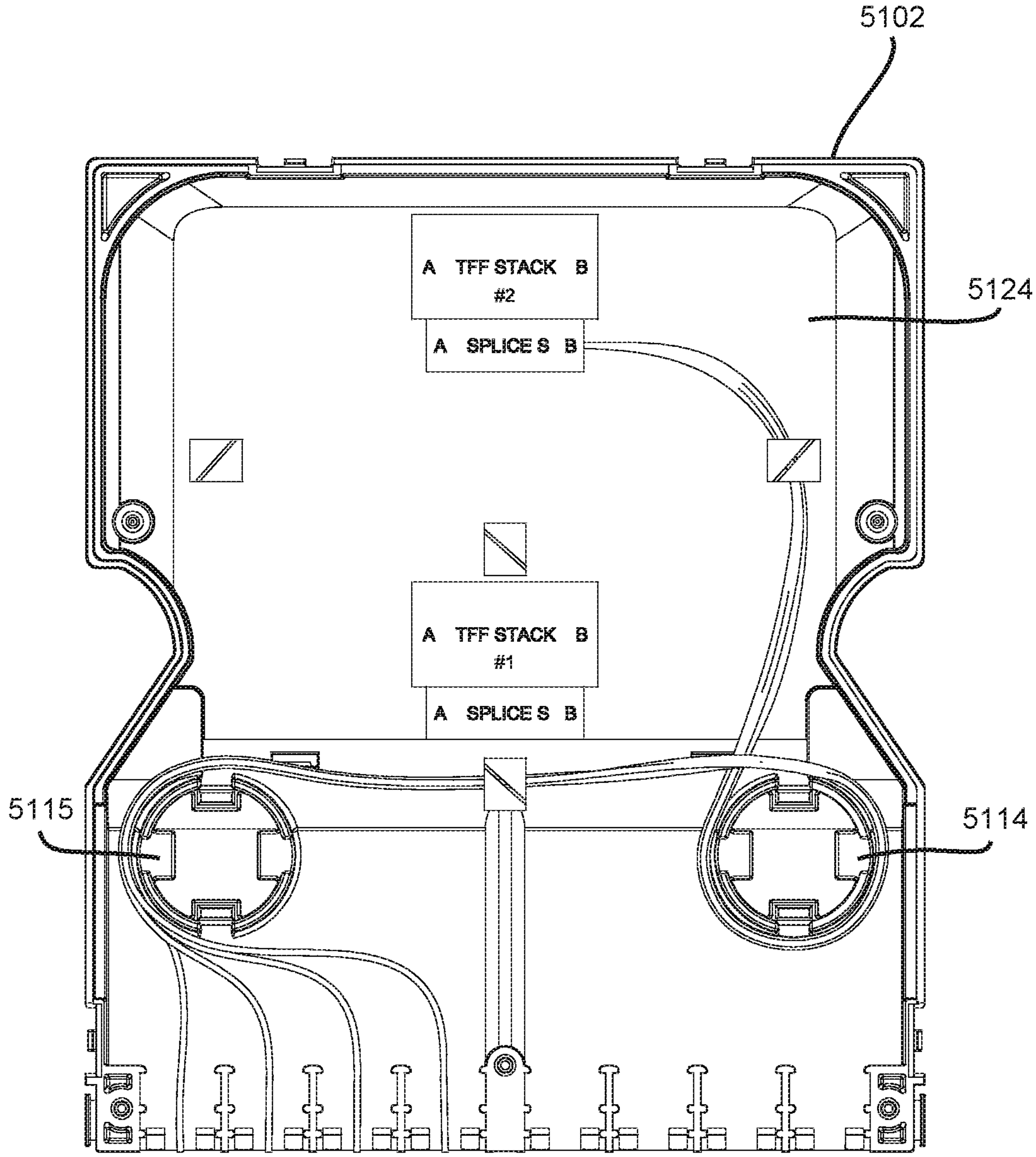
Figure 145L:
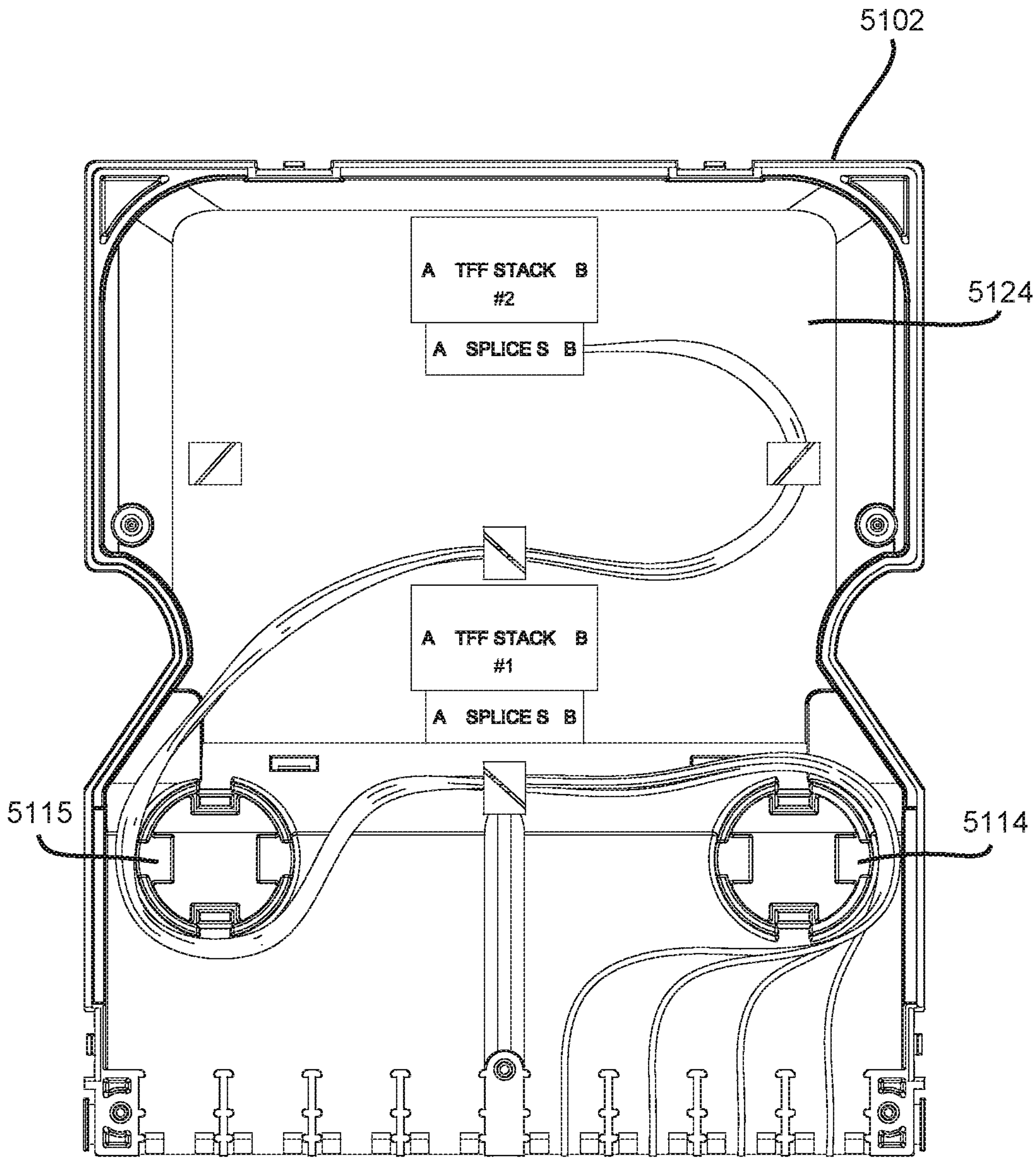
Figure 145M:
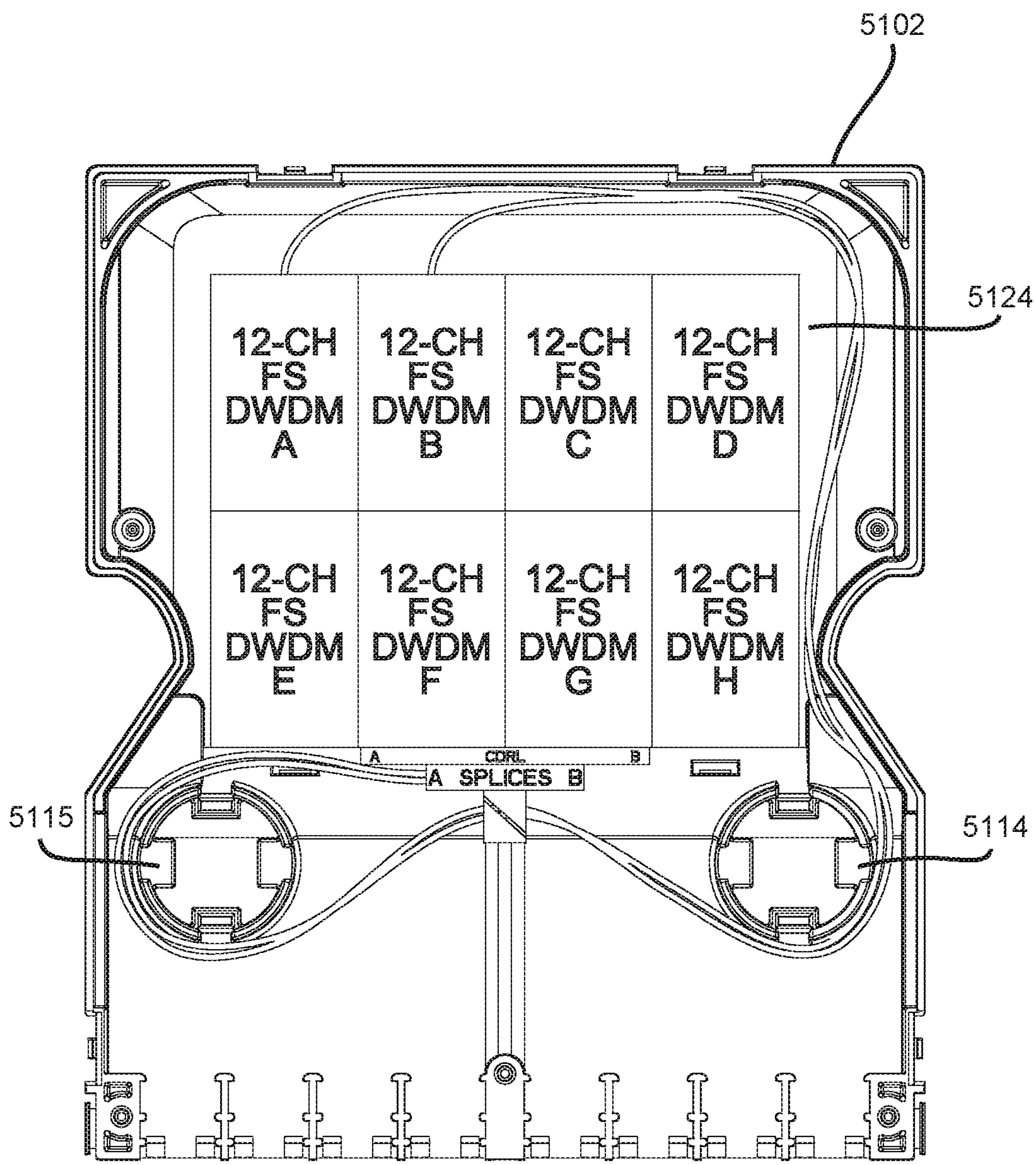
Figure 145N:
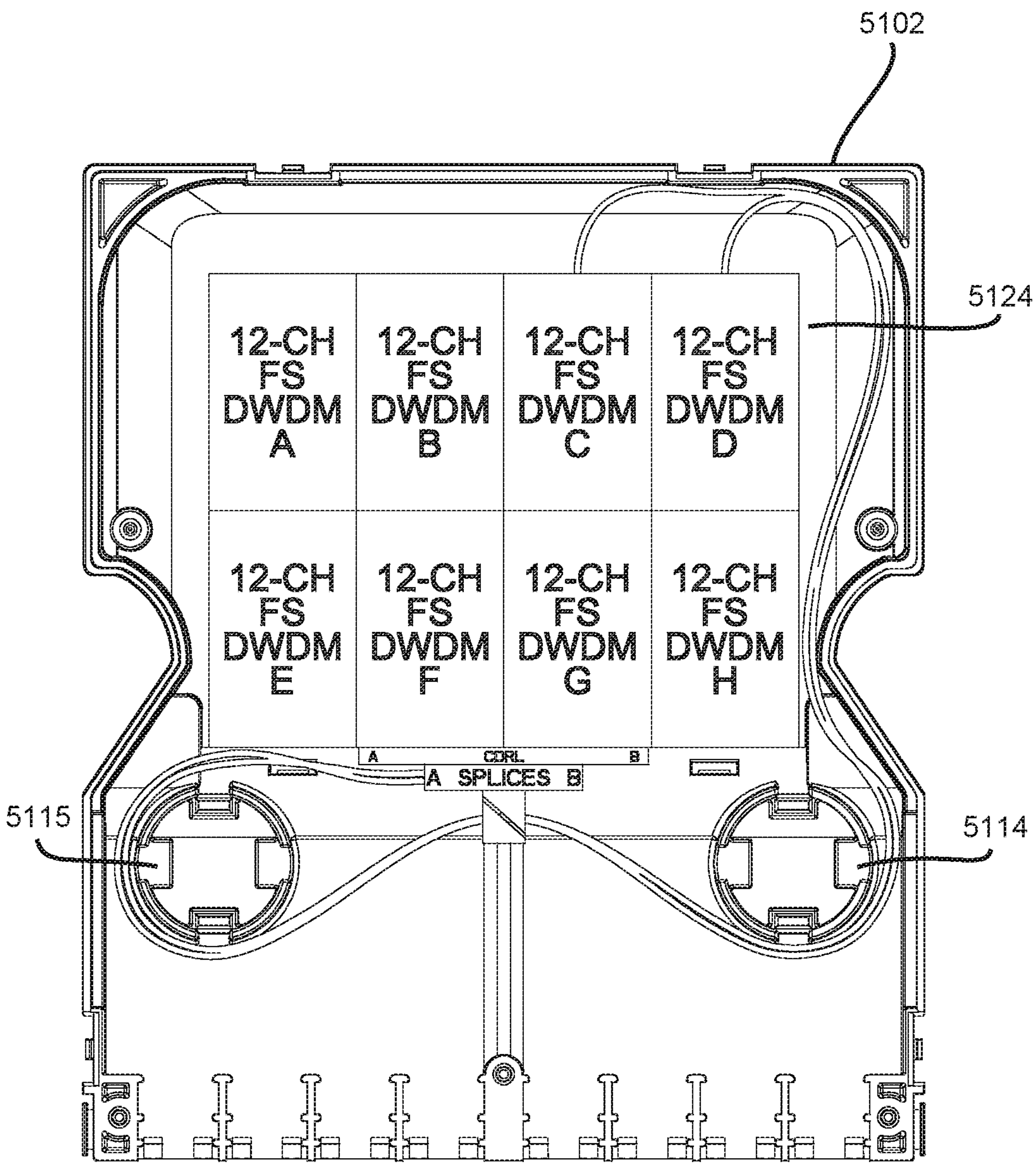
Figure 145O:
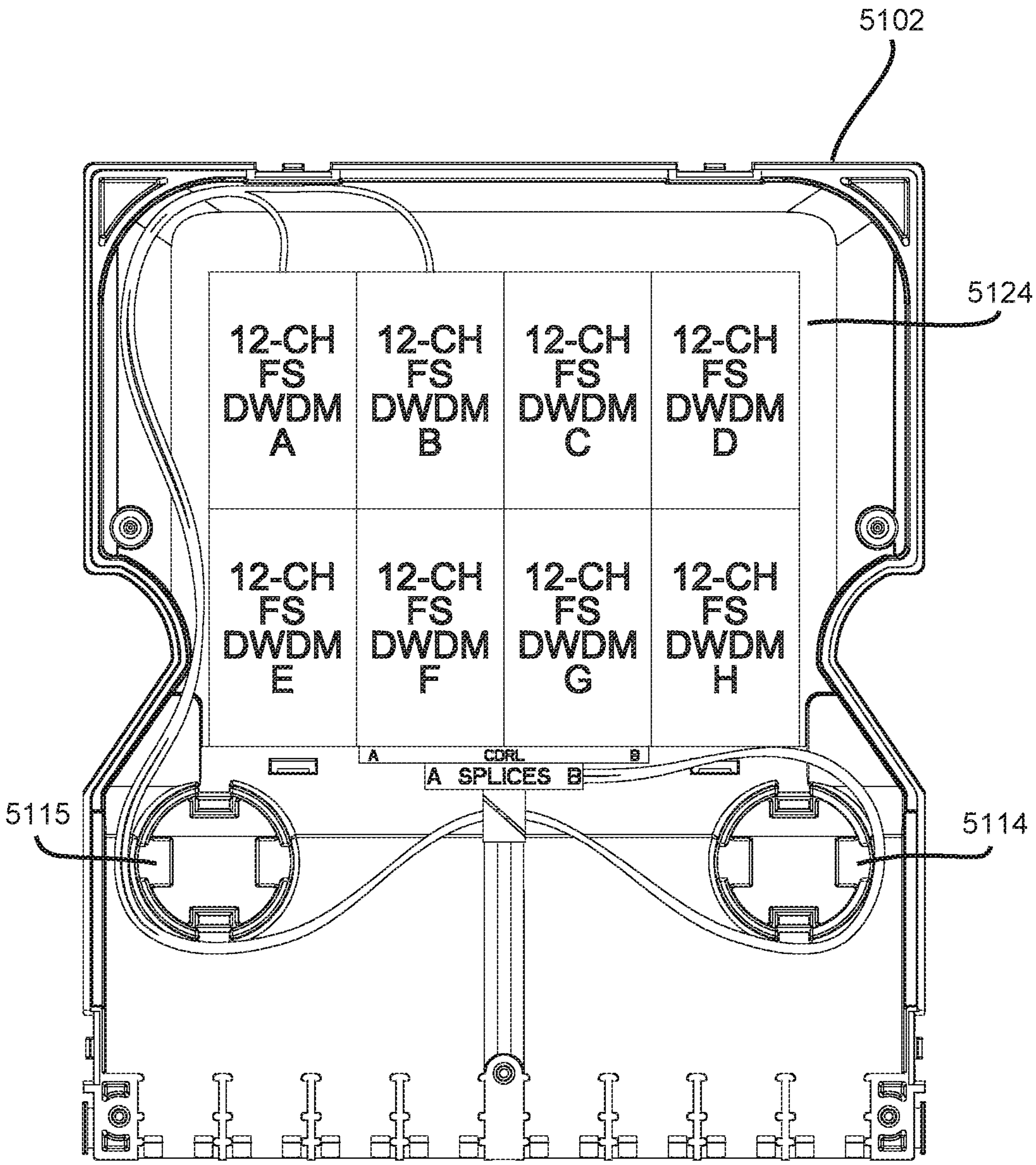
Figure 145P:
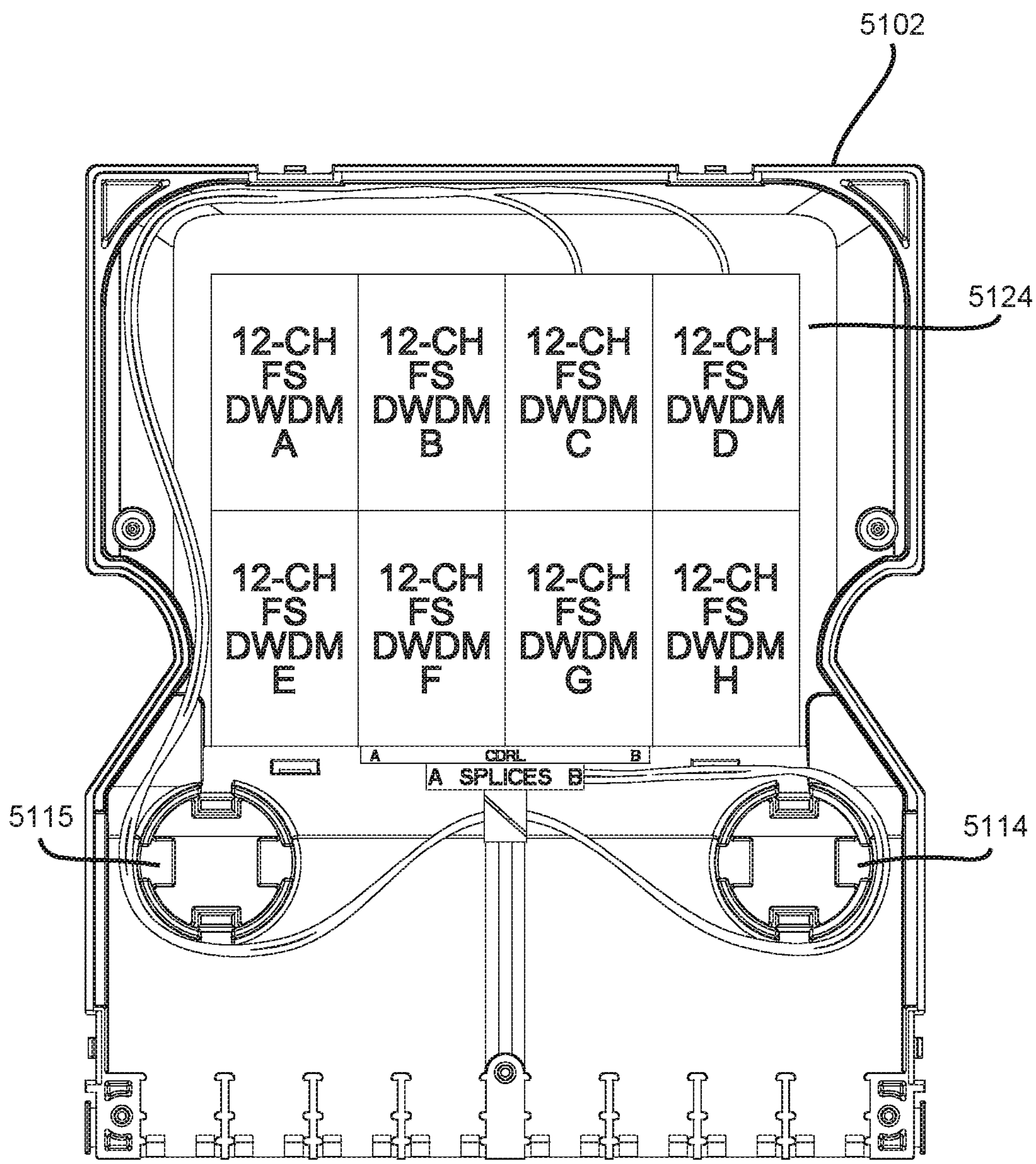
Figure 145Q:
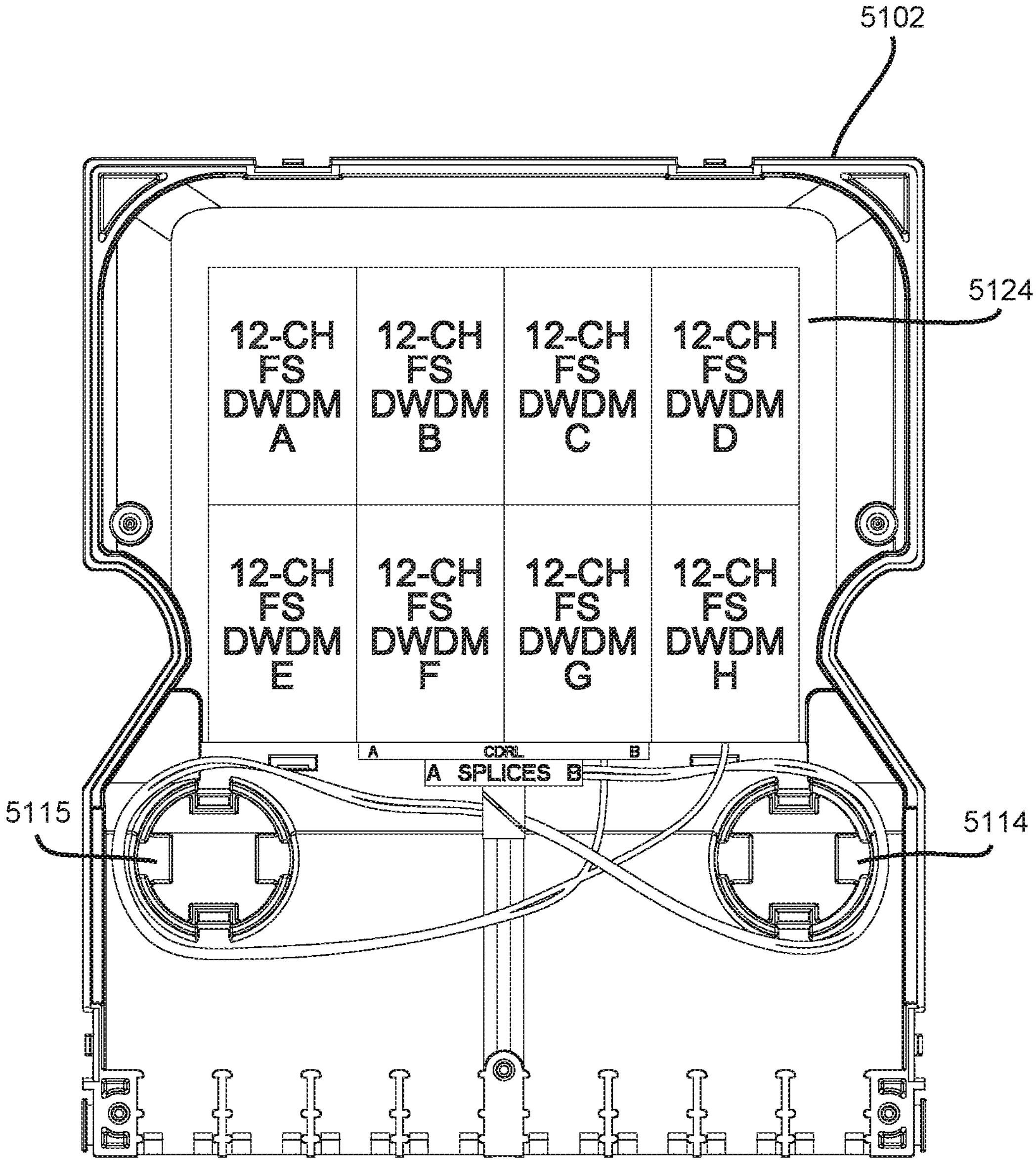
Figure 145R:
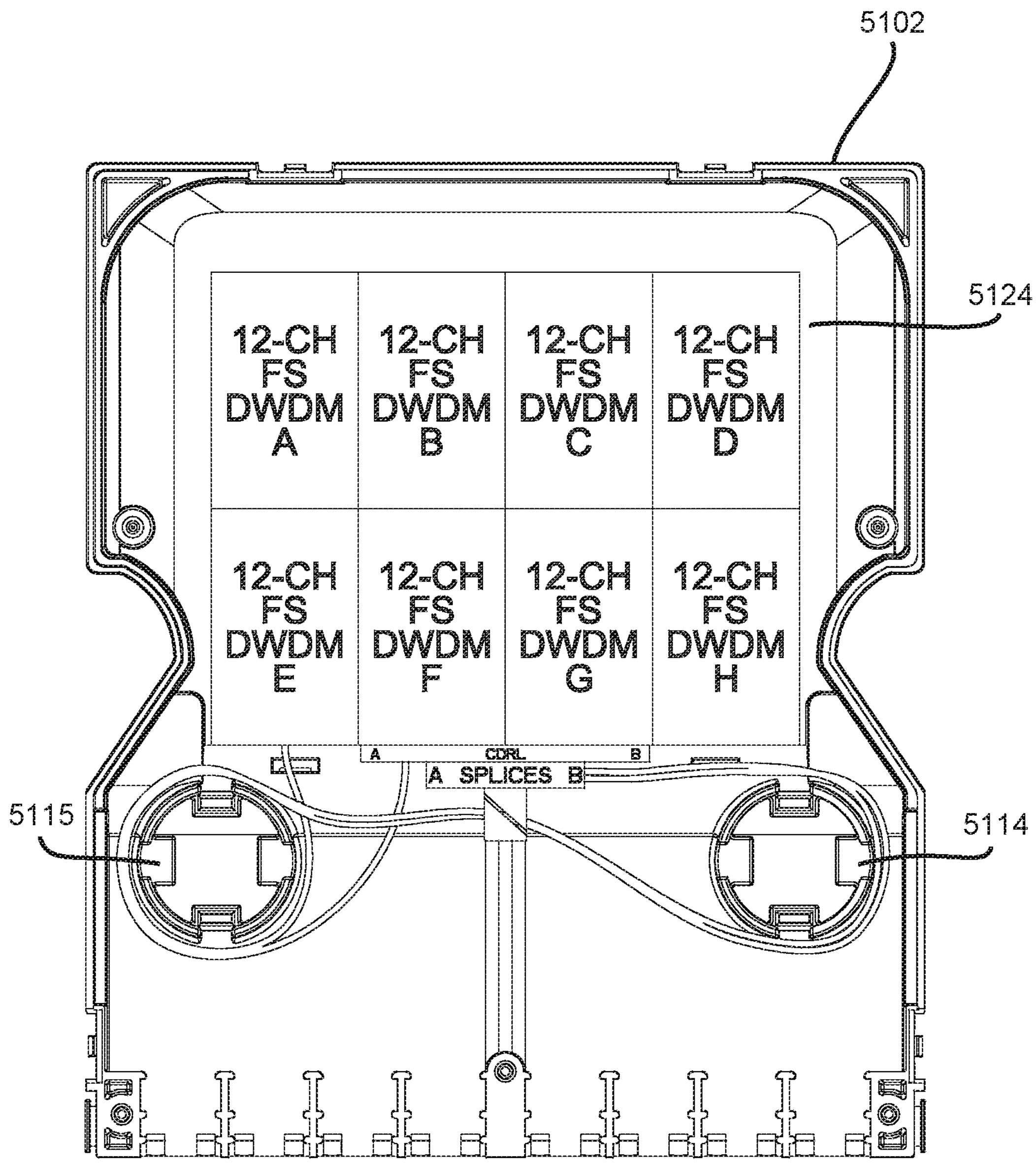
Figure 145S:
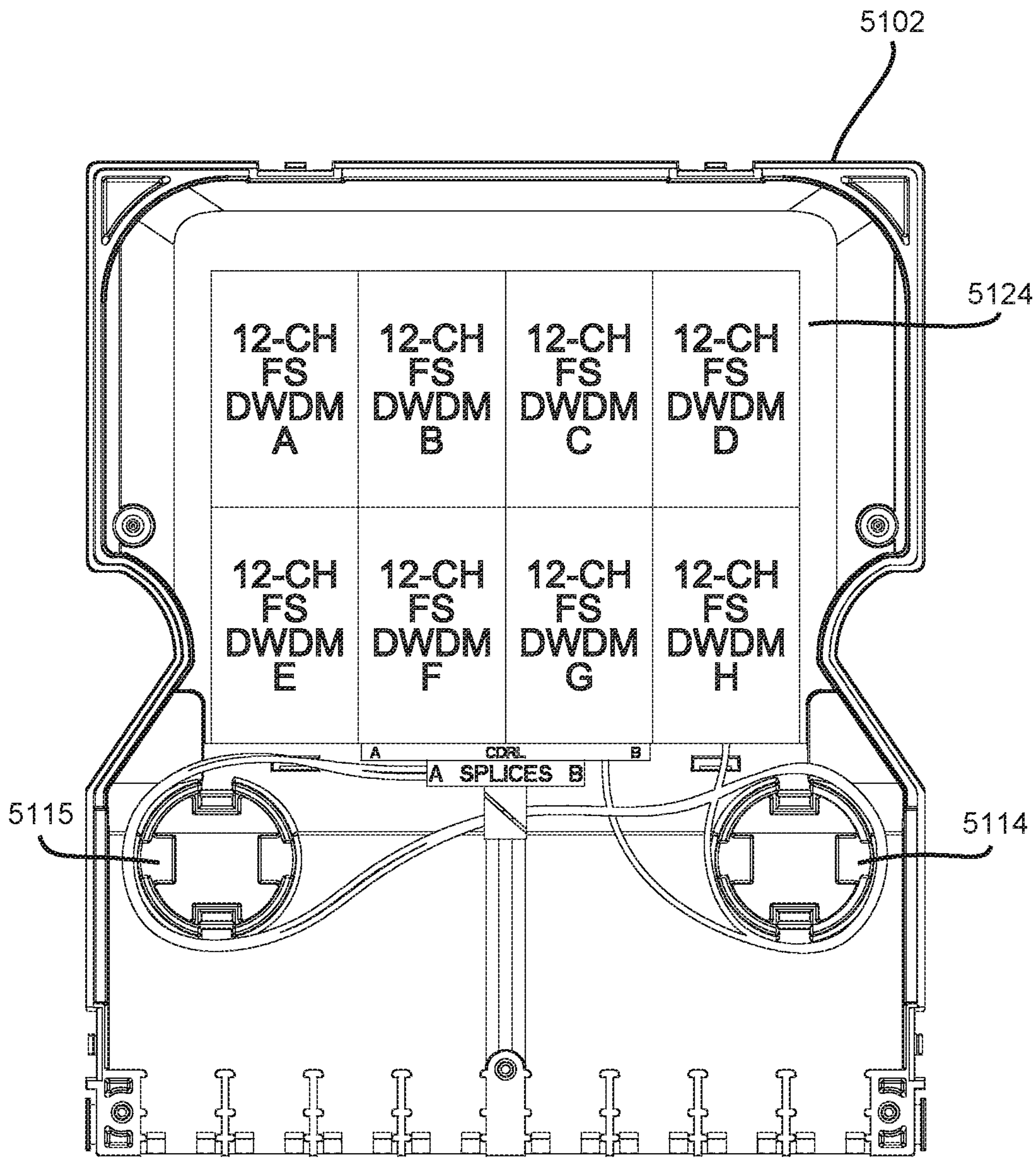
Figure 145T:
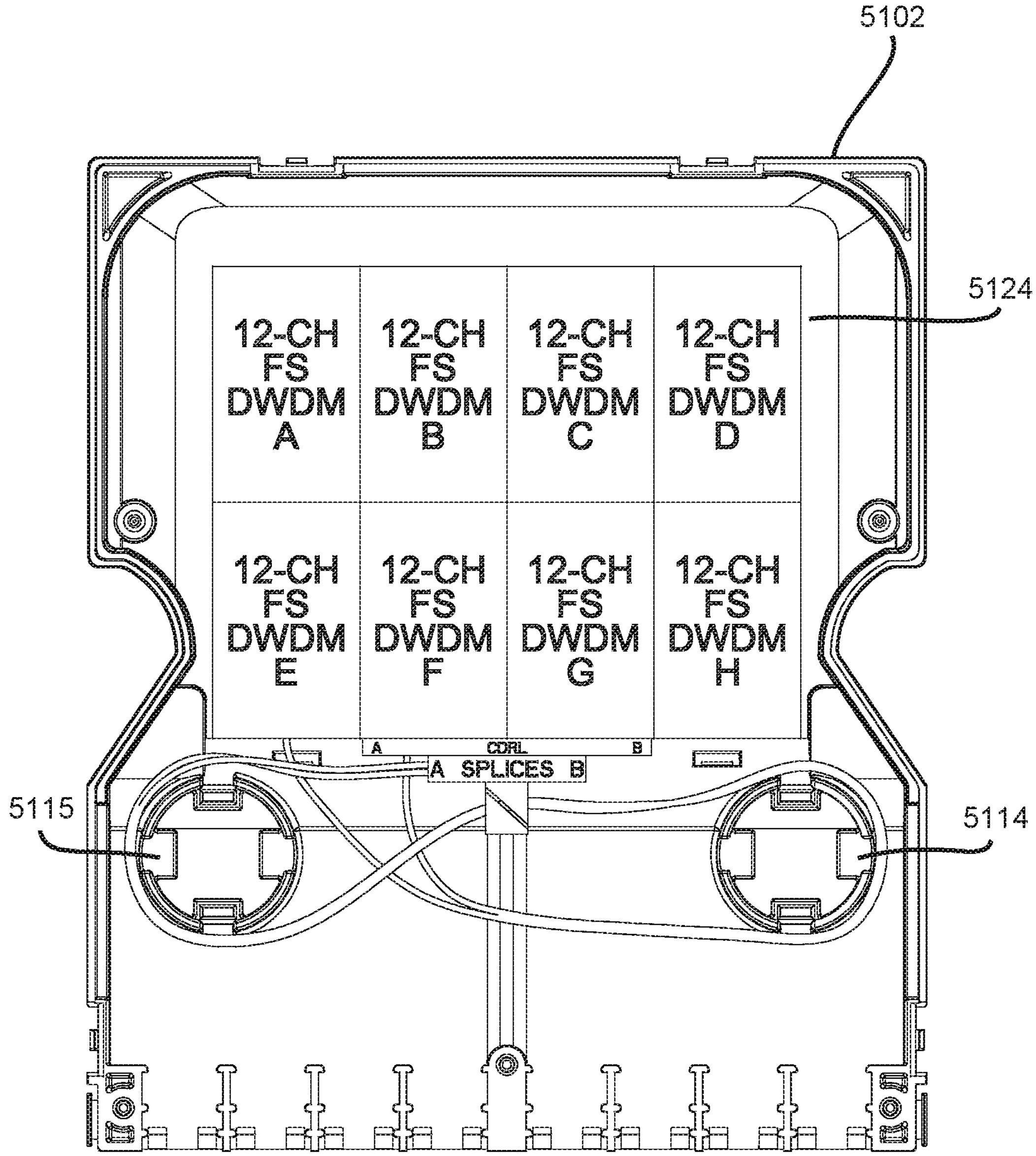
Figure 145U:
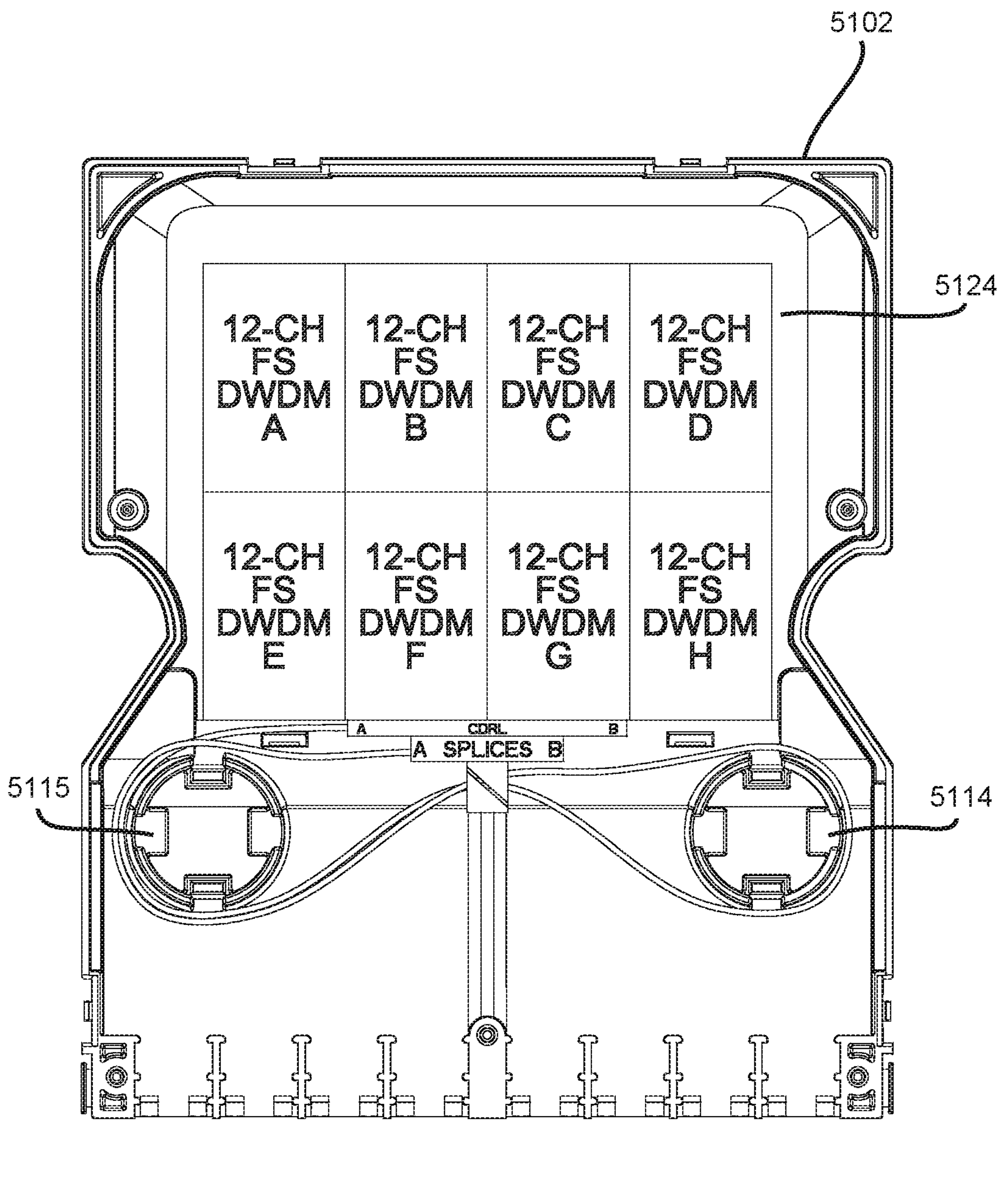
Figure 145V:
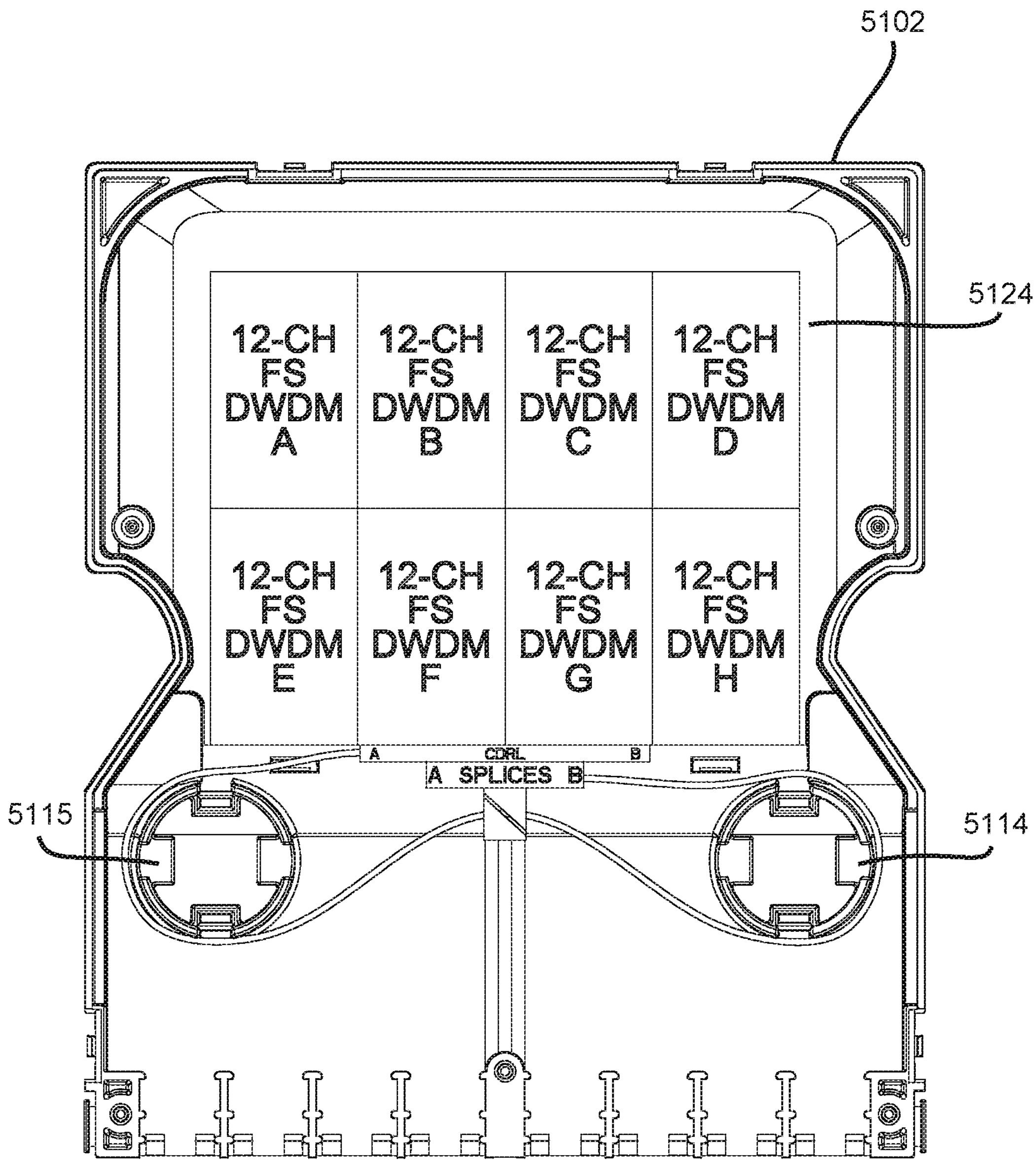
Figure 145W:
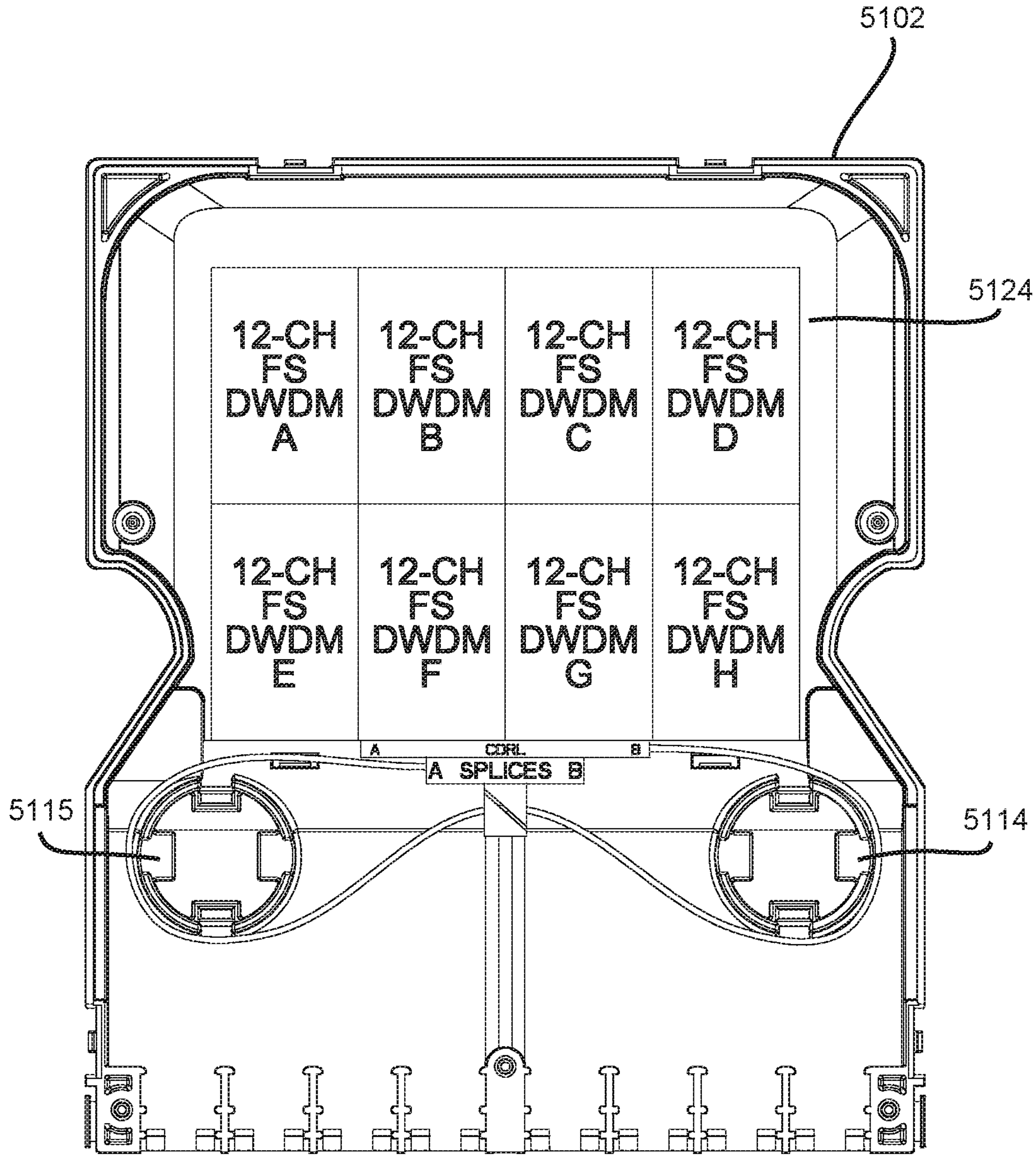
Figure 145X:
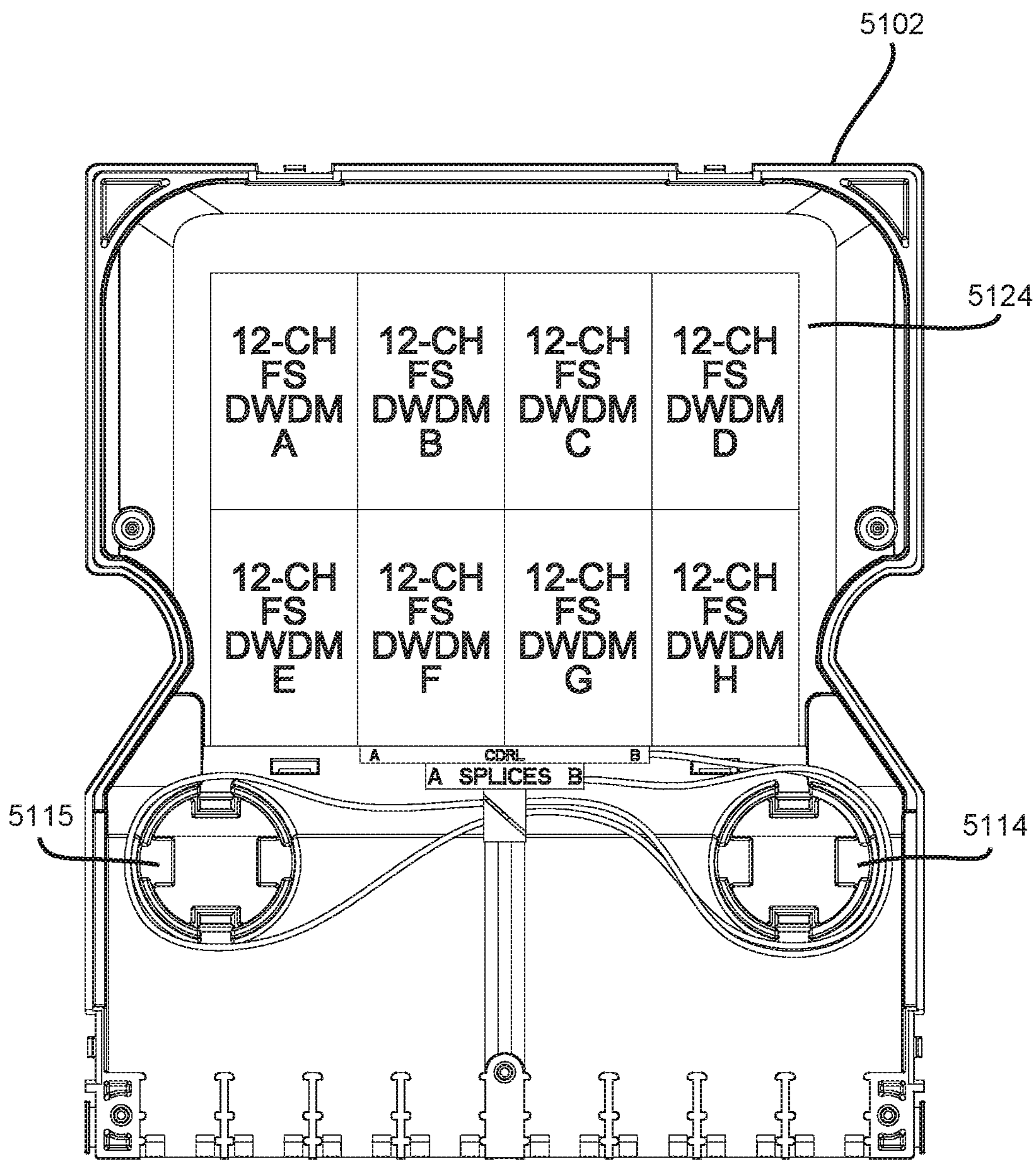

FIG. 74 is a front, right, top perspective view of another embodiment of a fiber optic cassette suitable for mounting on the main frame member of FIG. 37;

FIG. 75 is a top view of the fiber optic cassette of FIG. 74;

FIG. 76 is a bottom view of the fiber optic cassette of FIG. 74;

FIG. 77 is a right side view of the fiber optic cassette of FIG. 74;

FIG. 78 is a front, right, top exploded perspective view of the fiber optic cassette of FIG. 74;

FIG. 79 illustrates a top view of the fiber optic cassette of FIG. 74 with the cover removed to show the internal features thereof, the fiber optic cassette shown with a first example cable routing configuration within the cassette;

FIG. 80 illustrates the fiber optic cassette of FIG. 79 with a second example cable routing configuration within the cassette;

FIG. 81 illustrates the fiber optic cassette of FIG. 79 with a third example cable routing configuration within the cassette;

FIG. 82 illustrates the fiber optic cassette of FIG. 79 with a fourth example cable routing configuration within the cassette;

FIG. 83 illustrates the fiber optic cassette of FIG. 79 with a fifth example cable routing configuration within the cassette;

FIG. 84 illustrates the fiber optic cassette of FIG. 79 with a sixth example cable routing configuration within the cassette;

FIG. 85 illustrates the fiber optic cassette of FIG. 79 with a seventh example cable routing configuration within the cassette;

FIG. 86 illustrates the fiber optic cassette of FIG. 79 with an eighth example cable routing configuration within the cassette;

FIG. 87 illustrates the fiber optic cassette of FIG. 79 with a ninth example cable routing configuration within the cassette;

FIG. 88 illustrates the fiber optic cassette of FIG. 79 with a tenth example cable routing configuration within the cassette;

FIG. 89 illustrates the fiber optic cassette of FIG. 79 with an eleventh example cable routing configuration within the cassette;

FIG. 90 is a front, right, top perspective view of another embodiment of a fiber optic cassette suitable for mounting on the main frame member of FIG. 37;

FIG. 91 is a top view of the fiber optic cassette of FIG. 90;

FIG. 92 is a bottom view of the fiber optic cassette of FIG. 90;

FIG. 93 is a front view of the fiber optic cassette of FIG. 90;

FIG. 94 is a rear view of the fiber optic cassette of FIG. 90;

FIG. 95 is a right side view of the fiber optic cassette of FIG. 90;

FIG. 96 is a left side view of the fiber optic cassette of FIG. 90;

FIG. 97 is a front, right, top exploded perspective view of the fiber optic cassette of FIG. 90;

FIG. 98 illustrates a top view of the fiber optic cassette of FIG. 90 with the cover removed to show the internal features thereof, the fiber optic cassette shown with the MPO connectors removed from the fiber optic cassette;

FIG. 99 illustrates the fiber optic cassette of FIG. 98 with the MPO connectors mounted to the fiber optic cassette; and FIG. 100 illustrates a rear perspective view of a telecommunications rack configured to house multiple distribution panels similar to the distribution panel of FIG. 24, the telecommunications rack shown with one of the distribution panels mounted thereon and with an example cable routing configuration around portions of the rack;

FIG. 101 illustrates an example cable routing configuration for a fiber optic cassette similar to the cassette of FIGS. 50-71 mounted on the panel of FIG. 100, the cable routing shown for a rear side of the rack;

FIG. 102 illustrates an example cable routing configuration for the telecommunications rack of FIG. 100 for an incoming cable routed to the modules located on the rack, the cable incoming from the top of the rack;

FIG. 102A is a close up view of a portion of the cable routing configuration of FIG. 102;

FIG. 102B is a close up view of another portion of the cable routing configuration of FIG. 102;

FIG. 103 illustrates an example cable routing configuration for the telecommunications rack of FIG. 100 for an incoming cable routed to the modules located on the rack, the cable incoming from the bottom of the rack;

FIG. 103A is a close up view of a portion of the cable routing configuration of FIG. 103;

FIG. 103B is a close up view of another portion of the cable routing configuration of FIG. 103;

FIG. 104 illustrates an example cable routing configuration for the telecommunications rack of FIG. 100 for an incoming patch cord routed to the modules located on the rack, the patch cord incoming from the top of the rack;

FIG. 104A is a close up view of a portion of the cable routing configuration of FIG. 104;

FIG. 104B is a close up view of another portion of the cable routing configuration of FIG. 104;

FIG. 105 illustrates an example cable routing configuration for the telecommunications rack of FIG. 100 for an incoming cable that leads to a splice chassis of the rack, the cable incoming from the top of the rack;

FIG. 106 illustrates an example cable routing configuration for the telecommunications rack of FIG. 100 for an incoming cable that leads to a splice chassis of the rack, the cable incoming from the bottom of the rack;

FIG. 107 illustrates an example cable routing configuration within the rack for a pigtail cable extending from the modules of the telecommunications rack of FIG. 100 to a splice chassis of the rack;

FIG. 107A is a close up view of a portion of the cable routing configuration of FIG. 107;

FIG. 107B is a close up view of another portion of the cable routing configuration of FIG. 107;

FIG. 108 illustrates a front perspective view of the telecommunications rack of FIG. 100, showing an example cable routing configuration at the front side of the rack, the cables extending from the modules mounted on a distribution panel similar to the distribution panel of FIG. 24 which is mounted on the rack;

FIG. 109 illustrates an example cable routing configuration for a fiber optic cassette mounted on the panel of FIG. 100, the cable routing shown for a front side of the rack;

FIG. 110 illustrates an example cable routing configuration for cross-connect cabling within the same rack from one module on a panel to another module on another panel within the rack, the modules located on opposite sides of the rack;

FIG. 111 illustrates an example cable routing configuration for cross-connect cabling within the same rack similar to that shown in FIG. 110, however, between modules on the right side of the rack and between modules on the left side of the rack;

FIG. 112 illustrates an example cable routing configuration for cross-connect cabling between two of the telecommunications racks of FIG. 100;

FIG. 113 illustrates an example cable routing configuration for an interconnect routing on a single frame, wherein incoming patch cords are routed to the modules located on the rack, the patch cords incoming from the top of the rack;

FIG. 114 illustrates certain example methods of managing cable slack for cables routed within the rack of FIG. 100;

FIG. 115 is a perspective view of a bottom portion of the telecommunications rack of FIG. 100 including a sliding frame configured to hold telecommunications equipment such as splice cassettes;

FIG. 116 is an isolated view of a sliding frame of FIG. 115 with the splice cassettes removed for ease in viewing;

FIG. 117 is a top plan view of the telecommunications rack shown in FIG. 115 taken along a lateral cross-section so that the splice area is visible with the frame slid out to show the storage region;

FIG. 118 is a schematic diagram showing example cables routed through the storage area and sliding frame of FIG. 117;

FIG. 119 is a perspective view of a telecommunications fiber optic module, according to one embodiment;

FIG. 120 is a top view of the telecommunications fiber optic module of FIG. 119;

FIG. 121 is a front view of the telecommunications fiber optic module of FIGS. 119 and 120;

FIG. 122 is a front perspective view of a fiber distribution frame with multiple fiber optic connection modules mounted thereon in a stacked arrangement, according to one embodiment;

FIG. 123 is a top view of the fiber distribution frame of FIG. 122;

FIG. 124 is a rear perspective view of the fiber distribution frame of FIGS. 122 and 123;

FIG. 125 is an exploded view of a fiber optic cassette, according to one embodiment;

FIG. 126 is an assembled, perspective view of the fiber optic cassette of FIG. 125;

FIG. 127 is a perspective view of a fiber optic module, according to one embodiment;

FIG. 128 is a disassembled, perspective view of the fiber optic module of FIG. 127, showing the cassette exploded off the mount of the module;

FIG. 129 is a top view of the fiber optic module of FIGS. 127 and 128;

FIG. 130 is a disassembled, side view of the fiber optic module of FIGS. 127-129, showing the cassette exploded off the mount of the module;

FIGS. 131 and 133 are perspective views of a cassette similar to the cassettes of FIGS. 125-130 mounted to a bladed chassis system, according to one embodiment;

FIG. 132 shows the cassette exploded off the bladed chassis system of FIGS. 131 and 133;

FIG. 134 is a top view of the bladed chassis system of FIGS. 131-133;

FIG. 135 is a perspective view of a fiber optic cassette, according to an alternative embodiment, illustrated with the cover removed;

FIG. 136 is a top view of the fiber optic cassette of FIG. 135;

FIG. 137A is a top/rear perspective view of a pigtail adapter, according to one embodiment, with two parts of the adapter separated, and with one of the parts attached to a strain relief boot;

FIG. 137B is a top/front perspective view of the pigtail adapter of FIG. 137A, with the two parts of the adapter coupled together;

FIG. 138A is a top/front perspective view of an outer mounting body of the pigtail adapter of FIGS. 137A and 137B, according to one embodiment;

FIG. 138B is a top view of the outer mounting body of FIG. 138A;

FIG. 138C is top/rear perspective view of the outer mounting body of FIG. 138A;

FIG. 138D is a front view of the outer mounting body of FIG. 138A;

FIG. 138E is a side view of the outer mounting body of FIG. 138A;

FIG. 138F is a rear view of the outer mounting body of FIG. 138A;

FIG. 138G is a side, cross-sectional view of the outer mounting body of FIG. 138A;

FIG. 139 illustrates a 12-fiber array that has been terminated with LC format connectors at one end and crimped at a portion thereof to the pigtail adapter of FIGS. 137A and 137B, according to one embodiment;

FIG. 140 is an exploded view of a right-sided cassette assembly and a fiber array utilizing the pigtail adapter of FIGS. 137A and 137B for fixing a portion of the array to the cassette, according to one embodiment;

FIG. 141 is a top view of the cassette assembly and the fiber array of FIG. 140;

FIG. 142 is a top view of a left-sided cassette assembly having features that are similar to those shown in FIG. 140, according to an alternative embodiment;

FIG. 143 illustrates a left-sided cassette assembly that includes two 24-fiber arrays that have been terminated with LC format connectors at one end and crimped at a portion thereof to the pigtail adapters of FIGS. 137A and 137B and fixed to the cassette, according to an alternative embodiment (the connectors of the second array are not illustrated for simplicity);

FIG. 144 illustrates another left-sided cassette assembly similar to that shown in FIG. 143 that includes four 24-fiber arrays that have been terminated with LC format connectors at one end and crimped at a portion thereof to the pigtail adapters of FIGS. 137A and 137B and fixed to the cassette, according to an alternative embodiment (the connectors of three of the arrays are not illustrated for simplicity); and FIGS. 145A-145X illustrate the various fiber routing configurations that can be utilized within the cassette of the assemblies shown in FIGS. 140-144 using the radius limiters thereof depending upon the different types of optical equipment used therein and the desired connectivity applications.

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

A high-density distribution frame 10 is illustrated in FIGS. 1-7. The fiber distribution frame 10 defines a front side 12, a rear side 14, a right side 16, and a left side 18. The fiber distribution frame 10 includes multiple fiber optic connection modules 20 mounted thereon in a stacked arrangement. As will be described in further detail below, each of the connection modules 20 is separately slidable with respect to the frame 10 between a retracted position and an extended position for the purpose of accessing the fiber optic equipment located in or on the modules 20. The connection modules 20 are slidably extendable from a neutral position on the distribution frame 10 to an extended position in either the front or the back directions. Thus, if the fiber optic connection locations within the module 20 need to be accessed from the rear 14 of the distribution frame 10, the modules 20 can be slidably extended from the neutral position toward the rear 14 of the frame 10. Similarly, if the fiber optic connection locations within the module 20 need to be accessed from the front 12 of the distribution frame 10, the modules 20 can be slidably extended from the neutral position toward the front 12 of the frame 10. As will be explained in further detail below, the modules 20 include a latching arrangement configured to lock or position the modules 20 in the neutral retracted position and allow the modules 20 to be unlocked for slidable movement in either direction.

Still referring to FIGS. 1-7, as will be explained in further detail, the high-density fiber distribution frame 10 includes cable management features located on the left side 18 of the frame 10 and also generally underneath the stack of connection modules 20 for guiding input cables toward the frame 10 and guiding output cables away from the frame 10. In the present application, although the connection modules 20 are shown and described as being mounted on a fiber distribution frame such as that shown in FIGS. 1-7, the distribution frame 10 is only one example of a piece of fiber optic equipment to which such modules 20 may be mounted. The high-density fiber distribution frame 10 described herein may be used in a stacked arrangement in a telecommunications rack, such as that described in U.S. Pat. No. 6,591,051, incorporated herein by reference in its entirety. Such a telecommunications rack 300 is also shown in FIG. 24 with multiple prior art distribution frames or blocks 302 mounted thereon in a stacked arrangement. The example rack defines a vertical cable path 304 with cable management structures 306 for leading cables away from and toward the distribution frames/blocks 302.

Figure 9:
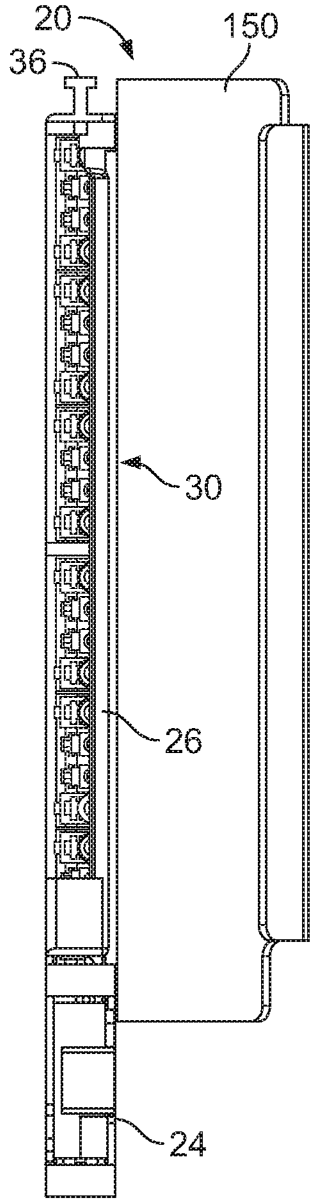
FIG. 9 is a front view of the fiber optic connection module of FIG. 8.

Now referring to FIGS. 8 and 9, one of the slidable fiber optic connection modules 20 is shown in isolation. The connection module 20 is shown in the neutral (retracted) position. The connection module 20 uses a three-piece slide assembly 22 that includes a rack and pinion arrangement allowing the connection module 20 to be slidable between the retracted and extended positions. By using a three-piece slide assembly 22 with a rack and pinion arrangement, a center member 24 of the slide assembly 22 moves with respect to both a main frame member 26 and a rack mount member 28 of the connection module 20. Due to the gear arrangement, the center member 24 moves at half the linear speed that the main frame member 26 moves with respect to the stationary rack mount member 28. Portions of the center member 24 of the slide assembly 22 may be used as handles for pulling and pushing the main frame member 26 between the extended and retracted positions. Since the center member 24 also moves while main frame member 26 is moving (at half the linear speed of the main frame member 26), the module 20 is configured to manage the slack in the cables routed through the module 20. The slide assembly 22 is configured such that when the connection module 20 is moved to either the front or the back extended position, cables extending from the main frame member 26, around radius limiters defined at the two ends of the center member 24, can maintain the same path length and are not stressed or pulled during the travel of the main frame member 26. Also, when the module 20 is being slid from the extended position to the neutral position, the slide assembly 22 allows the main frame member 26 to move in the same direction as the center member 24 (and the radius limiters located on ends of the center member 24), providing management of any slack in the cables routed through the module 20.

Still referring to FIGS. 8-9, as discussed, the connection module 20 includes a main frame member 26. The main frame member 26 is configured to provide connection locations 30 for the module 20. For each main frame member 26, at each of the right and left sides 32, 34 thereof, the main frame member 26 defines a dove-tail shaped longitudinal protrusion 36. At the left side 34 of the main frame member 26, the dove-tail shaped longitudinal protrusion 36 slides within a matching longitudinal groove 38 defined on the right side 40 of the center member 24. For each main frame member 26, at the right side 32 of the main frame member 26, the dove-tail shaped longitudinal protrusion 36 slides within one of multiple tracks 42 defined on the right side 16 of the high-density distribution frame 10.

As will be described in further detail below, the center member 24 slides between the rack mount member 28 (which may be stationarily mounted to a device such as the distribution frame 10) and the main frame member 26. The center member 24 defines a similar second longitudinal groove 44 on the left side 46 thereof that slides over a longitudinal protrusion 48 defined by the stationarily mounted rack mount member 28 such that the center member 24 can slide between the main frame member 26 and the rack mount member 28.

Each of the longitudinal protrusion 36 of the main frame member 26 and the longitudinal protrusion 48 of rack mount member 28 defines a rack. The racks 50, 52 in each of these members, respectively, meshes at the same time with a gear wheel 54 that is located within the center member 24. With such a rack and pinion arrangement of the slide assembly 22, synchronized slidable movement of the center member 24 and the main frame member 26 is established, while the rack mount member 28 stays stationary.

Thus, by pulling and pushing the center member 24, a user can slidably pull and push the main frame member 26 at the same time at twice the speed of the center member 24. Conversely, by moving the main frame member 26, the center member 24 also moves in the same direction as the main frame member 26, at half the speed of the main frame member 26 relative to the stationary rack mount member 28.

As such, the slide assembly 22 provides synchronized slidable movement for radius limiters located on the ends of the center member 24 relative to the main frame member 26. As noted above, the synchronized movement of the radius limiters of the center member 24 and the main frame member 26 ensures that cables routed from the connection locations 30 of the main frame member 26 do not bend too sharply when the main frame member 26 is being extended or retracted. If the cables were to bend too sharply or if the cables were stressed or pulled, loss of signal strength or loss of transmission may occur.

The rack mount member 28, in the depicted embodiment, includes fastener openings 54 for receiving fasteners for stationarily mounting the rack mount member 28 to a piece of telecommunications device such as the high distribution frame 10 shown in FIGS. 1-7.

Referring specifically now to FIGS. 10-15, the center member 24 that is used to pull and push the main frame member 26 includes a base member 60, a latch rod 62, and a cover member 64. The cover member 64 is configured to be coupled to the base member 60 with snap-fit connections, capturing the latch rod 62 therewithin.

When the center member 24 is initially in the neutral retracted state, it needs to be unlatched before it can be pulled or pushed. The latch rod 62 is configured to unlatch and latch the center member 24 with respect to the stationary rack mount member 28.

The latch rod 62 includes a front end 66 and a rear end 68 and a length 70 extending therebetween. At the front and rear ends 66, 68 thereof, the latch rod 62 includes a handle 72. Each handle 72 is used to pull or push the center member 24. At about midway along the length 70 of the latch rod 62, a gear housing 74 is located. The gear wheel 76 of the rack/pinion arrangement is located within the gear housing 74. As noted above, the gear wheel 76 includes gear teeth that are configured to simultaneously mesh with a first rack 52 provided in the rack mount member 28 and a second rack 50 provided on the main frame member 26. Adjacent both the front and rear sides of the gear wheel 76 is located a latching arrangement 80. The latching arrangement 80 includes a floating plate 82 defining a pin 84 therethrough. The pin 84 of the floating plate 82 resides in a groove 86 defined on the latch rod 62. The groove 86 defines an upside down V-shape configuration and has a middle peak point 88 and lower end points 90 at either side. When the pin 84 is positioned at the middle peak point 88, the plate 82 is at an upward position and is located within a notch 92 defined on the rack mount member 28 (please see FIG. 22). When the latch rod 62 is pulled or pushed, the pin 84 of the floating plate 82 moves downwardly along the groove 86 (having an upside down V-shape). The movement of the plate 82 downwardly clears the plate 82 from the notch 92 and the center member 24 can now be slidably pulled or pushed with respect to the rack mount member 28. The floating plate 82 is spring biased upwardly such that when the center member 24 is moved toward the neutral position, the plate 82 moves upwardly into the notch 92 of the rack mount member 28 when the plate 82 aligns with the notch 92, locking the center member 24 in place. Although only one of the floating plates 82 is shown in FIG. 11, the latch rod 62 includes a similar arrangement on both the front side and the rear side of the center gear wheel 76. Thus, the first rack 52 defined by the rack mount member 28 also includes notches 92 on both sides of the center gear 76.

As noted previously, once the floating plate 82 clears the notch 92, the gear 76 meshes with the racks 52, 50 defined on the rack mount member 28 and the main frame member 26 to start moving the main frame member 26 relative to both the center member 24 (at twice the speed of the center member 24) and the stationary rack mount member 28. It should be noted that when the handle 72 is pulled or pushed to unlock the module 20 and to move the pin 84 of the floating plate 82 from the peak 88 of the groove 86 toward either side of the groove 86, the gear wheel 76 rotates slightly to move the main frame member 26 in the same direction as the center member 24. When the pin 84 of the floating plate 82 reaches either of the lower ends 90 of the upside down V-shaped groove 86, the floating plate 82 is now completely out the notch 92 and the module 20 can freely slide.

At each of the front and rear ends 94, 96 of the center member 24 is located a cable management structure 98. The cable management structure 98 defines a spool 100 and a pair of cable management fingers 102. Along with the handle 72 and the spool 100, the cable management fingers 102 define a cable path 104 for fiber optic cables coming from or going to the main frame member 26. Once cables are lead around the spool 100, they are guided to the left side 18 of the high density distribution frame 10 to cable management structures found on the left side 18 of the frame 10.

It should be noted that cables from both the front and the back ends 25, 27 of the main frame member 26 are guided around a spool 100 located at each of the ends 94, 96 of the center member 24 and lead to the left side 18 of the distribution frame 10.

When the center member 24 moves, moving the main frame member 26 therewith, cables coming from the main frame member 26 that are routed around the spools 100 at each end 94, 96 of the center member 24 maintain a generally uniform length as they extend to the left side 18 of the distribution frame 10. For example, while the front end 25 of the main frame member 26 is moving toward the front 12 of the distribution frame 10, the front end 94 of the center member 24 and thus the spool 100 located at the front end 94 of the center member 24 also moves simultaneously with the main frame member 26, taking up any slack in the cable. Similarly, at the same time, while the rear end 27 of the main frame member 26 is moving toward the front 12 of the distribution frame 10, the rear end of the center member 26 and thus the spool 100 located at the rear end 96 of the center member 24 moves simultaneously in the same direction, reducing any pull or tension on the cable routed through the main frame member 26. The slide assembly 22 functions in the same manner when the main frame member 26 is moved in the rearward direction for accessing connection locations 30 from a rear side 14 of the distribution frame 10.

The interaction of the gear 76 within the center member 24 and the first rack 52 on the rack mount member 28 and the second rack 50 on the main frame member 26 is illustrated in FIGS. 20 and 21.

Referring to FIG. 10, tabs 110 located on the rack mount member 28 flex to fit within notches 112 defined on the cover member 64 of the center member 24 to provide stop points to indicate to a user a neutral position for the slide assembly 22.

Even though the base member 60 and the cover member 64 of the center member 24 are depicted as being coupled together with snap-fit interlocks via tabs 65 and recesses 67, other types of coupling arrangements may be used. For example, threaded fasteners may be used.

Figure 1:
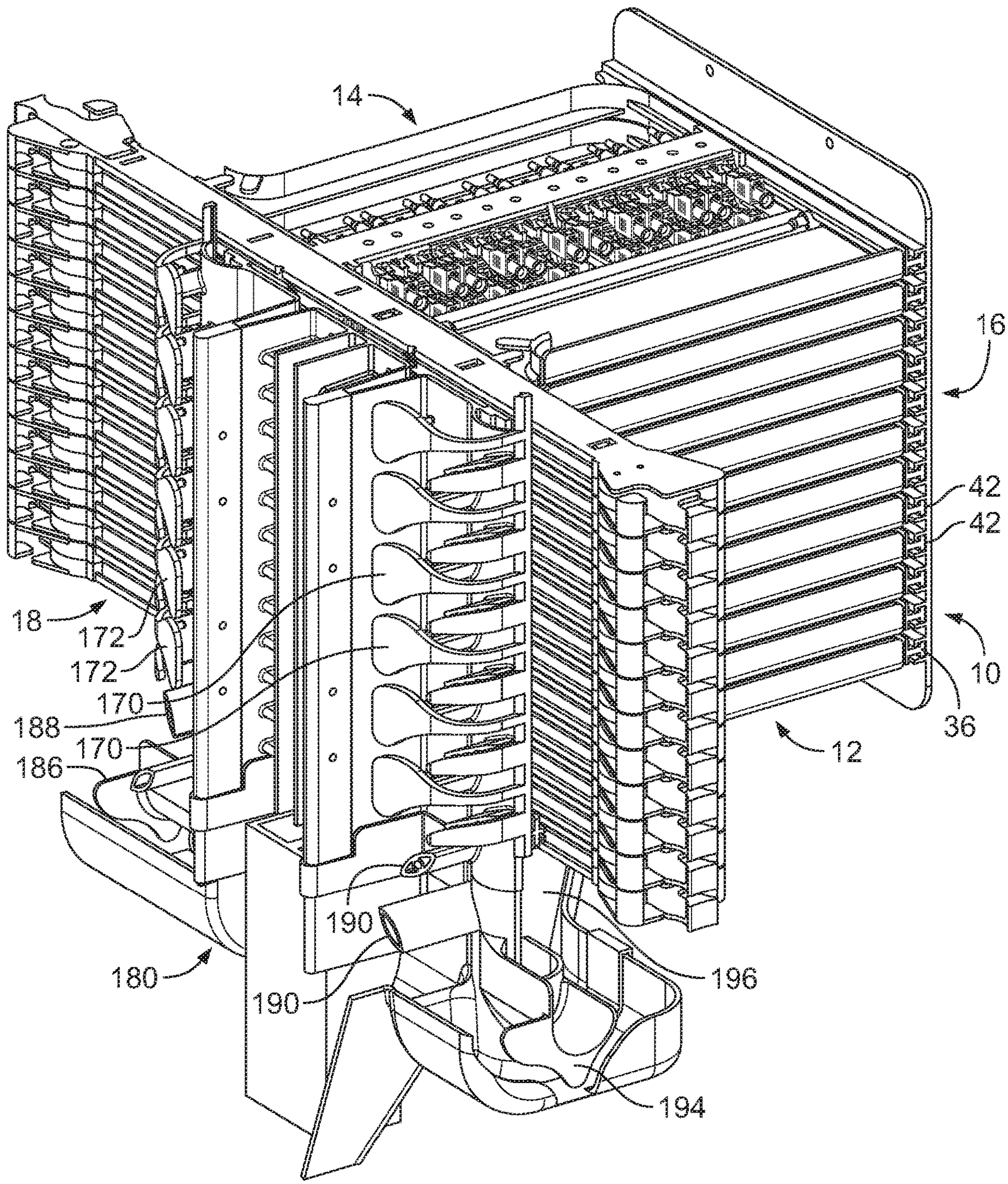
FIG. 1 is a front, left, top perspective view of a high-density fiber distribution frame shown with multiple slidable fiber optic connection modules having features that are examples of inventive aspects in accordance with the principles of the present disclosure mounted in a stacked arrangement thereon.
Figure 2:
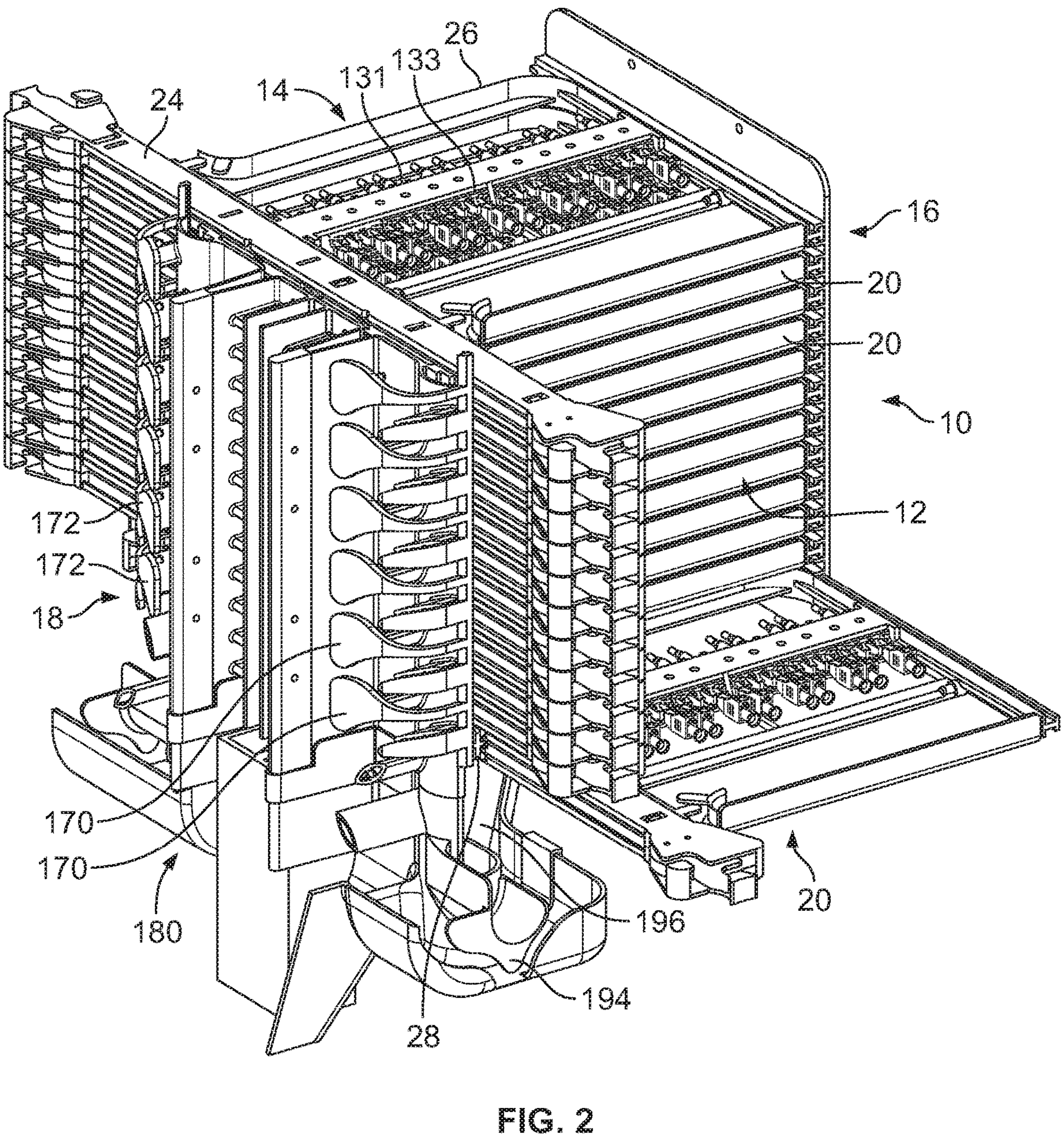
FIG. 2 illustrates the high-density fiber distribution frame of FIG. 1 with one of the slidable fiber optic connection modules in an extended position.

Referring back to FIGS. 8 and 9, the main frame member 26 is illustrated. The main frame member 26 includes a right wall 120 and a left wall 122. The right wall 120 defines the longitudinal protrusion 36 allowing the main frame member 26 to be slidably coupled to the right side 16 of the distribution frame 10. The left wall 122 includes a similar longitudinal protrusion 36 for sliding within the center member 24. As noted above, each of the longitudinal protrusions 36 of the right wall 120 and the left wall 122 defines a dovetail shaped profile for slidable insertion into dovetail shaped longitudinal groove 38 of the center member 24 and longitudinal track 42 defined on the right side 16 of the distribution frame 10 as shown in FIGS. 1 and 2. The dovetail shaped profiles provide for longitudinal slidable coupling between each center member 24 and main frame member 26 and each main frame member 26 and the distribution frame 10 while preventing uncoupling in a direction perpendicular to the sliding direction.

The longitudinal protrusion 36 on the left wall 122 of the main frame member 26 also defines the second rack 50 for meshing with the gear 76 located within the center member 24.

As discussed previously, by meshing with both the first rack 52 on the rack mount member 28 and the second rack 50 on the main frame member 26 at the same time, the gear 76 located on the center member 24 allows the center member 24 to move at half linear speed simultaneously with the main frame member 26 in the same direction.

The main frame member 26 is configured to provide fiber optic connection locations 30 for the connection module 20. By stacking multiple the modules 20 on a distribution frame 10, density of connections for fiber optic transmission can be increased and the slidability of the modules 20 in either the front direction or the back direction provides for easy access at the front 12 or the rear 14 of the distribution frame 10. As shown in FIGS. 8-9, the depicted version of the main frame member 26 includes a mount 130 for mounting fiber optic adapters 132 which define the fiber optic connection locations 30 in this embodiment of the module 20. Specifically, in the module 20 shown and described in the present application, the fiber optic connection locations 30 are defined by adapters 132 having an LC type footprint. In the depicted embodiments, twenty-four LC adapters 132 are mounted to the mount 130 via fasteners through fastener openings 134 defined on the mount 130. In the high density distribution frame 10 shown in FIGS. 1-7, twelve slidable modules 20 are mounted on the frame 10.

Other standards of fiber optic adapters 132 (such as SC adapters) can be mounted to the mount 130. Fiber optic adapters 132 are only one type of fiber optic equipment that provides connection locations 30 for the module 20 and the module 20 can be used with other types of fiber optic equipment. For example, equipment such as fiber optic splitters, couplers, multiplexers/demultiplexers, or other types of equipment wherein cables may be routed away from the connection locations 30 may be housed on the main frame member 26.

If fiber optic adapters are used, the connection locations may be defined by adapters individually mounted in the mount or may be defined by blocks that include integrally formed adapters. In other embodiments, the connection locations may be in the form of a cassette that includes fiber optic adapters on one side wherein the opposite side either has a multi-fiber connector or a cable extending outwardly therefrom, as described in further detail in U.S. Pat. No. 9,535,229, incorporated herein by reference in its entirety.

As long as multiple fiber optic cables (or even a single fiber optic cable) are being routed from the main frame member, around the radius limiters 100 of the center member 24, toward the left side 18 of the distribution frame 10, the slide assembly 22 of the module 20 provides access to those fiber optic terminations while managing the cable slack to prevent pinching and preventing pulling or stressing of the cables.

The left wall 122 of the main frame member 26 defines a cable management structure 136 adjacent the front side 25 of the main frame member 26. A second cable management structure 138 is also defined between the left wall 122 and the rear wall 123 of the main frame member 26 adjacent the rear 27 of the main frame member 26. Each of the first and second cable management structures 136, 138 includes a radius limiter 140, 142 and a pair of cable management fingers 144 for guiding cables from connection locations 30 toward ends 94, 96 of the center member 24.

The front side 25 of the main frame member 26 includes a plate 150 that is pivotably disposed. The plate 150 is configured to pivot downwardly by gravity when the module 20 has been extended forwardly and pivot upwardly by contact when the module 20 has been retracted to the neutral position. The plate 150, by pivoting downwardly, provides easier access to the connection locations 30 when the module 20 is in the forward extended position.

As noted above, after the cables coming from the connection locations 30 have been guided from the main frame member 26 around the spools 100 located at the ends 94, 96 of the center member 24, they are lead to the left side 18 of the distribution frame 10.

The distribution frame 10 defines multiple cable management fingers 170, 172, respectively, adjacent both the front 12 and the rear 14 at the left side 18 of the frame 10 for guiding cables downwardly/upwardly depending upon whether the cables are input or output cables.

After or before the cable management fingers 170, 172 (depending upon whether the cables are designated as input cables or output cables), the cables are routed through a trough system 180 located generally underneath the stacked modules 20.

Although an example cable routing will be described herein, it shall be understood that the routing used within the distribution frame 10 is only one example and that the distribution frame 10 may be used in a different manner.

According to one example use of the distribution frame 10, the rear sides 131 of the adapters 132 located within the module 20 may be used for connecting input signals and the front sides 133 of the adapters 132 may be used for output signals. According to the example routing, the cables carrying the input signals may be routed upwardly from the lower ramp 182 shown in FIG. 3 into the first horizontal trough 184 defined underneath the stacked modules 20. After going around a radius limiter 186 located adjacent the rear side 14 of the distribution frame 10, the cables are lead around a pair of management structures 188 located at the rear, left side 14/18 of the distribution frame 10 and up and around the cable management fingers 172 located adjacent the rear, left side 14/18 of the distribution frame 10. After the cables are passed around the cable management fingers 172, the cables may be guided around the spools 100 located at the back ends 96 of the center members 24 and into the main frame members 26 of the modules 20.

Figure 3:
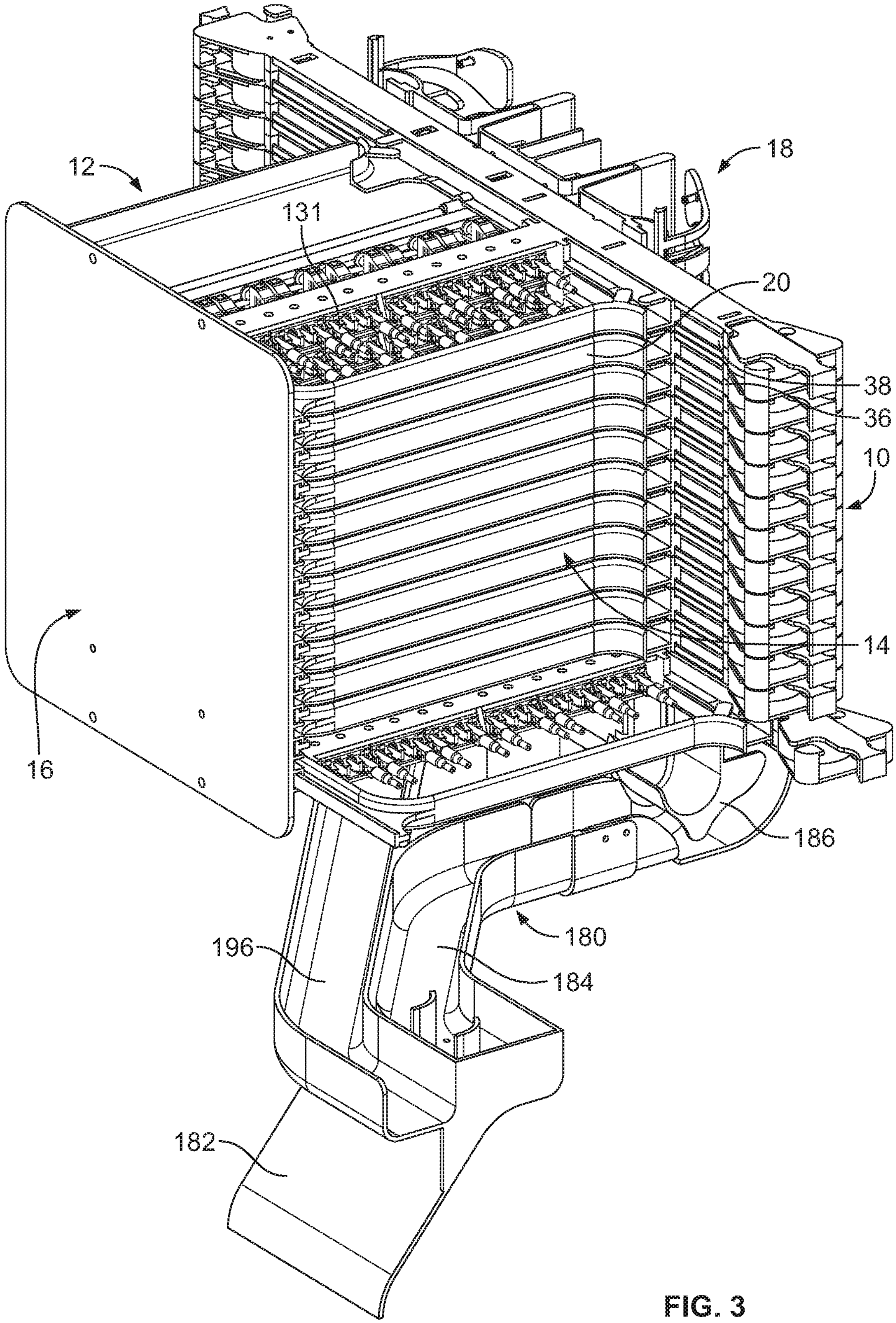
FIG. 3 is a rear, right, top perspective view of the high-density fiber distribution frame of FIG. 1.
Figure 4:
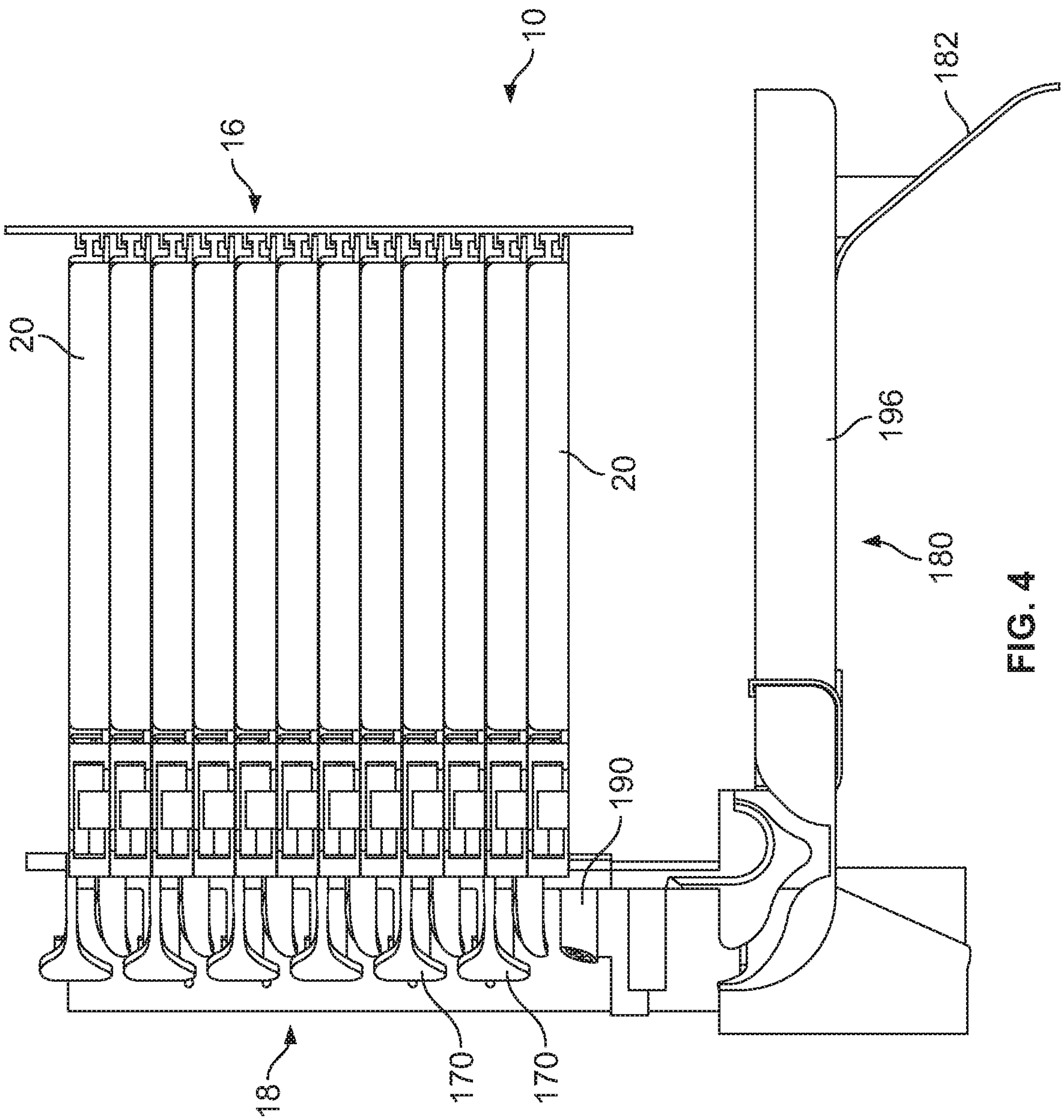
FIG. 4 is a front view of the high-density fiber distribution frame of FIG. 1.
Figure 5:
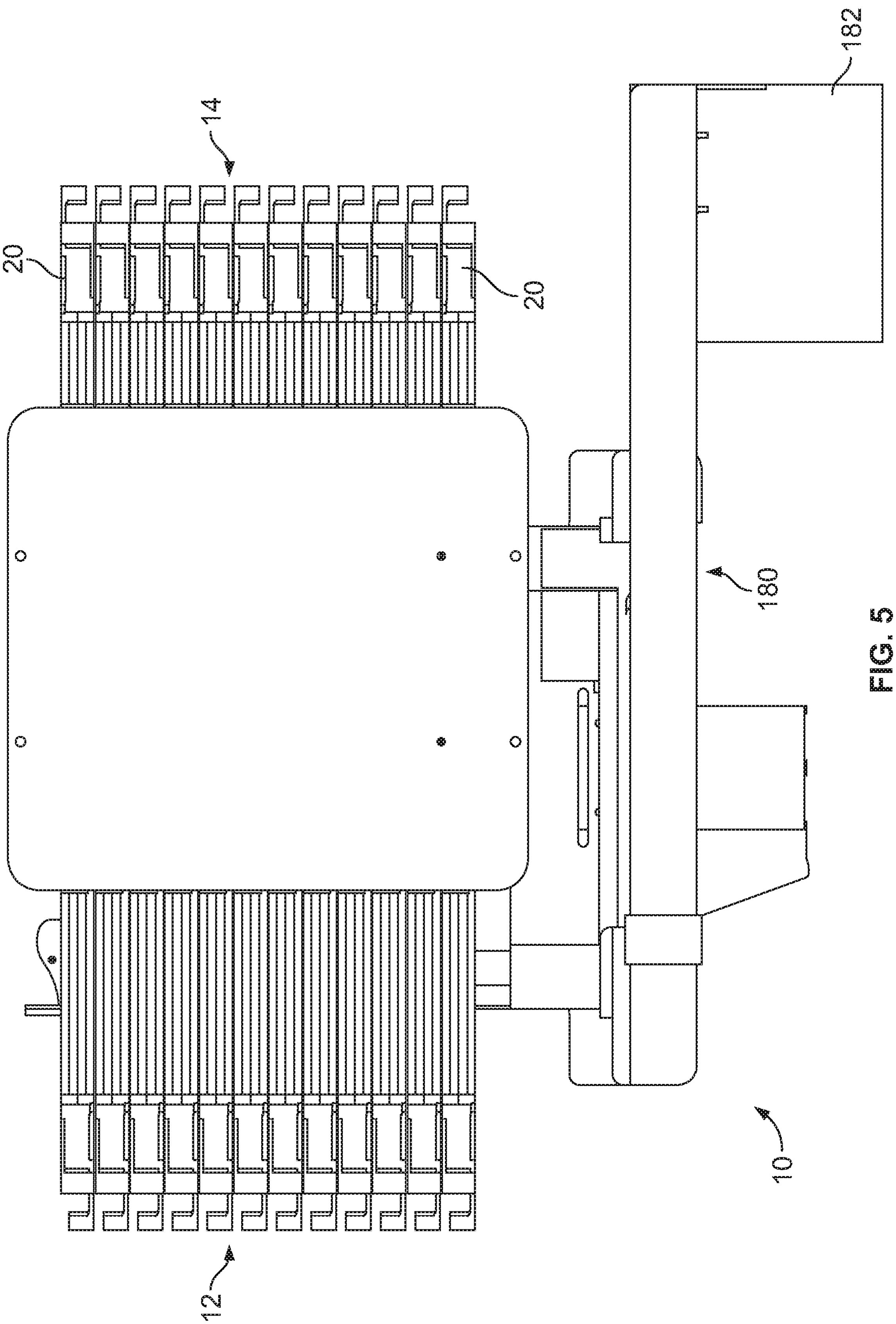
FIG. 5 is a right side view of the high-density fiber distribution frame of FIG. 1.
Figure 6:
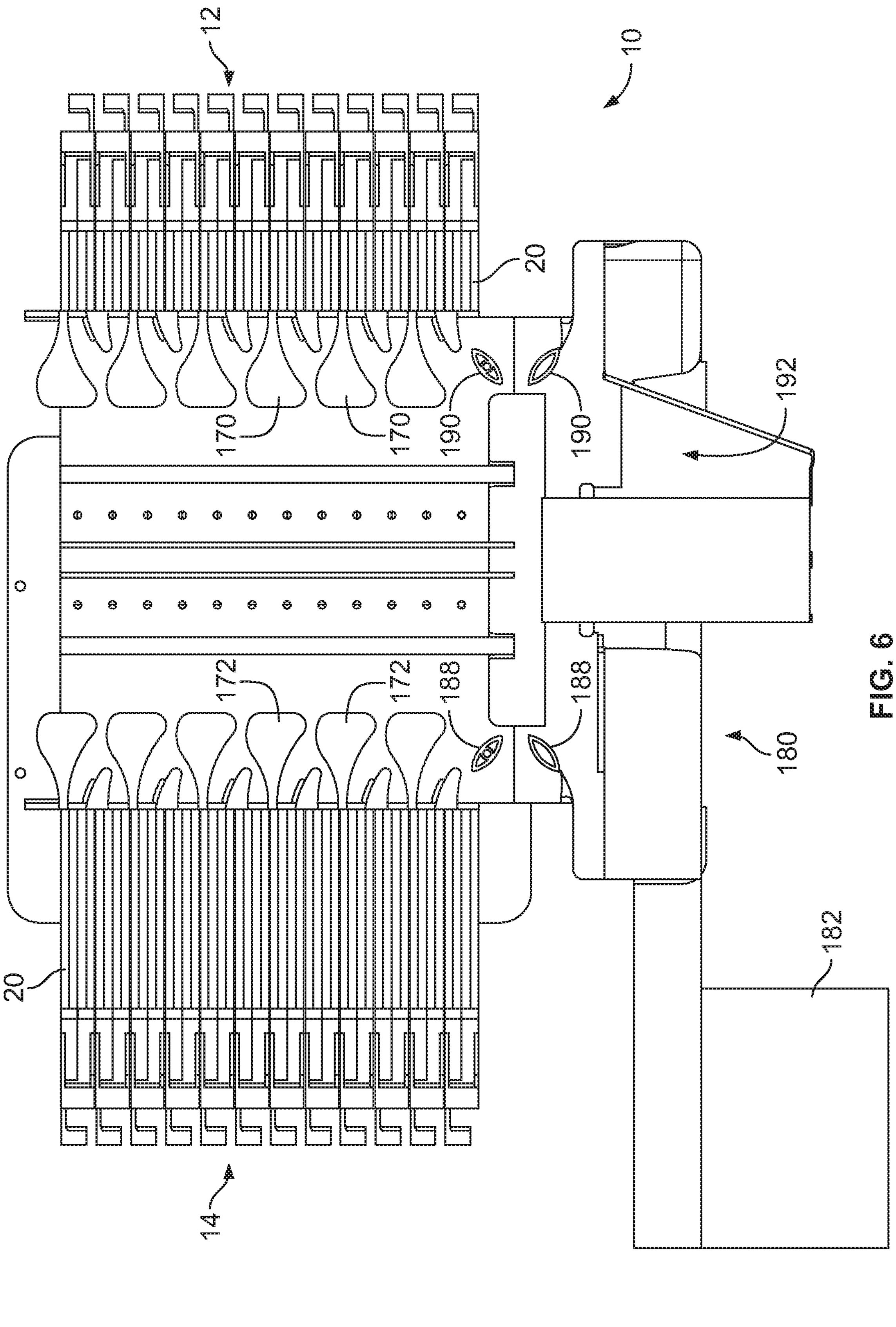
FIG. 6 is a left side view of the high-density fiber distribution frame of FIG. 1.
Figure 7:
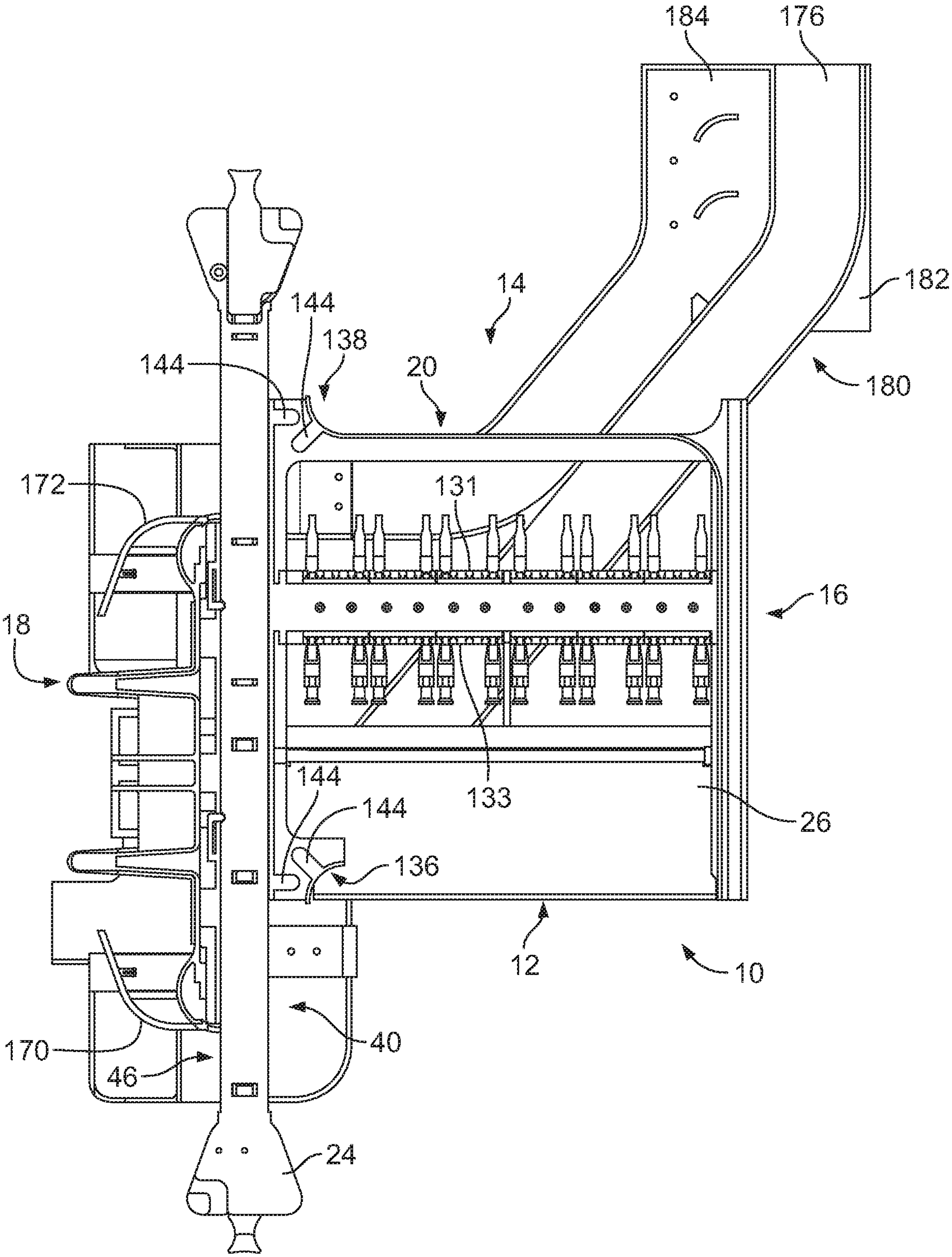
FIG. 7 is a top plan view of the high-density fiber distribution frame of FIG. 1.

The cables carrying the output signal may be lead out of the main frame members 26 and around the spools 100 at the front ends 94 of the center members 24. After going over the cable management fingers 170 adjacent the front, left side 12/18 of the distribution frame 10, cables carrying the output signal can go around a pair of management structures 190 located at the front, left side 12/18 of the distribution frame 10. From the pair of management structures 190, the output cables can either be directly lead downwardly through a vertical path 192 defined at the left side 18 of the distribution frame 10 or can be lead around a radius limiter 194 located at the front side 12 of the distribution frame 10 into a second horizontal trough 196 as shown in FIGS. 1-3. Within the second horizontal trough 196 that extends underneath the stacked modules 20, the output cables can go diagonally from the front, left side 12/18 of the frame 10 to the rear, right side 14/16 of the frame 10 for further connection.

As noted above, the distribution frame 10 may be modified to reverse the input and output cables and change the cable management paths thereof accordingly.

In accordance with some aspects, certain types of adapters 132 may be configured to collect physical layer information from one or more fiber optic connectors 135 received thereat. For example, as shown in FIG. 23, certain types of adapter modules 132 may include a body 200 configured to hold one or more media reading interfaces 220 that are configured to engage memory contacts on the fiber optic connectors 135. One or more media reading interfaces 220 may be positioned in the adapter body 200. In certain implementations, the adapter body 200 defines slots 210 extending between an exterior of the adapter body 200 and an internal passage in which the ferrules of the connectors 135 are received.

Certain types of media reading interfaces 220 include one or more contact members 221 that are positioned in the slots 210. As shown in FIG. 23, a portion of each contact member 221 extends into a respective one of the passages to engage memory contacts on a fiber optic connector 135. Another portion of each contact member 221 also extends out of the slot 210 to contact a circuit board 230. Portions of the main frame member 26 may define conductive paths that are configured to connect the media reading interfaces 220 of the adapter 132 with a master circuit board. The master circuit board may include or connect (e.g., over a network) to a processing unit that is configured to manage physical layer information obtained by the media reading interfaces.

Example adapters having media reading interfaces and example fiber optic connectors having suitable memory storage and memory contacts are shown in U.S. Pat. No. 8,690,593, the entire disclosure of which is hereby incorporated herein by reference.

Referring now to FIGS. 25-36, another embodiment of a slidable fiber optic connection module 300 having features that are examples of inventive aspects in accordance with the present disclosure is illustrated.

In FIG. 25, multiple the slidable fiber optic connection modules 300 are shown in a stacked arrangement on a rack mount telecommunications panel 302 (e.g., a 19-inch panel in the depicted example). As noted for previous embodiments, even though the connection modules 300 are shown and described as being mounted on a rack mount telecommunications panel such as that shown in FIG. 25, the panel 302 is only one example of a piece of fiber optic equipment to which such modules 300 may be mounted and other telecommunications equipment may be used. The rack mount panel 302 will be used to illustrate and describe the inventive aspects of the connection modules 300.

The telecommunications panel 302 defines an open front end 304, an open rear end 306, a right side 308 defined by a right wall 310, a left side 312 defined by a left wall 314, a top side 316 defined by a top wall 318, and a bottom side 320 defined by a bottom wall 322. The panel 302 includes mounting brackets 324 attached to the right and left walls 310, 314 for mounting the panel 302 to a standard telecommunications rack. The panel 302, in the depicted embodiment, includes a center divider 326 that splits the panel 302 into a right half 328 and a left half 330.

In the given embodiment, the arrangement of the modules 300 on the right half 328 of the panel 302 mirrors the arrangement on the left half 330 of the panel 302. As such, in the depicted example, panel 302 includes twelve modules 300 in a stacked arrangement from the bottom to the top side of the panel 302 at the left half 330 of the panel 302 and twelve modules 300 in a stacked arrangement at the right half 328 of the panel 302.

As will be described in further detail below, the connection modules 300 include certain features that are similar to the modules 20 describe above. However, the connection modules 300 are configured such that if connection locations of the modules need to be accessed from a front end 304 of the panel 302, a front handle 332 must be pulled (and pushed in retraction of the module 300) from the front end 304 of the panel 302 and if the connection locations of the modules 300 need to be accessed from a rear end 306 of the panel 302, a rear handle 334 of the connection modules 300 must be pulled (and pushed in retraction of the module 300) from the rear end 306 of the panel 302. As will be discussed in further detail below, each module 300 provides stop features such that the front handle 332 cannot be used to push the module 300 all the way to the rear end 306 where it can be accessed from the rear end 306 and that the rear handle 334 cannot be used to push the module 300 all the way to the front end 304 where it can be accessed from the front end 304 of the panel. Each of the front and rear handles 332, 334 can only be used to move the modules 300 from a neutral position to their respective sides and back to the neutral position.

FIGS. 26-32 illustrate a module 300 in isolation. Similar to the modules 20 described above (with certain differences), each module 300 uses a three-piece slide assembly 336 that includes a rack and pinion arrangement 338 allowing the connection module 300 to be slidable between a retracted neutral and an extended position. By using a three-piece slide assembly 336 with a rack and pinion arrangement 338, a center member 340 of the slide assembly 336 moves with respect to both a main frame member 342 and a rack mount member 344 of the connection module 300. As discussed with respect to the previous embodiment 20, due to the gear arrangement 338, the center member 340 moves at half the linear speed that the main frame member 342 moves with respect to the stationary rack mount member 344.

Since the center member 340 moves while main frame member 342 is moving (at half the linear speed of the main frame member 342), the module 300 is configured to manage the slack in the cables routed through the module 300, as discussed previously.

The main frame member 342 of the module 300 is configured to provide connection locations 346 for the module 300. Referring now to each module 300 that is located at the left half 330 of the rack mount telecommunications panel 302, for example, the main frame member 342 of the module 300 defines a dove-tail shaped longitudinal protrusion 348 at each of the right and left sides 350, 352 thereof. For those modules 300 that are at the left half 330 of the rack mount panel 302, at the left side 352 of the main frame member 342, the dove-tail shaped longitudinal protrusion 348 slides within a matching longitudinal groove 354 defined on the right side 356 of the center member 340. At the right side 350 of each main frame member 342, the dove-tail shaped longitudinal protrusion 348 slides within one of multiple tracks 358 defined by the center divider 326 of the rack mount telecommunications panel 302. This configuration is reversed or mirrored for modules 300 that are at the right half 328 of the telecommunications panel 302. As such, the details of the modules 300 at the right half 328 of the telecommunications panel 302 will not be discussed further, with the understanding that the configuration and the operation of the modules 300 on the right half 328 of the panel 302 are similar to the configuration and the operation of the modules 300 on the left half 330 of the panel 302.

Regarding the modules 300 at the left half 330 of the panel 302, as in previous modules 20 described above, the center member 340 slides between the rack mount member 344 (which is stationarily mounted to the panel 302) and the main frame member 342. The center member 340 defines a similar second longitudinal groove 360 on the left side 362 thereof that slides over a longitudinal protrusion 364 defined by the stationarily mounted rack mount member 344 such that the center member 340 can slide between the main frame member 342 and the rack mount member 344.

Similar to the previous embodiments discussed, each of the longitudinal protrusion 348 of the main frame member 342 and the longitudinal protrusion 364 of rack mount member 344 defines a rack. The racks 370, 372 in each of these members, respectively, meshes at the same time with a gear wheel 374 that is located within the center member 340. With such a rack and pinion arrangement 338 of the slide assembly 336, synchronized slidable movement of the center member 340 and the main frame member 342 is established, while the rack mount member 344 stays stationary.

Thus, by pulling and pushing the center member 340, a user can slidably pull and push the main frame member 342 at the same time at twice the speed of the center member 340. Conversely, by moving the main frame member 342, the center member 340 also moves in the same direction as the main frame member 342, at half the speed of the main frame member 342 relative to the stationary rack mount member 344.

The synchronized movement of radius limiters of the center member 340 and the main frame member 342 ensures that cables routed from the connection locations 346 of the main frame member 342 do not bend too sharply when the main frame member 342 is being extended from or returned to the neutral position. If the cables were to bend too sharply or if the cables were stressed or pulled, loss of signal strength or loss of transmission may occur.

In the depicted embodiment of the rack mount telecommunications panel 302, the rack mount member 344 of the modules 300 and the panel 302 include complementary interlock features for mounting the rack mount members 344 to the telecommunications panel 302 with a snap-fit interlock. In the depicted embodiment, each rack mount member 344 defines a dove-tail shaped longitudinal protrusion 380 that is slidably inserted into a dove-tail shaped longitudinal groove 382 defined by each of the right and left walls 310, 314 of the telecommunications panel 302. The longitudinal grooves 382 of the telecommunications panel 302 extend from the front side to the rear side of the panel 302 and are configured to receive the rack mount members 344 in a direction along a front to back direction.

Each rack mount member 344 also defines an elastically flexible cantilever arm 384 at the front and rear ends 386, 388 thereof, each configured to form a snap-fit interlock with the right and left walls 310, 314 of the panel. As shown in FIG. 25, when referring to, for example, the modules 300 on the right half 328 of the panel, when each rack mount member 344 is being slidably inserted into the longitudinal groove 382 of the panel 302 in a direction from the front side to the rear side of the panel 302, the cantilever arm 384 that is at the rear 388 of the rack mount member 344 (the cantilever arm 384 that is located forwardly in the advancing direction) flexes slightly to allow the longitudinal protrusion 380 of the rack mount member 344 to slidably fit within the groove 382 of the panel 302. When the rack mount member 344 has been slid all the way, the flexible arm 384 at the rear 388 flexes back to snap over a portion of the right wall 310 of the panel 302. The flexible cantilever arm 384 at the front end 386 of the rack mount member 344 provides a stop and prevents further advancement of the rack mount member 344 within the longitudinal groove 382. When removing the rack mount member 344 from the panel 302, depending upon which direction the rack mount member 344 will be removed, one of the rear or front flexible arms 384 must be flexed outwardly to clear the panel 302 before the rack mount member 344 can be slid in an opposite direction. The same procedure for inserting and removing rack mount members 344 can be used for rack mount members 344 that are on the left half 330 of the panel 302. It will also be noted that the rack mount members 344 that are used at the right side of the panel 302 can also be used on the left side of the panel 302 if they are flipped 180 degrees.

Referring specifically now to FIGS. 29-32, the configuration and the operation of the center member 340 of the modules 300 will be described.

Referring to a module 300 that is, for example, oriented to be located at the left half 330 of the rack mount panel 302, the center member 340 of the module 300 includes a base member 390, a cover member 392, and a front latch rod 394 and a rear latch rod 396. The cover member 392 is configured to be coupled to the base member 390 with snap-fit connections, capturing the front and rear latch rods 394, 396 therewithin.

When the center member 340 is initially in the neutral state in the panel 302, it needs to be unlatched before it can be pulled to an extended state. As will be described in further detail, the front and rear latch rods 394, 396 are configured to cooperate in unlatching and latching the center member 340 with respect to the stationary rack mount member 344 for movement between the neutral position and the extended position. As also will be described in further detail, the front and rear latch rods 394, 396 also cooperate to ensure that the front handle 332 cannot be used to push the module 300 all the way to the rear end of the panel 302 where it can be accessed from the rear end and the rear handle 334 cannot be used to push the module 300 all the way to the front end of the panel 302 where it can be accessed from the front end and that each of the front and rear handles 332, 334 can only be used to move the modules 300 from a neutral position to their respective sides and back to the neutral position.

Still referring to FIGS. 29-32, the front latch rod 394 includes a front end 398 and a rear end 400. At the front end 398 of the front latch rod 394 is the handle 332 that is used to pull the center member 340 from a neutral position to an extended position and is used to push the center member 340 from the extended position back to the neutral position. The handle 332 is positioned and slidably rides within a slot 402 defined at the front end 404 of the base 390 of the center member 340. Similarly, the rear latch rod 396 also includes the handle 334 that is positioned and slidably rides within a slot 406 defined at the rear end 408 of the cover 392 of the center member 340. The handles 332, 334, as will be discussed in further detail below, are configured for unlatching the center member 340 from the rack mount member 344 for moving the center member 340 with respect to the rack mount member 344. As will be described, for example, when the handle 332 at the front of the center member 340 is used to unlatch the center member 340, the handle 332 moves the front latch rod 394 slightly forwardly with respect to the base 390 of the center member 340 in freeing up the center member 340 from the rack mount member 344 to move the center member 340. When the handle 332 is used to unlatch and push the center member 340 back to the neutral position, the handle 332 also moves the front latch 394 slightly in the rearward direction in freeing up the center member 340 from the rack mount member 344 to move the center member 340.

As shown in FIG. 29, at the rear end 400 of the front latch rod 394 is a crescent shaped cam groove 412. The cam groove 412 is configured to impart movement to a floating plate 414 that includes a pin 416 extending therethrough. The floating plate 414 is axially fixed with respect to the base 390 of the center member 340. The floating plate 414 resides and is configured to slidably ride within a slot 418 (similar to slot 446 on the base member 390 that receives another floating plate 426 as shown in FIG. 29) defined on the base 390 of the center member 340 along a direction extending between left and right. The floating plate 414 is constrained from moving front or back with respect to the base 390 of the center member 340 due to the slot 418.

The pin 416 of the floating plate 414 is configured to slide within the cam groove 412 such that floating plate 414 can move axially with respect to the front latch rod 394 and also in a direction from right to left with respect to the front latch rod 394.

Since the floating plate 414 is constrained axially with respect to the base 390 of the center member 340 along a front to back direction by being housed within the slot 418, any movement of the base 390 of the center member 340 moves the floating plate 414 axially in the same amount. As noted above, the front latch rod 394 is configured so that it can move or float with respect to the base 390 to a certain extent to cam the float plate 414 out of engagement with the rack mount member 344. And, any axial movement of the floating plate 414 with respect to the front latch rod 394 occurs within the cam groove 412 of the front latch rod 394, wherein the floating plate 414 is always constrained from moving axially with respect to the base 390 due to being housed in the slot 418.

The rear latch rod 396 includes a similar configuration to the front latch rod 394. The rear latch rod 396 also includes the handle 334 at a rear end 420 and a cam groove 422 adjacent a front end 424 thereof. The rear latch rod 396 includes a floating plate 426 with a pin 428 extending therethrough that allow the rear latch rod 396 to act in a similar fashion to the front latch rod 394.

The base 390 of the center member 340 also defines a gear housing 430. The gear wheel 374 of the rack/pinion arrangement 338 is located within the gear housing 430. As noted above, the gear wheel 374 includes gear teeth that are configured to simultaneously mesh with a first rack 372 provided in the rack mount member 344 and a second rack 370 provided on the main frame member 342.

As shown in FIGS. 29-32, the rack mount member 344 defines a front notch 432, a rear notch 434, and an elongated middle notch 436. The notches 432, 434, 436 of the rack mount member 344 are configured to interact with the floating plates 414, 426 of the front and rear latch rods 394, 396 in allowing movement of the center member 340 of the module 300 with respect to the rack mounting member 344, as described below.

When the center member 340 (and thus the module 300) is in the neutral position, the floating plate 414 of the front latch rod 394 is positioned at a front edge 438 of the elongate middle notch 436 and the floating plate 426 of the rear latch rod 396 is positioned at a rear edge 440 of the elongate middle notch 436 (please see FIGS. 30 and 30A). At this point, both of the floating plates 414, 426 are positioned at the peaks 442 of the cam grooves 412, 422. It should be noted that the front and rear latching rods 394, 396 can be spring loaded to position the floating plates 414, 426 at the peaks 442 of the cam grooves 412, 422 as long as the floating plates 414, 426 have the clearance to move into the notches 432, 434, 436 defined on the rack mount member 344. In one example embodiment, a spring can engage the floating plates 414, 426 directly and bias the plates 414, 426 in a direction from the right to left to cause the plates 414, 426 to fit into the notches 432, 434, 436 when the plates 414, 426 are aligned with any of the notches 432, 434, 436. In other embodiments, springs could be positioned axially within the front and rear latch rods 394, 396 to cause the latch rods 394, 396 to move until the latch rods 394, 396 position the floating plates 414, 426 into any of the nearby notches 432, 434, 436.

Still referring to FIGS. 29, 30 and 30A, in the neutral position, when both of the floating plates 414, 426 are positioned within the middle notch 436, pulling on the front handle 332 starts to move the floating plate 414 from left to right out of the elongate middle notch 436 of the rack mount member 344. This is caused by the pin 416 encountering the cam profile of the cam groove 412 and moving to a lower point along the groove 412 at the rear end 444 of the groove 412. At this point, the front latch rod 394 has floated slightly forwardly with respect to the base 390 of the center member 340.

As the pin 416 of the floating plate 414 contacts the rear end 444 of the cam groove 412, the front latch 394 stops floating within the base 390 and starts moving the base 390 therewith. The rear latch rod 396, which is axially engaged with the base 390 of the center member 340 through the floating plate 426 within a slot 446, starts moving with the base 390. Since the rear floating plate 426 is riding along the elongate notch 436, the pin 428 of the rear floating plate 426 simply stays at the peak 442 of the rear cam groove 422.

Referring now to FIGS. 29, 31, and 31A, when the floating plate 414 of the front latch rod 394 encounters the front notch 432 of the rack mount member 344, the plate 414 is spring biased into the notch 432, providing a stop point to indicate to a user that the module 300 is at an extended position. At this point, the floating plate 426 of the rear latch rod 396 has encountered the front edge 438 of the elongate notch 436 of the rack mount member 344. Any more pull on the front handle 332 at this point will move the front latch rod 394 slightly within the base 390 until the pin 416 of the front floating plate 414 contacts the rear end 444 of the crescent cam groove 412 and the front latch rod 394 will start to move together with the base 390. However, since the base 390 is axially fixed with respect to the rear floating plate 426 via the slot 446, and the rear floating plate 426 is contacting the front edge 438 of the elongate notch 436, the base 390 cannot be pulled any further with respect to the rack mount member 344. Thus, the rear floating plate 426 and the front edge 438 of the elongate middle notch 436 cooperatively act as a stop feature for the extended position of the module 300.

When the front handle 332 is used to push the center member 340 back to a retracted neutral position, a rearward push on the handle 332 slightly floats the front latch rod 394 with respect to the base 390. The pin 416 of the floating plate 414 starts to encounter the cam profile of the cam groove 412 and starts moving the floating plate 414 rightward out of the front notch 432 of the rack mount member 344. The pin 416 of the floating plate 414, once it contacts a front end 450 of the cam groove 412 stops the floating of the front latch rod 394 with respect to the base 390 of the center member 340 and starts to move the base 390 with the front latch rod 394. This is, again, due to the front floating plate 414 being within the slot 418 and not being axially movable with respect to the base 390.

At this point, since the entire base 390 is moving and since the rear floating plate 426 is still within the elongate slot 436 and is able to move freely, the rear latch rod 396 also moves with the base member 390. The rear floating plate 426 slides along the elongate middle notch 436 until the front floating plate 436 reaches the front edge 438 of the middle elongate notch 436 and the rear floating plate 426 encounters the rear edge 440 of the middle notch 436. The front floating plate 414 is then biased back into the middle notch 436 in a right to left direction. This provides an indication to the user that the module 300 is now in the neutral retracted position.

As noted previously, the front and rear latch rods 394, 396 cooperate to ensure that the front handle 332 cannot be used to push the module 300 all the way to the rear side of the panel 302 where it can be accessed from the rear side and that the rear handle 334 cannot be used to push the module 300 all the way to the front side of the panel 302 where it can be accessed from the front side. Each of the front and rear handles 332, 334 can only be used to move the modules 300 from a neutral position to their respective sides and back to the neutral position.

This is accomplished because the floating plates 414, 426 are both constrained axially with respect to the base 390 of the center member 340 along a front to back direction by being housed within their respective slots 418, 436. Any movement of the base 390 of the center member 340 moves the floating plates 414, 426 axially in the same amount. The floating plates 414, 426 can only move axially with respect to the front latch rod 394 or the rear latch rod 396 as the front latch rod 394 and the rear latch rod 396 float within the base 390 of the center member 340.

Thus, when the center member 340 is in the neutral position, any push on the front handle 332 will either move the handle 332 slightly until it contacts the end of the slot 402 defined at the front 404 of the base 390 or move the front latch rod 394 within the base 390 slightly until the pin 416 of the floating plate 414 contacts the front end 450 of the cam groove 412. When this occurs, the front latch rod 394 will no longer float within the base 390 and the two will have to start moving together. Since the base member 390 does not move axially with respect to the floating plates 414, 426 (due to, for example, the rear floating plate 426 being within the slot 436 defined on the base 390), any further pushing on the handle 332 of the front latch rod 394 and thus on the center member 340 is prevented the due to the rear floating plate 426 being in contact with the rear edge 440 of the elongate notch 436 of the rack mount member 344. In this manner, the front handle 332 cannot be used to push the module 300 all the way to the rear side of the panel 302 where it can be accessed from the rear side of the panel 302.

In the depicted embodiment, as described above, the base 390, the front latch rod 394, the rear latch rod 396, and the cover 392 of the center member 340 are arranged such that the rear handle 334 is configured to ride within a slot 406 defined on the cover 392 and the front handle 332 is configured to ride within a slot 402 defined on the base 390 of the center member 340.

The mechanism described above operates in the opposite manner for pulling and pushing the rear handle 334 of the center member 340 for accessing the connection modules 300 from a rear side of the panel 302. The position of the front and rear floating plates 414, 426 within the middle and rear notches 436, 438 of the rack mount member 344 are illustrated in FIGS. 32 and 32A when the modules 300 is extended rearwardly.

Similar to the embodiment described previously, even though the base 390 and the cover 392 of the center member are depicted as being coupled together with snap-fit interlocks via tabs 452 and recesses 454, other types of coupling arrangements may be used. For example, threaded fasteners may be used.

As in the previous embodiment of the module, at each of the front and rear ends 454, 456 of the center member is located a cable management structure 458. The cable management structure 458 defines a spool 460 and a pair of cable management fingers 462. Along with the handle 332, 334 and the spool 460, the cable management fingers 462 define a cable path 464 for fiber optic cables coming from or going to the main frame member 342. For those modules 300 that are located at the left half 330 of the rack mount panel 302, once cables are lead around the spool 460, they are guided outwardly away from the left side of the panel 302.

It should be noted that cables from both the front and the back ends 466, 468 of the main frame member 342 are guided around a spool 460 located at each of the ends 454, 456 of the center member 340 and lead away from the panel 302.

For the modules 300 that are at the left half 330 of the panel 302, for example, when the center member 340 moves, moving the main frame member 342 therewith, cables coming from the main frame member 342 that are routed around the spools 460 at each end 454, 456 of the center member 340 maintain a generally uniform length as they extend to the left side of the panel.

As discussed previously, while the front end 466 of the main frame member 342 moves toward the front side of the panel 302, the front end 454 of the center member 340 and thus the spool 460 located at the front end 454 of the center member 340 also moves simultaneously with the main frame member 342, taking up any slack in the cable. Similarly, at the same time, while the rear end 468 of the main frame member 342 moves toward the front side of the panel 302, the rear end 456 of the center member 340 and thus the spool 460 located at the rear end 456 of the center member 340 moves simultaneously in the same direction, reducing any pull or tension on the cable routed through the main frame member 342.

The slide assembly 336 functions in the same manner when the main frame member 342 is moved in the rearward direction for accessing connection locations 346 from a rear side of the panel 302 by pulling the handle 334 at the rear end 456 of the center member 340.

Referring back to FIGS. 26-28, the main frame member 342 is illustrated. Similar to the modules 20 described above and referring again to the modules 300 located at the left half 330 of the panel 302 for reference, the main frame member 342 includes a right wall 470 and a left wall 472. The right wall 470 defines the longitudinal protrusion 348 allowing the main frame member 342 to be slidably coupled to the divider 326 at the center of the telecommunications panel 302. The left wall 472 includes a similar longitudinal protrusion 348 for sliding within the center member 340. As noted above, each of the longitudinal protrusions 348 of the right wall 470 and the left wall 472 may define a dovetail shaped profile for slidable insertion into dovetail shaped longitudinal groove 354 of the center member 340 and longitudinal track 358 defined on the center divider 326 of the telecommunications panel 302 as shown in FIG. 25.

The longitudinal protrusion 348 on the left wall 472 of the main frame member 342, as noted above, also defines the second rack 370 for meshing with the gear 374 located within the center member 340.

As discussed previously, by meshing with both the first rack 372 on the rack mount member 344 and the second rack 372 on the main frame member 342 at the same time, the gear 374 located on the center member 340 allows the center member 340 to move at half linear speed simultaneously with the main frame member 342 in the same direction.

The main frame member 342 is configured to provide fiber optic connection locations 346 for the connection module 300. By stacking multiple the modules 300 on both halves 328, 330 of the rack mount telecommunications panel 302, density of connections for fiber optic transmission can be increased and the slidability of the modules 300 in either the front direction or the back direction provides for easy access at both the front side or the rear side of the panel 302.

As shown in FIGS. 26-28, the depicted version of the main frame member 342 includes a mount 474 for mounting fiber optic adapters 476 which define the fiber optic connection locations 346 in this embodiment of the module 300. In the depicted embodiment, the mount 474 is defined by a first interlock structure 478 on the right wall 470 that defines dove-tail shaped protrusions and a second interlock structure 480 on the left wall 472 that defines dove-tail shaped grooves. The first and second interlock structures 478, 480 are configured for receive fiber optic adapter blocks 482, 484 having complementary shapes to the first and second interlock structures 478, 480. For example, a first fiber optic adapter block 482 shown in FIG. 28 includes dove-tail shaped protrusions 486 on a left wall 488 thereof for slidable insertion into the second interlock structure 480 and dove-tail shaped grooves 490 on the right wall 492 thereof for slidably coupling to a second adapter block 484 with similar interlocking features. The second adapter block 484 defines dove-tail shaped protrusions 494 on the left wall 496 thereof, where it can be mated with the first adapter block 482 and dove-tail shaped grooves 498 on the right wall 500 thereof that can mate with the first interlock structure 478 of the main frame member 342. In this manner, two adapter blocks 482, 484 can be aligned and slidably interlocked and engaged with the main frame member 342. In the example module 300 shown and described in the present application, the fiber optic connection locations 346 are defined by the first adapter block 482 having adapters 476 with an LC type footprint. The second adapter block 484 that is slidably mated with the first adapter block 482 defines adapters 476 having an SC type footprint.

The slidable mounting of the adapter blocks 482, 484 provides the advantage of being able to replace the entire connection module 300 without disturbing the connections that are being routed through the connection locations 346 of the main frame member 342. The adapter blocks 482, 484 can simply be slid out and provide clearance for replacing the module 300.

In the depicted embodiments, twelve LC adapters 476 are provided on each block 482. The main frame member 342 is configured such that another block 482 of twelve LC adapters 476 can be mounted side by side with the first block 482 such that twenty-four connections can be provided on each module 300. With the panel 302 populated with twelve modules 300 at the left half 330 and twelve modules 300 at the right half 328, the telecommunications panel 302 can include up to 576 fiber optic connections if LC type adapters 476 are used.

In the embodiment shown, if an SC type footprint is used, each module 300 can accommodate up to twelve connections.

It should be noted that the connection modules 300 can be used with a single standard or mixed standards of adapters 476 and connectors as shown in FIG. 28. Fiber optic adapters 476 are only one type of fiber optic equipment that provides connection locations 346 for the module 300 and the module 300 can be used with other types of fiber optic equipment. For example, equipment such as fiber optic splitters, couplers, multiplexers/demultiplexers, or other types of equipment wherein cables may be routed away from the connection locations 346 may be housed on the main frame member 342.

If fiber optic adapters 476 are used, the connection locations 346 may be defined by adapters 476 individually mounted in the mount 474 or may be defined by blocks that include integrally formed adapters 476 such as those shown in FIG. 28. In other embodiments, the connection locations 346 may be in the form of a cassette that includes fiber optic adapters on one side wherein the opposite side either has a multi-fiber connector or a cable extending outwardly therefrom, as described in further detail in U.S. Pat. No. 9,535,229, incorporated herein by reference in its entirety.

As long as plurality of fiber optic cables or even a single fiber optic cable is being routed from the main frame member 342, around the radius limiters 460 of the center member 340, the slide assembly 336 of the module 300 provides access to those fiber optic terminations while managing the cable slack to prevent pinching and preventing pulling or stressing of the cables.

Similar to the embodiment of the module 20 discussed previously, a first cable management structure 502 is defined adjacent the left wall 472 at the front 466 of the main frame member 342. A second cable management structure 504 is also defined adjacent the left wall 472 at the rear 468 of the main frame member 342. Each of the first and second cable management structures 502, 504 includes a radius limiter 506 and a cable management finger 508 that defines cable paths 510 for guiding cables from connection locations 346 toward ends 454, 456 of the center member 340.

Referring now to FIGS. 25, 28, and 33-36, the panel 302 defines a pair of doors 512 (one at the front side of the panel 302 and one at the rear side of the panel 302) for each of the modules 300 mounted on the panel 302. Each door 512 is pivotally coupled to a hinge structure 514 located generally at the center of the panel 302, defined by each of the front and rear ends of the center divider 326. A first hinge 514*a* structure is located at the front of the panel 302 for the front doors 512*a* and a second hinge structure 514*b* is located at the rear of the panel 302 for the rear doors 512*b*.

Each door 512 is spring loaded and biased to be in a closed position. As will be discussed in further detail below, the doors 512 are temporarily locked in the closed position by the main frame members 342 of the modules 300 and are allowed to be opened by the movement of the main frame members 342 from a neutral position to an extended position.

As shown in FIGS. 33-36, each of the cable management structures 502, 504 of the main frame member 342 defines a lock tab 516 that is configured to snap fit within a lock groove 518 of the door 512. Referring to a module 300 that is at the left half 330 of the panel 302 for reference, when the main frame member 342 is at the retracted neutral position, the lock tab 516 is within the lock groove 518, keeping the door 512 in a closed position (please see FIG. 33). Once the main frame member 342 is started to initially move toward the extended position, a cam surface 520 defined by a wall 522 of the radius limiter 506 that is on the opposite side from the cable path 510, starts to abut the a wall 524 defined adjacent the lock groove 518 of the door 512 and starts pivoting the door 512 outwardly from the panel 302 (please see FIG. 34). Once the cam surface 520 has advanced the door 512 far enough to clear the lock tab 516 out of the lock groove 518 of the door 512, the right wall 470 of the main frame member 342 starts to contact the door 512 and completely pivot it to an open position (please see FIG. 35). The door 512 is shown in an initially closed position in FIG. 33. In FIG. 34, the main frame member 342 is starting to slide and the cam surface 520 of the radius limiter 506 is starting to advance the door 512 so as to move the lock tab 516 out of the lock groove 518 of the door 512. In FIG. 35, the door 512 is seen as being contacted by the right wall 470 of the main frame member 342 to pivot it to a fully open position. In FIG. 36, the door 512 is shown in a fully open position.

When the main frame member 342 is moved to the neutral retracted position, the spring biasing the door 512 to the closed position pivots the door 512 to the closed position. When the door 512 is fully closed, the lock tab 516 ends up within the lock groove 518 of the door 512, not allowing the door 512 to be opened until the main frame member 342 of the module 300 is slidably pulled forwardly.

Referring now to FIG. 37, a main frame member 600 of another embodiment of a connection module having features that are examples of inventive aspect in accordance with the principles of the present disclosure is illustrated. Except for the differences which will be highlighted hereafter, the main frame member 600 includes features similar to and operates in a similar manner to the main frame member 342 described above and shown in FIGS. 25-36. The main frame member 600 is configured to be part of a connection module that can be mounted on a rack mount telecommunications panel such as panel 302 described above and shown in FIG. 25. The main frame member 600 is configured to be coupled to the rack mount telecommunications panel through a three-piece slide assembly that also includes a rack mount member and a center member, wherein the main frame member 600 is configured to move at twice the speed of the center member with respect to the rack mount member due to a rack and pinion arrangement.

Still referring to FIG. 37, the main frame member 600 defines a front wall 602 and a rear wall 604. The front and rear walls 602, 604 extend between a right wall 606 and a left wall 608. A center divider 610 also extends from the front wall 602 to the rear wall 604. As in main frame member 342 described above, the right wall 606 of the main frame member 600 defines a longitudinal protrusion 612 allowing the main frame member 600 to be slidably coupled to the telecommunications panel 302. The left wall 608 includes a similar longitudinal protrusion 612 for sliding within the center member of the connection module. As in the previous embodiments, each of the longitudinal protrusions 612 of the right wall 606 and the left wall 608 may define a dovetail shaped profile for slidable insertion into dovetail shaped longitudinal groove of the center member and longitudinal track defined on the telecommunications panel.

The longitudinal protrusion 612 on the left wall 608 of the main frame member 600, as noted for previous embodiments, also defines a rack 614 for meshing with the gear located within the center member (see FIG. 39).

As discussed previously, by meshing with both a first rack on the rack mount member and a second rack 614 on the main frame member at the same time, the gear assembly located on the center member allows the center member of the module to move at half linear speed simultaneously with the main frame member 600 in the same direction.

The main frame member 600 is configured to provide fiber optic connection locations 616 for the connection module. As discussed above, by stacking multiple the modules on both halves of the rack mount telecommunications panel, density of connections for fiber optic transmission can be increased and the slidability of the modules in either the front direction or the back direction provides for easy access at both the front side and the rear side of the panel.

Similar to the embodiment of the modules discussed previously, a first cable management structure 618 is defined adjacent the left wall 608 at the front of the main frame member 600. A second cable management structure 620 is also defined adjacent the left wall 600 at the rear of the main frame member 600. Each of the first and second cable management structures 618, 620 includes a radius limiter 622 and a cable management finger 624 that defines a cable path 626 for guiding cables from connection locations 616 toward ends of the center member of the module.

As shown in FIG. 37, the depicted version of the main frame member 600 includes a first interlock structure 628 on the left wall 608, a second interlock structure 630 on the center divider 610, and a third interlock structure 632 on the right wall 606 of the main frame member 600 for mounting equipment for providing fiber optic connection locations 616 for the module. The first interlock structure 628 defines a groove 634 and a flexible tab 636. The flexible tab 636 defines a ramped finger 637, a portion of which extends at least partially into the groove 634. The third interlock structure 632 on the right wall 606 of the main frame member 600 includes the same configuration as the first interlock structure 628. The second interlock structure 630 on the center divider 610 is configured for cooperating with both the first interlock structure 628 of the left wall 608 and the third interlock structure 632 of the right wall 606 in receiving telecommunications equipment that provides connection locations 616. As such, the second interlock structure 630 defines a groove 638 having twice the width as the grooves 634 of the first and the third interlock structures 628, 632.

As will be described in further detail below and as noted previously, the first, second, and third interlock structures 628, 630, 632 are configured to receive equipment such as fiber optic adapter blocks 640 having mounting structures with complementary shapes to those of the first, second, and third interlock structures 628, 630, 632. For example, a fiber optic adapter block 640 that may be mounted on the main frame member 600 is shown in FIGS. 72 and 73. In the depicted embodiment of the main frame member 600, two such fiber optic adapter blocks 640 may be mounted in a side by side configuration, wherein one adapter block 640 extends between the left wall 608 and the center divider 610 and the second block 640 extends between the center divider 610 and the right wall 606.

Referring now to the example fiber optic adapter block 640 shown in FIGS. 72 and 73, on each of the right and left sides 642, 644 of the adapter block 640 is provided a dovetail shaped mounting structure 646. Each of the dovetail mounting structures 646 is configured to be slidably inserted into the grooves 634, 638 defined by the first, second, and third interlock structures 628, 630, 632 of the main frame member 600. Since the second interlock structure 630 of the main frame member 600 defines a groove 638 having twice the width of the grooves 634 of the first and third interlock structures 628, 632, dovetail mountain structures 646 of two adapter blocks 640 can fit in a side by side arrangement into the groove 638 of the second interlock structure 630. The flexible tabs 636 of the first and third interlock structures 628, 632 are configured to elastically flex and snap back into position when receiving the dovetail mounting structures 646 of the adapter blocks 640, with the ramped finger 637 retaining the adapter blocks 640 when received therein.

As noted previously, the slidable mounting of the adapter blocks 640 provides the advantage of being able to replace either the blocks 640 themselves or the entire connection module without disturbing the connections that are being routed through the connection locations 616 of the main frame member 600. If the entire module needs to be replaced, the adapter blocks 640 can simply be slid out and provide clearance for replacing the module.

In the depicted embodiments, twelve LC type adapters 650 are provided on each block 640. The depicted main frame member 600 is configured such that two blocks 640 having twelve LC adapters 650 each can be mounted side by side providing a total of that twenty-four connections on each module. With a telecommunications panel such as the panel 302 shown in FIG. 25 populated with twelve modules at the left half and twelve modules at the right half, up to 576 fiber optic connections can be provided if LC type adapters 650 are used.

In the embodiment shown, if an SC type footprint is used, each main frame member 600 can accommodate up to twelve connections.

The adapter block 640 illustrated in FIGS. 72 and 73 defines a generally one-piece molded body 652 that defines multiple integrally formed adapters 650 (LC format in the depicted example) for optically connecting fiber optic cables terminated with connectors. Each of the adapter blocks 640 defines multiple adapters 650 provided in a stacked arrangement in a longitudinal direction D, such as from a right side to a left side of the adapter block 640, wherein every other adapter 650 of the block of adapters is staggered in a transverse direction T, such as in a front to back direction with respect to an adjacent adapter 650 for facilitating finger access. The adapter blocks 640 shown in FIGS. 72 and 73 are similar in configuration to adapter blocks described and shown in U.S. Pat. No. 9,075,203, the entire disclosure of which is incorporated herein by reference. Thus, further details of the adapter blocks 640 will not be described herein.

As noted previously, fiber optic adapters 650 are only one type of fiber optic equipment that may provide connection locations 616 for the module and the module can be used with other types of fiber optic equipment. For example, equipment such as fiber optic splitters, couplers, multiplexers/demultiplexers, or other types of equipment wherein cables may be routed away from the connection locations may be housed on the main frame member 600.

In yet other embodiments, the connection locations 616 may be provided by telecommunications equipment in the form of a cassette that includes fiber optic adapters 650 on one side wherein the opposite side either has a multi-fiber connector or a cable extending outwardly therefrom, as described in further detail in U.S. Pat. No. 9,535,229, that has been incorporated herein by reference.

In FIGS. 38-49, an example of a fiber optic cassette 660 that has a pair of the fiber optic adapter blocks 640 mounted on one side and a pair of multi-fiber connectors 662 extending from the opposite side is shown as being mounted on the main frame member 600. In FIGS. 50-71, another example of a fiber optic cassette 760 that has a pair of the fiber optic adapter blocks 640 mounted on one side and a pair of cables 762 extending outwardly from the opposite side is shown as being mounted on the main frame member 600.

Now referring back to FIGS. 72 and 73, each adapter block 640 defines a ramped tab 654 adjacent the dovetail mounting structure 646 on each of the right and left sides 642, 644 of the adapter block 640. As will be discussed in further detail below, the ramped tabs 654 allow the adapter blocks 640 to be snap-fit and become part of telecommunications equipment such as the fiber optic cassette 660 of FIGS. 38-49 or the fiber optic cassette 760 of FIGS. 50-71. The ramped tabs 654 are positioned and configured such that they allow the adapter blocks 640 to be mounted directly to the main frame member 600 if desired via the dovetail mounting structures 646. Or, the tabs 654 allow the adapter blocks 640 to be first snap-fit to the fiber optic cassettes 660, 760 and then mounted to the main frame member 600 as part of the fiber optic cassettes 660, 760 using the same dovetail mounting structures 646 of the adapter blocks 640.

Now referring to FIGS. 38-49, the fiber optic cassette 660 is shown in further detail. The fiber optic cassette 660 includes a body 664 defining an open front 666, a rear wall 668, a pair of sidewalls 670, 672 (i.e., right and left sidewalls), a bottom wall 674, and a top in the form of a removable cover 676, all defining an interior 678 of the cassette 660.

Cassette body 664 defines a cable entry location 680 which in the illustrated embodiment is along the rear wall 668. A pair of MPO style connectors 662 coming from an exterior of the cassette 660 are coupled to a pair of MPO style connectors 662 through a pair of adapters 682 at the cable entry location 680. The adapters 682 are provided in a staggered arrangement along the longitudinal direction D for facilitating finger access.

As shown, each of the connectorized cables 684 extending outwardly from the cassette 660 includes a boot 686 to provide strain relief at cable entry location 680.

As shown, two of the adapter blocks 640 are configured to be snap-fit to the cassette 660 in a side by side configuration at the open front 666 thereof, closing the front 666 of the cassette 660. The bottom wall 674 of the cassette body 664 defines a front end 688 that matches the staggered configuration of the adapters 650 of the adapter block 640.

Once coupled, the adapters 650 of the blocks 640 are stacked along the longitudinal axis D. The cables 684 at cable entry location 680 extend parallel to the longitudinal axis D, although some bending is permitted relative to the longitudinal axis D.

In general, the top defined by the cover 676 and the bottom wall 674 of the cassette 660 are generally parallel to each other and define the major surfaces of cassette body 664. Sidewalls 670, 672, front 666, and rear wall 668 define the minor sides of cassette body 664. The cassette 660 can be oriented in any position, so that the top and bottom surfaces can be reversed, or positioned vertically, or at some other orientation.

In the interior 678, LC connectorized cables that are broken out from each internal MPO connector 662 are led toward the front 666 of the cassette 660 and coupled to the rears 692 of the LC adapters 650 of each adapter block 640, wherein they can mate with LC connectors 651 coupled at the fronts 694 of the LC adapters 650.

As shown in FIGS. 40, 44, and 46, the front end 677 of the cover 676 of the cassette 660 is notched to accommodate the latches 653 of the inner LC connectors 651. The notches 679 of the cover 676 also provide a visual indication to the exterior of the cassette 660 which adapters 650 have been populated. Since a number of LC connector manufacturers provide their connectors in different colors to indicate different properties of the connections, being able to visually see the different types of LC connectors 651 through the cover 676 may also assist a technician in determining to which telecommunications manufacturers/providers the populated connections belong and the types of the populated connections.

Referring now, for example, to FIG. 109, the main frame member 600, the notched front end 677 of the cover 676 of the cassette, and the telecommunications panel 302 to which the main frame member 600 is slidably mounted are configured such that when the module is pulled all the way out of the panel 302 (with the door 512 pivoted all the way out), the cassette 660 extends out of the panel 302 just enough to be able to see the different colors of the latches of the inner LC connectors 651 from an exterior. In this manner, when a technician pulls out one of the modules, the positioning of the cassette 660 on the main frame member and the positioning of the notched front end 677 of the cover 676 on the cassette are such that visual identification of the colors is possible without having to remove the module from the panel 302. The positioning of the notches of the front end 677 of the cover 676 of the cassette 660 relative to the panel 302 is shown in FIG. 109 from a top perspective view to illustrate this advantage.

This feature may be used on all of the embodiments of the modules/cassettes noted in the present application. Main frame member 600 and the panel 302 are used as an exemplary embodiment to describe and illustrate this feature and should not be used to limit the scope of the disclosure.

Disposed within interior 678 of cassette body 664 are multiple radius limiters 696 which provide cable bend radius protection for the fibers disposed within interior. Cable radius limiters 696 can be in the form of discrete interior structures, and/or curved exterior surfaces which form around the front, rear wall, and side walls.

Removable cable retention fingers 698 may also be provided for retaining cables within the interior 678 of the cassette 660. Each cable retention finger 698 defines an L-shaped configuration, wherein a mounting portion 697 is removably received within a pocket 700 defined around various parts of the cassette 660 and a retaining portion 699 extends toward the interior 678 of the cassette body 664.

Fibers may be provided with excess length between the interior MPO connectors 662 and the inner LC connectors 651 coupled to the rears 692 of the adapters 650. Severe bending of the fibers is to be avoided. In the illustrated embodiment, the small size of the cassette 660 may require that some fibers reverse direction.

As noted above, the adapter blocks 640 are configured such that they can be snap-fit to the cassette body 664 and also be mounted to the main frame member 600 as part of the cassette 660. The ramped tabs 654 adjacent the dovetail mounting structures 646 snap into openings 702 provided on the right and left sidewalls 670, 672 and at a center divider wall 671 at the front 666 of cassette body 664. The right and left sidewalls 670, 672 of the cassette body 664 are elastically flexible in receiving the ramped tabs 654. On each side of each adapter block 640, a protrusion 704 that is above the ramped tab 654 also provides a guiding effect in sliding the ramped tab 654 into the openings 702 and sits on top of a front portion of the cassette 660 after the adapter block 640 has been snap-fit thereto, as shown in FIG. 41.

Once the adapter blocks 640 have been snap-fit to the cassette 660, the dovetail mounting structures 646 are used to slide the adapter blocks 640 and thus the cassette 660 into the first, second, and third interlocking structures 628, 630, 632 of the main frame member 600 as noted above.

The fiber optic cassette 660 also includes certain structures that are used to key and couple the cassette 660 to the main frame member 600 in addition to the mounting structures 646 provided by the adapter blocks 640. For example, as shown in FIGS. 43, 45, 47, and 49, the cassette 660 defines a pair of protrusions 706 extending from the bottom wall 674 thereof adjacent the rear of the cassette 660 that are configured to snap into openings 708 in the front wall 602 and the rear wall 604 of the main frame member 600 (shown in FIG. 37). Depending upon which orientation the cassette 660 is being used, either the openings 708 on the front wall 602 or the openings 708 on the rear wall 604 of the main frame member 600 are used. In the depicted embodiment of FIGS. 38-49, the rear wall 604 of the main frame member 600 is used for mounting the cassette 660. It should also be noted that each of the front wall 602 and the rear wall 604 defines a gentle curvature that is matched by a bottom portion 710 of the cassette 660 surrounding the pair of protrusions 706, as shown in FIGS. 45, 47, and 49. The bottom wall 674 of the cassette 660 also defines a notch 712 extending in a front to back direction for accommodating the center divider 610 of the main frame member 600 when the cassette 660 is mounted thereto.

A similar snap-fit structure in the form of protrusions 706 extending from the bottom wall 674 of the cassette body 664 and also the notch 712 for accommodating the center divider 610 of the main frame member 600 are also provided in the embodiment of the cassette 760 shown in FIGS. 50-71.

Now referring to embodiment of the fiber optic cassette 760 of FIGS. 50-71, the fiber optic cassette 760 is another piece of telecommunications equipment that may be mounted to the main frame member 600 of FIG. 37 for providing connection locations 616 for the module.

The fiber optic cassette 760 of FIGS. 50-71, as depicted, includes many of the features of the cassette 660 of FIGS. 38-49, such as the adapter block snap-fit features, cable management and retention features, features for mounting the cassette 760 to the main frame member 600 and also cover features that accommodate the LC connector latches.

For example, FIGS. 64 and 66 are close-up views illustrating a right ramped tab 654 of an adapter block 640 snap-fit into an opening 764 on the center divider wall 766 of the fiber optic cassette body 768. FIGS. 65 and 67 illustrates a left ramped tab 654 of the adapter block 640 snap-fit into an opening 764 on the left side wall 770 of the fiber optic cassette body 768. FIG. 69 is a close-up cross-sectional view illustrating the left ramped tab 654 of the left adapter block 640 snap-fit into an opening 764 on the left side wall 770 of the fiber optic cassette body 768. FIG. 70 is a close-up cross-sectional view illustrating the right ramped tab 654 of the right adapter block 640 and the left ramped tab 654 of the left adapter block 640 snap-fit into the opening 764 on the center divider wall 766 of the fiber optic cassette body 768. FIG. 71 is a close-up cross-sectional view illustrating the right ramped tab 654 of the right adapter block 640 snap-fit into an opening 764 on the right side wall 772 of the fiber optic cassette body 768.

In the version of the fiber optic cassette 760 of FIGS. 50-71, the fiber optic signals are input or output from the cassette 760 via direct fiber optic cables 762, rather than through connectorized cables. Cables 762 entering the cassette 760 are connected to the cable entry location 780 with a crimp tube 782 and a crimp ring 784 which crimps jacket and strength member to crimp tube 782. A small pocket 786 captures the crimp tubes 782 in a stacked arrangement for retention with cassette body 768. Pocket 786 captures hex end 788 of crimp tube 782 to retain cables 762 with cassette body 768. As shown, the pocket 786 is provided in an inset portion 790 defined at the center of the right and left portions of the rear wall 792 of the cassette 760. The portions of the rear wall 792 surrounding the pocket 786 provide gradual curves 794 as the portions extend from the pocket 786 to portions of the rear wall 792 that are parallel to the longitudinal axis D. Thus, when the cable 762 placed in the pocket 786 is bent in either direction toward the right side or the left side of the cassette 760, bend radius protection is provided with the curved portions 794 of the rear wall 792. This provides a built-in bend radius protection structure that may eliminate the need for a separate boot for each of the cables 762.

The interior 796 of the cassette body 768 generally defines two separately identifiable chambers 798, 800, each one including a radius limiter 801 (e.g., in the form of a spool) with cable retention fingers 802 extending therefrom. As shown in FIGS. 56-59, the optical fibers 804 that are input into the cassette 760 through the bottom connectorized cable 762 are led to the right chamber 798 and the optical fibers 804 input into the cassette 760 through the top connectorized cable 762 are led to the left chamber 800 before being led to the adapter blocks 640.

As discussed previously, parts of the telecommunications equipment described herein such as the high density distribution frame 10 or the telecommunications panel 302 may be configured to relay physical layer information from one or more fiber optic connectors (e.g., connectors 135, 651) received into the connection locations of the main frame members (such as main frame member 26 of FIGS. 8-9, main frame member 342 of FIGS. 26-28, or main frame member 600 of FIG. 37) to other parts of the distribution frame 10 or telecommunications panel 302.

As described previously, certain types of adapters that may form the connection locations may be configured to collect physical layer information from one or more fiber optic connectors received thereat. For example, structures such as the fiber optic adapter blocks 482, 484, or 600 may include bodies configured to hold one or more media reading interfaces that are configured to engage memory contacts on fiber optic connectors inserted into the individual adapters of the blocks. One or more media reading interfaces may be positioned in each adapter body within the blocks. Certain types of media reading interfaces may include one or more contact members that are positioned to engage memory contacts on a fiber optic connector inserted within a slot of the adapter. Another portion of each such contact member may also extend out of the adapter slot to contact a circuit board that may be positioned on the block body. Please refer to FIG. 23 for an example illustration of an adapter configured to collect physical layer information from one or more fiber optic connector received thereat. As will be described in further detail below, portions of the main frame members, the center members, or the rack mount members may define conductive paths that are configured to connect the media reading interfaces of the adapters with a master circuit board located elsewhere on the distribution frame 10 or the panel 302. The master circuit board may include or connect (e.g., over a network) to a processing unit that is configured to manage physical layer information obtained by the media reading interfaces.

Referring now to FIGS. 29, 30, and 33-36, the main frame member 342, the center member 340, and the rack mount member 344 of the telecommunications module 300 have been shown as including structures forming part of a conductive path for relaying physical layer information from a connector mounted to the module to other portions of the telecommunications panel 302. It should be noted that the structures used on the telecommunications module 300 that form the conductive paths can be used on any of the telecommunications modules discussed herein and that the module 300 is simply one representative example embodiment used to illustrate such features.

As shown in FIGS. 29, 30, and 33-36, the main frame member 342 and the rack mount member 344 may include electrical connector locations 900 (**900*a*, 900*b*, 900*c*, 900*d*) defined thereon. As shown in FIG. 29 and FIGS. 33-36, an electrical cable 902 (e.g., a multi contact electrical cable) may extend from a connection location 900*b* on the main frame member 342 to a connector location 900*c* on the rack mount member 344. The cable, which has been illustrated diagrammatically in the drawings, according to one example embodiment, may be a flexible, flat ribbon-type, multi-contact electrical cable. As shown in FIG. 29, the cable 902 that extends from the connection location 900*b* may be nested within the longitudinal groove 354 defined on the right side 356 of the center member. The cable 902 may extend from the longitudinal groove 354 through a passage defined within the interior of the spool 460 of the center member 340 to the second longitudinal groove 360 on the left side of the center member 340 (that also receives the longitudinal protrusion 364 defined by the rack mount member 344). From within the longitudinal groove 360, the cable 902 extends to connector location 900*c* defined on the rack mount member 344**.

As shown in FIGS. 33-36, due to the three-piece slide assembly, when the main frame member 342 moves forwardly relative to the center member 340 and also the rack mount member 344, the center member 340 also moves forwardly relative to the rack mount member 344 (at half the speed of the center member 342 relative to the rack mount member 344). Stated in an another way, when the main frame member 342 moves forwardly relative to the center member 340, the rack mount member 344 moves rearwardly relative to the center member 340. In this manner, the cable 902 used to provide the electrical pathway from connector location 900*b* to connector location 900*c* can always maintain the same length, sliding within the spool 460 as needed. The slidable movement of the cable 902 is shown in FIGS. 33-36.

The main frame member 342 may include internal electrically conductive structures (i.e., integrally formed with or embedded therein) that establish electrically conductive paths from the connector location 900*b* to connector location 900*a* that is provided on the mount 474. Similarly, the rack mount member 344 may include internal electrically conductive structures that establish an electrical path from the connector location 900*c* to connector location 900*d*.

The connector location 900*a* is configured such that it can make electrical contact with conductive portions or contact portions (e.g., on a circuit board) of an adapter block such as block 482, 484, or 640 that may be mounted on the mount 474. As such, physical layer information from a connector mounted to an adapter block of the module may be relayed from the adapter block, through the mount 474, to the left side of the rack mount member 344 via the cable 902.

Internal electrical conductive paths from the connector location 900*c* to connector location 900*d* relay the physical layer information that is transmitted via the cable 902. At connector location 900*d*, the electrical signals all the way from inserted fiber optic connectors may be relayed to a master circuit board located elsewhere on the panel 302 (e.g., at right wall 310 or at left wall 314). As noted above, the master circuit board may include or connect (e.g., over a network) to a processing unit that is configured to manage physical layer information obtained by the media reading interfaces.

Even though in one embodiment, the electrically conductive paths between connector locations 900*a* and 900*b* and connector locations 900*c* and 900*d* have been described as being provided by internal conductive structures that may be integrally formed with or embedded into the portions of the main frame member 342 or the rack mount member 344, in other embodiments, the main frame member 342 and the rack mount member 344 can be configured such that the electrically conductive paths are provided by flexible cabling such as the cable 902. In such embodiments, the cabling extending between connector locations 900*a* and 900*b* and connector locations 900*c* and 900*d* may be extensions of cable 902.

It should be noted that although an example electrical conductive path has been discussed with respect to the front side of the module 300, a similar path including a cable 902 and connector locations 900 can be provided at the rear side of the module.

Now referring to FIGS. 74-89, another embodiment of a fiber optic cassette 1000 is illustrated. The fiber optic cassette 1000 is another piece of telecommunications equipment that may be mounted to the main frame member 600 of FIG. 37 for providing connection locations 616 for the module.

The fiber optic cassette 1000 of FIGS. 74-89, as depicted, shares many of the features of the cassette 660 of FIGS. 38-49 and cassette 760 of FIGS. 50-71, such as the adapter block snap-fit features, cable management and retention features, features for mounting the cassette 1000 to the main frame member 600 and also cover features that accommodate the LC connector latches. In the depicted embodiment of the cassette 1000, the fiber optic signal entry and exit points are defined by the snap-in adapter blocks 640 at the front 1001 of the cassette body 1002 rather than a cable entry point at the rear 1003 of the cassette body 1002 as in the cassette 660 of FIGS. 38-49 and the cassette 760 of FIGS. 50-71.

In addition to the shared features, the fiber optic cassette 1000 of FIGS. 74-89 also includes additional features that will be described in further detail below. For example, as shown in the exploded view of FIG. 78, the interior 1004 of the cassette body 1002 generally defines two separately identifiable chambers 1006, each one including a cable management structure in the form of multiple discrete posts 1008. The posts 1008 may be structures that are integrally molded with the body 1002 of the fiber optic cassette 1000. In other embodiments, the posts 1008 may be removable structures. The plurality of discrete posts 1008 are configured and positioned to resemble the shape of a circular spool structure such that an outer perimeter defined by the posts 1008 still meets the minimum bend radius requirements for any cables that are routed around the posts 1008. In addition to providing bend radius protection around the outer periphery of the posts 1008, the discrete, spaced-out configuration of the posts 1008 also allows any cabling to be routed through the region 1010 defined at the interior of the posts 1008. Example cable routing configurations are shown in FIGS. 79-89, wherein cables 1012 can be routed around the posts 1008 or through the region 1010 defined at the interior of the posts 1008.

As shown in FIG. 78, the fiber optic cassette 1000 also includes removable cable retention fingers 1014 similar to fingers 698 of fiber optic cassette 660 of FIGS. 38-49 and finger 802 of fiber optic cassette 760 of FIGS. 50-71. The cable retention fingers 1014 provide additional cable management for cables 1012 routed around and/or through the posts 1008 within the cassette body interior 1004 as shown in FIGS. 79-89. As shown in FIGS. 74-89, other integral portions of the cassette body 1002 such as the rear wall 1016 or the side walls 1018 may provide cable management features such as curved surfaces for meeting bend radius requirements.

Still referring to FIG. 78, the interior 1004 of the cassette body 1002 defines a rear pocket 1020 behind the discrete posts 1008. As will be described in further detail below, the pocket 1020 may be used to house fiber optic equipment 1022 (i.e., devices) within the cassette 1000, wherein fiber optic signals may be routed between the fiber optic equipment 1022 and the fiber optic adapters 650 of the adapter blocks 640 at the front 1001 of the cassette 1000 (FIGS. 82-89). As also shown in FIGS. 79-81 and will be described in further detail, the fiber optic signals may be routed from one connection point on the fiber optic equipment 1022, through the cassette body 1002, to another connection point on the equipment 1022.

One example embodiment of a piece of fiber optic equipment 1022 that may be used within the cassette 1000 are multiple thin film filters 1024, as shown in the depicted embodiment of the cassette 1000 in FIGS. 78-89. In other embodiments, other types of fiber optic equipment 1022 including fused biconic couplers (such as fiber optic splitters, couplers, or equipment having monitoring circuitry), equipment having planar lightwave circuitry (PLC) such as splitters, or equipment such as multiplexers/demultiplexers can be used within the cassette 1000.

Depending upon the type of equipment 1022 used, the inputs and the outputs for the fiber optic signals can be arranged differently. For example, depending upon the type of equipment 1022 used, the inputs and outputs may be located on opposite sides of the device 1022 (e.g., right side 1026 and left side 1028). For example, according to one example embodiment, the inputs for the device 1022 may be located at the right side 1026 of the device 1022 and the outputs may be located at the left side 1028 of the device 1022. The locations of the inputs and the outputs can be interchanged, wherein the inputs may be located at the left side 1028 of the device 1022 and the outputs located at the right side 1026 of the device 1022.

If multiple smaller devices 1022 are used in a stacked arrangement such as the thin film filters 1024 shown in FIGS. 78-89, the inputs and the outputs may be provided in an alternating arrangement between the right side 1026 and the left side 1028 from one filter 1024 to the next.

Also, in certain embodiments, as will be described in further detail below, the signals may simply extend from the fiber optic device 1022 to connectors within the fiber optic adapters 650 at the front 1001 of the cassette 1000 without being routed back to the device 1022.

FIGS. 79-89 depict eleven different example cable routing configurations that may be used within the fiber optic cassette 1000. The eleven example cable routing configurations are provided to illustrate the vast number of cable routing possibilities that may be used given the features of the fiber optic cassette 1000 and are not intended to limit the scope of the disclosure in any way. Other cable routing configurations are certainly possible and are contemplated by the present disclosure. Also, in the routing configurations shown in FIGS. 79-89, only one or two representative cables 1012 have been used to demonstrate the routing possibilities, without populating all of the equipment connection locations.

FIG. 79 illustrates a first example cable routing configuration within the cassette 1000 wherein a signal carrying cable 1012 is routed between a connection location 1027 at the right side 1026 of the device 1022 and a connection location at the left side 1028 of the device 1022 after extending around the cable management posts 1008.

FIG. 80 illustrates a second example cable routing configuration within the cassette 1000 wherein a signal carrying cable 1012 is routed from a connection location 1027 at the right side 1026 of the device 1022 to another connection location 1027 at the same, right, side 1026 of the device 1022 after extending around the cable management posts 1008.

FIG. 81 illustrates a third example cable routing configuration within the cassette 1000 wherein a signal carrying cable 1012 is routed from a connection location 1027 at the left side 1028 of the device 1022 to another connection location 1027 at the same, left, side 1028 of the device 1022 after extending around the cable management posts 1008. This configuration is similar to that of FIG. 80, except for the change in the orientation of the side.

FIG. 82 illustrates a fourth example cable routing configuration within the cassette 1000 wherein signal carrying cables 1012 are routed from a connection location 1027 at the right side 1026 of the device 1022 to fiber optic adapters 650 located generally to the left of the device 1022 at the front 1001 of the cassette 1000.

FIG. 83 illustrates another example cable routing configuration within the cassette 1000 similar to the configuration of FIG. 82, wherein signal carrying cables 1012 are routed from a connection location 1027 at the right side 1026 of the device 1022 to fiber optic adapters 650 located generally to the left of the device 1022 at the front 1001 of the cassette 1000.

FIG. 84 illustrates a sixth example cable routing configuration within the cassette 1000 wherein signal carrying cables 1012 are routed from a connection location 1027 at the left side 1028 of the device 1022 to fiber optic adapters 650 located generally to the right of the device 1022 at the front 1001 of the cassette 1000. This configuration is similar to that of FIG. 82, except for the change in the orientation of the side.

FIG. 85 illustrates another example cable routing configuration within the cassette 1000 similar to the configuration of FIG. 84, wherein signal carrying cables 1012 are routed from a connection location 1027 at the left side 1028 of the device to fiber optic adapters 650 located generally to the right of the device 1022 at the front 1001 of the cassette 1000. This configuration is similar to that of FIG. 83, except for the change in the orientation of the side.

FIG. 86 illustrates an eighth example cable routing configuration within the cassette 1000 wherein signal carrying cables 1012 are routed from a connection location 1027 at the right side 1026 of the device 1022 to fiber optic adapters 650 located generally to the right of the device 1022 at the front 1001 of the cassette 1000 after being routed around posts 1008 on both sides of the cassette 1000.

FIG. 87 illustrates another example cable routing configuration within the cassette 1000 similar to the configuration of FIG. 86, wherein signal carrying cables 1012 are routed from a connection location 1027 at the right side 1026 of the device 1022 to fiber optic adapters 650 located generally to the right of the device 1022 at the front 1001 of the cassette 1000 after being routed around posts 1008 on both sides of the cassette 1000.

FIG. 88 illustrates a tenth example cable routing configuration within the cassette 1000 wherein signal carrying cables 1012 are routed from a connection location 1027 at the left side 1028 of the device 1022 to fiber optic adapters 650 located generally to the left of the device 1022 at the front 1001 of the cassette 1000 after being routed around posts 1008 on both sides of the cassette 1000. This configuration is similar to that of FIG. 86, except for the change in the orientation of the side.

FIG. 89 illustrates another example cable routing configuration within the cassette 1000 similar to the configuration of FIG. 88, wherein signal carrying cables 1012 are routed from a connection location 1027 at the left side 1028 of the device 1022 to fiber optic adapters 650 located generally to the left of the device 1022 at the front 1001 of the cassette 1000 after being routed around posts 1008 on both sides of the cassette 1000. This configuration is similar to that of FIG. 87, except for the change in the orientation of the side.

Now referring to FIGS. 90-99, another embodiment of a fiber optic cassette 1100 is illustrated. The fiber optic cassette 1100 is another piece of telecommunications equipment that may be mounted to the main frame member 600 of FIG. 37 for providing connection locations 616 for the module.

The fiber optic cassette 1100 of FIGS. 90-99, as depicted, shares many of the features of the cassette 660 of FIGS. 38-49, cassette 760 of FIGS. 50-71, and cassette 1000 of FIGS. 74-89, such as the adapter block snap-fit features, cable management and retention features, features for mounting the cassette 1100 to the main frame member 600 and also cover features that accommodate the LC connector latches. In the depicted embodiment of the cassette 1100, the fiber optic signal exit points may be defined by the snap-in adapter blocks 640 at the front 1101 of the cassette body 1102 and cable entry points may be defined at the rear 1103 of the cassette body 1102 by MPO style connectors 662. In the depicted embodiment of the cassette 1100, the cable entry points may be defined by a pair of MPO style connectors. A pair of MPO style connectors 662 coming from an exterior of the cassette 1100 are coupled to a pair of MPO style connectors 662 through a pair of adapters 682 that are mounted at the rear 1103 of the cassette 1100.

Referring to FIGS. 90-99, cassette 1100 defines a rear extension 1120 that is configured to support the pair of adapters 682. The cassette 1100 includes a cover 1122 that is sized generally smaller than the cassettes of the previous embodiments such that the rear extension 1120 stays exposed to an exterior of the cassette 1100.

The rear extension 1120 is defined by a rear wall 1124, an intermediate wall 1126 of the cassette 1100 and a bottom 1128 that extends between the rear wall 1124 and the intermediate wall 1126 of the cassette 1100. The rear extension 1120 also includes a divider 1130 located between the intermediate wall 1126 and the rear wall 1124 defining the rear extension 1120.

The pair of adapters 682 each includes flanges 1132 on opposing sides of the adapter bodies. The flanges 1132 are slidably inserted into notches 1134 defined on each of the rear wall 1124, the intermediate wall 1126, and the divider structure 1130 of the rear extension 1120. As shown in FIGS. 90 and 91, the notches 1134 are positioned such that when the adapters 682 are slidably inserted therein, the adapters 682 are positioned in a staggered configuration. The staggering provides cable management and also preserves bend radius requirements.

The flanges 1132 of the adapters 682 and the notches 1134 are sized to provide a friction fit for retaining the adapters 682 at the rear extension 1120. The accessibility and removability of the adapters 682 due to the exposed rear extension 1120 facilitate inspection and/or cleaning of the adapters 682 or the connectors 662 coupled therewith.

As noted above, a pair of MPO style connectors 662 are coupled to right ends 1136 of the adapters 682 in the depicted example. Each of the MPO style connectors 662 are terminated with cabling 1138 (i.e., pigtails) that extend between the connectors 662 and a crimp location 1140. In the depicted embodiment, the connectors 662 include pigtails 1138 that extend from the connectors 662 to a crimp location 1140 at the right side 1142 of the cassette 1100. It should be noted that, as seen in FIG. 99, connectors 662 can be provided at left ends 1144 of the adapters 682, wherein pigtails 1138 could extend from the connectors 662 to a crimp location 1140 at the left side 1146 of the cassette 1100. Thus, the cassette 1100 allows the intermediate MPO connectors 662 (e.g., the connectors that relay the signal from external connectors through the adapters 682) to be located at either end of the adapters 682.

The crimp locations 1140 at either the right side 1142 or the left side 1146 of the cassette 1100 are defined by small pockets 1150. The pigtails 1138 entering the cassette 1100 are connected to the crimp locations 1140 with a crimp tube 1152 and a crimp ring 1154 which crimps the jacket and strength member of the cabling 1138 to crimp tube 1152. The small pockets 1150 defined at each crimp location 1140 capture the crimp tubes 1152 in a side by side stacked arrangement for retention with the cassette body 1102. Each pocket 1150 defining the crimp location 1140 captures the hex end 1156 of crimp tube 1152 to retain cables 1138 with the cassette body 1102. Portions 1160 of the intermediate wall 1126 surrounding the pockets 1150 provide gradual curves as the portions 1160 extend from the pockets 1150 to portions of the intermediate wall 1126 that are parallel to the rear wall 1124. Thus, bend radius protection is provided with the curved portions 1160 of the intermediate wall 1126.

Referring now to FIGS. 97-99, the interior 1162 of the cassette body 1102 generally defines two separately identifiable chambers 1164, each chamber 1164 including a radius limiter 1166 (e.g., in the form of a spool) with removable cable retention fingers 1168 extending therefrom, similar to the embodiments of the cassettes described previously.

Connectorized cables 1170 (e.g., cables terminated with LC type fiber optic connectors) extending from the crimp locations 1140 may be lead around the radius limiters 1166 before being directed to the fiber optic adapter blocks 640 at the front 1101 of the cassette 1100, with a variety of different cable routing configurations.

Referring now to FIGS. 100-114, various example cable routing configuration are shown for a telecommunications rack 2000 that is configured to house multiple distribution panels 2002 similar to the distribution panel 302 of FIG. 24. As will be described in further detail below, the telecommunications rack 2000 includes a variety of cable management features for managing incoming cables and outgoing cables and cabling within the rack 2000 itself. Cross-connect patching can also be provided between multiple similar racks 2000 using the cable management features of the racks 2000.

The cable management features of the telecommunications rack 2000 have been designed such that the same length cables incoming to the rack 2000 from above or below the rack 2000 can be routed to different portions of the rack 2000, with the slack being stored as needed on the features of the rack 2000.

Referring now to FIG. 100 specifically, the telecommunications rack 2000 is shown from a rear side 2004 with one of the distribution panels 2002 mounted thereon and with an example cable routing configuration around portions of the rack 2000. As shown, in the rear side 2004, the rack 2000 defines vertical cable guides 2006, 2008, respectively, on both the right and left sides 2010, 2012 of the rack extending along the height of the rack 2000. A cross-frame trough 2014 is provided for each panel 2002 and connects the vertical cable guides 2006, 2008 on the right and left sides 2010, 2012. A radius limiter 2016 in the form of a trumpet flare is provided on the right end of the cross-frame trough 2014. A second trumpet flare 2018 is provided below the first trumpet flare 2016 on the right side 2010 of the rack 2000. At the left side 2012 of the rack 2000, a radius limiter 2020 (e.g., a spool) is located within the left vertical cable guide 2008. Although not shown in FIG. 100, a radius limiter 2040 (e.g., a spool) may also be mounted at the right side 2010 of the rack 2000 for each panel 2002 (see FIG. 103) within the right vertical cable guide 2006, in offset relationship with respect to the spool 2020 on the left side 2012. Still referring to FIG. 100, the rack 2000 also includes a rear horizontal trough 2022 extending between the right side 2010 and the left side 2012 of the rack 2000. Front-to-rear troughs 2024, 2026 are also provided at each of the right and left sides 2010, 2012, respectively, of the rack 2000 for routing cables between a front side 2028 and the rear side 2004 of the rack 2000 as will be discussed in further detail below.

It should be noted that the terms "right" and "left" are used to refer to the right and left sides of the rack when looking at the rack 2000 from a rear view thereof (i.e. when a person is standing at the rear of the rack).

Still referring to FIG. 100, an example cable routing configuration for cables extending from modules of the panel 2002 is shown for a rear side 2004 of the rack 2000. In the example shown in FIG. 100, for the module located at the right side 2010 of the rack 2000, a cable 2030 extending from an adapter 650 mounted on one of the main frame members 600 is lead around the cable management features of a center member 340 of the module and downwardly around fingers 2032 at the right side 2010 of the rack 2000. From the fingers 2032, the cable 2030 goes through the second trumpet flare 2018 and up or down the vertical cable guide 2006 at the right side 2010 of the rack 2000. For a cable 2030 extending from a module at the left side 2012 of the rack 2000, the cable 2030 is lead around the cable management features of the center member 340 of the module and downwardly around fingers 2034 at the left side 2012 of the rack 2000. Thereafter, the cable 2030 is lead upwardly around the radius limiter 2020 and into the cross-frame trough 2014. The cable 2030 then extends through the cross-frame trough 2030 and out the first trumpet flare 2016 and upwardly or downwardly into the vertical cable guide 2008 at the left side 2012 of the rack 2000.

FIG. 101 illustrates an example cable routing configuration for a fiber optic cassette similar to the cassette 760 of FIGS. 50-71 mounted on the panel 2002 of FIG. 100, the cable routing shown for a rear side 2004 of the rack 2000. As discussed above, the slide assembly of the module carrying the cassette 760 provides a mechanism to take up the cable slack from the cassette 760 as the main frame member 600 is being moved back and forth on the panel 2002.

FIG. 102 illustrates an example cable routing configuration for the telecommunications rack 2000 for two incoming cables 2030 (e.g., an IFC cable) routed to the modules located on the rack 2000. In the illustrated example, the cables 2030 are incoming from a top side 2036 of the rack 2000 and are clamped at the top, right side of the rack 2000. In the example shown, one of the cables 2030 is routed through the vertical cable guide 2006 at the right side 2010 of the rack 2000. A drip loop 2039 is formed. If the cable 2030 is being terminated at the right side 2010 of the rack 2000, the cable 2030 is routed through the second trumpet flare 2018 and into a module at the right side 2010 of the rack 2000. If the cable 2030 is being terminated at the left side 2012 of the rack 2000, the cable 2030 is routed through the crossframe trough 2014, around spool 2020, and into one of the modules within the panel 2002 at the left side 2012 of the rack 2000. FIG. 102A is a close up view of the radius limiter 2020 in the form of a spool at the left side 2012 of the rack 2000. FIG. 102B is a close up view of the second trumpet flare 2018 at the right side 2010 of the rack 2000.

FIG. 103 illustrates an example cable routing configuration for the telecommunications rack 2000 of FIG. 100 for two incoming cables 2030 routed to the modules located on the rack 2000, the cables 2030 incoming from a bottom side 2038 of the rack 2000. Cables 2030 are clamped at bottom, right side of the rack 2000. The cables 2030 are routed through the vertical cable guide 2006 at the right side 2010 of the rack 2000. If the cable 2030 is terminated on the right side 2010 of the rack 2000, the cable 2030 is routed through the second trumpet flare 2018 and to the module. The slack is taken up by an appropriate spool 2040 on the right side 2010 of the rack 2000. If the cable 2030 is being terminated on the left side 2012 of the rack 2000, the cable 2030 is routed through the crossframe trough 2014, around spool 2020 and into a module at the left side 2012 of the rack 2000. The slack is again taken up by a spool 2040 within the vertical cable guide 2006 on the right side 2010 of the rack 2000. FIG. 103A is a close up view of the radius limiter 2020 in the form of a spool at the left side 2012 of the rack 2000. FIG. 103B is a close up view of the second trumpet flare 2018 at the right side 2010 of the rack 2000.

FIG. 104 illustrates an example cable routing configuration for the telecommunications rack 2000 of FIG. 100 for incoming patch cords 2030 routed to the modules located on the rack 2000, the patch cords 2030 incoming from the top 2036 of the rack 2000. The patch cords 2030 are routed downwardly through the right vertical cable guide 2006. If the cable 2030 is being terminated at the right side 2010 of the rack 2000, the cable 2030 is routed through the second trumpet flare 2018 to the module. If the cable 2030 is being terminated at the left side 2012 of the rack 2000, the cable 2030 is routed through the crossframe trough 2014, around spool 2020 on the left side 2012 of the rack 2000 and into the module. FIG. 104A is a close up view of the radius limiter 2020 in the form of a spool at the left side 2012 of the rack 2000. FIG. 104B is a close up view of the second trumpet flare 2018 at the right side 2010 of the rack 2000.

FIG. 105 illustrates an example cable routing configuration for the telecommunications rack 2000 of FIG. 100 for an incoming cable 2030 that leads to a splice region or chassis 2042 of the rack 2000, the cable 2030 incoming from the top 2036 of the rack 2000. As shown in FIG. 105, the cable 2030 is clamped from overhead at the top, right side of the rack 2000. The cable 2030 is routed downwardly through the right vertical cable guide 2006 into the splice chassis 2042. A splice chassis similar to the splice chassis 2042 that may be provided on the rack 2000 of the present disclosure is described in further detail in U.S. Pat. No. 9,348,105, the entire disclosure of which is incorporated herein by reference.

The splice chassis 2042, one example embodiment of which can be used on the rack 2000, is illustrated in FIGS. 115-118 and will be discussed in further detail below.

Referring now to FIG. 106, an example cable routing configuration is illustrated for the telecommunications rack 2000 of FIG. 100 for incoming cables 2030 that lead to the splice chassis 2042 of the rack 2000, wherein the cables 2030 are incoming from the bottom 2038 of the rack 2000. In such a routing, the cables 2030, which are clamped underfloor at the bottom, right side of the rack 2000, are routed upwardly through the vertical cable guide 2006 at the right side 2010 of the rack 2000 into the splice chassis 2042.

FIG. 107 illustrates an example cable routing configuration within the rack 2000 for a pigtail cables 2030 extending from the modules of the telecommunications rack 2000 of FIG. 100 to the splice chassis 2042 of the rack 2000. If the cable 2030 going toward the splice chassis 2042 is coming from a module on the right side 2010 of the rack 2000, the cable 2030 is routed through second trumpet flare 2018 and downwardly through vertical cable guide 2006 at the right side 2010 of the rack 2000 to the splice chassis 2042. If the cable 2030 going toward the splice chassis 2042 is coming from a module on the left side 2012 of the rack 2000, the cable 2030 is routed down and around the radius limiter 2020 and up around the crossframe trough 2014. After passing through the first trumpet flare 2016, the cable 2030 is routed downwardly through vertical cable guide 2006 at the right side 2010 of the rack 2000 to the splice chassis 2042. FIG. 107A is a close up view of the radius limiter 2020 in the form of a spool at the left side 2012 of the rack 2000. FIG. 107B is a close up view of the second trumpet flare 2018 at the right side 2010 of the rack 2000.

FIGS. 108-113 illustrate example cable routing configurations at the front side 2028 of the rack 2000, wherein patch cord cabling might be used. At the front side 2028, the rack 2000 includes the front-to rear troughs 2024, 2026 that communicate with the rear horizontal troughs 2022 at the rear 2004 of the rack 2000. Cable loops 2044 are provided adjacent both the right and left sides 2010, 2012 of the rack 2000, wherein the cable loops 2044 are located within right and left front vertical cable guides 2046, 2048, respectively. In the depicted embodiment, the rack 2000 also includes cable slack management spools 2050 at the right side 2010 of the rack 2000, wherein the spools 2050 are in a stacked configuration along a column at the right side 2010 of the rack 2000, at the front 2028 of the rack 2000.

For example, FIG. 108 illustrates a front perspective view of the telecommunications rack 2000 of FIG. 100, showing an example cable routing configuration at the front side 2028 of the rack 2000, the cables 2030 extending from the modules mounted on a distribution panel 2002 similar to the distribution panel 302 of FIG. 24 which is mounted on the rack 2000. A cable 2030 in the form of a patch cord may be routed from the adapter ports 650 of a cassette similar to the cassette 760 of FIGS. 50-71 to different locations around the rack 2000. For example, still referring to FIG. 108, for the module located at the left side 2012 of the rack 2000, a cable 2030 extending from an adapter 650 mounted on one of the main frame members 600 is lead around the cable management features of a center member 340 of the module and downwardly around fingers 2052 at the left side 2012 of the rack 2000. From the fingers 2052, the cable 2030 can either extend through front-to-rear troughs 2026 to the rear horizontal trough 2022 and then to a destination rack 2000 for patching or down through the vertical cable guide 2048 through the cable loops 2044. A similar cable routing configuration may be followed for the module located at the right side 2010 of the rack 2000.

FIG. 109 illustrates an example cable routing configuration at the front side 2028 for a fiber optic cassette that may be mounted on a main frame member 600 on the panel 2002. As discussed above, the slide assembly of the module provides a mechanism to take up the cable slack from the cassette as the main frame member 600 is being moved back and forth on the panel 2002.

FIG. 110 illustrates an example cable routing configuration for cross-connect cabling within the same rack 2000 from one module on a panel 2002 to another module on another panel 2002 within the rack 2000, wherein the modules are located on opposite sides 2010, 2012 of the rack 2000. A cable 2030 coming from a first termination point on a module is routed down through the vertical cable guide 2046 on the right side 2010 to a bottom trough 2054. The cable 2030 is terminated to a second termination point on a module after passing around an anchor spool 2056 provided adjacent the bottom trough 2054 at the front, right side of the rack 2000. The cable 2030 is lead through the bottom trough 2054 and upwardly along the vertical cable guide 2048 at the left side 2012 of the rack 2000 before being terminated to the second termination point. Slack cabling is looped over storage spools 2050 at the right side 2010 of the rack 2000.

FIG. 111 illustrates an example cable routing configuration for cross-connect cabling within the same rack 2000 similar to that shown in FIG. 110, however, between modules on the right side 2010 of the rack 2000 and between modules on the left side 2012 of the rack 2000. A routing similar to that shown in FIG. 110 is followed, however, crossing the bottom trough 2054 twice, going within the vertical cable guides 2046, 2048 twice, and going around the anchor spool 2056 twice for the respective terminations.

FIG. 112 illustrates an example cable routing configuration for cross-connect cabling between two of the telecommunications racks 2000 of FIG. 100. In the example configurations shown in FIG. 112, once the proper patch cord length is determined, a cable 2030 from either a module on the left side 2012 or a module on the right side 2010 is routed through a respective front-to-rear trough 2024, 2026 to the rear horizontal trough 2022 to the destination rack 2000. In certain embodiments, the cross-connect is performed from a module on a given rack 2000 to a module on the opposite side of the destination rack 2000 as shown in FIG. 112. Whether the cabling starts out from a module on the right side 2010 of the rack 2000 or from a module on the left side 2012 of the rack 2000, the cables 2030 are first lead down through their respective vertical cable guides 2046, 2048 to the bottom trough 2054, and after going through the bottom trough 2054, the cables 2030 are led up the respective vertical cable guides 2046, 2048 to the respective front-to-rear troughs 2024, 2026 before being lead to the destination rack 2000. The slack cabling is taken up by the storage spools 2050 on the right side 2010 of the rack 2000.

FIG. 113 illustrates an example cable routing configuration for an interconnect routing on a single rack 2000, wherein incoming patch cords 2030 are routed to the modules located on the rack 2000, the patch cords 2030 incoming from the top 2036 of the rack 2000. The patch cords 2030 are normally routed from above the rack 2000 to a module on the opposite side of the rack 2000. The patch cords 2030 are lead downwardly through the respective vertical cable guides 2046, 2048 and through the bottom trough 2054. After going around the anchor spool 2056 adjacent the right side 2010 of the rack 2000, the patch cords 2030 are terminated to modules at opposite sides of the rack 2000 from where they first entered the rack 2000, as shown in FIG. 113. The slack cabling 2030 is taken up by the storage spools 2050 on the right side 2010 of the rack 2000.

FIG. 114 illustrates an example method of managing cable slack for cables 2030 routed within the rack 2000 of FIG. 100. For example, as seen in the example method in FIG. 114 and as discussed above with respect to the various front cable routing configurations, the patch cord 2030 may be routed around the appropriate storage spool 2050 (e.g., the highest possible spool) at the right side 2010 of the rack 2000 after the patch cord 2030 has been terminated and has been extended as far as it can reach.

Referring now to FIGS. 115-118, one example embodiment of a splice chassis that may be used as part of the telecommunications rack 2000 and the associated cable routing around the splice chassis is illustrated.

The splice chassis will be described such that the terms "right" and "left" will be used to refer to the right and left sides of the chassis when looking directly at the splice chassis (i.e. when a person is standing in front of the splice chassis).

FIG. 115 shows a perspective view of the bottom portion of the rack 2000 that is configured to hold telecommunications equipment. As noted above, the rack 2000 includes a splice region 3110 at which one or more splice cassettes may be stored on the rack 2000. In some implementations, the splice region 3110 is disposed beneath a termination region of the rack 2000. In certain implementations, the splice region 3110 is disposed towards a bottom of the rack 2000. In certain implementations, the splice region 3110 is disposed at a "dead zone" beneath all termination regions of the rack 2000. In certain implementations, the splice region 3110 is located a rear side of the rack 2000. In certain implementations, one or more covers can extend over the splice region 3110 to inhibit access to and/or to protect the splice region 3110. In certain implementations, the one or more covers can be fastened in place to protect components at the splice region 3110.

In the example shown, a sliding drawer, blade, or other frame 3112 is mounted to the rack 2000 at the splice region 3110. The sliding frame 3112 includes one or more compartments or zones 3114 at which the splice cassettes 3200 may be disposed. The frame 3112 may be slid relative to the rack 2000 from a stowed position to an extended position to provide access to the splice cassettes 3200 disposed in the zones 3114. For example, the frame 3112 may include guides along which the frame 3112 slides. In certain implementations, the splice cassettes 3200 are more accessible from a rear of the rack 2000 when the frame 3112 is slid to the extended position and are less accessible from the rear of the rack 2000 when the frame 3112 is slid to the stowed position. In certain implementations, the rack 2000 inhibits access to the splice cassettes 3200 when the frame 3112 is in the stowed position within the rack 2000.

In some implementations, the zones 3114 are arranged in a T-shaped configuration on the frame 3112 (see FIG. 117). In the example shown, the zones 3114 include a first zone 3114*a* that extends horizontally across the rack 2000. The first zone 3114*a* is configured to hold one or more splice cassettes 3200 in a row extending parallel to a sideways axis of the rack 2000. Forward-rearward facing zones 3114*b*, 3114*c* are disposed at opposite ends of the first zone 3114*a*. Each forward-rearward facing zone 3114*b*, 3114*c* is configured to hold one or more splice cassettes 3200 in a row extending parallel to a forward-rearward axis of the rack 2000. These three zones 3114*a*-3114*c* form the cross-member of the "T" of the frame 3112. Behind the first zone 3114*a* (i.e., closer to the front of the rack 2000) additional forward-rearward facing zones 3114*d*, 3114*e* can be disposed. These zones 3114*d*, 3114*e* form the base of the "T" of the frame 3112. In other implementations, however, the sliding frame 3112 may include a greater or lesser number of zones 3114 arranged in various other configurations.

In general, the splice cassettes 3200 are configured to stack or otherwise fit together so that a bottom major surface of one splice cassette 3200 engages a top major surface of another splice cassette 3200. An end of each splice cassette 3200 seats on the frame 3112, as discussed further in U.S. Pat. No. 9,348,105, that has been incorporated by reference in its entirety.

The frame 3112 may include flat panels or flanges that extend upwardly at opposite ends of one or more of the stacks to retain the splice cassettes 3200 within the frame 3112. In other implementations, the splice cassettes 3200 may be stacked so that a major side or elongated edge of one or more of the splice cassettes seats on the frame 3112.

FIG. 116 shows one example implementation of the sliding frame 3112 in isolation from the frame 2000 and with the splice cassettes 3200 removed. The sliding frame 3112 is configured for high-density applications. In some implementations, the frame 3112 can accommodate up to forty-eight splice cassettes, each with a capacity of up to six mass fusion splices, which each splice having twelve fiber ribbons (i.e., seventy-two spliced fibers), for a total capacity of 3,456 splices per frame 3112. In other implementations, the frame 3112 can accommodate a greater or lesser number of splice cassettes 3200. In other implementations, the splice cassettes 3200 can accommodate a greater or lesser number of splices.

In some implementations, each zone 3114 includes spaced apart flanges 3118 that define cassette slots 3119 therebetween. In some implementations, each cassette slot 3119 defines a space sized to receive a single splice cassette 3200. In other implementations, each cassette slot 3119 defines a space sized to receive multiple splice cassettes 3200. In certain implementations, each cassette slot 3119 is aligned with at least one lancing section 3115. In other implementations, at least one of the lancing sections 3115 is accessible from each cassette slot 3119. The flanges 3118 and slots 3119 are sized and shaped to receive the cassettes 3200 so that the cassettes 3200 stand along narrow edges of the cassettes 3200.

The frame 3112 includes one or more lancing sections 3115 (e.g., at tie-off points) at which optical fibers or cables can be secured when routed to the splice cassettes 3200. The fibers or cables can be anchored to the lancing sections 3115 by waxed lacing or other cable securement fasteners. In certain implementations, the incoming cables are secured to the lancing sections 3115 as the incoming cables enter the cassettes 3200. In the example shown in FIG. 117, a first lancing section 3115*a* extends along the front zone 3114 out of view in FIG. 116. A second lancing section 3115*b* is disposed at a first end of the front compartment 3114*a* adjacent the second zone 3114*b*, and a third lancing section 3115*c* is disposed at a second end of the first compartment 3114*a* adjacent the third zone 3114*c*. Fourth and fifth lancing sections 3115*d*, 3115*e* are disposed between the additional forward-rearward facing zones 3114*d*, 3114*e*.

In some implementations, the rack 2000 defines a storage area 3116 beneath the splice region 3110 (e.g., see FIGS. 115, 117, and 118). In certain implementations, the storage region 3116 is disposed at a floor on which the rack 2000 seats. In certain implementations, the storage region 3116 has a width that generally matches a lateral distance across the fourth and fifth zones 3114*d*, 3114*e* of the frame 3112. In certain implementations, the storage region 3116 has a width that generally matches a distance across the first zone 3114*a* of the frame 3112. In the example shown in FIG. 117, the first zone 3114*a* and at least part of the fourth and fifth zones 3114*d*, 3114*e* are disposed over the storage area 3116 when the frame 3112 is in the stowed position.

The storage region 3116 is configured to hold cable slack for the cables and fibers (e.g., network cables, distribution cables, etc.) entering and exiting the splices held at the splice region 3110. FIG. 117 shows a top plan view of the storage region 3116. One or more bend radius limiters 3119 are disposed within the storage area 3116. In the example shown, one bend radius limiter 3119 is disposed at a first side of the storage area 3116 and another bend radius limiter 3119 is disposed at an opposite second side of the storage area 3116. The bend radius limiters 3119 are accessible from the rear of the rack 2000 when the frame 3112 is disposed at the extended position. The frame 3112 blocks access to the limiters 3119 from the rear of the rack 2000 when the frame 3112 is disposed at the stowed position.

As shown in FIG. 118, cables 3300 that are to enter and exit the splice cassettes 3200 are routed from a bottom of the frame 3100 into the storage area 3116 below the splice region 3110. In the example shown, the cables 3300 are routed from one side of the frame. The cables 3300 are routed between the two bend radius limiters 3119 (see points A in FIG. 118) and up to the sliding frame 3112. In some implementations, the cables 3300 are disposed within the storage area 3116 when the frame 3112 is in the rear position. In particular, the slack length of the cables 3300 extends into the storage area 3116, extends between and loops around the bend radius limiters 3119, and extends up to the frame 3112. In some implementations, sliding the frame 3112 to the extended position provides access to the storage area 3116 from the rear of the rack 2000. As the frame 3112 is slid to the extended position, the cable slack lengthens out (e.g., unfolds from around the bend radius limiters 3119).

In some implementations, the cables 3300 can be routed onto the frame 3112 through guides (e.g., vertically extending bend radius limiters) 3117 and into channels 3113 defined between the zones 3114. In certain implementations, the guides 3117 are disposed where the base of the "T" of the frame 3112 and the cross-member of the "T" of the frame 3112 meet. In certain implementations, the guides 3117 are located generally above the bend radius limiters 3119 when the frame 3112 is in the stowed position. In some implementations, the cables 3300 are branched into fibers or groups of fibers when the cables 3300 enter from the guides 3117. The separated fibers or groups of fibers (e.g., ribbons, buffered fibers, upjacketed fibers, etc.) are each routed through the channels 3113 to one of the zones 3114*a*-3114*e*. The cables 3300 are tied off at the lancing points 3115 (e.g., see point B in FIG. 118) that correspond to the desired zone 3114 of the frame 3112.

In the example shown in FIG. 118, a first cable 3300 is routed from the right side of the rack 2000, through the bend radius limiters 3119, to the left side of the storage area 3116, beneath the frame 3112, and to a top of the frame 3112 at a left guide 3117. Fibers or groups of fibers branching from the first cable 3300 are routed to the second zone 3114*b*, fourth zone 3114*d*, or left side of the first zone 3114*a* and secured to the corresponding lancing sections 3115*b*, 3115*d*, and 3115*a*. A second cable 3300 is routed from the right side of the rack 2000, through the bend radius limiters 3119, to the right side of the storage area 3116, beneath the frame 3112, and to a top of the frame 3112 at a right guide 3117. Fibers or groups of fibers branching from the second cable 3300 are routed to the third zone 3114*c*, fifth zone 3114*e*, or right side of the first zone 3114*a* and secured to the corresponding lancing sections 3115*c*, 3115*e*, and 3115*a*. In some implementations, the cables 3300 are routed straight from the storage area 3116 to the guides 3117. In other implementations, the cables 3300 are curved or undulated en route to the respective guide 3117 (e.g., see section 3300*a* in FIG. 118).

In some implementations, end lengths of the cables 3300 can be removed from the rack 2000 and prepared for splicing within one or more splice cassettes 3200 at a location remote from the rack 2000. For example, the terminated end of a cable 3300 can be broken out, ribbonized (if initially stranded), and spliced to one or more other cables at a working location that is between 1 foot and fifty feet away from the rack 2000. In certain implementations, the working location is located within thirty feet of the rack 2000. In certain implementations, the working location is located within twenty feet of the rack 2000. In certain implementations, the working location is located within ten feet of the rack 2000. At least some of the excess slack of the end length of the cable 3300 is taken up by winding the end length around the splice cassettes 3200, as will be disclosed in more detail below, until the splice cassette 3200 is located at the frame 3112.

Now referring to FIGS. 119-121, an alternative embodiment of a fiber optic connection module 4020 is shown in isolation. In this embodiment, the module 4020 is constructed as an integrated unit and does not include a separate cassette, as described elsewhere herein. The connection module 4020, shown in the neutral (retracted) position, includes a rack mount portion 4022 for mounting the module 4020 to a telecommunications fixture, a center portion 4023 slidably coupled to the rack mount portion 4022 along a sliding direction, and a main housing portion 4024 slidably coupled to the center portion 4023 along the sliding direction. The center portion 4023 includes a rack and pinion arrangement, allowing the connection module 4020 to be slidable between retracted and extended positions. As the three-piece slide assembly of the connection module 4020 is described in detail above, for example in relation to FIGS. 8 and 9, it will not be described again in detail here. In some embodiments, the module 4020 may include a radius limiter (as described further above), for guiding fiber optic cables 4036.

The main housing portion 4024 has a front end 4026, a rear end 4028, a right side 4030, a left side 4031, and an enclosed interior 4033. The main housing portion 4024 in FIGS. 119-121 is shown without a top or cover, to enhance clarity, but in some embodiments the main housing portion 4024 may include a cover that encloses the enclosed interior 4033. The front end 4026 of the main housing portion 4024 includes multiple openings 4032, within which fiber optic adapters 4034 may be positioned. In FIGS. 119-121, four adapters 4034 are shown, but alternative embodiments may include fewer or greater number of adapters 4034. An optical component, such as those illustrated in FIGS. 78-89, may be disposed in the enclosed interior 4033 of the main housing portion 4024 and configured to process signals received from connectors to be coupled via the fiber optic adapters 4034. The optical component (not illustrated) of the fiber optic module 4020 may include, but is not limited to, a fiber optic splitter, a fiber optic filter, and/or a multiplexer/demultiplexer.

The fiber optic main housing portion 4024 may also include a crimp tube 4038 mounted to the front end 4026, and at least one fiber optic cable 4036 may be attached to the crimp tube 4038 and extend from the main housing portion 4024 to carry the signal processed by the optical component. Each fiber optic cable 4036 may include, for example, a jacket, a strength member crimped to the crimp tube 4038, and optical fibers extending past the crimp tube 4038 into the interior 4033 of the main housing portion 4024.

Each of the fiber optic adapters 4034 may define at least one signal entry/exit port. In some embodiments, the entry/exit ports in a given fiber optic adapter 4034 may include a first signal entry/exit port for relaying a main wavelength and a second signal entry/exit port for relaying an express wavelength. The optical component may be configured to combine the main wavelength and the express wavelength into a combination signal carried by the fiber optic cable(s) 4036. In some embodiments, the fiber optic adapters 4034 may be of LC format.

According to some embodiments, each fiber optic cable 4036 of the fiber optic main housing portion 4024 may include multiple fibers (not shown). The embodiment of module 4020 in FIGS. 119-121 includes four fiber optic cables 4036, but alternative embodiments may include fewer or greater number of cables 4036. The multiple fibers of the cables 4036 may optionally be broken out by an optical fan-out before each of the multiple fibers is terminated by an additional, separate fiber optic connector (not shown). In some embodiments, these additional, separate fiber optic connectors may also be LC connectors. In some embodiments, each fiber optic cable 4036 is a 24-fiber cable. In the illustrated embodiment, each of the fiber optic adapters 4034 mounted to the front side 4026 of the main housing portion 4024 has capacity for a 24-fiber cable, and there are four adapters 4034, thus providing capacity for 96 total fibers. In alternative embodiments, the main housing portion 4024 may include fewer than four or more than four adapters 4034. In some embodiments, each fiber optic cable 4036 may be a 24-fiber cable and may include a separate strength member crimped to a separate crimp tube 4038 mounted to the main housing portion 4024. In some embodiments, at least one of the adapters 4034 is positioned adjacent at least one of the fiber optic cables 4036, at the front end 4026 of the main housing portion 4024.

In some embodiments of the fiber optic module 4020, the fiber optic main housing portion 4024 is mounted in a stationary position relative to the rack mount portion 4022. Alternatively, the fiber optic main housing portion 4024 may be mounted as a sliding three-piece assembly in combination with the rack mount portion 4022.

Referring to FIGS. 122-124, one embodiment of a fiber distribution frame 4010 is illustrated, with multiple fiber optic connection modules 4020 mounted thereon in a stacked arrangement. The fiber optic connection modules 4020 may include any or all of the features of the module 4020 described immediately above, and the fiber distribution frame 4010 may have any or all of the features described previously for other embodiments of fiber distribution frames.

FIGS. 119-124 illustrate only one embodiment of the fiber optic connection module 4020. In alternative embodiments, a fiber optic connection cassette may be provided. In some cases, such a fiber optic cassette may be removably inserted into a mount to form a complete module, as will be discussed in further detail below. Alternatively, the cassette may be built into the mount, forming an integrated module as described with respect to FIGS. 119-124.

Referring now to FIGS. 125 and 126, one embodiment of such a fiber optic cassette 4200 is illustrated in exploded view (FIG. 125) and assembled view (FIG. 126). The fiber optic cassette 4200 may be attached to any suitable mount to form a fiber optic module, such as but not limited to the mounts described herein. In some embodiments, the cassette 4200 is removably attached to a mount defined by the main housing portion of a module, which may be either a stationary portion or a slidable portion, according to various embodiments. In alternative embodiments, the cassette 4200 may be permanently attached or integrally formed with the mount, rather than being a separate component.

In the illustrated embodiment, the cassette 4200 includes a cassette body 4224 defining a front end 4226, a rear end 4228, a left side 4230, a right side 4232, and an enclosed interior 4233. The cassette 4200 also includes a removable top 4229. There may be at least one signal entry/exit port in the front end 4226 of the cassette body 4224, where each signal entry/exit port is defined by a fiber optic adapter 4234. The cassette 4200 may also include an optical component (not shown), located in the enclosed interior 4233 of the cassette body 4224, for processing signals received from fiber optic connectors coupled to the fiber optic adapters 4234. One or more crimp tubes 4238 may be mounted to the front end 4226 of the cassette body 4224. A fiber optic cable (not shown) may be attached to each crimp tube 4238 and may extend from the cassette 4200 to carry the signal processed by the optical component. As with the previous embodiment, each fiber optic cable may include a jacket, a strength member crimped to one of the crimp tubes 4238, and optical fibers extending past the crimp tube 4238 into the enclosed 4233 interior of the cassette body 4224.

Each of the adapters 4234 may include a first signal entry/exit port configured to relay a main wavelength and a second signal entry/exit port configured to relay an express wavelength. The optical component may combine the main wavelength and the express wavelength into a combination signal carried by one of the fiber optic cables. The fiber optic adapters 4234 may be any suitable adapters, such as, but not limited to, LC adapters. The adapters 4234 may be positioned on the front end 4226 of the cassette body 4224, and the crimp tubes 4238 and fiber optic cables may also be positioned on the front end 4226, so that a left-most adapter 4234 is located adjacent a right-most crimp tube 4238 and fiber optic cable. Each fiber optic cable may include multiple fibers, and in some embodiments, each fiber optic cable is broken out by an optical fan-out before each of the multiple fibers is terminated by a separate fiber optic connector (not shown). These separate fiber optic connectors may be any suitable connectors, such as, but not limited, to LC connectors. In one embodiment, the fiber optic cables are 24-fiber cables. For example, four 24-fiber cables are included in one embodiment. In some embodiments, each fiber optic cable of the fiber optic cassette 4200 includes a separate strength member crimped to a separate crimp tube 4238 mounted to the front end 4226 of the cassette body 4224. The optical component may be a fiber optic splitter, a fiber optic filter, a multiplexer/demultiplexer, and/or the like, as discussed above with respect to the integral module versions.

Turning now to FIGS. 127-130, one embodiment of a fiber optic module 4220 may include the fiber optic cassette 4200 described immediately above, attached to a mount 4222 of the module 4220. As both the fiber optic module 4220 and various embodiments of the mount 4222 are described in detail, they will not be further described again here. As mentioned above, the cassette 4200 may be removably housed in the main housing portion of the module in some embodiments. In alternative embodiments, the cassette 4200 may be permanently attached to the mount 4222 of the module. FIGS. 127 and 129 show the fiber optic cassette 4200 attached to the mount 4222. FIGS. 128 and 130 show the fiber optic cassette 4200 in an exploded configuration over the mount 4222 of the main housing portion, in an unattached position. Again, the fiber optic cassette 4200 includes four adapters 4234 and four crimp tubes 4238 for holding four fiber optic cables (not shown). As described previously, each of the four fiber optic cables may be 24-fiber cables.

FIGS. 131-134 illustrate yet another embodiment of a fiber optic module 4400. In this embodiment, the module 4400 includes the removable fiber optic cassette 4200 described immediately above mounted to a bladed chassis system 4420. Various embodiments and features of the bladed chassis system 4420 are described more completely in U.S. Pat. No. 9,709,765, which is hereby incorporated fully by reference. As the fiber optic cassette 4200 is described fully above, and as the bladed chassis system 4420 is described in the incorporated patent, these will not be described further here.

Referring to FIGS. 135 and 136, an alternative embodiment of a fiber optic cassette 4500 is illustrated in perspective view (FIG. 135) and top view (FIG. 136). In both views, the cassette 4500 is shown without a cover, for enhanced clarity. The fiber optic cassette 4500 may be attached to any suitable mount to form a fiber optic module, such as but not limited to, the mounts described herein. In some embodiments, the cassette 4500 is removably attached to a mount defined by the main housing portion of a module, which may be either a stationary portion or a slidable portion, according to various embodiments. In alternative embodiments, the cassette 4500 may be permanently attached or integrally formed with the mount, rather than being a separate component.

In the illustrated embodiment, the cassette 4500 includes a cassette body 4524 defining a front end 4526, a rear end 4528, a left side 4530, a right side 4532, and an enclosed interior 4533. The cassette 4500 may also include a removable top (not shown). In contrast to previously described embodiments, the front end 4526 of the cassette body 4524 includes two angled portions, which are set at an angle relative to the left side 4530 and the right side 4532, or in other words relative to the longitudinal axis of the cassette body 4524. The front end 4526 may also include one or more straight portions. There may be at least one signal entry/exit port at the front end 4526 of the cassette body 4524, where each signal entry/exit port is defined by a fiber optic adapter 4534. As illustrated, in this embodiment, the four fiber optic adapters 4534 are attached to the two angled portions of the front end 4526. The angled configuration of the adapters 4534 at the front end 4526 may provide one or more advantages, such as a larger cable radius for smaller bend angles for any fiber optic cables extending from the adapters 4534 into the interior of the cassette 4500. The angled configuration may also facilitate cable management at an exterior of the cassette, around the rack systems to which the modules carrying such cassettes may be mounted.

According to various embodiments, the front end 4526 may include any suitable number of angled portions and straight portions, may include only one angled portion and no straight portions, or any suitable combination thereof.

The cassette 4500 may also include an optical component (not shown), located in the enclosed interior 4533 of the cassette body 4524, for processing signals received from fiber optic connectors coupled to the fiber optic adapters 4534. One or more crimp tubes 4538 may be mounted to the front end 4526 of the cassette body 4524. In the illustrated embodiment, the crimp tubes 4538 are mounted to a straight portion of the front end 4526. A fiber optic cable (not shown) may be attached to each crimp tube 4538 and may extend from the cassette 4500 to carry the signal processed by the optical component. As with previous embodiments, each fiber optic cable may include a jacket, a strength member crimped to one of the crimp tubes 4538, and optical fibers extending past the crimp tube 4538 into the enclosed interior 4533 of the cassette body 4524.

Each of the adapters 4534 may include a first signal entry/exit port configured to relay a main wavelength and a second signal entry/exit port configured to relay an express wavelength. The optical component may combine the main wavelength and the express wavelength into a combination signal carried by one of the fiber optic cables. The fiber optic adapters 4534 may be any suitable adapters, such as, but not limited to, LC adapters. The adapters 4534 and the crimp tubes 4538 may be positioned on the front end 4526, so that a left-most adapter 4534 is located adjacent a right-most crimp tube 4538. Each fiber optic cable may include multiple fibers, and in some embodiments, each fiber optic cable is broken out by an optical fan-out before each of the multiple fibers is terminated by a separate fiber optic connector (not shown). These separate fiber optic connectors may be any suitable connectors, such as, but not limited to, LC connectors. In one embodiment, the fiber optic cables are 24-fiber cables. For example, four 24-fiber cables are included in one embodiment. In some embodiments, each fiber optic cable of the fiber optic cassette 4500 includes a separate strength member crimped to a separate crimp tube 4538 mounted to the front end 4526 of the cassette body 4524. The optical component may be a fiber optic splitter, a fiber optic filter, a multiplexer/demultiplexer, and/or the like, as discussed above.

Referring now to FIGS. 137A and 137B, an exemplary embodiment of a pigtail adapter 5000 includes a crimp body 5004 and an outer mounting body 5002. The crimp body 5004 defines a first side 5022 and a second side 5028, separated by a center portion 5023. The crimp body 5004 is configured for slidable insertion into, and coupling to, the outer mounting body 5002.

As shown in FIG. 137A, the crimp body 5004 includes two flexible cantilever legs 5024, 5025, extending from the first side 5022, which flex toward and away from each other during insertion into the mounting body 5002. Each of the legs 5024, 5025 includes an outwardly protruding tab 5026, which defines a tapered front profile and a rear a flat face for catching against an internal catch of the outer mounting body 5002. The center portion 5023, separating the first side 5022 from the second side 5028, defines a generally rectangular portion for insertion into and abutting a flange defined around a through-hole 5014 of the outer mounting body 5002. As shown in FIG. 137B, an integral crimp portion 5030 extends from the second side 5028 of the crimp body 5004. In this embodiment, the integral crimp portion 5030 is cylindrical and has a central bore 5032 and outer surface texturing. The integral crimp portion 5030 fits into a strain relief boot 5034, and the outer surface texturing helps securely couple the crimp body 5004 to the boot 5034.

The outer mounting body 5002 is sized for insertion into apertures on a cassette, which are designed for LC duplex adapters, SC simplex adapters, or MPO adapters. The outer mounting body 5002 has a top surface 5006, a bottom surface 5008, a front 5009, a back 5011, a first side 5010 and a second side 5012. Each side 5010, 5012 has a tab 5016, which is configured for slidable insertion into slots defined at the cassette apertures. Each side 5010, 5012 also includes a wider portion 5018 near the front 5009 of the outer mounting body 5002. In this embodiment, the back 5011 is flat, and the front 5009 is curved from top to bottom.

As noted above, the outer mounting body 5002 also includes a through-hole 5014, into which the legs 5025, 5026 of the crimp body 5004 are inserted. The outer mounting body 5002 is configured for slidable insertion into the cassette, in a direction generally perpendicular to the insertion direction (front to back) of the crimp body 5004 into the outer mounting body 5002. Once inserted, the tabs 5016 of the outer mounting body 5002 mate with the slots of the cassette and are retained therein against movement in the front to back direction.

The pigtail adapter 5000 may be used for fixing a portion of a connectorized pigtail to a cassette, such as those described above, while still directing fibers extending from the terminated connector(s) into the cassette. For example, the pigtail adapter 5000 may be used to fix the outer cabling carrying a certain numbers of fibers to a telecommunications device or fixture, such as a cassette, while allowing the fibers carried by the cabling to extend into the cassette.

The fibers that extend from the pigtail adapter 5000 may lead to different types of equipment, such as fiber optic filters that filter out a certain type of wavelength within such a cassette. At opposite ends of the filters, the fibers may be spliced to fibers that are led out of the cassette via fiber optic components such as mounted fiber optic adapters. The fibers that are directed within the cassette toward the mounted fiber optic adapters may be terminated to internal connectors, so that they can be mated to external connectors that are coming from outside the cassette.

Referring to FIGS. 138A-138G, additional views of the outer mounting body 5002 of the pigtail adapter 5000 are provided. FIG. 138A is a top/front perspective view. FIG. 138B is a top view. FIG. 138C is top/rear perspective view. FIG. 138D is a front view. FIG. 138E is a side view. FIG. 138F is a rear view. FIG. 138G is a side, cross-sectional view.

FIG. 139 illustrates a 12-fiber array 5050 that has been terminated with LC format connectors at one end and crimped at a portion thereof to the pigtail adapter 5000, according to one embodiment. This figure shows the strain relief boot 5034 surrounding the crimp portion 5030 of the crimp body 5004 of the pigtail adapter 5000. Fibers 5036 extend out of the back 5011 of the outer mounting body 5002 of the pigtail adapter 5000 for being directed into a telecommunications device, such as a cassette on which the pigtail adapter 5000 may be mounted, and provide a fixation point for the outer cabling carrying the fibers 5036.

Referring now to FIGS. 140 and 141, another alternative embodiment of a fiber optic cassette 5100 is illustrated in exploded view (FIG. 140) and assembled/top view (FIG. 141). The fiber optic cassette 5100 may be attached to any suitable mount to form a fiber optic module, such as but not limited to the mounts described herein. In some embodiments, the cassette 5100 is removably attached to a mount defined by the main housing portion of a module, which may be either a stationary portion or a slidable portion, according to various embodiments. In alternative embodiments, the cassette 5100 may be permanently attached to, or integrally formed with, the mount, rather than being a separate component.

In the illustrated embodiment, the cassette 5100 includes a cassette body 5102 defining a front end 5116, a rear end 5118, a left side 5120, a right side 5122, and an enclosed interior 5124. The cassette 5100 also includes a removable top 5104, which is attached to the cassette body 5102 via multiple fasteners 5106 (screws in this embodiment). Optionally, one or more labels 5108 may be placed on the removable top 5104. There are multiple apertures 5110 in the front end 5116 of the cassette body 5100, each of which is configured to house one fiber optic adapter 5210, one example of which is the pigtail adapter 5000 described above and illustrated in FIG. 140. The cassette 5100 may also include optical components (not shown), located in the enclosed interior 5124 of the cassette body 5102, for processing signals received from fiber optic connectors 5200 coupled to the fiber optic adapters 5210. The cassette 5100 may also include one or more radius limiters 5114, 5115 in the enclosed interior 5124, for wrapping excess fibers to prevent damage to the fibers that may be caused by violating bend radius requirements. As depicted, there may be a left radius limiter 5114 and a right radius limiter 5115. The use thereof might depend on the placement of the optical components within the cassette 5000 and the side of entry/exit for the fibers. The radius limiters 5114, 5115 may define slots around the perimeter, for removably receiving cable management fingers for retaining the fibers around the radius limiters. The cable management fingers extend outwardly from the radius limiter 5114, 5115 when mounted.

The illustrated embodiment of the cassette 5100 includes eight apertures 5110 at the front wall 5116 of the cassette body 5102. Alternative embodiments may include any suitable alternative number of apertures 5110. According to the inventive aspects of the disclosure, the apertures 5110 are all identical in configuration and allow the pigtail adapter 5000, other different types of adapters 5210 and/or other fiber optic structures to be mounted therein, for different connectivity needs. For example, the apertures 5110 can receive duplex LC format adapters, simplex SC format adapters, or MPO format adapters. When an aperture 5110 is not in use, it can be plugged with a blank structure 5112 (or "plug") that has the same outer profile as one of the adapters 5000, 5210 and other fiber optic components. In the cassette body 5102 shown, as many as eight adapters 5000, 5210, in any combination, may be positioned on the front end 5116 of the cassette body 5102 in the apertures 5110. Alternatively, fewer adapters 5000, 5210 may be mounted on the front end 5116, and any unused apertures 5110 may be plugged with blank structures 5112.

In the illustrated embodiment, a single, 12-fiber (or channel) array 5200 is connected to right-most aperture 5110 of the cassette 5100, via the pigtail adapter 5000. Three adapters 5210 are mounted in the apertures 5110 directly to the left of the 12-channel array 5200, and four blank structures 5112 occupy the apertures 5110 on the left side of the cassette body 5102. Thus, the embodiment of FIGS. 140 and 141 may be referred to as a "right-sided" or "right" configuration. Again, this is only one example of how the cassette 5100 may be used and configured.

FIG. 142 shows an alternative embodiment, in which the cassette 5100 and all of its features are the same, but the apertures 5110 are being used in a different configuration. This example is the opposite of the embodiment shown in FIGS. 140 and 141, and thus it may be referred to as a "left-sided" or "left" configuration. Here, the 12-fiber array 5200 is connected to the left-most aperture 5110 of the cassette 5100, via the pigtail adapter 5000, three adapters 5210 are mounted in the apertures 5110 directly to the right of the 12-channel array 5200, and four blank structures 5112 occupy the apertures 5110 on the right side of the cassette body 5102. Again, this is only one example, and any other combination or configuration may be employed in other examples.

FIG. 143 shows another alternative embodiment, in which the cassette 5100 and all of its features are the same, but the apertures 5110 are being used in a different configuration. In this embodiment, two 24-fiber or channel arrays 5300, 5310 are connected to the two left-most apertures 5110 of the cassette 5100, via two pigtail adapters 5000. (The connectors of the second array 5310 are not shown, for simplicity.) Five adapters 5210 are mounted in the apertures 5110 directly to the right of the 12-channel array 5200, and one blank structure 5112 occupies the right-most aperture 5110 of the cassette body 5102.

FIG. 144 shows another alternative embodiment, in which the cassette 5100 and all of its features are the same, but the apertures 5110 are being used in a different configuration. In this embodiment, four 24-fiber or channel arrays 5300, 5310 are connected to the four left-side apertures 5110 of the cassette 5100, via four pigtail adapters 5000. (The connectors of the additional three arrays 5310 are not shown, for simplicity.) Four adapters 5210 are mounted in the right-side apertures 5110 of the cassette body 5102. Again, the example combinations shown in FIGS. 140-144 are exemplary only and are not intended to be limiting. Any other suitable combination of arrays, adapters, blank structures and apertures may be used, according to various alternative embodiments.

FIGS. 145A-145X illustrate the various fiber routing configurations that can be utilized within the interior 5124 of the cassette body 5102, using the two radius limiters 5114, 5115 thereof depending upon the different types of optical equipment used therein and the desired connectivity applications. These routing configurations are merely examples and are not intended to be limiting.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A fiber optic cassette, comprising:

a cassette body defining a front end, a rear end, and an enclosed interior;

at least one signal entry/exit port at the front end of the cassette body, the at least one signal entry/exit port defined by a fiber optic adapter;

an optical component located in the enclosed interior of the cassette body and configured to process a signal received from a fiber optic connector coupled to the fiber optic adapter;

at least one crimp tube mounted to the front end of the cassette body; and at least one fiber optic cable attached to the at least one crimp tube, extending from the cassette and configured to carry the signal processed by the optical component, wherein the at least one fiber optic cable comprises:

a jacket;

a strength member crimped to the crimp tube; and multiple optical fibers extending past the at least one crimp tube into the interior of the cassette body, wherein the at least one fiber optic cable comprises multiple 24-fiber cables each carrying multiple optical fibers extending past the at least one crimp tube into the interior of the cassette body and wherein the at least one crimp tube comprises multiple crimp tubes mounted to the front end of the cassette body, wherein each fiber optic cable of the fiber optic cassette comprises a separate strength member crimped to a separate crimp tube of the multiple crimp tubes mounted to the cassette body.

2. The fiber optic cassette of claim 1, wherein the at least one signal entry/exit port comprises:

a first signal entry/exit port configured to relay a main wavelength; and a second signal entry/exit port configured to relay an express wavelength.

3. The fiber optic cassette of claim 2, wherein the optical component is configured to combine the main wavelength and the express wavelength into a combination signal carried by the at least one fiber optic cable.

4. The fiber optic cassette of claim 1, wherein the fiber optic adapter comprises an LC adapter.

5. The fiber optic cassette of claim 1, wherein the multiple optical fibers of the at least one fiber optic cable are broken out by an optical fan-out before each of the multiple optical fibers is terminated by a separate fiber optic connector.

6. The fiber optic cassette of claim 5, wherein the separate fiber optic connector comprises an LC connector.

7. The fiber optic cassette of claim 1, wherein the at least one fiber optic cable comprises at least four 24-fiber cables.

8. The fiber optic cassette of claim 1, wherein the optical component comprises a fiber optic splitter.

9. The fiber optic cassette of claim 1, wherein the optical component comprises a fiber optic filter.

10. The fiber optic cassette of claim 1, wherein the optical component comprises a multiplexer/demultiplexer.

11. The fiber optic cassette of claim 1, wherein the fiber optic cassette is configured to be mounted in a stationary mount that does not move relative to a chassis.

12. The fiber optic cassette of claim 1, wherein the fiber optic cassette is configured to be mounted in a sliding mount that slides relative to a chassis.

13. The fiber optic cassette of claim 1, wherein the at least one signal entry/exit port is positioned adjacent the at least one fiber optic cable at the front end of the cassette body.

14. The fiber optic cassette of claim 1, wherein the cassette defines a plurality of signal entry/exit ports at the front end of the cassette body and at least one port for receiving a pigtail adapter structure defining the at least one crimp tube mounted to the front end of the cassette body, all of the signal entry/exit ports and the at least one pigtail adapter receiving port defining an identical configuration.

15. A fiber optic cassette, comprising:

a cassette body defining a front end, a rear end, and an enclosed interior;

at least one signal entry/exit port at the front end of the cassette body, the at least one signal entry/exit port defined by a fiber optic adapter, wherein the at least one signal entry/exit port comprises:

a first signal entry/exit port configured to relay a main wavelength; and a second signal entry/exit port configured to relay an express wavelength;

an optical component located in the enclosed interior of the cassette body and configured to process a signal received from a fiber optic connector coupled to the fiber optic adapter;

at least one crimp tube mounted to the front end of the cassette body; and at least one fiber optic cable attached to the at least one crimp tube, extending from the cassette and configured to carry the signal processed by the optical component, wherein the at least one fiber optic cable comprises:

a jacket;

a strength member crimped to the at least one crimp tube; and optical fibers extending past the at least one crimp tube into the interior of the cassette body, wherein the at least one fiber optic cable comprises multiple 24-fiber cables each carrying optical fibers extending past the at least one crimp tube into the interior of the cassette body and wherein the at least one crimp tube comprises multiple crimp tubes mounted to the front end of the cassette body, wherein each fiber optic cable of the fiber optic cassette comprises a separate strength member crimped to a separate crimp tube of the multiple crimp tubes mounted to the cassette body.

16. The fiber optic cassette of claim 15, wherein the optical component is configured to combine the main wavelength and the express wavelength into a combination signal carried by the at least one fiber optic cable.

17. A fiber optic cassette, comprising:

a cassette body defining a front end, a rear end, and an enclosed interior;

at least one signal entry/exit port at the front end of the cassette body, the at least one signal entry/exit port defined by a fiber optic adapter in the form of an LC adapter;

an optical component located in the enclosed interior of the cassette body and configured to process a signal received from a fiber optic connector coupled to the fiber optic adapter;

at least one crimp tube mounted to the front end of the cassette body; and at least one fiber optic cable attached to the at least one crimp tube, extending from the cassette and configured to carry the signal processed by the optical component, wherein the at least one fiber optic cable comprises:

a jacket;

a strength member crimped to the at least one crimp tube; and optical fibers extending past the at least one crimp tube into the interior of the cassette body, wherein the at least one fiber optic cable comprises multiple 24-fiber cables each carrying optical fibers extending past the at least one crimp tube into the interior of the cassette body and wherein the at least one crimp tube comprises multiple crimp tubes mounted to the front end of the cassette body, wherein each fiber optic cable of the fiber optic cassette comprises a separate strength member crimped to a separate crimp tube of the multiple crimp tubes mounted to the cassette body.

* * * * *